United States Patent
Mills

(10) Patent No.: US 12,540,073 B2
(45) Date of Patent: Feb. 3, 2026

(54) HETEROGENEOUS HYDROGEN-CATALYST SOLID FUEL REACTION MIXTURE AND REACTOR

(71) Applicant: BRILLIANT LIGHT POWER, INC., Cranberry, NJ (US)

(72) Inventor: Randell L. Mills, Cranberry, NJ (US)

(73) Assignee: BRILLIANT LIGHT POWER, INC., Newtown, PA (US)

(*) Notice: Subject to any disclaimer, the term of this patent is extended or adjusted under 35 U.S.C. 154(b) by 766 days.

(21) Appl. No.: 16/358,411

(22) Filed: Mar. 19, 2019

(65) Prior Publication Data

US 2020/0299130 A1 Sep. 24, 2020
US 2023/0045778 A9 Feb. 9, 2023

Related U.S. Application Data

(63) Continuation of application No. 13/054,198, filed as application No. PCT/US2009/052072 on Jul. 29, 2009, now abandoned.

(Continued)

(51) Int. Cl.
  *C01B 3/00* (2006.01)
  *F01K 27/00* (2006.01)
  (Continued)

(52) U.S. Cl.
  CPC ............ *C01B 3/0094* (2013.01); *F01K 27/00* (2013.01); *H01M 8/04216* (2013.01); *H01M 8/065* (2013.01)

(58) Field of Classification Search
  CPC ....... C01B 3/0094; C01B 3/02; C01B 3/0031; C01B 3/00; C01B 3/0026; C01B 6/00;
  (Continued)

(56) References Cited

U.S. PATENT DOCUMENTS 2,829,950 A 4/1958 Cunningham
4,603,043 A * 7/1986 Douglas ................. C01G 41/00
  423/61

(Continued)

FOREIGN PATENT DOCUMENTS

WO 90/013126 11/1990
WO 92/010838 6/1992

(Continued)

OTHER PUBLICATIONS

Jung et al. "Catalytic effects of metal oxide on hydrogen absorption of magnesium metal hydride" Journal of Alloys and Compounds 421 (2006) 179-184 (Year: 2006).*

(Continued)

*Primary Examiner* — Anthony J Zimmer
*Assistant Examiner* — Syed T Iqbal
(74) *Attorney, Agent, or Firm* — Greenberg Traurig, LLP

(57) ABSTRACT

A power source and hydride reactor is provided comprising a reaction cell comprising a solid reaction mixture which undergoes one or more chemical reactions providing a net positive enthalpy of reaction. Power and chemical plants that can be operated continuously using electrolysis or thermal regeneration reactions involving these solid fuels are also provided herein. The solid fuel reaction mixture may comprise:

(a) inorganic halide, inorganic oxide selected from $Y_2O_3$, $SnO_2$, $As_2O_3$, $Bi_2O_3$, FeO, $TeO_2$, $P_2O_5$, and $SeO_2$, inorganic nitrate selected from $NaNO_3$ and $LiNO_3$, metal carbide selected from TiC, and WC, inorganic nitride selected from $Mg_3N_2$, AlN, $Zn_3N_2$, and $Ca_3N_2$, inorganic sulfide selected from $Li_2S$, ZnS, CoS, $Sb_2S_5$, MnS, $Cu_2S$, $Y_2S_3$, CuS, FeS, $Sb_2S_5$, and $CS_2$, inorganic boride selected from $CrB_2$ and $TiB_2$, or combinations thereof;
(b) metal hydride or metal hydroxide; and
(c) one or more metals.

11 Claims, 6 Drawing Sheets

Related U.S. Application Data

(60) Provisional application No. 61/084,923, filed on Jul. 30, 2008, provisional application No. 61/086,316, filed on Aug. 5, 2008, provisional application No. 61/088,492, filed on Aug. 13, 2008, provisional application No. 61/094,513, filed on Sep. 5, 2008, provisional application No. 61/098,514, filed on Sep. 19, 2008, provisional application No. 61/102,465, filed on Oct. 3, 2008, provisional application No. 61/104,534, filed on Oct. 10, 2008, provisional application No. 61/105,660, filed on Oct. 15, 2008, provisional application No. 61/106,932, filed on Oct. 20, 2008, provisional application No. 61/109,088, filed on Oct. 28, 2008, provisional application No. 61/110,253, filed on Oct. 31, 2008, provisional application No. 61/112,491, filed on Nov. 7, 2008, provisional application No. 61/114,735, filed on Nov. 14, 2008, provisional application No. 61/193,543, filed on Dec. 5, 2008, provisional application No. 61/139,293, filed on Dec. 19, 2008, provisional application No. 61/145,022, filed on Jan. 15, 2009, provisional application No. 61/146,962, filed on Jan. 23, 2009, provisional application No. 61/150,571, filed on Feb. 6, 2009, provisional application No. 61/152,500, filed on Feb. 13, 2009, provisional application No. 61/156,328, filed on Feb. 27, 2009, provisional application No. 61/158,252, filed on Mar. 6, 2009, provisional application No. 61/160,145, filed on Mar. 13, 2009, provisional application No. 61/164,151, filed on Mar. 27, 2009, provisional application No. 61/166,495, filed on Apr. 3, 2009, provisional application No. 61/170,418, filed on Apr. 17, 2009, provisional application No. 61/174,346, filed on Apr. 30, 2009, provisional application No. 61/176,675, filed on May 8, 2009, provisional application No. 61/178,796, filed on May 15, 2009, provisional application No. 61/180,456, filed on May 22, 2009, provisional application No. 61/182,468, filed on May 29, 2009, provisional application No. 61/186,660, filed on Jun. 12, 2009, provisional application No. 61/218,771, filed on Jun. 19, 2009, provisional application No. 61/220,911, filed on Jun. 26, 2009, provisional application No. 61/222,721, filed on Jul. 2, 2009, provisional application No. 61/226,541, filed on Jul. 17, 2009.

(51) Int. Cl.
   H01M 8/04082 (2016.01)
   H01M 8/065 (2016.01)

(58) Field of Classification Search
   CPC ......... C01B 21/06; F01K 27/00; F01K 11/02; H01M 8/04216; H01M 8/065; Y02E 60/50; F22B 1/003; F22B 1/18
   See application file for complete search history.

(56) References Cited

U.S. PATENT DOCUMENTS

| | | | |
|---|---|---|---|
| 5,858,479 A * | 1/1999 | Saito | C23C 26/00 |
| | | | 427/580 |
| 6,024,935 A | 2/2000 | Mills et al. | |
| 6,693,060 B2 | 2/2004 | Park et al. | |
| 7,125,618 B2 | 10/2006 | Kim | |
| 7,188,033 B2 | 3/2007 | Mills | |
| 7,559,494 B1 * | 7/2009 | Yadav | B22F 9/12 |
| | | | 419/36 |
| 2002/0150694 A1 * | 10/2002 | Ye | H01M 4/0404 |
| | | | 427/446 |
| 2004/0011834 A1 | 1/2004 | Damrath et al. | |
| 2005/0011863 A1 | 1/2005 | Wayte | |
| 2005/0020978 A1 | 1/2005 | Vollenweider | |
| 2005/0031870 A1 * | 2/2005 | Liu | C08K 3/36 |
| | | | 428/407 |
| 2006/0023369 A1 | 2/2006 | Carey et al. | |
| 2007/0016658 A1 | 1/2007 | Moineau et al. | |
| 2007/0041897 A1 * | 2/2007 | Eickhoff | C01B 3/065 |
| | | | 423/658.2 |
| 2007/0231254 A1 * | 10/2007 | Gross | C01B 3/001 |
| | | | 423/658.2 |
| 2007/0264190 A1 * | 11/2007 | Zhang | B01J 8/025 |
| | | | 423/648.1 |

FOREIGN PATENT DOCUMENTS

| | | |
|---|---|---|
| WO | 94/029873 | 12/1994 |
| WO | 96/042085 | 12/1996 |
| WO | 99/005735 | 2/1999 |
| WO | 99/026078 | 5/1999 |
| WO | 99/034322 | 7/1999 |
| WO | 99/035698 | 7/1999 |
| WO | 00/007931 | 2/2000 |
| WO | 00/007932 | 2/2000 |
| WO | 01/018948 | 3/2001 |
| WO | 01/021300 | 3/2001 |
| WO | 01/022472 | 3/2001 |
| WO | 01/070627 | 9/2001 |
| WO | 01/095944 | 12/2001 |
| WO | 02/016956 | 2/2002 |
| WO | 02/087291 | 10/2002 |
| WO | 02/088020 | 11/2002 |
| WO | 2003/066516 | 8/2003 |
| WO | 2003/093173 | 11/2003 |
| WO | 04/092058 | 10/2004 |
| WO | 05/041368 | 5/2005 |
| WO | 05/067678 | 7/2005 |
| WO | 05/116630 | 12/2005 |
| WO | 07/051078 | 5/2007 |
| WO | 2007/053486 | 5/2007 |
| WO | 2008/134451 | 11/2008 |
| WO | 20100014684 | 2/2010 |
| WO | WO-2010014684 A2 * | 2/2010 ........... C01B 3/0094 |

OTHER PUBLICATIONS

Watkins et al. "Reaction of Alkali Metal Hydrides with Zinc Halides in Tetrahydrofuran. A Convenient and Economical Preparation of Zinc Hydride", Inorganic Chemistry, vol. 13, No. 10, 1974, p. 2350-2354. (Year: 1974).*

Barkhordarian et al. "Catalytic Mechanism of Transition-Metal Compounds on Mg Hydrogen Sorption Reaction" J. Phys. Chem. B 2006, 110, 11020-11024. (Year: 2006).*

Wu et al. "Effect of carbon/noncarbon addition on hydrogen storage behaviors of magnesium hydride" Journal of Alloys and Compounds 414 (2006) 259-264. (Year: 2006).*

Santjojo et al. "Ellipsometric Characterization on Multi-Layered Thin Film Systems during Hydrogenation" Materials Transactions, vol. 48, No. 6 (2007) pp. 1380 to 1386 (Year: 2007).*

Mills, R., et al., "Comprehensive Identification and Potential Applications of New States of Hydrogen," Int. J. Hydrogen Energy, vol. 32(14), (2007), pp. 2988-3009.

Mills, R., et al., "Cw Hi Laser Based on a Stationary Inverted Lyman Population Formed from Incandescently Heated Hydrogen Gas with Certain Group I Catalysts," IEEE Transactions on Plasma Science, vol. 31, No. 2, April (2003), pp. 236-247.

Mills, R., et al., "Dihydrino Molecule Identification," Fusion Technol., vol. 25, Jan. 1994, pp. 103-119.

Mills, R., et al., "Energetic Catalyst-Hydrogen Plasma Reaction as a Potential New Energy Source," Prepr. Pap.-Am. Chem. Soc. Conf., Div. Fuel Chem., vol. 49, No. 1, (2004), pp. 392-401.

Mills, R., et al., "Evidence of an Energy Transfer Reaction Between Atomic Hydrogen and Argon II or Helium II as the Source of

(56) References Cited

OTHER PUBLICATIONS

Excessively Hot H Atoms in Radio-Frequency Plasmas," J. Plasma Physics, vol. 72, No. 4, (2006), pp. 469-484.

Mills, R., et al., "Excess Heat Production by the Electrolysis of an Aqueous Potassium Carbonate Electrolyte and the Implications for Cold Fusion," Fusion Technol., vol. 20, Aug. 1991, pp. 65-81.

Mills, R., et al., "Excessive Balmer a Line Broadening in Capacitively Coupled RF Water-Vapor Plasmas," Int. J. of Hydrogen Energy, vol. 33, (2008), pp. 802-815.

Mills, R., et al., "Excessively Bright Hydrogen-Strontium Plasma Light Source Due to Energy Resonance of Strontium with Hydrogen," J. Plasma Physics, vol. 69, (2003), pp. 131-158.

Mills, R., et al., "Extreme Ultraviolet Spectroscopy of Hellum-Hydrogen Plasma," J. Phys. D: Appl. Phys., vol. 36, (2003), pp. 1535-1542.

Mills, R., et al., "Formation of a Hydrogen Plasma from an Incandescently Heated Hydrogen-Catalyst Gas Mixture with an Anomalous Afterglow Duration," Int. J. Hydrogen Energy, vol. 26, No. 7, Jul. 2001, pp. 749-762.

Mills, R., et al., "Fractional Quantum Energy Levels of Hydrogen," Fusion Technology, vol. 28, No. 4, Nov. 1995, pp. 1697-1719.

Mills, R., et al., "H2O-Based Solid Fuel Power Source Based on the Catalysis of H by HOH Catalyst," Blacklight Power, Inc., Cranbury, New Jersey, May 28, 2014.

Mills, R., et al., "Highly Stable Amorphous Silicon Hydride from a Helium Plasma Reaction," Materials Chemistry and Physics, vol. 94, (2005), pp. 298-307.

Mills, R., et al., "Highly Stable Amorphous Silicon Hydride," Solar Energy Materials & Solar Cells, vol. 80, No. 1, (2003), pp. 1-20.

Mills, R., et al., "Highly Stable Novel Inorganic Hydrides from Aqueous Electrolysis and Plasma Electrolysis," Electrochimica Acta, vol. 47, No. 24, (2002), pp. 3909-3926.

Mills, R., et al., "Identification of Compounds Containing Novel Hydride Ions by Nuclear Magnetic Resonance Spectroscopy," Int. J. Hydrogen Energy, vol. 26, No. 9, (2001), pp. 965-979.

Mills, R., et al., "Measurement of Energy Balances of Noble Gas-Hydrogen Discharge Plasmas Using Calvet Calorimetry," Int. J. Hydrogen Energy, vol. 27, No. 9, (2002), pp. 967-978.

Mills, R., et al., "Measurement of Hydrogen Balmer a Line Broadening and Thermal Power Balances of Noble Gas- Hydrogen Discharge Plasmas," Int. J. Hydrogen Energy, vol. 27, No. 6, (2002), pp. 671-685.

Mills, R., et al., "Mechanism of Soft X-ray Continuum Radiation from Low-Energy Pinch Discharges of Hydrogen and Ultra-low Field Ignition of Solid Fuels," BlackLight Power, Inc., Cranbury, New Jersey, May 28, 2014.

Mills, R., et al., "Minimum Heat of Formation of Potassium Iode Hydride," Int. J. Hydrogen Energy, vol. 26, No. 11, (2001), pp. 1199-1208.

Mills, R., et al., "New Power Source from Fractional Quantum Energy Levels of Atomic Hydrogen that Surpasses Internal Combustion," J. Mol. Struct., vol. 643, No. 1-3, (2002), pp. 43-54.

Mills, R., et al., "Novel Alkali and Alkaline Earth Hydrides for High Voltage and High Energy Density Batteries," Proceedings of the 17th Annual Battery Conference on Applications and Advances, California State University, Long Beach, CA, (Jan. 15-18, 2002), pp. 1-6.

Mills, R., et al., "Observation of Extreme Ultraviolet Hydrogen Emission from Incandescently Heated Hydrogen Gas with Certain Catalysts," Int. J. Hydrogen Energy, vol. 25, (2000), pp. 919-943.

Mills, R., et al., "Observation of Extreme Ultraviolet Hydrogen Emission from Incandescently Heated Hydrogen Gas with Strontium that Produced an Anomalous Optically Measured Power Balance," Int. J. Hydrogen Energy, vol. 26, No. 4, (2001), pp. 309-326.

Mills, R., et al., "Optically Measured Power Balances of Glow Discharges of Mixtures of Argon, Hydrogen, and Potassium, Rubidium, Cesium, or Strontium Vapor," Int. J. Hydrogen Energy, vol. 27, No. 6, (2002), pp. 651-670.

Mills, R., et al., "Plasma Power Source Based on a Catalytic Reaction of Atomic Hydrogen Measured by Water Bath Calorimetry," Thermochimica Acta, vol. 406, Nos. 1-2, (2003), pp. 35-53.

Mills, R., et al., "Potential for a Hydrogen Water-Plasma Laser," Applied Physics Letters, vol. 82, No. 11, (2003), pp. 1679-1681.

Mills, R., et al., "Role of Atomic Hydrogen Density and Energy in Low Power Chemical Vapor Deposition Synthesis of Diamond Films," Thin Solid Films, vol. 478, (2005), pp. 77-90.

Mills, R., et al., "Solid Fuels that Form HOH Catalyst," Intl. J. Hydrogen Energy, vol. 39 (2014), pp. 11930-11944 DOI: 10.1016/j.ijhydene.

Mills, R., et al., "Spectral Emission of Fractional Quantum Energy Levels of Atomic Hydrogen from a Helium-Hydrogen Plasma and the Implications for Dark Matter," Int. J. Hydrogen Energy, vol. 27, No. 3, (2002), pp. 301-322.

Mills, R., et al., "Spectral Emission of Fractional-Principal-Quantum-Energy-Level Atomic and Molecular Hydrogen," Vibrational Spectroscopy, vol. 31, No. 2, (2003), pp. 195-213.

Mills, R., et al., "Spectral Identification of New States of Hydrogen," BlackLight Power, Inc., Cranbury, New Jersey, Nov. 18, 2003.

Mills, R., et al., "Spectroscopic Characterization of the Atomic Hydrogen Energies and Densities and Carbon Species During Hellum-Hydrogen-Methane Plasma CVD Synthesis of Diamond Films," Chem. Mater., vol. 15, (2003), pp. 1313-1321.

Mills, R., et al., "Spectroscopic Identification of a Novel Catalytic Reaction of Potassium and Atomic Hydrogen and the Hydride Ion Product," Int. J. Hydrogen Energy, vol. 27, No. 2, (2002), pp. 183-192.

Mills, R., et al., "Spectroscopic Identification of a Novel Catalytic Reaction of Rubidium Ion with Atomic Hydrogen and the Hydride Ion Product," Int. J. Hydrogen Energy, vol. 27, No. 9, (2002), pp. 927-935.

Mills, R., et al., "Spectroscopic Observation of Hellum-Ion- and Hydrogen-Catalyzed Hydrino Transitions," Cent. Eur. J. Phys., vol. 8, No. 3, (2010), pp. 318-339.

Mills, R., et al., "Spectroscopic Study of Unique Line Broadening and Inversion in Low-Pressure Microwave Generated Water Plasmas," J. Plasma Physics, vol. 71, No. 6, (2005), 877-888.

Mills, R., et al., "Stationary Inverted Lyman Population and a Very Stable Novel Hydride Formed by a Catalytic Reaction of Atomic Hydrogen and Certain Catalysts," J. Opt. Mat., vol. 27, (2004), 181-186.

Mills, R., et al., "Stationary Inverted Lyman Population Formed from Incandescently Heated Hydrogen Gas with Certain Catalysts," J. Phys. D: Appl. Phys., vol. 36, (2003), pp. 1504-1509.

Mills, R., et al., "Substantial Changes in the Characteristics of a Microwave Plasma Due to Combining Argon and Hydrogen," New Journal of Physics, www.njp.org, vol. 4, (2002), p. 22.1-22.17.

Mills, R., et al., "Synthesis and Characterization of a Highly Stable Amorphous Silicon Hydride as the Product of a Catalytic Helium-Hydrogen Plasma Reaction," Int. J. Hydrogen Energy, vol. 28, No. 12, (2003), pp. 1401-1424.

Mills, R., et al., "Synthesis and Characterization of Novel Hydride Compounds," Int. J. of Hydrogen Energy, vol. 26, No. 4, (2001), pp. 339-367.

Mills, R., et al., "Synthesis and Characterization of Potassium Iode Hydride," Int. J. of Hydrogen Energy, vol. 25, No. 12, Dec. 2000, pp. 1185-1203.

Mills, R., et al., "Synthesis of HDLC Films from Solid Carbon," J. Mater. Sci., vol. 39, (2004), pp. 3309-3318.

Mills, R., et al., "Vibrational Spectral Emission of Fractional-Principal-Quantum-Energy-Level Hydrogen Molecular Ion," Int. J. Hydrogen Energy, vol. 27, No. 5, (2002), pp. 533-564.

Mills, R., et al., "Water Bath Calorimetry on a Catalytic Reaction of Atomic Hydrogen," Int. J. Hydrogen Energy, vol. 32, (2007), pp. 4258-4266.

Mills, R., The Grand Unified Theory of Classical Quantum Mechanics, Nov. 1995 Edition, HydroCatalysis Power Corp., Malvern, PA, Library of Congress Catalog No. 94-077780, ISBN No. ISBN 0-9635171-1-2, Chp. 22.

Mills, R.L. et al., "Commercializable Power Source Using Heterogeneous Hydrino Catalysts," Int. J. Hydrogen Energy, vol. 35 (2010), pp. 395-419, doi: 10.1016/j.ijhydene.2009.10.038.

(56) References Cited

OTHER PUBLICATIONS

"Mills, R.L et al., ""Hydrino Continuum Transitions with Cutoffs at 22.8 nm and 10.1 nm,"" Int. J. Hydrogen Energy, 35 (2010), pp. 8446-8456, doi: 10.1016/j.ijhydene.2010.05.098."

Mills, R.L. et al., "Spectroscopic Observation of Hellum-Ion- and Hydrogen-Catalyzed Hydrino Transitions," Central European J. Phys., vol. 8, (2010), 318-339, doi: 10.2478/s11534-009-0106-9.

Lide, D. R., CRC Handbook of Chemistry and Physics, 78th Edition, CRC Press, (1997), pp. 10-214 to 10-216.

Lide, D. R., CRC Handbook of Chemistry and Physics, 79th Edition, CRC Press, Boca Raton, Florida, (Sep. 1998), pp. 10-175 to 12-191.

Lide, D. R., CRC Handbook of Chemistry and Physics, 86th Edition, CRC Press, Taylor & Francis, Boca Raton, (Jun. 2005), pp. 10-202 to 10-204.

Lide, D. R., CRC Handbook of Chemistry and Physics, 86th Edition, CRC Press, Taylor & Francis, Boca Raton, (Jun. 2005), pp. 5-4 to 5-18; 9-63.

Lide, D.R., CRC Handbook of Chemistry and Physics, 86th Edition, CRC Press, Taylor & Francis, Boca Raton, (Jun. 2005), pp. 4-45 to 4-97.

Lide, D.R., CRC Handbook of Chemistry and Physics, 86th Edition, CRC Press, Taylor & Francis, Boca Raton, (Jun. 2005), pp. 9-54 to 9-59.

Lu, C., et al., "Study the Effects of Mechanical Activation on Li—N—H Systems with 1 H and 6Li Solid-State NMR," J. Power Sources, vol. 170, (2007), pp. 419-424.

Luggenholscher et al., Essen University, Germany, "Investigations on Electric Field Distributions in a Microwave Discharge in Hydrogen", Verhandlungen der Deutschen Physikalischen Gesellschaft, vol. 36, No. 5, p. 167 (Jul. 2001).

Luque et al., "Experimental research into the influence of ion dynamics when measuring the electron density from the Stark broadening of H(alpha) and H(beta) lines", Journal of Physics B, vol. 36, pp. 1573-1584 (Apr. 2003).

Lykke, K. R.., et al., "Threshold Photodetachment of H-," Phys. Rev. A, vol. 43, No. 11, (1991), pp. 6104-6107.

Margenau, H., et al., "The Mathematics of Chemistry and Physics", D. Van Nostrand Company, Inc., New York, (1956), Second Edition, pp. 363-367.

Mason, J., Editor, Multinuclear NMR, Plenum Press, New York, (1987), Chapter 3.

Mayo, R. M., et al., "Direct Plasmadynamic Conversion of Plasma Thermal Power to Electricity for Microdistributed Power Applications," 40th Annual Power Sources Conference, Cherry Hill, NJ, Jun. 10-13, 2002, pp. 1-4.

Mayo, R. M., et al., "Direct Plasmadynamic Conversion of Plasma Thermal Power to Electricity," IEEE Transactions on Plasma Science, vol. 30, No. 5, Oct. 2002, pp. 2066-2073.

Mayo, R. M., et al., "On the Potential of Direct or MHD Conversion of Power From a Novel Plasma Source to Electricity for Microdistributed Power Applications," IEEE Transactions on Plasma Science, vol. 30, No. 4, Aug. 2002, pp. 1568-1578.

Mills, R et al., "Catalysis of Atomic Hydrogen to New Hydrides as a New Power Source," International Journal of Global Energy Issues (IJGEI). Special Edition in Energy Systems, vol. 28, Nos. 2/3, (2007), 304-324, Novel.

Mills, R et al., "Catalyst induced hydrino transition {CIHT} electrochemical cell," (2012).

Mills, R et al., "Energetic Catalyst-Hydrogen Plasma Reaction as a Potential New Energy Source," Am. Chem. Soc. Div. Fuel Chem. Prepr., vol. 48, No. 2, (2003), p. 863.

Mills, R et al., "Energetic Catalyst-Hydrogen Plasma Reaction as a Potential-New Energy Source," Division of Fuel Chemistry, Session: Chemistry of Solid, Liquid, and Gaseous Fuels, 227th American Chemical Society National Meeting, Mar. 28-Apr. 1, 2004, Anaheim, CA.

Mills, R et al., "Evidence of an energy transfer reaction between atomic hydrogen and argon II or helium II as the source of excessively hot H atoms in radio-frequency plasmas," J. Plasma Physics, vol. 72, No. 4, (2006), 469-484.

Mills, R et al., "Low-Voltage EUV and Visible Light Source Due to Catalysis of Atomic Hydrogen," submitted.

Mills, R et al., "Solid Fuels that Form HOH Catalyst," (2013}.

Mills, R., "Author's response to "Hydrino atom: novel chemistry or invalid physics," International Journal of Hydrogen Energy," 26 (2001 ), p. 1233.

Mills, R., "Blacklight Power Technology—A New Clean Energy Source with the Potential for Direct Conversion to Electricity," Global Foundation International Conference on Global Warming and Energy Policy, Dr. Behram N. Kursunoglu, Chairman, Fort Lauderdale, FL, Nov. 26-28, 2000, Kluwer Academic/Plenum Publishers, New York, pp. 187-202.

Mills, R., "Blacklight Power Technology—A New Hydrogen Energy Source with the Potential for Direct Conversion to Electricity," Proceedings of the National Hydrogen Association, 12th Annual U.S. Hydrogen Meeting and Exposition, Hydrogen: The Common Thread, The Washington Hilton and Towers, Washington DC, (Mar. 6-8, 2001), pp. 671-697.

Mills, R., "Classical Quantum Mechanics," Physics Essays, vol. 16, No. 4, (2003), pp. 433-498.

Mills, R., "Exact Classical Quantum Mechanical Solution for Atomic Helium Which Predicts Conjugate Parameters from a Unique Solution for the First Time," Physics Essays, vol. 21(2), (2008), pp. 103-141.

Mills, R., "Exact Classical Quantum Mechanical Solutions for One—through Twenty-Electron Atoms," Physics Essays, vol. 18, No. 3, (2005), pp. 321-361.

Mills, R., "Highly Stable Novel Inorganic Hydrides," J. New Materials for Electrochemical Systems, vol. 6, (2003), pp. 45-54.

Mills, R., "Maxwell's Equations and QED: Which Is Fact and Which Is Fiction?," Physics Essays, vol. 19, No. 2, (2006), pp. 225-262.

Mills, R., "Novel Hydrogen Compounds from a Potassium Carbonate Electrolytic Cell," Fusion Technol., vol. 37, No. 2, Mar. 2000, pp. 157-182.

Mills, R., "Novel Inorganic Hydride," Int. J. of Hydrogen Energy, vol. 25, (2000), pp. 669-683.

Mills, R., "Observation of Extreme Ultraviolet Emission from Hydrogen-KI Plasmas Produced by a Hollow Cathode Discharge," Int. J. Hydrogen Energy, vol. 26, No. 6, (2001 ), pp. 579-592.

Mills, R., "Physical Solutions of the Nature of the Atom, the Photon, and Their Interactions to Form Excited and Predicted Hydrino States," Physics Essay, vol. 20, No. 3, (2007), pp. 403-460.

Mills, R., "Spectroscopic Identification of a Novel Catalytic Reaction of Atomic Hydrogen and the Hydride Ion Product," Int. J. Hydrogen Energy, vol. 26, No. 10, (2001), pp. 1041-1058.

Mills, R., "Temporal Behavior of Light-Emission in the Visible Spectral Range from a Ti-K2CO3-H-Cell," Int. J. Hydrogen Energy, vol. 26, No. 4, (2001), pp. 327-332.

Mills, R., "The Fallacy of Feynman's and Related Arguments on the Stability of the Hydrogen Atom According to Quantum Mechanics," Annales de la Fondation Louis de Broglie, vol. 30, No. 2, (2005), pp. 129-151.

Mills, R., "The Grand Unified Theory of Classical Quantum Mechanics," Global Foundation, Inc. Orbis Scientiae entitled The Role of Attractive and Repulsive Gravitational Forces in Cosmic Acceleration of Particles the Origin of the Cosmic Gamma Ray Bursts, (29th Conference on High Energy Physics and Cosmology Since 1964) Dr. Behram N. Kursunoglu, Chairman, Dec. 14-17, 2000, Lago Mar Resort, Fort Lauderdale, FL, Kluwer Academic/Plenum Publishers New York pp. 243-258.

Mills, R., "The Grand Unified Theory of Classical Quantum Mechanics," Int. J. Hydrogen Energy, vol. 27, No. 5, (2002), pp. 565-590.

Mills, R., "The Grand Unified Theory of Classical Quantum Mechanics," Jun. 2006 Edition, BlackLight Power, Inc., Cranbury, New Jersey (posted at www.blacklightpower.com).

Mills, R., "The Hydrogen Atom Revisited," Int. J. of Hydrogen Energy, vol. 25, No. 12, Dec. 2000, pp. 1171-1183.

Mills, R., "The Nature of Free Electrons in Superfluid Hellum—a Test of Quantum Mechanics and a Basis to Review its Foundations

(56) References Cited

OTHER PUBLICATIONS and Make a Comparison to • Classical Theory," Int. J. Hydrogen Energy, vol. 26, No. 10, (2001), pp. 1059-1096.

Mills, R., "The Nature of the Chemical Bond Revisited and an Alternative Maxwellian Approach," Physics Essays, vol. 17, No. 3, (2004), pp. 342-389.

Mills, R., et al., "A Comprehensive Study of Spectra of the Bound-Free Hyperfine Levels of Novel Hydride Ion H-(½), Hydrogen, Nitrogen, and Air," Int. J. Hydrogen Energy, vol. 28, No. 8, (2003), pp. 825-871.

Mills, R., et al., "Argon-Hydrogen-Strontium Discharge Light Source," IEEE Transactions on Plasma Science, vol. 30, No. 2, (2002), pp. 639-652.

Mills, R., et al., "Bright Hydrogen-Light Source due to a Resonant Energy Transfer with Strontium and Argon Ions," New Journal of Physics, vol. 4, (2002), pp. 70.1-70.28 (http://www.njp.org/).

Mills, R., et al., "Catalysis of Atomic Hydrogen to Novel Hydrides as a New Power Source," Prepr. Pap.-Am. Chem. Soc. Conf., Div. Fuel Chem., vol. 50, No. 2, (2005), pp. 777-783.

Mills, R., et al., "Catalysis of Atomic Hydrogen to Novel Hydrogen Species H-(¼) and H2(¼) as a New Power Source" Int. J. Hydrogen Energy, vol. 32, No. 12, 2007, pp. 2573-2584.

Mills, R., et al., "Comparison of Excessive Balmer a Line Broadening of Glow Discharge and Microwave Hydrogen Plasmas with Certain Catalysts," J. of Applied Physics, vol. 92, No. 12, (2002), pp. 7008-7021.

Mills, R., et al., "Comparison of Excessive Balmer a Line Broadening of Inductively and Capacitively Coupled RF, Microwave, and Glow Discharge Hydrogen Plasmas with Certain Catalysts," IEEE Transactions on Plasma Science, vol. 31, No. 3, Jun. 2003, pp. 338-355.

Mills, R.L et al., "Total Bond Energies of Exact Classical Solutions of Molecules Generated by Millsian 1.0 Compared to those Computed Using Modern 3-21G* Basis Sets," Phys. Essays 23, (2010) 153-199; doi: 10.4006/1.3310832.

Mills, R.L., "Classical Quantum Mechanics," Physics Essays (2003), vol. 16, No. 4, pp. 433-498.

Mills, R.L., "Exact Classical Quantum-Mechanical Solutions for One-through Twenty-Electron Atoms," Physics Essays (2005), vol. 18, No. 3, pp. 321-361.

Mills, R.L., "Physical Solutions of the Nature of the Atom, Photon, and Their Interactions to Form Excited and Predicted Hydrino States," Physics Essays (2007), vol. 20, No. 3, pp. 403-460.

Mills, R.L., "The Grand Unified Theory of Classical Physics", vol. 1: Atomic Physics, August, (2011 ), posted at http://www.blacklightpower.com/theory/bookdownload.shtml.

Mills, R.L., et al., "Spectroscopic and NMR Identification of Novel Hydride Ions in Fractional Quantum Energy States Formed by an Exothermic Reaction of Atomic Hydrogen with Certain Catalysts," Eur. Phys. J. Appl. Phys., vol. 28, (2004), pp. 83-104.

Mills, R.L., et al., "Tests of Features of Field-Acceleration Models for the Extraordinary Selective H Balmer a Broadening in Certain Hydrogen Mixed Plasmas," (2009), Int. J. Hydrogen Energy, vol. 34, pp. 6465-6477.

Morse et al., Methods of Theoretical Physics, Part I, McGraw-Hill Book Company, New York (1953), pp. 808-903.

Mueller, W. M., et al., "Metal Hydrides," Academic Press, New York, (1968), pp. 201-203, "Hydrogen in Intermetalic Compounds I," Edited by L. Schlapbach, Springer-Verlag, Berlin, and "Hydrogen in Intermetalic Compounds II," Edited by L. Schlapbach, Springer-Verlag, Berlin.

Mugweru, A., et al., "Report on Synthesis and Studies of 'Generation 2' Lower Energy Hydrogen Chemicals," Rowan University, Aug. 10, 2009, pp. 1-20.

Mugweru, A., et al., "Synthesis and Characterization Alkali Metal Salts Containing Trapped Hydrino," Rowan University, May 2009, pp. 1-14.

Nicolau, I., et al., "Hydrogen in a Commercial Raney Nickel," J. Catalysis, vol. 68, (1981), pp. 339-348.

Niessen, K., et al., "Enthalpies of Formation of Liquid and Solid Binary Alloys Based on 3d Metals," Physica B, vol. 152, (1988), pp. 303-346.

Ohoyama, K et al., "Characteristic Hydrogen Structure in Li—N—H Complex Hydrides," Proceedings of the International Symposium on Research Reactor and Neutron Science—In Commemoration of the 10th Anniversary of HANARO—Daejeon, Korea, Apr. 2005, pp. 655-657.

Pauling et al., Introduction to Quantum Mechanics with Applications to Chemistry, Dover Publications, Dover, Delaware (1985), pp. 121-140.

Phelps, A.V., "Comment on Water Bath Calorimetric Study of Excess Heat Generation in Resonant Transfer Plasmas", Journal of Applied Physics, Oct. 2, 2005.

PHI Trift II, ToF-SIMS Technical Brochure (1999), Physical Electronics, Copyright © 1998, Eden Prairie, MN 55344.

Phillips, J., et al., "Evidence of Catalytic Production of Hot Hydrogen in RF-Generated Hydrogen/Argon Plasmas," Int. J. Hydrogen Energy, vol. 32(14), (2007), pp. 3010-3025.

Phillips, J., et al., "Water Bath Calorimetric Study of Excess Heat in 'Resonance Transfer' Plasmas," Journal of Applied Physics, vol. 96, No. 6, pp. 3095-3102.

Pinkerton, F.E., "Decomposition Kinetics of Lithium Amide for Hydrogen Storage Materials," J. Alloys Compd., vol. 400, (2005), pp. 76-82.

Pugh, J.K., et al., "Independent Off Site Evaluation of Electrical Power Generation by BlackLight Power's High-Power-Density Catalyst Induced Hydrino Transition (CIHT) Cells," The ENSER Corporation, Jan. 16, 2013.

Ramanujachary, K.V., "Validation of Electrical Power Generation by Second Generation CIHT Technology," Nov. 2011.

Ramanujachary, K.V., "Validation of SF-CIHT Technology," Professor, Department of Chemistry and Biochemistry, Rowan University, Feb. 2014.

Rathke, "A critical analysis of the hydrino model," New Journal of Physics, vol. 7, No. 1, May 1, 2005, pp. 127-127.

Rowan University, Anomalous Heat Gains from Regenerative Chemical Mixtures: Characterization of BLP Chemistries Used for Energy Generation and Regeneration Reactions, Nov. 2010.

Sidgwick, N. V., "The Chemical Elements and Their Compounds," vol. I, Oxford, Clarendon Press, (1950), pp. 16-19.

Stavola, M., et al., "Interstitial H2 in Si: are All Problems Solved?" Physica B, vol. 340-342, (2003), pp. 58-66.

Suarez, C., "Gas-phase NMR spectroscopy", The Chemical Educator, vol. 3, No. 2, (1998).

Suarez, C., et al., "Gas-Phase Dynamic NMR Study of the Internal Rotation in N-trifluoroacetylpyrrolidine", J. Phys. Chem. A, vol. 107, (2003), pp. 3024-3029.

Vijh, "Hydrino atom: novel chemistry or invalid physics?", International Journal of Hydrogen Energy Elsevier Sciences Publishers B.V., vol. 25, No. 3, Mar. 1, 2001, p. 281.

Weinberg, Henry, "CIHT Validation Report," Jan. 2012.

Wikipedian entry for Blacklight Power.

European Search Report for corresponding European Patent Application No. 08712914.4-1225 dated Apr. 21, 2011.

European Search Report, dated Dec. 30, 2011 issued in corresponding EP Application No. 08754923.4.

International Search Report and Written Opinion for corresponding International Application No. PCT/US08/61455 mailed Aug. 15, 2008.

Office Action mailed Oct. 24, 2011, in co-pending U.S. Appl. No. 12/108,700 (08056.0043-00).

PCT International Seach Report, mailed Jul. 26, 2010, in Application PCT/US2010/027828.

PCT Search Report and Written Opinion issued by European Patent Office in International Application No. PCT/US2009/052072, mailing date Oct. 14, 2010.

Search Report and Written Opinion issued by Austrian Patent Office in Singapore Patent Application No. 200907057-4 mailing date Feb. 9, 2011.

Abeles, F. (ed.), Optical Properties of Solids, (1972), p. 725.

Atkins, P.W., Physical Chemistry, Second Edition, W.H. Freeman, San Francisco, (1982), p. 589.

(56) References Cited

OTHER PUBLICATIONS

Baldridge, K.K., et al., Correlation of Empirical (TMS) and Absolute NMR Chemical Shifts Predicted by Ab Initio Computations, J. Phys. Chem. A, vol. 103, (1999), pp. 4038-4042.

Baranowski, B., et al., "45 Years of Nickel Hydride—History and Perspectives", Journal of Alloys and Compounds, vol. 404-406, (2005), pp. 2-6.

Bethe et al., Quantum Mechanics of One- and Two-Electron Atoms, Plenum Publishing Corporation, New York (1977), pp. 2, 9-12, 47, 83-84, 92 and 107.

Beutler, H., "Die dissoziationswarme des wasserstoffmolekuls H2, aus einem neuen ultravioletten resonanzbandenzug bestimmt," Z. Physical Chem., vol. 27B, (1934), pp. 287-302.

Booker, R.A., "Report on the Evaluation of Chapter 1, pp. 61-83 in 'The Grand Unified Theory of Classical Quantum Mechanics' by Dr. Randell L. Mills", Aug. 10, 2009.

Bournaud, F., et al., "Missing Mass in Collisional Debris from Galaxies", Science, vol. 316, (2007), pp. 1166-1169.

Cavanaugh, R.R., et al., "Neutron Vibrational Spectroscopy of Hydrogen and Deuterium on Raney Nickel", J. Chem. Phys, vol. 77(3), (1982), pp. 1540-1547.

Chen, E.E., et al., "Key to Understanding Interstitial H2 in Si", Phys. Rev. Letts., vol. 88(10), (2002), pp. 105507-1 to 105507-4.

Chen, E.E., et al., "Rotation of Molecular Hydrogen in Si: Unambiguous Identification of Ortho-H2 and Para-D2", Phys. Rev. Letts, vol. 88(24), (2002), pp. 245503-1 to 245503-4.

Chen, P., et al., "Interaction between Lithium Amide and Lithium Hydride", J. Phys. Chem. B, vol. 107, (2003), pp. 10967-10970.

Chen, P., et al., Interaction of Hydrogen with Metal Nitrides and Arnides, Nature, vol. 420, (2002), pp. 302-304.

Choudhary, V.R., et al., "Leaching of Raney Ni—Al Alloy with Alkili; Kinetics of Hydrogen Evolution", J Chem. Tech. Biotech, vol. 33a, (1983), pp. 339-349.

Conrads, H. et al., "Emission in the Deep Vacuum Ultraviolet from a Plasma Formed by Incandescently Heating Hydrogen Gas with Trace Amounts of Potassium Carbonate", Plasma Sourcs Sci. Tech., vol. 12, (2003), pp. 389-395.

Copeland, T., "Evaluation of Electrical Power Generation by Blacklight Power's High-Power-Density Catalyst Induced Hydrino Transition (CIHT) Cells", The ENSER Corporation, Dec. 15, 2012.

Copeland, Terry M., "Catalyst Induced Hydrino Transition (CIHT) Electrochemical Cell Validation," Jan. 5, 2012.

Cotton, F.A., et al., Advanced Inorganic Chemistry, Sixth Edition, John Wiley & Sons, Inc., New York, (1999), Chapter 6 and p. 92 and 98.

Crouse, G., Jr., "Differential Scanning Calorimeter Analysis of Hydrino-Producing Solid Fuel", Aerospace Engineering, Auburn University, May 2014.

David, W.I.F., et al., "A Mechanism for Non-Stoichiometry in the Lithium Amide/Lithium Imide Hydrogen Storage Reaction", J. Am. Chem. Soc., vol. 129, (2007), pp. 1594-1601.

De Castro, Antonio S., "Orthogonality Criterion for Banishing Hydrino States from Standard Quantum Mechanics", Physics Letters A 369 (5-6): 380, Apr. 4, 2007.

Dombey et al., "The hydrino and other unlikely states," Science Direct—Physics Letters, Dec. 18, 2006, pp. 62-65.

Dombey, Norman, "The Hydrino and Other Unlikely States", Physics Letters A 360: 62, Aug. 8, 2006.

Earle, R.L., et al., "Unit Operations in Food Processing", The New Zealand Institute of ood Science & Technology (Inc), Web Edition (2004), avaiable at http://www.nzifst.org.nz/unitoperations/.

Elmegreen, B.G., "Dark Matter in Galactic Collisional Debris", Science, vol. 316, (2007), pp. 32-33.

Evaluation of Electrical Power Generation by Blacklight Power's Catalyst Induced Hydrino Transition (CIHT} Cells: by the Enser Corporation, 5430 70th Ave North, Pinellas Park, FL 33781.

Feynman et al., the Feynman Lectures On Physics, vol. III, Quantum Mechanics, Addison-Wesley Publishing Company, Reading, Mass., (1965), pp. 1-9, 2-6 and 19-1 through 19-18.

Gasser, J.G., et al., "Electrical Resistivity of Liquid Nickel-Lanthanum and Nickel-Cerium Alloys", Physical Review B, vol. 41, No. 5, (1990), pp. 2776-2783.

GEN3 Partners and Harvard Smithsonian Center for Astrophysics, "Validation of the Observation of Soft X-ray Continuum Radiation from Low-Energy Pinch Discharges in the Presence of Molecular Hydrogen", Nov. 29, 2010.

GEN3 Partners, "GEN3 Validation Report: Water Flow Calorimetry, Experimental Runs and Validation Testing for BlackLight Power, Inc.", Aug. 2009.

Glumac, N., "Scientific Test report", Mechanical Science & Engineering Department, University of Illinois, Urbana—Champaign, Apr. 2014.

Glumac, N., "Test Agreement Report", Mechanical Science & Engineering Department, University of Illinois, Urbana—Champaign, May 2013.

Glumac, Nick, "Final Consultant Report," Jan. 21, 2012.

Good, W., et al., "Spectroscopic and NMR Identification of Novel Hydride Ions in Fractional Quantum Energy States Formed by an Exothermic Reaction of Atomic Hydrogen with Certain Catalysts", Eur. Phys. J. Appl. Phys., vol. 28, (2004), pp. 83-104.

Grot Jahn, D.B., et al., "First Synthesis and Structural Determination of a Monomeric, Unsolvated Lithium Amide, LINH2," J. Am. Chem. Soc., vol. 123, (2001), pp. 5489-5494.

Hemingway, B. S., et al., "Enthalpies of formation of low albite ( ), gibbsite ( ), and; revised values for and of some aluminosilicate minerals", J. Res. U.S. Geol. Surv., vol. 5(4), (1977), pp. 413-429.

Herzberg, G., et al., "The Lyman bands of molecular hydrogen," Can. J. Phys., vol. 37, (1959), pp. 636-659.

Hu, Y. H., et al., "Hydrogen Storage of LiNH2 Prepared by Reacting Li with NH3," Ind. Eng. Chem. Res., vol. 45, (2006), pp. 182-186.

Hu, Y. H., et al., "Ultrafast Reaction between Li3 N and LiNH2 to Prepare the Effective Hydrogen Storage Material Li2NH," Ind. Eng. Chem. Res., vol. 45, (2006), pp. 4993-4998.

Hu, Y.H., et al., "High Reversible Hydrogen Capacity of LiNH2/Li3N Mixtures," Ind. Eng. Chem. Res., vol. 44, (2005), pp. 1510-1513.

Ichikawa, T., et al., "Lithium Nitride for Reversible Hydrogen Storage," J. Alloys Compd., vol. 365, (2004), pp. 271-276.

Independent Technology Evaluation Study Phase 1—Test Plan Development for Blacklight Power CIHT Technology by SCI Technology, Inc., Jan. 23, 2012.

Jansson, P.M., et al., "Anomalous Heat Gains from Multiple Chemical Mixtures: Analytical Studies of 'Generation 2' Chemistries of Blacklight Power Corporation," Rowan University, Aug. 10, 2009, pp. 1-57.

Jansson, P.M., et al., "Water Flow Calorimetry Experiments, Validation Tests and Chemical Analysis of Reactants for Blacklight Power, Inc.," Rowan University, Sep. 2008, pp. 1-16.

Karplus, M., et al., "Atoms and Molecules an Introduction for Students of Physical Chemistry," The Benjamin/Cummings Publishing Company, Menlo Park, California, (1970), pp. 447-484.

Kojima, Y., et al., "IR Characterizations of Lithium Imide and Amide," J. Alloys Compd., vol. 395, (2005), pp. 236-239.

Kunze, H-J, "On the Spectroscopic Measurements Used to Support the Postulate of States with Fractional Principal Quantum Numbers in Hydrogen", J. Phys D: Appl. Phys 41 (10): 108001, (2008).

Lamb, M. D., "Luminescence Spectroscopy," Academic Press, London, (1978), p. 68.

Lavrov, E. V., et al., "Ortho and Para Interstitial H2 in Silicon," Phys. Rev. Letts., vol. 89(21), (2002), pp. 215501 to 1-215501-4.

Leitch, A. W. R., et al., "Raman Spectroscopy of Hydrogen Molecules in Crystalline Silicon," Phys. Rev. Letts., vol. 81(2), (1998), pp. 421-424.

\* cited by examiner

1

HETEROGENEOUS HYDROGEN-CATALYST SOLID FUEL REACTION MIXTURE AND REACTOR

CROSS-REFERENCES TO RELATED APPLICATIONS

This application is a continuation of U.S. application Ser. No. 13/054,198, filed Jan. 14, 2011; which is a national stage entry under 35 U.S.C. § 371 of International Application No. PCT/US2009/052072, filed Jul. 29, 2009; which claims the benefit of priority of U.S. Provisional Application Nos. 61/084,923, filed Jul. 30, 2008; 61/086,316, filed Aug. 5, 2008; 61/088,492, filed Aug. 13, 2008; 61/094,513, filed Sep. 5, 2008; 61/098,514, filed Sep. 19, 2008; 61/102,465, filed Oct. 3, 2008; 61/104,534, filed Oct. 10, 2008; 61/105,660, filed Oct. 15, 2008; 61/106,932, filed Oct. 20, 2008; 61/109,088, filed Oct. 28, 2008; 61/110,253, filed Oct. 31, 2008; 61/112,491, filed Nov. 7, 2008; 61/114,735, filed Nov. 14, 2008; 61/116,966, filed Nov. 21, 2008; 61/193,543, filed Dec. 5, 2008; 61/139,293, filed Dec. 19, 2008; 61/145,022, filed Jan. 15, 2009; 61/146,962, filed Jan. 23, 2009; 61/150,571, filed Feb. 6, 2009; 61/152,500, filed Feb. 13, 2009; 61/156,328, filed Feb. 27, 2009; 61/158,252, filed Mar. 6, 2009; 61/160,145, filed Mar. 13, 2009; 61/164,151, filed Mar. 27, 2009; 61/166,495, filed Apr. 3, 2009; 61/170,418, filed Apr. 17, 2009; 61/174,346, filed Apr. 30, 2009; 61/176,675, filed May 8, 2009; 61/178,796, filed May 15, 2009; 61/180,456, filed May 22, 2009; 61/182,468, filed May 29, 2009; 61/186,660, filed Jun. 12, 2009; 61/218,771, filed Jun. 19, 2009; 61/220,911, filed Jun. 26, 2009; 61/222,721, filed Jul. 2, 2009; and 61/226,541, filed Jul. 17, 2009, all of which are herein incorporated by reference in their entirety.

SUMMARY OF DISCLOSED EMBODIMENTS

The present disclosure is directed to catalyst systems comprising a hydrogen catalyst capable of causing atomic H in its n=1 state to form a lower-energy state, a source of atomic hydrogen, and other species capable of initiating and propagating the reaction to form lower-energy hydrogen. In certain embodiments, the present disclosure is directed to a reaction mixture comprising at least one source of atomic hydrogen and a catalyst or source of catalyst to support the catalysis of hydrogen to form hydrinos. The reactants and reactions disclosed herein for solid and liquid fuels are also reactants and reactions of heterogeneous fuels comprising a mixture of phases. The reaction mixture comprises at least two components chosen from a hydrogen catalyst or source of hydrogen catalyst and a source of atomic hydrogen, wherein at least one of the atomic hydrogen and the hydrogen catalyst may be formed by a reaction of the reaction mixture. In additional embodiments, the reaction mixture further comprises a support, which in certain embodiments can be electrically conductive, a solvent such as an organic solvent or inorganic solvent including a molten salt, a getter, and at least one reactant that by virtue of it undergoing a reaction causes the catalysis to be active.

The reaction to form hydrinos may be activated or initiated and propagated by one or more chemical reactions. These reactions can be chosen from (i) exothermic reactions, which provide the activation energy for the hydrino reaction, (ii) coupled reactions, which provide for at least one of a source of catalyst or atomic hydrogen to support the hydrino reaction, (iii) free radical reactions, which in certain embodiments, serve as an acceptor of electrons from the catalyst during the hydrino reaction, (iv) oxidation-reduction reactions, which in certain embodiments, serve as an acceptor of electrons from the catalyst during the hydrino reaction, (v) exchange reactions such as anion exchange including halide, sulfide, hydride, arsenide, oxide, phosphide, and nitride exchange that in an embodiment, facilitate the action of the catalyst to become ionized as it accepts energy from atomic hydrogen to form hydrinos, and (vi) getter, support, or matrix-assisted hydrino reactions, which may provide at least one of a chemical environment for the hydrino reaction, act to transfer electrons to facilitate the H catalyst function, undergoes a reversible phase or other physical change or change in its electronic state, and binds a lower-energy hydrogen product to increase at least one of the extent or rate of the hydrino reaction. In certain embodiments, the electrically conductive support enables the activation reaction.

In additional embodiments, the present disclosure is directed to a power system comprising at least two components chosen from: a source of catalyst or catalyst; a source of atomic hydrogen or atomic hydrogen; reactants to form the source of catalyst or catalyst and a source of atomic hydrogen or atomic hydrogen; one or more reactants to initiate the catalysis of atomic hydrogen; and a support to enable the catalyst, wherein the power system can further comprise any of a reaction vessel, a vacuum pump, a power converter and systems such as separator systems, an electrolyzer, thermal systems for reversing an exchange reaction, and chemical synthesis reactors to regenerate the fuel from the reaction products.

In further embodiments, the present disclosure is directed to a system for forming compounds having hydrogen in lower-energy states comprising at least two components chosen from: a source of catalyst or catalyst; a source of atomic hydrogen or atomic hydrogen; reactants to form the source of catalyst or catalyst and a source of atomic hydrogen or atomic hydrogen; one or more reactants to initiate the catalysis of atomic hydrogen; and a support to enable the catalyst, wherein the system for forming compounds having hydrogen in lower-energy states can further comprise any of a reaction vessel, a vacuum pump, and systems such as separator systems, an electrolyzer, thermal systems for reversing an exchange reaction, and chemical synthesis reactors to regenerate the fuel from the reaction products.

Other embodiments of the present disclosure are directed to a battery or fuel cell system for forming compounds having hydrogen in lower-energy states comprising at least two components chosen from: a source of catalyst or catalyst; a source of atomic hydrogen or atomic hydrogen; reactants to form the source of catalyst or catalyst and a source of atomic hydrogen or atomic hydrogen; one or more reactants to initiate the catalysis of atomic hydrogen; and a support to enable the catalyst, wherein the battery or fuel cell system for forming compounds having hydrogen in lower-energy states can further comprise any of a reaction vessel, a vacuum pump, and systems such as separator systems, an electrolyzer, thermal systems for reversing an exchange reaction, and chemical synthesis reactors to regenerate the fuel from the reaction products.

DETAILED DESCRIPTION OF THE EMBODIMENTS OF THE DISCLOSURE

Figure 1:
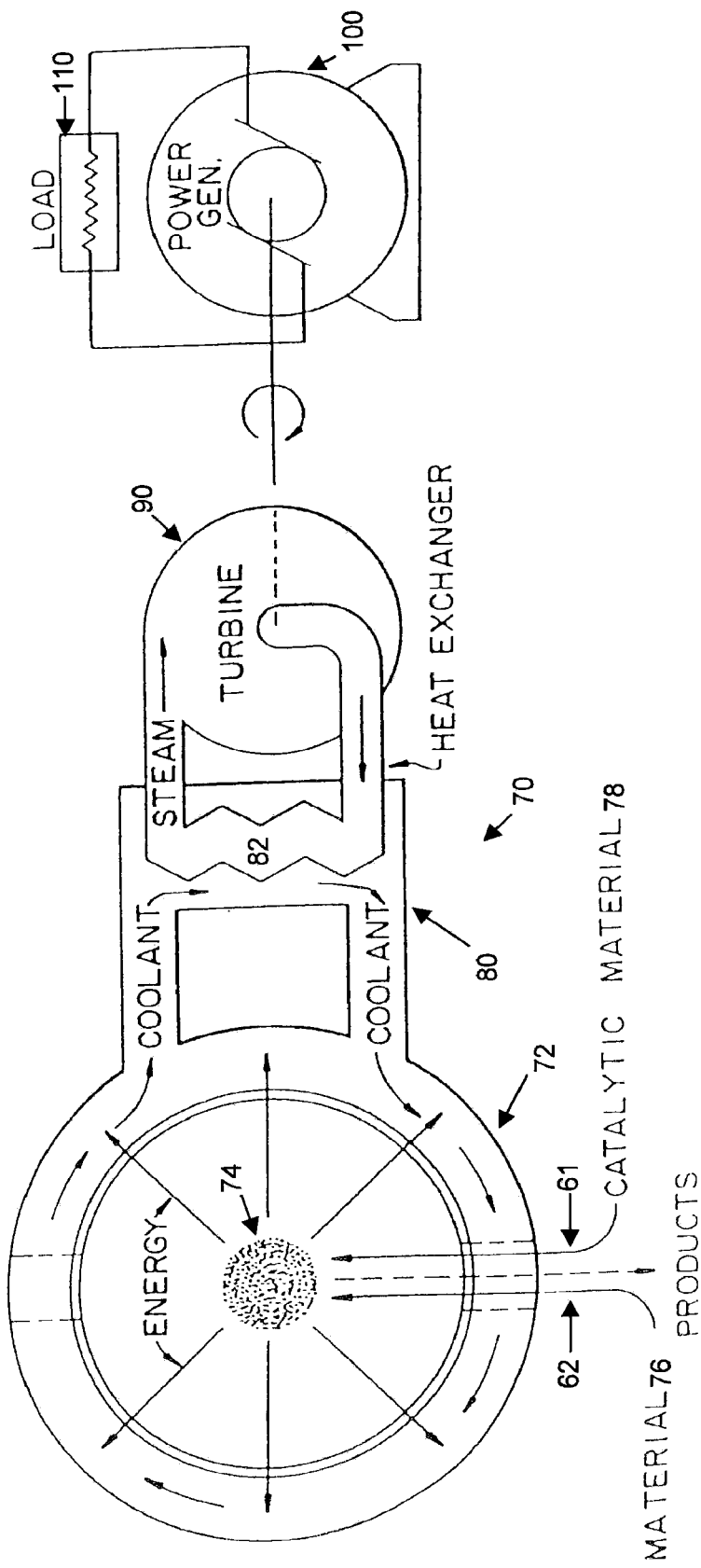
FIG. 1 is a schematic drawing of an energy reactor and power plant in accordance with the present disclosure.

The present disclosure is directed to catalyst systems to release energy from atomic hydrogen to form lower energy states wherein the electron shell is at a closer position relative to the nucleus. The released power is harnessed for power generation and additionally new hydrogen species and compounds are desired products. These energy states are predicted by classical physical laws and require a catalyst to accept energy from the hydrogen in order to undergo the corresponding energy-releasing transition.

Classical physics gives closed-form solutions of the hydrogen atom, the hydride ion, the hydrogen molecular ion, and the hydrogen molecule and predicts corresponding species having fractional principal quantum numbers. Using Maxwell's equations, the structure of the electron was derived as a boundary-value problem wherein the electron comprises the source current of time-varying electromagnetic fields during transitions with the constraint that the bound n=1 state electron cannot radiate energy. A reaction predicted by the solution of the H atom involves a resonant, nonradiative energy transfer from otherwise stable atomic hydrogen to a catalyst capable of accepting the energy to form hydrogen in lower-energy states than previously thought possible. Specifically, classical physics predicts that atomic hydrogen may undergo a catalytic reaction with certain atoms, excimers, ions, and diatomic hydrides which provide a reaction with a net enthalpy of an integer multiple of the potential energy of atomic hydrogen, $E_h$=27.2 eV where $E_h$ is one Hartree. Specific species (e.g. He$^+$, Ar$^+$, Sr$^+$, K, Li, HCl, and NaH) identifiable on the basis of their known electron energy levels are required to be present with atomic hydrogen to catalyze the process. The reaction involves a nonradiative energy transfer followed by q·13.6 eV continuum emission or q·13.6 eV transfer to H to form extraordinarily hot, excited-state H and a hydrogen atom that is lower in energy than unreacted atomic hydrogen that corresponds to a fractional principal quantum number. That is, in the formula for the principal energy levels of the hydrogen atom:

$$E_n = -\frac{e^2}{n^2 8\pi\varepsilon_o a_H} = -\frac{13.598 \text{ eV}}{n^2} \quad (1)$$

$$n = 1, 2, 3, \ldots \quad (2)$$

where $a_H$ is the Bohr radius for the hydrogen atom (52.947 pm), e is the magnitude of the charge of the electron, and $\varepsilon_o$ is the vacuum permittivity, Fractional Quantum Numbers:

$$n = 1, \frac{1}{2}, \frac{1}{3}, \frac{1}{4}, \ldots, \frac{1}{p}; \text{ where } p \leq 137 \text{ is an integer} \quad (3)$$

replace the well known parameter n=integer in the Rydberg equation for hydrogen excited states and represent lower-energy-state hydrogen atoms called "hydrinos." The n=1 state of hydrogen and the $$n = \frac{1}{\text{integer}}$$

states of hydrogen are nonradiative, but a transition between two nonradiative states, say n=1 to n=½, is possible via a nonradiative energy transfer. Hydrogen is a special case of the stable states given by Eqs. (1) and (3) wherein the corresponding radius of the hydrogen or hydrino atom is given by $$r = \frac{a_H}{p}, \quad (4)$$

where p=1, 2, 3, . . . . In order to conserve energy, energy must be transferred from the hydrogen atom to the catalyst in units of an integer of the potential energy of the hydrogen atom in the normal n=1 state, and the radius transitions to $$\frac{a_H}{m+p}.$$

Hydrinos are formed by reacting an ordinary hydrogen atom with a suitable catalyst having a net enthalpy of reaction of $$m \cdot 27.2 \text{ eV} \quad (5)$$

where m is an integer. It is believed that the rate of catalysis is increased as the net enthalpy of reaction is more closely matched to m·27.2 eV. It has been found that catalysts having a net enthalpy of reaction within ±10%, preferably ±5%, of m·27.2 eV are suitable for most applications.

The catalyst reactions involve two steps of energy release: a nonradiative energy transfer to the catalyst followed by additional energy release as the radius decreases to the corresponding stable final state. Thus, the general reaction is given by

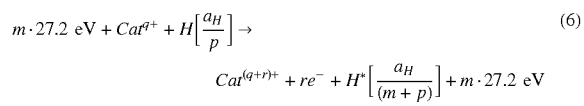

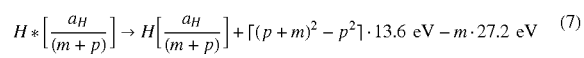

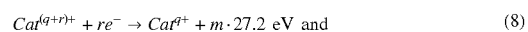

the overall reaction is $$H\left[\frac{a_H}{p}\right] \rightarrow H\left[\frac{a_H}{(m+p)}\right] + \lceil(p+m)^2 - p^2\rceil \cdot 13.6 \text{ eV} \quad (9)$$

q, r, m, and p are integers.

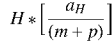

has the radius of the hydrogen atom (corresponding to the 1 in the denominator) and a central field equivalent to (m+p) times that of a proton, and

is the corresponding stable state with the radius of $$\frac{1}{(m+p)}$$

that of H. As the electron undergoes radial acceleration from the radius of the hydrogen atom to a radius of $$\frac{1}{(m+p)}$$

this distance, energy is released as characteristic light emission or as third-body kinetic energy. The emission may be in the form of an extreme-ultraviolet continuum radiation having an edge at $$\lceil(p+m)^2 - p^2 - 2m\rceil \cdot 13.6 \text{ eV}\left(\frac{91.2}{[(p+m)^2 - p^2 - 2m]}\text{nm}\right)$$

and extending to longer wavelengths. In addition to radiation, a resonant kinetic energy transfer to form fast H may occur. Subsequent excitation of these fast H(n=1) atoms by collisions with the background $H_2$ followed by emission of the corresponding H(n=3) fast atoms gives rise to broadened Balmer α emission. Extraordinary Balmer α line broadening (>100 eV) is observed consistent with predictions.

A suitable catalyst can therefore provide a net positive enthalpy of reaction of m·27.2 eV. That is, the catalyst resonantly accepts the nonradiative energy transfer from hydrogen atoms and releases the energy to the surroundings to affect electronic transitions to fractional quantum energy levels. As a consequence of the nonradiative energy transfer, the hydrogen atom becomes unstable and emits further energy until it achieves a lower-energy nonradiative state having a principal energy level given by Eqs. (1) and (3). Thus, the catalysis releases energy from the hydrogen atom with a commensurate decrease in size of the hydrogen atom, $r_n = na_H$ where n is given by Eq. (3). For example, the catalysis of H(n=1) to H(n=¼) releases 204 eV, and the hydrogen radius decreases from $a_H$ to ¼$a_H$. The catalyst product, H(1/p), may also react with an electron to form a hydrino hydride ion H⁻(1/p), or two H(1/p) may react to form the corresponding molecular hydrino $H_2(1/p)$.

Specifically, the catalyst product, H(1/p), may also react with an electron to form a novel hydride ion H⁻(1/p) with a binding energy $E_B$:

$$E_B = \frac{\hbar^2\sqrt{s(s+1)}}{8\mu_e a_0^2\left[\frac{1+\sqrt{s(s+1)}}{p}\right]^2} - \frac{\pi\mu_0 e^2\hbar^2}{m_e^2}\left[\frac{1}{a_H^3} + \frac{2^2}{a_0^3\left[\frac{1+\sqrt{s(s+1)}}{p}\right]^3}\right] \quad (10)$$

where p=integer >1, s=½, $\hbar$ is Planck's constant bar, $\mu_o$ is the permeability of vacuum, $m_e$ is the mass of the electron, $\mu_e$ is the reduced electron mass given by $$\mu_e = \frac{m_e m_p}{\frac{m_e}{\sqrt{\frac{3}{4}}} + m_p}$$

where $m_p$ is the mass of the proton, $a_o$ is the Bohr radius, and the ionic radius is $$r_1 = \frac{a_0}{p}\left(1+\sqrt{s(s+1)}\right).$$

From Eq. (10), the calculated ionization energy of the hydride ion is 0.75418 eV, and the experimental value is 6082.99±0.15 cm⁻¹ (0.75418 eV).

Upfield-shifted NMR peaks are direct evidence of the existence of lower-energy state hydrogen with a reduced radius relative to ordinary hydride ion and having an increase in diamagnetic shielding of the proton. The shift is given by the sum of that of an ordinary hydride ion H⁻ and a component due to the lower-energy state:

$$\frac{\Delta B_T}{B} = -\mu_0 \frac{e^2}{12 m_e a_0 \left(1+\sqrt{s(s+1)}\right)}(1+\alpha 2\pi p) = -(29.9 + 1.37p) \text{ ppm} \quad (11)$$

where for H⁻ p=0 and p=integer >1 for H⁻ (1/p) and α is the fine structure constant.

H(1/p) may react with a proton and two H(1/p) may react to form $H_2(1/p)^+$ and $H_2(1/p)$, respectively. The hydrogen molecular ion and molecular charge and current density functions, bond distances, and energies are solved from the Laplacian in ellipsoidal coordinates with the constraint of nonradiation.

$$(\eta - \zeta)R_\xi \frac{\partial}{\partial \xi}\left(R_\xi \frac{\partial \phi}{\partial \xi}\right) + \quad (12)$$

$$(\zeta - \xi)R_\eta \frac{\partial}{\partial \eta}\left(R_\eta \frac{\partial \phi}{\partial \eta}\right) + (\xi - \eta)R_\zeta \frac{\partial}{\partial \zeta}\left(R_\zeta \frac{\partial \phi}{\partial \zeta}\right) = 0.$$

The total energy $E_T$ of the hydrogen molecular ion having a central field of +pe at each focus of the prolate spheroid molecular orbital is $$E_T = -p^2 \left\{ \frac{e^2}{8\pi\varepsilon_o a_H}(4\ln 3 - 1 - 2\ln 3) \left[ 1 + p\sqrt{\frac{2\hbar\sqrt{\frac{2e^2}{4\pi\varepsilon_o(2a_H)^3}}}{m_e c^2}} \right] - \frac{1}{2}\hbar\sqrt{\frac{\frac{pe^2}{4\pi\varepsilon_o\left(\frac{2a_H}{p}\right)^3} - \frac{pe^2}{8\pi\varepsilon_o\left(\frac{3a_H}{p}\right)^3}}{\mu}} \right\} \quad (13)$$

$$= -p^2 16.13392 \text{ eV} - p^3 0.118755 \text{ eV}$$

where p is an integer, c is the speed of light in vacuum, and μ is the reduced nuclear mass. The total energy of the hydrogen molecule having a central field of +pe at each focus of the prolate spheroid molecular orbital is $$E_T = -p^2 \left\{ \frac{e^2}{8\pi\varepsilon_o a_0}\left[\left(2\sqrt{2} - \sqrt{2} + \frac{\sqrt{2}}{2}\right)\ln\frac{\sqrt{2}+1}{\sqrt{2}-1} - \sqrt{2}\right] \left[ 1 + p\sqrt{\frac{2\hbar\sqrt{\frac{e^2}{4\pi\varepsilon_o a_0^3}}}{m_e c^2}} \right] - \frac{1}{2}\hbar\sqrt{\frac{\frac{pe^2}{8\pi\varepsilon_o\left(\frac{a_0}{p}\right)^3} - \frac{pe^2}{8\pi\varepsilon_o\left(\frac{\left(1+\frac{1}{\sqrt{2}}\right)a_0}{p}\right)^3}}{\mu}} \right\} \quad (14)$$

$$= -p^2 31.351 \text{ eV} - p^3 0.326469 \text{ eV}$$

The bond dissociation energy, $E_D$, of the hydrogen molecule $H_2(1/p)$ is the difference between the total energy of the corresponding hydrogen atoms and $E_T$ $$E_D = E(2H(1/p)) - E_T \quad (15)$$

where $$E(2H(1/p)) = p^2 27.20 \text{ eV} \quad (16)$$

$E_D$ is given by Eqs. (15-16) and (14):

$$E_D = -p^2 27.20 \text{ eV} - E_T \quad (17)$$
$$= -p^2 27.20 \text{ eV} - \left(-p^2 31.351 \text{ eV} - p^3 0.326469 \text{ eV}\right)$$
$$= p^2 4.151 \text{ eV} + p^3 0.326469 \text{ eV}.$$

Calculated and experimental parameters of $H_2$, $D_2$, $H_2^+$, and $D_2^+$ are given in TABLE 1.

TABLE 1

The Maxwellian closed-form calculated and experimental parameters of $H_2$, $D_2$, $H_2^+$ and $D_2^+$.

| Parameter | Calculated | Experimental |
|---|---|---|
| $H_2$ Bond Energy | 4.478 eV | 4.478 eV |
| $D_2$ Bond Energy | 4.556 eV | 4.556 eV |
| $H_2^+$ Bond Energy | 2.654 eV | 2.651 eV |
| $D_2^+$ Bond Energy | 2.696 eV | 2.691 eV |
| $H_2$ Total Energy | 31.677 eV | 31.675 eV |
| $D_2$ Total Energy | 31.760 eV | 31.760 eV |
| $H_2$ Ionization Energy | 15.425 eV | 15.426 eV |
| $D_2$ Ionization Energy | 15.463 eV | 15.466 eV |
| $H_2^+$ Ionization Energy | 16.253 eV | 16.250 eV |
| $D_2^+$ Ionization Energy | 16.299 eV | 16.294 eV |
| $H_2^+$ Magnetic Moment | $9.274 \times 10^{-24}$ JT$^{-1}$ ($\mu_B$) | $9.274 \times 10^{-24}$ JT$^{-1}$ ($\mu_B$) |
| Absolute $H_2$ Gas-Phase NMR Shift | −28.0 ppm | −28.0 ppm |
| $H_2$ Internuclear Distance[a] | 0.748 Å $\sqrt{2}a_o$ | 0.741 Å |
| $D_2$ Internuclear Distance[a] | 0.748 Å $\sqrt{2}a_o$ | 0.741 Å |
| $H_2^+$ Internuclear Distance | 1.058 Å $2a_o$ | 1.06 Å |
| $D_2^+$ Internuclear Distance[a] | 1.058 Å $2a_o$ | 1.0559 Å |
| $H_2$ Vibrational Energy | 0.517 eV | 0.516 eV |
| $D_2$ Vibrational Energy | 0.371 eV | 0.371 eV |
| $H_2$ $\omega_e x_e$ | 120.4 cm$^{-1}$ | 121.33 cm$^{-1}$ |
| $D_2$ $\omega_e x_e$ | 60.93 cm$^{-1}$ | 61.82 cm$^{-1}$ |
| $H_2^+$ Vibrational Energy | 0.270 eV | 0.271 eV |
| $D_2^+$ Vibrational Energy | 0.193 eV | 0.196 eV |
| $H_2$ J = 1 to J = 0 Rotational Energy[a] | 0.0148 eV | 0.01509 eV |
| $D_2$ J = 1 to J = 0 Rotational Energy[a] | 0.00741 eV | 0.00755 eV |
| $H_2^+$ J = 1 to J = 0 Rotational Energy | 0.00740 eV | 0.00739 eV |
| $D_2^+$ J = 1 to J = 0 Rotational Energy[a] | 0.00370 eV | 0.003723 eV |

[a]Not corrected for the slight reduction in internuclear distance due to $E_{osc}$.

The NMR of catalysis-product gas provides a definitive test of the theoretically predicted chemical shift of $H_2(\frac{1}{4})$. In general, the $^1H$ NMR resonance of $H_2(1/p)$ is predicted to be upfield from that of $H_2$ due to the fractional radius in elliptic coordinates wherein the electrons are significantly closer to the nuclei. The predicted shift, $$\frac{\Delta B_T}{B},$$

for $H_2(1/p)$ is given by the sum of that of $H_2$ and a term that depends on p=integer >1 for $H_2(1/p)$:

$$\frac{\Delta B_T}{B} = -\mu_0\left(4 - \sqrt{2}\ln\frac{\sqrt{2}+1}{\sqrt{2}-1}\right)\frac{e^2}{36a_0 m_e}(1 + \pi\alpha p) \quad (18)$$

$$\frac{\Delta B_T}{B} = -(28.01 + 0.64p) \text{ ppm} \quad (19)$$

where for $H_2$ p=0. The experimental absolute $H_2$ gas-phase resonance shift of −28.0 ppm is in excellent agreement with the predicted absolute gas-phase shift of −28.01 ppm (Eq. (19)).

The vibrational energies, $E_{vib}$, for the υ=0 to υ=1 transition of hydrogen-type molecules $H_2(1/p)$ are $$E_{vib} = p^2 0.515902 \text{ eV} \quad (20)$$

where p is an integer. The rotational energies, $E_{rot}$, for the J to J+1 transition of hydrogen-type molecules $H_2(1/p)$ are $$E_{rot} = E_{J+1} - E_J = \frac{\hbar^2}{I}[J+1] = p^2(J+1)\, 0.01509 \text{ eV} \tag{21}$$

where p is an integer, I is the moment of inertia.

The $p^2$ dependence of the rotational energies results from an inverse p dependence of the internuclear distance and the corresponding impact on the moment of inertia I. The predicted internuclear distance $2c'$ for $H_2(1/p)$ is $$2c' = \frac{a_o\sqrt{2}}{p}. \tag{22}$$

The data from a broad spectrum of investigational techniques strongly and consistently indicates that hydrogen can exist in lower-energy states than previously thought possible. This data supports the existence of these lower-energy states called hydrino, for "small hydrogen," and the corresponding hydride ions and molecular hydrino. Some of these prior related studies supporting the possibility of a novel reaction of atomic hydrogen, which produces hydrogen in fractional quantum states that are at lower energies than the traditional "ground" (n=1) state, include extreme ultraviolet (EUV) spectroscopy, characteristic emission from catalysts and the hydride ion products, lower-energy hydrogen emission, chemically-formed plasmas, Balmer α line broadening, population inversion of H lines, elevated electron temperature, anomalous plasma afterglow duration, power generation, and analysis of novel chemical compounds.

The catalytic lower-energy hydrogen transitions of the present disclosure require a catalyst that may be in the form of an endothermic chemical reaction of an integer m of the potential energy of uncatalyzed atomic hydrogen, 27.2 eV, that accepts the energy from atomic H to cause the transition. The endothermic catalyst reaction may be the ionization of one or more electrons from a species such as an atom or ion (e.g. m=3 for Li→Li$^{2+}$) and may further comprise the concerted reaction of a bond cleavage with ionization of one or more electrons from one or more of the partners of the initial bond (e.g. m=2 for NaH→Na$^{2+}$+H). He$^+$ fulfills the catalyst criterion—a chemical or physical process with an enthalpy change equal to an integer multiple of 27.2 eV since it ionizes at 54.417 eV, which is 2·27.2 eV. Two hydrogen atoms may also serve as the catalyst of the same enthalpy. Hydrogen atoms H(1/p) p=1, 2, 3, . . . 137 can undergo further transitions to lower-energy states given by Eqs. (1) and (3) wherein the transition of one atom is catalyzed by a second that resonantly and nonradiatively accepts m·27.2 eV with a concomitant opposite change in its potential energy. The overall general equation for the transition of H(1/p) to H(1/(p+m)) induced by a resonance transfer of m·27.2 eV to H(1/p') is represented by $$H(1/p')+H(1/p) \rightarrow H+H(1/(p+m))+[2pm+m^2-p'^2+1] \cdot 13.6 \text{ eV}. \tag{23}$$

Hydrogen atoms may serve as a catalyst wherein m=1 and m=2 for one and two atoms, respectively, acting as a catalyst for another. The rate for the two-atom-catalyst, 2H, may be high when extraordinarily fast H collides with a molecule to form the 2H wherein two atoms resonantly and nonradiatively accept 54.4 eV from a third hydrogen atom of the collision partners.

With m=2, the product of catalysts He$^+$ and 2H is H(1/3) that reacts rapidly to form H(1/4), then molecular hydrino, $H_2(1/4)$, as a preferred state. Specifically, in the case of a high hydrogen atom concentration, the further transition given by Eq. (23) of H(1/3) (p=3) to H(1/4) (p+m=4) with H as the catalyst (p'=1; m=1) can be fast:

The corresponding molecular hydrino $H_2(1/4)$ and hydrino hydride ion H$^-$(1/4) are final products consistent with observation since the p=4 quantum state has a multipolarity greater than that of a quadrupole giving it H(1/4) a long theoretical lifetime for further catalysis.

The nonradiative energy transfer to the catalysts, He$^+$ and 2H, is predicted to pump the He$^+$ ion energy levels and increase the electron excitation temperature of H in helium-hydrogen and hydrogen plasmas, respectively. For both catalysts, the intermediate $$H^*\left[\frac{a_H}{2+1}\right]$$

(Eq. (6) with m=2) has the radius of the hydrogen atom (corresponding to the 1 in the denominator) and a central field equivalent to 3 times that of a proton, and $$H\left[\frac{a_H}{3}\right]$$

is the corresponding stable state with the radius of ⅓ that of H. As the electron undergoes radial acceleration from the radius of the hydrogen atom to a radius of ⅓ this distance, energy is released as characteristic light emission or as third-body kinetic energy. The emission may be in the form of an extreme-ultraviolet continuum radiation having an edge at 54.4 eV (22.8 nm) and extending to longer wavelengths. The emission may be in the form of an extreme-ultraviolet continuum radiation having an edge at 54.4 eV (22.8 nm) and extending to longer wavelengths. Alternatively, fast H is predicted due to a resonant kinetic-energy transfer. A secondary continuum band is predicted arising from the subsequently rapid transition of the catalysis product $$\left[\frac{a_H}{3}\right]$$

(Eqs. (4-7) and (23)) to the $$\left[\frac{a_H}{4}\right]$$

state wherein atomic hydrogen accepts 27.2 eV from

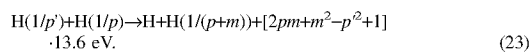

Extreme ultraviolet (EUV) spectroscopy and high-resolution visible spectroscopy were recorded on microwave and glow and pulsed discharges of helium with hydrogen and hydrogen alone providing catalysts He$^+$ and 2H, respectively. Pumping of the He$^+$ ion lines occurred with the addition of hydrogen, and the excitation temperature of hydrogen plasmas under certain conditions was very high. The EUV continua at both 22.8 nm and 40.8 nm were observed and extraordinary (>50 eV) Balmer α line broadening were observed. $H_2(1/4)$ was observed by solution NMR at 1.25 ppm on gases collected from helium-hydrogen, hydrogen, and water-vapor-assisted hydrogen plasmas and dissolved in $CDCl_3$.

Similarly, the reaction of $Ar^+$ to $Ar^{2+}$ has a net enthalpy of reaction of 27.63 eV, which is equivalent to m=1 in Eqs. (4-7). When $Ar^+$ served as the catalyst its predicted 91.2 nm and 45.6 nm continua were observed as well as the other characteristic signatures of hydrino transitions, pumping of the catalyst excited states, fast H, and the predicted gaseous hydrino product $H_2(1/4)$ that was observed by solution NMR at 1.25 ppm. Considering these results and those of helium plasmas, the q·13.6 eV continua with thresholds at 54.4 eV (q=4) and 40.8 eV (q=3) for $He^+$ catalyst and at 27.2 eV (q=2) and 13.6 eV (q=1) for $Ar^+$ catalyst have been observed. Much higher values of q are possible with transitions of hydrinos to lower states giving rise to high-energy continuum radiation over a broad spectral region.

In recent power generation and product characterization studies, atomic lithium and molecular NaH served as catalysts since they meet the catalyst criterion—a chemical or physical process with an enthalpy change equal to an integer multiple m of the potential energy of atomic hydrogen, 27.2 eV (e.g. m=3 for Li and m=2 for NaH). Specific predictions based on closed-form equations for energy levels of the corresponding hydrino hydride ions $H^-(1/4)$ of novel alkali halido hydrino hydride compounds (MH*X; M=Li or Na, X=halide) and molecular hydrino $H_2(1/4)$ were tested using chemically generated catalysis reactants.

First, Li catalyst was tested. Li and $LiNH_2$ were used as a source of atomic lithium and hydrogen atoms. Using water-flow, batch calorimetry, the measured power from 1 g Li, 0.5 g $LiNH_2$, 10 g LiBr, and 15 g $Pd/Al_2O_3$ was about 160 W with an energy balance of $\Delta H=-19.1$ kJ. The observed energy balance was 4.4 times the maximum theoretical based on known chemistry. Next, Raney nickel (R-Ni) served as a dissociator when the power reaction mixture was used in chemical synthesis wherein LiBr acted as a getter of the catalysis product $H(1/4)$ to form LiH*X as well as to trap $H_2(1/4)$ in the crystal. The ToF-SIMs showed LiH*X peaks. The $^1H$ MAS NMR LiH*Br and LiH*I showed a large distinct upfield resonance at about 2.5 ppm that matched $H^-(1/4)$ in a LiX matrix. An NMR peak at 1.13 ppm matched interstitial $H_2(1/4)$, and the rotation frequency of $H_2(1/4)$ of $4^2$ times that of ordinary $H_2$ was observed at 1989 $cm^{-1}$ in the FTIR spectrum. The XPS spectrum recorded on the LiH*Br crystals showed peaks at about 9.5 eV and 12.3 eV that could not be assigned to any known elements based on the absence of any other primary element peaks, but matched the binding energy of $H^-(1/4)$ in two chemical environments. A further signature of the energetic process was the observation of the formation of a plasma called a resonant transfer- or rt-plasma at low temperatures (e.g. $\approx 10^3$ K) and very low field strengths of about 1-2 V/cm when atomic Li was present with atomic hydrogen. Time-dependent line broadening of the H Balmer α line was observed corresponding to extraordinarily fast H(>40 eV).

A compound of the present disclosure such as MH comprising hydrogen and at least one element M other than hydrogen serves as a source of hydrogen and a source of catalyst to form hydrinos. A catalytic reaction is provided by the breakage of the M-H bond plus the ionization of t electrons from the atom M each to a continuum energy level such that the sum of the bond energy and ionization energies of the t electrons is approximately m·27.2 eV, where in is an integer. One such catalytic system involves sodium. The bond energy of NaH is 1.9245 eV, and the first and second ionization energies of Na are 5.13908 eV and 47.2864 eV, respectively. Based on these energies NaH molecule can serve as a catalyst and H source, since the bond energy of NaH plus the double ionization (t=2) of Na to $Na^{2+}$ is 54.35 eV (2·27.2 eV). The catalyst reactions are given by

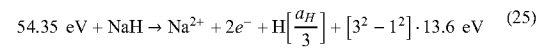

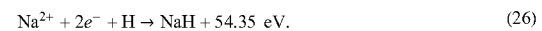

And the overall reaction is

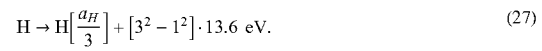

The product $H(1/3)$ reacts rapidly to form $H(1/4)$, then molecular hydrino, $H_2(1/4)$, as a preferred state (Eq. (24)). The NaH catalyst reactions may be concerted since the sum of the bond energy of NaH, the double ionization (t=2) of Na to $Na^{2+}$, and the potential energy of H is 81.56 eV (3·27.2 eV). The catalyst reactions are given by

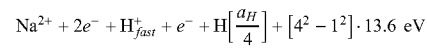

And the overall reaction is

where $H_{fast}^+$ is a fast hydrogen atom having at least 13.6 eV of kinetic energy. $H^-(1/4)$ forms stable halidohydrides and is a favored product together with the corresponding molecule formed by the reactions $2H(1/4) \rightarrow H_2(1/4)$ and $H^-(1/4)+H^+ \rightarrow H_2(1/4)$.

Sodium hydride is typically in the form of an ionic crystalline compound formed by the reaction of gaseous hydrogen with metallic sodium. And, in the gaseous state, sodium comprises covalent $Na_2$ molecules with a bond energy of 74.8048 kJ/mole. It was found that when NaH (s) was heated at a very slow temperature ramp rate (0.1° C./min) under a helium atmosphere to form NaH(g), the predicted exothermic reaction given by Eqs. (25-27) was observed at high temperature by differential scanning calorimetry (DSC). To achieve high power, a chemical system was designed to greatly increase the amount and rate of formation of NaH(g). The reaction of NaOH and Na to $Na_2O$ and NaH (s) calculated from the heats of formation releases $\Delta H=-44.7$ kJ/mole NaOH:

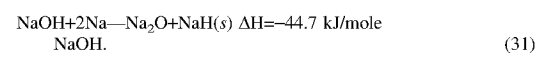

This exothermic reaction can drive the formation of NaH(g) and was exploited to drive the very exothermic reaction given by Eqs. (25-27). The regenerative reaction in the presence of atomic hydrogen is $$Na_2O + H \rightarrow NaOH + Na \quad \Delta H = -11.6 \text{ kJ/mole NaOH} \tag{32}$$

$$NaH \rightarrow Na + H(1/3) \quad \Delta H = 10{,}500 \text{ kJ/mole H} \tag{33}$$

and $$NaH \rightarrow Na + H(1/4) \quad \Delta H = -19{,}700 \text{ kJ/mole H}. \tag{34}$$

NaH uniquely achieves high kinetics since the catalyst reaction relies on the release of the intrinsic H, which concomitantly undergoes the transition to form H(1/3) that further reacts to form H(1/4). High-temperature differential scanning calorimetry (DSC) was performed on ionic NaH under a helium atmosphere at an extremely slow temperature ramp rate (0.1° C./min) to increase the amount of molecular NaH formation. A novel exothermic effect of −177 kJ/moleNaH was observed in the temperature range of 640° C. to 825° C. To achieve high power, R-Ni having a surface area of about 100 m²/g was surface-coated with NaOH and reacted with Na metal to form NaH. Using water-flow, batch calorimetry, the measured power from 15 g of R-Ni was about 0.5 kW with an energy balance of ΔH=36 kJ compared to ΔH≈0 kJ from the R-Ni starting material, R-NiAl alloy, when reacted with Na metal. The observed energy balance of the NaH reaction was 1.6×10⁴ kJ/mole H₂ over 66 times the −241.8 kJ/mole H₂ enthalpy of combustion. With an increase in NaOH doping to 0.5 wt %, the Al of the R-Ni intermetallic served to replace Na metal as a reductant to generate NaH catalyst. When heated to 60° C., 15 g of the composite catalyst material required no additive to release 11.7 kJ of excess energy and develop a power of 0.25 kW. Solution NMR on product gases dissolved in DMF-d7 showed H₂(1/4) at 1.2 ppm.

The ToF-SIMs showed sodium hydrino hydride, NaH$_x$, peaks. The ¹H MAS NMR spectra of NaH*Br and NaH*Cl showed large distinct upfield resonance at −3.6 ppm and −4 ppm, respectively, that matched H⁻(1/4), and an NMR peak at 1.1 ppm matched H₂(1/4). NaH*Cl from reaction of NaCl and the solid acid KHSO₄ as the only source of hydrogen comprised two fractional hydrogen states. The H⁻(1/4) NMR peak was observed at −3.97 ppm, and the H⁻(1/3) peak was also present at −3.15 ppm. The corresponding H₂(1/4) and H₂(1/3) peaks were observed at 1.15 ppm and 1.7 ppm, respectively. ¹H NMR of NaH*F dissolved in DMF-d7 showed isolated H₂(1/4) and H⁻(1/4) at 1.2 ppm and −3.86 ppm, respectively, wherein the absence of any solid matrix effect or the possibly of alternative assignments confirmed the solid NMR assignments. The XPS spectrum recorded on NaH*Br showed the H⁻(1/4) peaks at about 9.5 eV and 12.3 eV that matched the results from LiH*Br and KH*I; whereas, sodium hydrino hydride showed two fractional hydrogen states additionally having the H⁻(1/3) XPS peak at 6 eV in the absence of a halide peak. The predicted rotational transitions having energies of 4² times those of ordinary H₂ were also observed from H₂(1/4) which was excited using a 12.5 keV electron beam.

These data such as NMR shifts, ToF-SIMs masses, XPS binding energies, FTIR, and emission spectrum are characteristic of and identify hydrino products of the catalysts systems that comprise an aspect of the present disclosure.

I. Hydrinos

A hydrogen atom having a binding energy given by $$\text{Binding Energy} = \frac{13.6 \text{ eV}}{(1/p)^2} \tag{35}$$

where p is an integer greater than 1, preferably from 2 to 137, is the product of the H catalysis reaction of the present disclosure. The binding energy of an atom, ion, or molecule, also known as the ionization energy, is the energy required to remove one electron from the atom, ion or molecule. A hydrogen atom having the binding energy given in Eq. (35) is hereafter referred to as a "hydrino atom" or "hydrino." The designation for a hydrino of radius $$\frac{a_H}{p},$$

where $a_H$ is the radius of an ordinary hydrogen atom and p is an integer, is $$H\left[\frac{a_H}{p}\right].$$

A hydrogen atom with a radius $a_H$ is hereinafter referred to as "ordinary hydrogen atom" or "normal hydrogen atom." Ordinary atomic hydrogen is characterized by its binding energy of 13.6 eV.

Hydrinos are formed by reacting an ordinary hydrogen atom with a suitable catalyst having a net enthalpy of reaction of $$m \cdot 27.2 \text{ eV} \tag{36}$$

where m is an integer. It is believed that the rate of catalysis is increased as the net enthalpy of reaction is more closely matched to m·27.2 eV. It has been found that catalysts having a net enthalpy of reaction within ±10%, preferably ±5%, of m·27.2 eV are suitable for most applications.

This catalysis releases energy from the hydrogen atom with a commensurate decrease in size of the hydrogen atom, $r_n = na_H$. For example, the catalysis of H(n=1) to H(n=1/2) releases 40.8 eV, and the hydrogen radius decreases from $a_H$ to 1/2$a_H$. A catalytic system is provided by the ionization of t electrons from an atom each to a continuum energy level such that the sum of the ionization energies of the t electrons is approximately m·27.2 eV where m is an integer.

A further example to such catalytic systems given supra (Eqs. (6-9)) involves lithium metal. The first and second ionization energies of lithium are 5.39172 eV and 75.64018 eV, respectively. The double ionization (t=2) reaction of Li to Li²⁺, then, has a net enthalpy of reaction of 81.0319 eV, which is equivalent to m=3 in Eq. (36).

$$81.0319 \text{ eV} + Li(m) + H\left[\frac{a_H}{p}\right] \rightarrow \tag{37}$$

$$Li^{2+} + 2e^- + H\left[\frac{a_H}{(p+3)}\right] + \left[(p+3)^2 - p^2\right] \cdot 13.6 \text{ eV}$$

$$Li^{2+} + 2e^- \rightarrow Li(m) + 81.0319 \text{ eV}. \tag{38}$$

And the overall reaction is $$H\left[\frac{a_H}{p}\right] \rightarrow H\left[\frac{a_H}{(p+3)}\right] + \left[(p+3)^2 - p^2\right] \cdot 13.6 \text{ eV}. \quad (39)$$

In another embodiment, the catalytic system involves cesium. The first and second ionization energies of cesium are 3.89390 eV and 23.15745 eV, respectively. The double ionization (t=2) reaction of Cs to $Cs^{2+}$, then, has a net enthalpy of reaction of 27.05135 eV, which is equivalent to m=1 in Eq. (36).

$$27.05135 \text{ eV} + Cs(m) + H\left[\frac{a_H}{p}\right] \rightarrow \quad (40)$$

$$Cs^{2+} + 2e^- + H\left[\frac{a_H}{(p+1)}\right] + \left[(p+1)^2 - p^2\right] \cdot 13.6 \text{ eV}$$

$$Cs^{2+} + 2e^- \rightarrow Cs(m) + 27.05135 \text{ eV}. \quad (41)$$

And the overall reaction is $$H\left[\frac{a_H}{p}\right] \rightarrow H\left[\frac{a_H}{(p+1)}\right] + \left[(p+1)^2 - p^2\right] \cdot 13.6 \text{ eV}. \quad (42)$$

An additional catalytic system involves potassium metal. The first, second, and third ionization energies of potassium are 4.34066 eV, 31.63 eV, 45.806 eV, respectively. The triple ionization (t=3) reaction of K to $K^{3+}$, then, has a net enthalpy of reaction of 81.7767 eV, which is equivalent to in =3 in Eq. (36).

$$81.7767 \text{ eV} + K(m) + H\left[\frac{a_H}{p}\right] \rightarrow \quad (43)$$

$$K^{3+} + 3e^- + H\left[\frac{a_H}{(p+3)}\right] + \left[(p+3)^2 - p^2\right] \cdot 13.6 \text{ eV}$$

$$K^{3+} + 3e^- \rightarrow K(m) + 81.7426 \text{ eV}. \quad (44)$$

And the overall reaction is $$H\left[\frac{a_H}{p}\right] \rightarrow H\left[\frac{a_H}{(p+3)}\right] + \left[(p+3)^2 - p^2\right] \cdot 13.6 \text{ eV}. \quad (45)$$

As a power source, the energy given off during catalysis is much greater than the energy lost to the catalyst. The energy released is large as compared to conventional chemical reactions. For example, when hydrogen and oxygen gases undergo combustion to form water $$H_2(g) + \frac{1}{2}O_2(g) \rightarrow H_2O(l) \quad (46)$$

the known enthalpy of formation of water is $\Delta H_f = 286$ kJ/mole or 1.48 eV per hydrogen atom. By contrast, each (n=1) ordinary hydrogen atom undergoing catalysis releases a net of 40.8 eV. Moreover, further catalytic transitions may occur:

$$n = \frac{1}{2} \rightarrow \frac{1}{3}, \frac{1}{3} \rightarrow \frac{1}{4}, \frac{1}{4} \rightarrow \frac{1}{5},$$

and so on. Once catalysis begins, hydrinos autocatalyze further in a process called disproportionation. This mechanism is similar to that of an inorganic ion catalysis. But, hydrino catalysis should have a higher reaction rate than that of the inorganic ion catalyst due to the better match of the enthalpy to m·27.2 eV.

The hydrino hydride ion of the present disclosure can be formed by the reaction of an electron source with a hydrino, that is, a hydrogen atom having a binding energy of about $$\frac{13.6 \text{ eV}}{n^2},$$

where $$n = \frac{1}{p}$$

and p is an integer greater than 1. The hydrino hydride ion is represented by $H^-(n=1/p)$ or $H^-(1/p)$:

$$H\left[\frac{a_H}{p}\right] + e^- \rightarrow H^-(n = 1/p) \quad (47)$$

$$H\left[\frac{a_H}{p}\right] + e^- \rightarrow H^-(1/p). \quad (48)$$

The hydrino hydride ion is distinguished from an ordinary hydride ion comprising an ordinary hydrogen nucleus and two electrons having a binding energy of about 0.8 eV. The latter is hereafter referred to as "ordinary hydride ion" or "normal hydride ion." The hydrino hydride ion comprises a hydrogen nucleus including proteum, deuterium, or tritium, and two indistinguishable electrons at a binding energy according to Eqs. (49-50).

The binding energy of a hydrino hydride ion can be represented by the following formula:

$$\text{Binding Energy} = \quad (49)$$

$$\frac{\hbar^2 \sqrt{s(s+1)}}{8\mu_e a_0^2 \left[\frac{1+\sqrt{s(s+1)}}{p}\right]^2} - \frac{\pi\mu_0 e^2 \hbar^2}{m_e^2}\left(\frac{1}{a_H^3} + \frac{2^2}{a_0^3\left[\frac{1+\sqrt{s(s+1)}}{p}\right]^3}\right)$$

where p is an integer greater than one, s=½, π is pi, ℏ is Planck's constant bar, $\mu_o$ is the permeability of vacuum, $m_e$ is the mass of the electron, $\mu_e$ is the reduced electron mass given by $$\mu_e = \frac{m_e m_p}{\frac{m_e}{\sqrt{\frac{3}{4}}} + m_p}$$

where $m_p$ is the mass of the proton, $a_H$ is the radius of the hydrogen atom, $a_o$ is the Bohr radius, and e is the elementary charge. The radii are given by $$r_2 = r_1 = a_0(1 + \sqrt{s(s+1)}); \quad s = \frac{1}{2}. \quad (50)$$

The binding energies of the hydrino hydride ion, H$^-$(n=1/p) as a function of p, where p is an integer, are shown in TABLE 2.

TABLE 2

The representative binding energy of the hydrino hydride ion H$^-$ (n = 1/p) as a function of p, Eq. (49).

| Hydride Ion | $r_1$ $(a_o)^a$ | Binding Energy (eV)$^b$ | Wavelength (nm) |
|---|---|---|---|
| H$^-$ (n = 1) | 1.8660 | 0.7542 | 1644 |
| H$^-$ (n = 1/2) | 0.9330 | 3.047 | 406.9 |
| H$^-$ (n = 1/3) | 0.6220 | 6.610 | 187.6 |
| H$^-$ (n = 1/4) | 0.4665 | 11.23 | 110.4 |
| H$^-$ (n = 1/5) | 0.3732 | 16.70 | 74.23 |
| H$^-$ (n = 1/6) | 0.3110 | 22.81 | 54.35 |
| H$^-$ (n = 1/7) | 0.2666 | 29.34 | 42.25 |
| H$^-$ (n = 1/8) | 0.2333 | 36.09 | 34.46 |
| H$^-$ (n = 1/9) | 0.2073 | 42.84 | 28.94 |
| H$^-$ (n = 1/10) | 0.1866 | 49.38 | 25.11 |
| H$^-$ (n = 1/11) | 0.1696 | 55.50 | 22.34 |
| H$^-$ (n = 1/12) | 0.1555 | 60.98 | 20.33 |
| H$^-$ (n = 1/13) | 0.1435 | 65.63 | 18.89 |
| H$^-$ (n = 1/14) | 0.1333 | 69.22 | 17.91 |
| H$^-$ (n = 1/15) | 0.1244 | 71.55 | 17.33 |
| H$^-$ (n = 1/16) | 0.1166 | 72.40 | 17.12 |
| H$^-$ (n = 1/17) | 0.1098 | 71.56 | 17.33 |
| H$^-$ (n = 1/18) | 0.1037 | 68.83 | 18.01 |
| H$^-$ (n = 1/19) | 0.0982 | 63.98 | 19.38 |
| H$^-$ (n = 1/20) | 0.0933 | 56.81 | 21.82 |
| H$^-$ (n = 1/21) | 0.0889 | 47.11 | 26.32 |
| H$^-$ (n = 1/22) | 0.0848 | 34.66 | 35.76 |
| H$^-$ (n = 1/23) | 0.0811 | 19.26 | 64.36 |
| H$^-$ (n = 1/24) | 0.0778 | 0.6945 | 1785 |

$^a$Eq. (50)
$^b$Eq. (49)

According to the present disclosure, a hydrino hydride ion (H$^-$) having a binding energy according to Eqs. (49-50) that is greater than the binding of ordinary hydride ion (about 0.75 eV) for p=2 up to 23, and less for p=24 (H$^-$) is provided. For p=2 to p=24 of Eqs. (49-50), the hydride ion binding energies are respectively 3, 6.6, 11.2, 16.7, 22.8, 29.3, 36.1, 42.8, 49.4, 55.5, 61.0, 65.6, 69.2, 71.6, 72.4, 71.6, 68.8, 64.0, 56.8, 47.1, 34.7, 19.3, and 0.69 eV. Exemplary compositions comprising the novel hydride ion are also provided herein.

Exemplary compounds are also provided comprising one or more hydrino hydride ions and one or more other elements. Such a compound is referred to as a "hydrino hydride compound."

Ordinary hydrogen species are characterized by the following binding energies (a) hydride ion, 0.754 eV ("ordinary hydride ion"); (b) hydrogen atom ("ordinary hydrogen atom"), 13.6 eV; (c) diatomic hydrogen molecule, 15.3 eV ("ordinary hydrogen molecule"); (d) hydrogen molecular ion, 16.3 eV ("ordinary hydrogen molecular ion"); and (e) H$_3^+$, 22.6 eV ("ordinary trihydrogen molecular ion"). Herein, with reference to forms of hydrogen, "normal" and "ordinary" are synonymous.

According to a further embodiment of the present disclosure, a compound is provided comprising at least one increased binding energy hydrogen species such as (a) a hydrogen atom having a binding energy of about $$\frac{13.6 \text{ eV}}{\left(\frac{1}{p}\right)^2},$$

such as within a range of about 0.9 to 1.1 times $$\frac{13.6 \text{ eV}}{\left(\frac{1}{p}\right)^2}$$

where p is an integer from 2 to 137; (b) a hydride ion (H$^-$) having a binding energy of about Binding Energy =

$$\frac{\hbar^2\sqrt{s(s+1)}}{8\mu_e a_0^2\left[\frac{1+\sqrt{s(s+1)}}{p}\right]^2} - \frac{\pi\mu_0 e^2\hbar^2}{m_e^2}\left(\frac{1}{a_H^3} + \frac{2^2}{a_0^3\left[\frac{1+\sqrt{s(s+1)}}{p}\right]^3}\right),$$

such as within a range of about 0.9 to 1.1 times

Binding Energy =

$$\frac{\hbar^2\sqrt{s(s+1)}}{8\mu_e a_0^2\left[\frac{1+\sqrt{s(s+1)}}{p}\right]^2} - \frac{\pi\mu_0 e^2\hbar^2}{m_e^2}\left(\frac{1}{a_H^3} + \frac{2^2}{a_0^3\left[\frac{1+\sqrt{s(s+1)}}{p}\right]^3}\right)$$

where p is an integer from 2 to 24; (c) H$_4^+$(1/p); (d) a trihydrino molecular ion, H$_3^+$(1/p), having a binding energy of about $$\frac{22.6}{\left(\frac{1}{p}\right)^2} \text{ eV}$$

such as within a range of about 0.9 to 1.1 times $$\frac{22.6}{\left(\frac{1}{p}\right)^2} \text{ eV}$$

where p is an integer from 2 to 137; (e) a dihydrino having a binding energy of about $$\frac{15.3}{\left(\frac{1}{p}\right)^2} \text{ eV}$$

such as within a range of about 0.9 to 1.1 times $$\frac{15.3}{\left(\frac{1}{p}\right)^2} \text{ eV}$$

where p is an integer from 2 to 137; (f) a dihydrino molecular ion with a binding energy of about $$\frac{16.3}{\left(\frac{1}{p}\right)^2} \text{ eV}$$

such as within a range of about 0.9 to 1.1 times $$\frac{16.3}{\left(\frac{1}{p}\right)^2} \text{ eV}$$

where p is an integer, preferably an integer from 2 to 137.

According to a further embodiment of the present disclosure, a compound is provided comprising at least one increased binding energy hydrogen species such as (a) a dihydrino molecular ion having a total energy of about $$E_T = -p^2 \left\{ \frac{e^2}{8\pi\varepsilon_o a_H}(4\ln 3 - 1 - 2\ln 3) \left[ 1 + p \sqrt{\frac{2\hbar\sqrt{\frac{2e^2}{4\pi\varepsilon_o(2a_H)^3 m_e}}}{m_e c^2}} \right] - \frac{1}{2}\hbar \sqrt{\frac{\frac{pe^2}{4\pi\varepsilon_o\left(\frac{2a_H}{p}\right)^3} - \frac{pe^2}{8\pi\varepsilon_o\left(\frac{3a_H}{p}\right)^3}}{\mu}} \right\} \quad (51)$$

$$= -p^2 16.13392 \text{ eV} - p^3 0.118755 \text{ eV}$$

such as within a range of about 0.9 to 1.1 times $$E_T = -p^2 \left\{ \frac{e^2}{8\pi\varepsilon_o a_H}(4\ln 3 - 1 - 2\ln 3) \left[ 1 + p \sqrt{\frac{2\hbar\sqrt{\frac{2e^2}{4\pi\varepsilon_o(2a_H)^3 m_e}}}{m_e c^2}} \right] - \frac{1}{2}\hbar \sqrt{\frac{\frac{pe^2}{4\pi\varepsilon_o\left(\frac{2a_H}{p}\right)^3} - \frac{pe^2}{8\pi\varepsilon_o\left(\frac{3a_H}{p}\right)^3}}{\mu}} \right\} \quad (52)$$

$$= -p^2 16.13392 \text{ eV} - p^3 0.118755 \text{ eV}$$

where p is an integer, $\hbar$ is Planck's constant bar, $m_e$ is the mass of the electron, c is the speed of light in vacuum, and $\mu$ is the reduced nuclear mass, and (b) a dihydrino molecule having a total energy of about $$E_T = -p^2 \left\{ \frac{e^2}{8\pi\varepsilon_o a_0}\left[\left(2\sqrt{2} - \sqrt{2} + \frac{\sqrt{2}}{2}\right)\ln\frac{\sqrt{2}+1}{\sqrt{2}-1} - \sqrt{2}\right] \left[ 1 + p \sqrt{\frac{2\hbar\sqrt{\frac{e^2}{4\pi\varepsilon_o a_0^3 m_e}}}{m_e c^2}} \right] - \frac{1}{2}\hbar \sqrt{\frac{\frac{pe^2}{8\pi\varepsilon_o\left(\frac{a_0}{p}\right)^3} - \frac{pe^2}{8\pi\varepsilon_o\left(\frac{\left(1+\frac{1}{\sqrt{2}}\right)a_0}{p}\right)^3}}{\mu}} \right\}$$

$$= -p^2 31.351 \text{ eV} - p^3 0.326469 \text{ eV}$$

such as within a range of about 0.9 to 1.1 times $$E_T = -p^2 \left\{ \frac{e^2}{8\pi\varepsilon_o a_0}\left[\left(2\sqrt{2} - \sqrt{2} + \frac{\sqrt{2}}{2}\right)\ln\frac{\sqrt{2}+1}{\sqrt{2}-1} - \sqrt{2}\right] \left[ 1 + p \sqrt{\frac{2\hbar\sqrt{\frac{e^2}{4\pi\varepsilon_o a_0^3 m_e}}}{m_e c^2}} \right] - \frac{1}{2}\hbar \sqrt{\frac{\frac{pe^2}{8\pi\varepsilon_o\left(\frac{a_0}{p}\right)^3} - \frac{pe^2}{8\pi\varepsilon_o\left(\frac{\left(1+\frac{1}{\sqrt{2}}\right)a_0}{p}\right)^3}}{\mu}} \right\}$$

$$= -p^2 31.351 \text{ eV} - p^3 0.326469 \text{ eV}$$

where p is an integer and $a_o$ is the Bohr radius.

According to one embodiment of the present disclosure wherein the compound comprises a negatively charged increased binding energy hydrogen species, the compound further comprises one or more cations, such as a proton, ordinary $H_2^+$, or ordinary $H_3^+$.

A method is provided herein for preparing compounds comprising at least one hydrino hydride ion. Such compounds are hereinafter referred to as "hydrino hydride compounds." The method comprises reacting atomic hydrogen with a catalyst having a net enthalpy of reaction of about $$\frac{m}{2} \cdot 27 \text{ eV},$$

where m is an integer greater than 1, preferably an integer less than 400, to produce an increased binding energy hydrogen atom having a binding energy of about $$\frac{13.6 \text{ eV}}{\left(\frac{1}{p}\right)^2}$$

where p is an integer, preferably an integer from 2 to 137. A further product of the catalysis is energy. The increased binding energy hydrogen atom can be reacted with an electron source, to produce an increased binding energy hydride ion. The increased binding energy hydride ion can be reacted with one or more cations to produce a compound comprising at least one increased binding energy hydride ion.

The novel hydrogen compositions of matter can comprise:
(a) at least one neutral, positive, or negative hydrogen species (hereinafter "increased binding energy hydrogen species") having a binding energy
   (i) greater than the binding energy of the corresponding ordinary hydrogen species, or
   (ii) greater than the binding energy of any hydrogen species for which the corresponding ordinary hydrogen species is unstable or is not observed because the ordinary hydrogen species' binding energy is less than thermal energies at ambient conditions (standard temperature and pressure, STP), or is negative; and
(b) at least one other element. The compounds of the present disclosure are hereinafter referred to as "increased binding energy hydrogen compounds."

By "other element" in this context is meant an element other than an increased binding energy hydrogen species. Thus, the other element can be an ordinary hydrogen species, or any element other than hydrogen. In one group of compounds, the other element and the increased binding energy hydrogen species are neutral. In another group of compounds, the other element and increased binding energy hydrogen species are charged such that the other element provides the balancing charge to form a neutral compound. The former group of compounds is characterized by molecular and coordinate bonding; the latter group is characterized by ionic bonding.

Also provided are novel compounds and molecular ions comprising
(a) at least one neutral, positive, or negative hydrogen species (hereinafter "increased binding energy hydrogen species") having a total energy
   (i) greater than the total energy of the corresponding ordinary hydrogen species, or
   (ii) greater than the total energy of any hydrogen species for which the corresponding ordinary hydrogen species is unstable or is not observed because the ordinary hydrogen species' total energy is less than thermal energies at ambient conditions, or is negative; and
(b) at least one other element.

The total energy of the hydrogen species is the sum of the energies to remove all of the electrons from the hydrogen species. The hydrogen species according to the present disclosure has a total energy greater than the total energy of the corresponding ordinary hydrogen species. The hydrogen species having an increased total energy according to the present disclosure is also referred to as an "increased binding energy hydrogen species" even though some embodiments of the hydrogen species having an increased total energy may have a first electron binding energy less that the first electron binding energy of the corresponding ordinary hydrogen species. For example, the hydride ion of Eqs. (49-50) for p=24 has a first binding energy that is less than the first binding energy of ordinary hydride ion, while the total energy of the hydride ion of Eqs. (49-50) for p=24 is much greater than the total energy of the corresponding ordinary hydride ion.

Also provided herein are novel compounds and molecular ions comprising
(a) a plurality of neutral, positive, or negative hydrogen species (hereinafter "increased binding energy hydrogen species") having a binding energy
   (i) greater than the binding energy of the corresponding ordinary hydrogen species, or
   (ii) greater than the binding energy of any hydrogen species for which the corresponding ordinary hydrogen species is unstable or is not observed because the ordinary hydrogen species' binding energy is less than thermal energies at ambient conditions or is negative; and
(b) optionally one other element. The compounds of the present disclosure are hereinafter referred to as "increased binding energy hydrogen compounds."

The increased binding energy hydrogen species can be formed by reacting one or more hydrino atoms with one or more of an electron, hydrino atom, a compound containing at least one of said increased binding energy hydrogen species, and at least one other atom, molecule, or ion other than an increased binding energy hydrogen species.

Also provided are novel compounds and molecular ions comprising
(a) a plurality of neutral, positive, or negative hydrogen species (hereinafter "increased binding energy hydrogen species") having a total energy
   (i) greater than the total energy of ordinary molecular hydrogen, or
   (ii) greater than the total energy of any hydrogen species for which the corresponding ordinary hydrogen species is unstable or is not observed because the ordinary hydrogen species' total energy is less than thermal energies at ambient conditions or is negative; and
(b) optionally one other element. The compounds of the present disclosure are hereinafter referred to as "increased binding energy hydrogen compounds".

In an embodiment, a compound is provided comprising at least one increased binding energy hydrogen species chosen from (a) hydride ion having a binding energy according to Eqs. (49-50) that is greater than the binding of ordinary hydride ion (about 0.8 eV) for p=2 up to 23, and less for p=24 ("increased binding energy hydride ion" or "hydrino hydride ion"); (b) hydrogen atom having a binding energy greater than the binding energy of ordinary hydrogen atom (about 13.6 eV) ("increased binding energy hydrogen atom" or "hydrino"); (c) hydrogen molecule having a first binding energy greater than about 15.3 eV ("increased binding energy hydrogen molecule" or "dihydrino"); and (d) molecular hydrogen ion having a binding energy greater than about 16.3 eV ("increased binding energy molecular hydrogen ion" or "dihydrino molecular ion").

II. Power Reactor and System

According to another embodiment of the present disclosure, a hydrogen catalyst reactor for producing energy and lower-energy hydrogen species is provided. As shown in FIG. 1, a hydrogen catalyst reactor 70 comprises a vessel 72 that contains an energy reaction mixture 74, a heat exchanger 80, and a power converter such as a steam generator 82 and turbine 90. In an embodiment, the catalysis involves reacting atomic hydrogen from the source 76 with the catalyst 78 to form lower-energy hydrogen "hydrinos" and produce power. The heat exchanger 80 absorbs heat released by the catalysis reaction, when the reaction mixture, comprised of hydrogen and a catalyst, reacts to form lower-energy hydrogen. The heat exchanger exchanges heat with the steam generator 82 that absorbs heat from the exchanger 80 and produces steam. The energy reactor 70 further comprises a turbine 90 that receives steam from the steam generator 82 and supplies mechanical power to a power generator 100 that converts the steam energy into electrical energy, which can be received by a load 110 to produce work or for dissipation.

In an embodiment, the energy reaction mixture 74 comprises an energy releasing material 76, such as a fuel supplied through supply passage 62. The reaction mixture may comprise a source of hydrogen isotope atoms or a source of molecular hydrogen isotope, and a source of catalyst 78 which resonantly remove approximately m·27.2 eV to form lower-energy atomic hydrogen where m is an integer, preferably an integer less than 400, wherein the reaction to lower energy states of hydrogen occurs by contact of the hydrogen with the catalyst. The catalyst may be in the molten, liquid, gaseous, or solid state. The catalysis releases energy in a form such as heat and forms at least one of lower-energy hydrogen isotope atoms, lower-energy hydrogen molecules, hydride ions, and lower-energy hydrogen compounds. Thus, the power cell also comprises a lower-energy hydrogen chemical reactor.

The source of hydrogen can be hydrogen gas, dissociation of water including thermal dissociation, electrolysis of water, hydrogen from hydrides, or hydrogen from metal-hydrogen solutions. In another embodiment, molecular hydrogen of the energy releasing material 76 is dissociated into atomic hydrogen by a molecular hydrogen dissociating catalyst of the mixture 74. Such dissociating catalysts or dissociators may also absorb hydrogen, deuterium, or tritium atoms and/or molecules and include, for example, an element, compound, alloy, or mixture of noble metals such as palladium and platinum, refractory metals such as molybdenum and tungsten, transition metals such as nickel and titanium, and inner transition metals such as niobium and zirconium. Preferably, the dissociator has a high surface area such as a noble metal such as Pt, Pd, Ru, Ir, Re, or Rh, or Ni on $Al_2O_3$, $SiO_2$, or combinations thereof.

In an embodiment, a catalyst is provided by the ionization of t electrons from an atom or ion to a continuum energy level such that the sum of the ionization energies of the t electrons is approximately m·27.2 eV where t and m are each an integer. A catalyst may also be provided by the transfer of t electrons between participating ions. The transfer of t electrons from one ion to another ion provides a net enthalpy of reaction whereby the sum of the t ionization energies of the electron-donating ion minus the ionization energies of t electrons of the electron-accepting ion equals approximately m·27.2 eV where t and m are each an integer. In another embodiment, the catalyst comprises MH such as NaH having an atom M bound to hydrogen, and the enthalpy of m·27.2 eV is provided by the sum of the M-H bond energy and the ionization energies of the t electrons.

In an embodiment, a source of catalyst comprises a catalytic material 78 supplied through catalyst supply passage 61, that typically provides a net enthalpy of approximately $$\frac{m}{2} \cdot 27.2 \text{ eV}$$

plus or minus 1 eV. The catalysts comprise atoms, ions, molecules, and hydrinos that accept energy from atomic hydrogen and hydrinos. In embodiments, the catalyst may comprise at least one species chosen from molecules of AlH, BiH, ClH, CoH, GeH, InH, NaH, RuH, SbH, SeH, SiH, SnH, $C_2$, $N_2$, $O_2$, $CO_2$, $NO_2$, and $NO_3$ and atoms or ions of Li, Be, K, Ca, Ti, V, Cr, Mn, Fe, Co, Ni, Cu, Zn, As, Se, Kr, Rb, Sr, Nb, Mo, Pd, Sn, Te, Cs, Ce, Pr, Sm, Gd, Dy, Pb, Pt, Kr, $2K^+$, $He^+$, $Ti^{2+}$, $Na^+$, $Rb^+$, $Sr^+$, $Fe^{3+}$, $Mo^{2+}$, $Mo^{4+}$, $In^{3+}$, $He^+$, $Ar^+$, $Xe^+$, $Ar^{2+}$ and $H^+$, and $Ne^+$ and $H^+$.

In an embodiment of a power system, the heat is removed by a heat exchanger having a heat exchange medium. The heat exchanger may be a water wall and the medium may be water. The heat may be transferred directly for space and process heating. Alternatively, the heat exchanger medium such as water undergoes a phase change such as conversion to steam. This conversion may occur in a steam generator. The steam may be used to generate electricity in a heat engine such as a steam turbine and a generator.

Figure 2:
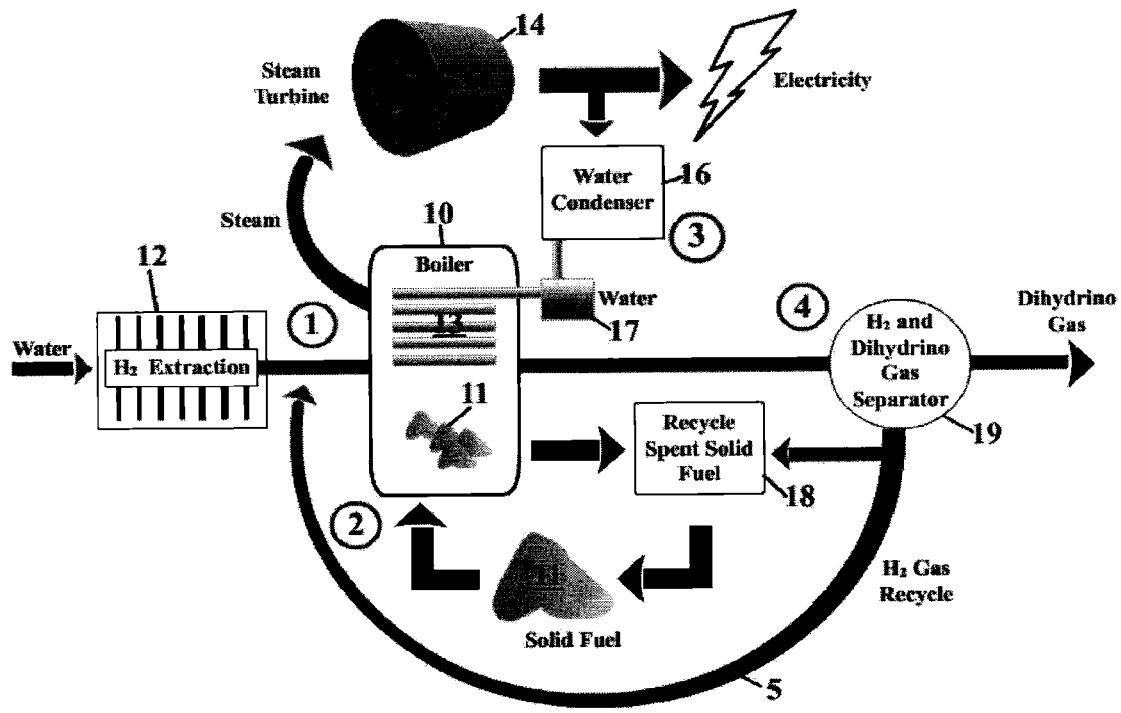
FIG. 2 is a schematic drawing of an energy reactor and power plant for recycling or regenerating the fuel in accordance with the present disclosure.

An embodiment of an hydrogen catalyst energy and lower-energy-hydrogen species-producing reactor 5, for recycling or regenerating the fuel in accordance with the present disclosure, is shown in FIG. 2 and comprises a boiler 10 which contains a fuel reaction mixture 11 that may be a mixture of a source of hydrogen, a source of catalyst, and optionally a solvent that may be vaporized, a hydrogen source 12, steam pipes and steam generator 13, a power converter such as a turbine 14, a water condenser 16, a water-make-up source 17, a fuel recycler 18, and a hydrogen-dihydrino gas separator 19. At Step 1, the fuel, such as one that is gaseous, liquid, solid, or a heterogeneous mixture comprising multiple phases, comprising a source of catalyst and a source of hydrogen reacts to form hydrinos and lower-energy hydrogen products. At Step 2, the spent fuel is reprocessed to re-supply the boiler 10 to maintain thermal power generation. The heat generated in the boiler 10 forms steam in the pipes and steam generator 13 that is delivered to the turbine 14 that in turn generates electricity by powering a generator. At Step 3, the water is condensed by the water condensor 16. Any water loss may be made up by the water source 17 to complete the cycle to maintain thermal to electric power conversion. At Step 4, lower-energy hydrogen products such as hydrino hydride compounds and dihydrino gas may be removed, and unreacted hydrogen may be returned to the fuel recycler 18 or hydrogen source 12 to be added back to spent fuel to make-up recycled fuel. The gas products and unreacted hydrogen may be separated by hydrogen-dihydrino gas separator 19. Any product hydrino hydride compounds may be separated and removed using fuel recycler 18. The processing may be performed in the boiler or externally to the boiler with the fuel returned. Thus, the system may further comprise at least one of gas and mass transporters to move the reactants and products to achieve the spent fuel removal, regeneration, and re-supply. Hydrogen make-up for that spent in the formation of hydrinos is added from the source 12 during fuel reprocessing and may involve recycled, unconsumed hydrogen. The recycled fuel maintains the production of thermal power to drive the power plant to generate electricity.

The reactor may be run in a continuous mode with hydrogen addition and with separation and addition or replacement to counter the minimum degradation of the reactants. Alternatively, the reacted fuel is continuously regenerated from the products. In one embodiment of the latter scheme, the reaction mixture comprises species that can generate the reactants of atomic or molecular catalyst and atomic hydrogen that further react to form hydrinos, and the product species formed by the generation of catalyst and atomic hydrogen can be regenerated by at least the step of reacting the products with hydrogen. In an embodiment, the reactor comprises a moving bed reactor that may further comprise a fluidized-reactor section wherein the reactants are continuously supplied and side products are removed and regenerated and returned to the reactor. In an embodiment, the lower-energy hydrogen products such as hydrino hydride compounds or dihydrino molecules are collected as the reactants are regenerated. Furthermore, the hydrino hydride ions may be formed into other compounds or converted into dihydrino molecules during the regeneration of the reactants.

The reactor may further comprise a separator to separate components of a product mixture such as by evaporation of the solvent if one is present. The separator may, for example, comprise sieves for mechanically separating by differences in physical properties such as size. The separator may also be a separator that exploits differences in density of the component of the mixture, such as a cyclone separator. For example, at least two of the groups chosen from carbon, a metal such as Eu, and an inorganic product such as KBr can be separated based on the differences in density in a suitable medium such as forced inert gas and also by centrifugal forces. The separation of components may also be based on the differential of the dielectric constant and chargeability. For example, carbon may be separated from metal based on the application of an electrostatic charge to the former with removal from the mixture by an electric field. In the case that one or more components of a mixture are magnetic, the separation may be achieved using magnets. The mixture may be agitated over a series of strong magnets alone or in combination with one or more sieves to cause the separation based on at least one of the stronger adherence or attraction of the magnetic particles to the magnet and a size difference of the two classes of particles. In an embodiment of the use of sieves and an applied magnetic field, the latter adds an additional force to that of gravity to draw the smaller magnetic particles through the sieve while the other particles of the mixture are retained on the sieve due to their larger size.

The reactor may further comprise a separator to separate one or more components based on a differential phase change or reaction. In an embodiment, the phase change comprises melting using a heater, and the liquid is separated from the solid by methods known in the art such as gravity filtration, filtration using a pressurized gas assist, centrifugation, and by applying vacuum. The reaction may comprise decomposition such as hydride decomposition or reaction to from a hydride, and the separations may be achieved by melting the corresponding metal followed by its separation and by mechanically separating the hydride powder, respectively. The latter may be achieved by sieving. In an embodiment, the phase change or reaction may produce a desired reactant or intermediate. In certain embodiments, the regeneration including any desired separation steps may occur inside or outside of the reactor.

Other methods known by those skilled in the art that can be applied to the separations of the present disclosure by application of routine experimentation. In general, mechanical separations can be divided into four groups: sedimentation, centrifugal separation, filtration, and sieving. In one embodiment, the separation of the particles is achieved by at least one of sieving and use of classifiers. The size and shape of the particle may be chosen in the starting materials to achieve the desired separation of the products.

The power system may further comprise a catalyst condensor to maintain the catalyst vapor pressure by a temperature control which controls the temperature of a surface at a lower value than that of the reaction cell. The surface temperature is maintained at a desired value that provides the desired vapor pressure of the catalyst. In an embodiment, the catalyst condensor is a tube grid in the cell. In an embodiment with a heat exchanger, the flow rate of the heat transfer medium may be controlled at a rate that maintains the condensor at the desired lower temperature than the main heat exchanger. In an embodiment, the working medium is water, and the flow rate is higher at the condensor than the water wall such that the condensor is the lower, desired temperature. The separate streams of working media may be recombined and transferred for space and process heating or for conversion to steam.

The cells of the present disclosure comprise the catalysts, reaction mixtures, methods, and systems disclosed herein wherein the particular cell serves as a reactor and at least one component to activate, initiate, propagate, and/or maintain the reaction and regenerate the reactants. According to the present disclosure, the cells comprise at least one catalyst or a source of catalyst, at least one source of atomic hydrogen, and a vessel. The cells and systems for their operation are known to those skilled in the art. The electrolytic cell energy reactor such as a eutectic-salt electrolysis cell, plasma electrolysis reactor, barrier electrode reactor, RF plasma reactor, pressurized gas energy reactor, gas discharge energy reactor, preferably pulsed discharge, and more preferably pulsed pinched plasma discharge, microwave cell energy reactor, and a combination of a glow discharge cell and a microwave and or RF plasma reactor of the present disclosure comprises: a source of hydrogen; one of a solid, molten, liquid, gaseous, and heterogeneous source of catalyst or reactants in any of these states to cause the hydrino reaction by a reaction amongst the reactants; a vessel the reactants or at least containing hydrogen and the catalyst wherein the reaction to form lower-energy hydrogen occurs by contact of the hydrogen with the catalyst or by reaction of MH catalyst; and optionally a component for removing the lower-energy hydrogen product. In an embodiment, the reaction to form lower-energy state hydrogen is facilitated by an oxidation reaction. The oxidation reaction may increase the reaction rate to form hydrinos by at least one of accepting electrons from the catalyst and neutralizing the highly-charged cation formed by accepting energy from atomic hydrogen. Thus, these cells may be operated in a manner that provides such an oxidation reaction. In an embodiment, the electrolysis or plasma cell may provide an oxidation reaction at the anode wherein hydrogen provided by a method such as sparging and catalyst react to form hydrinos via the participating oxidation reaction.

In an embodiment of a liquid fuel, the cell is operated at a temperature wherein the rate of decomposition of the solvent is negligible with respect to the power to regenerate it relative to the power of the cell. In the case, the temperature is below that at which a satisfactory efficiency of power conversion can be obtained by more conventional methods such as those using a steam cycle, a lower-boiling-point working medium may be used. In another embodiment, the temperature of a working medium may be increased using a heat pump. Thus, space and process heating may be supplied using the power cell operating at a temperature above ambient wherein a working medium is increased in temperature with a component such as a heat pump. With sufficient elevation of the temperature, a liquid to gas phase transition may occur, and the gas may be used for pressure volume (PV) work. The PV work may comprise powering a generator to produce electricity. The medium may then be condensed, and the condensed working medium may be returned to the reactor cell to be re-heated and recirculated in the power loop.

In an embodiment of the reactor, a heterogeneous catalyst mixture comprising a liquid and solid phase is flowed through the reactor. The flow may be achieved by pumping. The mixture may be a slurry. The mixture may be heated in a hot zone to cause the catalysis of hydrogen to hydrinos to release heat to maintain the hot zone. The products may be flowed out of the hot zone, and the reactant mixture may be regenerated from the products. In another embodiment, at least one solid of a heterogeneous mixture may be flowed into the reactor by gravity feed. A solvent may be flowed into the reactor separately or in combination with one or more solids. The reactant mixture may comprise at least one of the group of a dissociator, a high-surface-area (HSA) material, R-Ni, Ni, NaH, Na, NaOH, and a solvent.

In an embodiment, one or more reactants, preferably a source of halogen, halogen gas, source of oxygen, or solvent, are injected into a mixture of the other reactants. The injection is controlled to optimize the excess energy and power from the hydrino-forming reaction. The cell temperature at injection and rate of injection may be controlled to achieve the optimization. Other process parameters and mixing can be controlled to further the optimization using methods known to those skilled in the art of process engineering.

For power conversion, each cell type may be interfaced with any of the known converters of thermal energy or plasma to mechanical or electrical power which include for example, a heat engine, steam or gas turbine system, Sterling engine, or thermionic or thermoelectric converters. Further plasma converters comprise the magnetic mirror magnetohydrodynamic power converter, plasmadynamic power converter, gyrotron, photon bunching microwave power converter, charge drift power, or photoelectric converter. In an embodiment, the cell comprises at least one cylinder of an internal combustion engine.

III. Hydrogen Gas Cell and Solid, Liquid, and Heterogeneous Fuel Reactor

Figure 3:
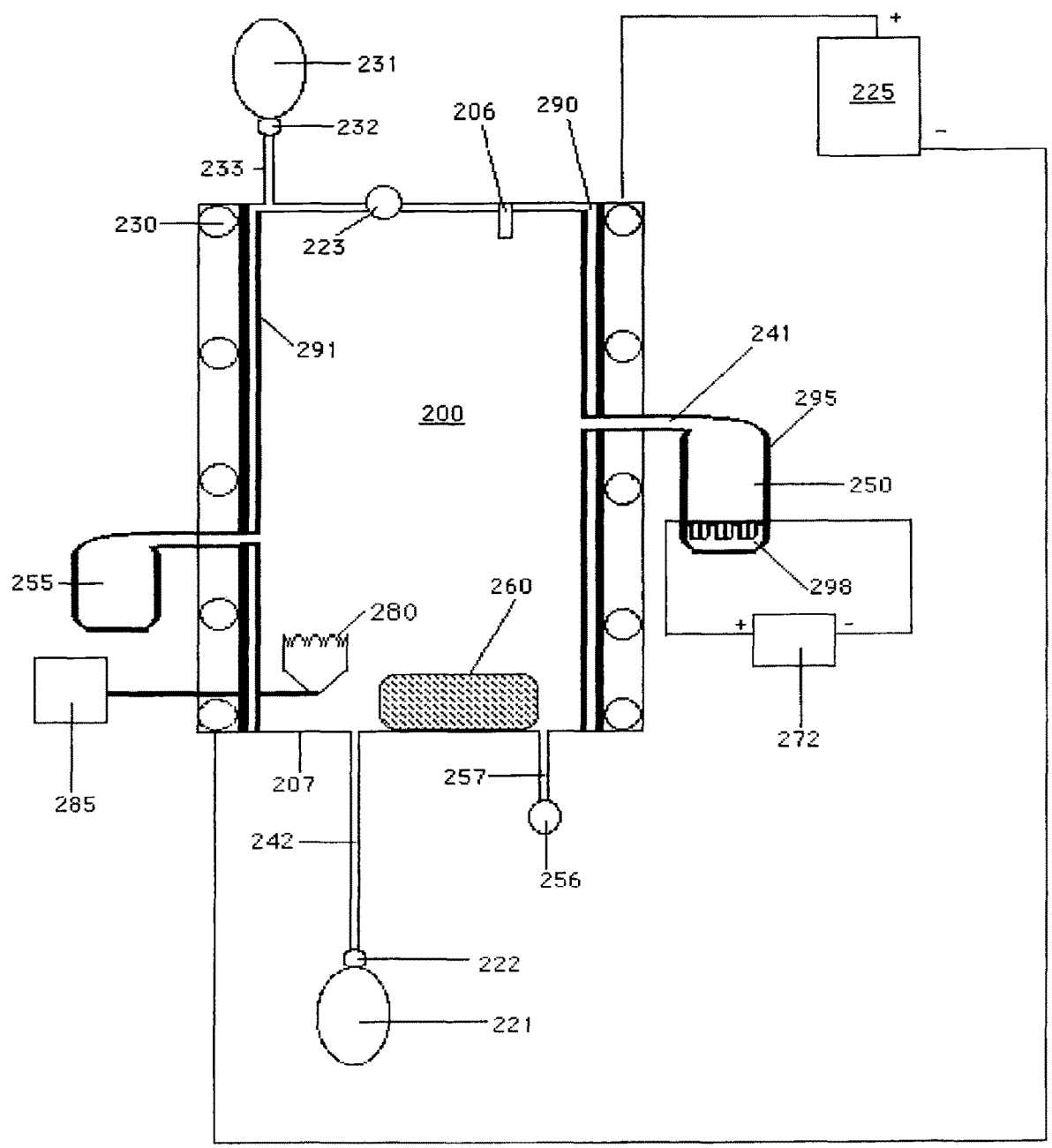
FIG. 3 is a schematic drawing of a power reactor in accordance with the present disclosure.

According to an embodiment of the present disclosure, a reactor for producing hydrinos and power may take the form of a reactor cell. A reactor of the present disclosure is shown in FIG. 3. Reactant hydrinos are provided by a catalytic reaction with catalyst. Catalysis may occur in the gas phase or in solid or liquid state.

The reactor of FIG. 3 comprises a reaction vessel 207 having a chamber 200 capable of containing a vacuum or pressures greater than atmospheric. A source of hydrogen 221 communicating with chamber 200 delivers hydrogen to the chamber through hydrogen supply passage 242. A controller 222 is positioned to control the pressure and flow of hydrogen into the vessel through hydrogen supply passage 242. A pressure sensor 223 monitors pressure in the vessel. A vacuum pump 256 is used to evacuate the chamber through a vacuum line 257.

In an embodiment, the catalysis occurs in the gas phase. The catalyst may be made gaseous by maintaining the cell temperature at an elevated temperature that, in turn, determines the vapor pressure of the catalyst. The atomic and/or molecular hydrogen reactant is also maintained at a desired pressure that may be in any pressure range. In an embodiment, the pressure is less than atmospheric, preferably in the range about 10 millitorr to about 100 Torr. In another embodiment, the pressure is determined by maintaining a mixture of source of catalyst such as a metal source and the corresponding hydride such as a metal hydride in the cell maintained at the desired operating temperature.

A source of suitable catalyst 250 for generating hydrino atoms can be placed in a catalyst reservoir 295, and gaseous catalyst can be formed by heating. The reaction vessel 207 has a catalyst supply passage 241 for the passage of gaseous catalyst from the catalyst reservoir 295 to the reaction chamber 200. Alternatively, the catalyst may be placed in a chemically resistant open container, such as a boat, inside the reaction vessel.

The source of hydrogen can be hydrogen gas and the molecular hydrogen. Hydrogen may be dissociated into atomic hydrogen by a molecular hydrogen dissociating catalyst. Such dissociating catalysts or dissociators include, for example, Raney nickel (R-Ni), precious or noble metals, and a precious or noble metal on a support. The precious or noble metal may be Pt, Pd, Ru, Ir, and Rh, and the support may be at least one of Ti, Nb, $Al_2O_3$, $SiO_2$ and combinations thereof. Further dissociators are Pt or Pd on carbon that may comprise a hydrogen spillover catalyst, nickel fiber mat, Pd sheet, Ti sponge, Pt or Pd electroplated on Ti or Ni sponge or mat, TiH, Pt black, and Pd black, refractory metals such as molybdenum and tungsten, transition metals such as nickel and titanium, inner transition metals such as niobium and zirconium, and other such materials known to those skilled in the art. In an embodiment, hydrogen is dissociated on Pt or Pd. The Pt or Pd may be coated on a support material such as titanium or $Al_2O_3$. In another embodiment, the dissociator is a refractory metal such as tungsten or molybdenum, and the dissociating material may be maintained at elevated temperature by temperature control component 230, which may take the form of a heating coil as shown in cross section in FIG. 3. The heating coil is powered by a power supply 225. Preferably, the dissociating material is maintained at the operating temperature of the cell. The dissociator may further be operated at a temperature above the cell temperature to more effectively dissociate, and the elevated temperature may prevent the catalyst from condensing on the dissociator. Hydrogen dissociator can also be provided by a hot filament such as 280 powered by supply 285.

In an embodiment, the hydrogen dissociation occurs such that the dissociated hydrogen atoms contact gaseous catalyst to produce hydrino atoms. The catalyst vapor pressure is maintained at the desired pressure by controlling the temperature of the catalyst reservoir 295 with a catalyst reservoir heater 298 powered by a power supply 272. When the catalyst is contained in a boat inside the reactor, the catalyst vapor pressure is maintained at the desired value by controlling the temperature of the catalyst boat, by adjusting the boat's power supply. The cell temperature can be controlled at the desired operating temperature by the heating coil 230 that is powered by power supply 225. The cell (called a permeation cell) may further comprise an inner reaction chamber 200 and an outer hydrogen reservoir 290 such that hydrogen may be supplied to the cell by diffusion of hydrogen through the wall 291 separating the two chambers. The temperature of the wall may be controlled with a heater to control the rate of diffusion. The rate of diffusion may be further controlled by controlling the hydrogen pressure in the hydrogen reservoir.

To maintain the catalyst pressure at the desire level, the cell having permeation as the hydrogen source may be sealed. Alternatively, the cell further comprises high temperature valves at each inlet or outlet such that the valve contacting the reaction gas mixture is maintained at the desired temperature. The cell may further comprise a getter or trap 255 to selectively collect the lower-energy-hydrogen species and/or the increased-binding-energy hydrogen compounds and may further comprise a selective valve 206 for releasing dihydrino gas product.

In an embodiment, the reactants such as the solid fuel or heterogeneous-catalyst fuel mixture 260 is reacted in the vessel 200 by heating with heaters 230. A further added reactant such as at least one of an exothermic reactant, preferably having fast kinetics, may be flowed into the cell 200 through control valve 232 and connection 233. The added reactant may be a source of halogen, halogen, source of oxygen, or solvent. The reactant 260 may comprise a species that reacts with the added reactant. A halogen may be added to form a halide with reactant 260, or a source of oxygen may be added to reactant 260 to form an oxide, for example.

The catalyst may be at least one of the group of atomic lithium, potassium, or cesium, NaH molecule, 2H, and hydrino atoms, wherein catalysis comprises a disproportionation reaction. Lithium catalyst may be made gaseous by maintaining the cell temperature in about the 500-1000° C. range. Preferably, the cell is maintained in about the 500-750° C. range. The cell pressure may be maintained at less than atmospheric, preferably in the range about 10 millitorr to about 100 Torr. Most preferably, at least one of the catalyst and hydrogen pressure is determined by maintaining a mixture of catalyst metal and the corresponding hydride such as lithium and lithium hydride, potassium and potassium hydride, sodium and sodium hydride, and cesium and cesium hydride in the cell maintained at the desired operating temperature. The catalyst in the gas phase may comprise lithium atoms from the metal or a source of lithium metal. Preferably, the lithium catalyst is maintained at the pressure determined by a mixture of lithium metal and lithium hydride at the operating temperature range of about 500-1000° C. and most preferably, the pressure with the cell at the operating temperature range of about 500-750° C. In other embodiments, K, Cs, and Na replace Li wherein the catalyst is atomic K, atomic Cs, and molecular NaH.

In an embodiment of the gas cell reactor comprising a catalyst reservoir or boat, gaseous Na, NaH catalyst, or the gaseous catalyst such as Li, K, and Cs vapor is maintained in a super-heated condition in the cell relative to the vapor in the reservoir or boat which is the source of the cell vapor. In one embodiment, the superheated vapor reduces the condensation of catalyst on the hydrogen dissociator or the dissociator of at least one of metal and metal hydride molecules disclosed infra. In an embodiment comprising Li as the catalyst from a reservoir or boat, the reservoir or boat is maintained at a temperature at which Li vaporizes. $H_2$ may be maintained at a pressure that is lower than that which forms a significant mole fraction of LiH at the reservoir temperature. The pressures and temperatures that achieve this condition can be determined from the data plots of $H_2$ pressure versus LiH mole fraction at given isotherms that are known in the art. In an embodiment, the cell reaction chamber containing a dissociator is operated at a higher temperature such that the Li does not condense on the walls or the dissociator. The $H_2$ may flow from the reservoir to the cell to increase the catalyst transport rate. Flow such as from the catalyst reservoir to the cell and then out of the cell is a method to remove hydrino product to prevent hydrino product inhibition of the reaction. In other embodiments, K, Cs, and Na replace Li wherein the catalyst is atomic K, atomic Cs, and molecular NaH.

Hydrogen is supplied to the reaction from a source of hydrogen. For example, the hydrogen is supplied by permeation from a hydrogen reservoir. The pressure of the hydrogen reservoir may be in the range of 10 Torr to 10,000 Torr, preferably 100 Torr to 1000 Torr, and most preferably about atmospheric pressure. The cell may be operated in the temperature of about 100° C. to 3000° C., preferably in the temperature of about 100° C. to 1500° C., and most preferably in the temperature of about 500° C. to 800° C.

The source of hydrogen may be from decomposition of an added hydride. A cell design that supplies $H_2$ by permeation is one comprising an internal metal hydride placed in a sealed vessel wherein atomic H permeates out at high temperature. The vessel may comprise Pd, Ni, Ti, or Nb. In an embodiment, the hydride is placed in a sealed tube such as a Nb tube containing a hydride and sealed at both ends with seals such as Swagelocks. In the sealed case, the hydride could be an alkaline or alkaline earth hydride. Alternatively, in this as well as the internal-hydride-reagent case, the hydride could be at least one of the group of saline hydrides, titanium hydride, vanadium, niobium, and tantalum hydrides, zirconium and hafnium hydrides, rare earth hydrides, yttrium and scandium hydrides, transition element hydrides, intermetalic hydrides, and their alloys.

In an embodiment the hydride and the operating temperature ±200° C., based on each hydride decomposition temperature, is chosen from at least one of the list of:

a rare earth hydride with an operating temperature of about 800° C.; lanthanum hydride with an operating temperature of about 700° C.; gadolinium hydride with an operating temperature of about 750° C.; neodymium hydride with an operating temperature of about 750° C.; yttrium hydride with an operating temperature of about 800° C.; scandium hydride with an operating temperature of about 800° C.; ytterbium hydride with an operating temperature of about 850-900° C.; titanium hydride with an operating temperature of about 450° C.; cerium hydride with an operating temperature of about 950° C.; praseodymium hydride with an operating temperature of about 700° C.; zirconium-titanium (50%/50%) hydride with an operating temperature of about 600° C.; an alkali metal/alkali metal hydride mixture such as Rb/RbH or K/KH with an operating temperature of about 450° C.; and an alkaline earth metal/alkaline earth hydride mixture such as Ba/BaH$_2$ with an operating temperature of about 900-1000° C.

Metals in the gas state can comprise diatomic covalent molecules. An objective of the present disclosure is to provide atomic catalyst such as Li as well as K and Cs. Thus, the reactor may further comprise a dissociator of at least one of metal molecules ("MM") and metal hydride molecules ("MH"). Preferably, the source of catalyst, the source of $H_2$, and the dissociator of MM, MH, and HH, wherein M is the atomic catalyst are matched to operate at the desired cell conditions of temperature and reactant concentrations for example. In the case that a hydride source of $H_2$ is used, in an embodiment, its decomposition temperature is in the range of the temperature that produces the desired vapor pressure of the catalyst. In the case of that the source of hydrogen is permeation from a hydrogen reservoir to the reaction chamber, preferable sources of catalysts for continuous operation are Sr and Li metals since each of their vapor pressures may be in the desired range of 0.01 to 100 Torr at the temperatures for which permeation occurs. In other embodiments of the permeation cell, the cell is operated at a high temperature permissive of permeation, then the cell temperature is lowered to a temperature which maintains the vapor pressure of the volatile catalyst at the desired pressure.

In an embodiment of a gas cell, a dissociator comprises a component to generate catalyst and H from sources. Surface catalysts such as Pt on Ti or Pd, iridium, or rhodium alone or on a substrate such as Ti may also serve the role as a dissociator of molecules of combinations of catalyst and hydrogen atoms. Preferably, the dissociator has a high surface area such as Pt/Al$_2$O$_3$ or Pd/Al$_2$O$_3$.

The $H_2$ source can also be $H_2$ gas. In this embodiment, the pressure can be monitored and controlled. This is possible with catalyst and catalyst sources such as K or Cs metal and LiNH$_2$, respectively, since they are volatile at low temperature that is permissive of using a high-temperature valve. $LiNH_2$ also lowers the necessary operating temperature of the Li cell and is less corrosive which is permissive of long-duration operation using a feed through in the case of plasma and filament cells wherein a filament serves as a hydrogen dissociator.

Further embodiments of the gas cell hydrogen reactor having NaH as the catalyst comprise a filament with a dissociator in the reactor cell and Na in the reservoir. $H_2$ may be flowed through the reservoir to main chamber. The power may be controlled by controlling the gas flow rate, $H_2$ pressure, and Na vapor pressure. The latter may be controlled by controlling the reservoir temperature. In another embodiment, the hydrino reaction is initiated by heating with the external heater and an atomic H is provided by a dissociator.

The reaction mixture may be agitated by methods known in the art such as mechanical agitation or mixing. The agitation system may comprise one or more piezoelectric transducers. Each piezoelectric transducer may provide ultrasonic agitation. The reaction cell may be vibrated and further contain agitation elements such as stainless steel or tungsten balls that are vibrated to agitate the reaction mixture. In another embodiment, mechanical agitation comprises ball milling. The reactant may also be mixed using these methods, preferably by ball milling.

In an embodiment, the catalyst is formed by mechanical agitation such as, for example, at least one of vibration with agitation elements, ultrasonic agitation, and ball milling. The mechanical impact or compression of sound waves such as ultrasound may cause a reaction or a physical change in the reactants to cause the formation of the catalyst, preferably NaH molecules. The reactant mixture may or may not comprise a solvent. The reactants may be solids such as solid NaH that is mechanically agitated to form NaH molecules. Alternatively, the reaction mixture may comprise a liquid. The mixture may have at least one Na species. The Na species may be a component of a liquid mixture, or it may be in solution. In an embodiment, sodium metal is dispersed by high-speed stirring of a suspension of the metal in a solvent such as an ether, hydrocarbon, fluorinated hydrocarbon, aromatic, or heterocyclic aromatic solvent. The solvent temperature may be held just above the melting point of the metal.

IV. Fuels-Types

An embodiment of the present disclosure is directed to a fuel comprising a reaction mixture of at least a source of hydrogen and a source of catalyst to support the catalysis of hydrogen to form hydrinos in at least one of gaseous, liquid, and solid phases of a possible mixture of phases. The reactants and reactions given herein for solid and liquid fuels are also reactants and reactions of heterogeneous fuels comprising a mixture of phases.

An objective of the present disclosure is to provide atomic catalysts such as Li as well as K and Cs and molecular catalyst NaH. Metals form diatomic covalent molecules. Thus, in solid-fuels, liquid-fuels, and heterogeneous-fuels embodiments, the reactants comprise alloys, complexes, sources of complexes, mixtures, suspensions, and solutions that may reversibly form with a metal catalyst M and decompose or react to provide a catalyst such as Li or NaH. In another embodiment, at least one of the catalyst source and atomic hydrogen source further comprises at least one reactant that reacts to form at least one of the catalyst and atomic hydrogen. In another embodiment, the reaction mixture comprises NaH catalyst or a source of NaH catalyst or other catalyst such as Li or K that may form via the reaction of one or more reactants or species of the reaction mixture or may form by a physical transformation. The transformation may be solvation with a suitable solvent.

The reaction mixture may further comprise a solid to support the catalysis reaction on a surface. The catalyst or a source of catalyst such as NaH may be coated on the surface. The coating may be achieved by mixing a support such as activated carbon, TiC, WC, R-Ni with NaH by methods such as ball milling. The reaction mixture may comprise a heterogeneous catalyst or a source of heterogeneous catalyst. In an embodiment, the catalyst such as NaH is coated on the support such as activated carbon, TiC, WC, or a polymer by the method of incipient wetness, preferably by using an aportic solvent such as an ether. The support may also comprise an inorganic compound such as an alkali halide, preferably at least one of NaF and $HNaF_2$ wherein NaH serves as the catalyst and a fluorinated solvent is used.

In an embodiment of a liquid fuel, the reaction mixture comprises at least one of a source of catalyst, a catalyst, a source of hydrogen, and a solvent for the catalyst. In other embodiments, the present disclosure of a solid fuel and a liquid fuel further comprises combinations of both and further comprises gaseous phases as well. The catalysis with the reactants such as the catalyst and atomic hydrogen and sources thereof in multiple phases is called a heterogeneous reaction mixture and the fuel is called a heterogeneous fuel. Thus, the fuel comprises a reaction mixture of at least a source of hydrogen to undergo transition to hydrinos, states given by Eq, (35), and a catalyst to cause the transitions having the reactants in at least one of liquid, solid, and gaseous phases. Catalysis with the catalyst in a different phase from the reactants is generally known in the art as a heterogeneous catalysis that is an embodiment of the present disclosure. Heterogeneous catalysts provide a surface for the chemical reaction to take place on and comprise embodiments of the present disclosure. The reactants and reactions given herein for solid and liquid fuels are also reactants and reactions of heterogeneous fuels.

For any fuel of the present disclosure, the catalyst or source of catalyst such as NaH may be mixed with other components of the reaction mixture such as a support such as a HSA material by methods such as mechanical mixing or by ball milling. In all cases additional hydrogen may be added to maintain the reaction to form hydrinos. The hydrogen gas may be any desired pressure, preferably in the range of 0.1 to 200 atm. Alternatives sources of hydrogen comprise at least one of the group of $NH_4X$ (X is an anion, preferably a halide), $NaBH_4$, $NaAlH_4$, a borane, and a metal hydride such as an alkali metal hydride, alkaline earth metal hydride preferably $MgH_2$, and a rare earth metal hydride preferably $LaH_2$ and $GdH_2$.

A. Support

In certain embodiments, the solid, liquid, and heterogeneous fuels of the present disclosure comprise a support. The support comprises properties specific for its function. For example, in the case that the support functions as an electron acceptor or conduit, the support is preferably conductive. Additionally, in the case that the support disperses the reactants, the support preferably has a high surface area. In the former case, the support such as a HSA support may comprise a conductive polymer such as activated carbon, graphene, and heterocyclic polycyclic aromatic hydrocarbons that may be macromolecular. The carbon may preferably comprise activated carbon (AC), but may also comprise other forms such as mesoporous carbon, glassy carbon, coke, graphitic carbon, carbon with a dissociator metal such as Pt or Pd wherein the wt % is 0.1 to 5 wt %, transition metal powders having preferably one to ten carbon layers and more preferably three layers, and a metal or alloy coated carbon, preferably nanopowder, such as a transition metal preferably at least one of Ni, Co, and Mn coated carbon. A metal may be intercalated with the carbon. In the case that the intercalated metal is Na and the catalyst is NaH, preferably the Na intercalation is saturated. Preferably, the support has a high surface area. Common classes of organic conductive polymers that may serve as the support are at least one of the group of poly(acetylene)s, poly(pyrrole)s, poly(thiophene)s, poly(aniline)s, poly(fluorene)s, poly(3-alkylthiophene)s, polytetrathiafulvalenes, polynaphthalenes, polyp-phenylene sulfide), and poly(para-phenylene vinylene)s. These linear backbone polymers are typically known in the art as polyacetylene, polyaniline, etc. "blacks" or "melanins". The support may be a mixed copolymer such as one of polyacetylene, polypyrrole, and polyaniline. Preferably, the conductive polymer support is at least one of typically derivatives of polyacetylene, polyaniline, and polypyrrole. Other support comprise other elements than carbon such as the conducting polymer polythiazyl ($(S-N)_x$).

In another embodiment, the support is a semiconductor. The support may be a Column IV element such as carbon, silicon, germanium, and α-gray tin. In addition to elemental materials such as silicon and germanium, the semiconductor support comprises a compound material such as gallium arsenide and indium phosphide, or alloys such as silicon germanium or aluminum arsenide. Conduction in materials such as silicon and germanium crystals can be enhanced in an embodiment by adding small amounts (e.g. 1-10 parts per million) of dopants such as boron or phosphorus as the crystals are grown. The doped semiconductor may be ground into a powder to serve as a support.

In certain embodiments, the HSA support is a metal such as a transition metal, noble metal, intermetallic, rare earth, actinide, lanthanide, preferably one of La, Pr, Nd, and Sm, Al, Ga, In, Tl, Sn, Pb, metalloids, Si, Ge, As, Sb, Te, Y, Zr, Nb, Mo, Tc, Ru, Rh, Pd, Ag, Cd, Hf, Ta, W, Re, Os, Ir, Pt, Au, Hg, alkali metal, alkaline earth metal, and an alloy comprising at least two metals or elements of this group such as a lanthanide alloy, preferably $LaNi_5$ and Y—Ni. The support may be a noble metal such as at least one of Pt, Pd, Au, Ir, and Rh or a supported noble metal such as Pt or Pd on titanium (Pt or Pd/Ti).

In other embodiments, the HSA material comprises at least one of cubic boron nitride, hexagonal boron nitride, wurtzite boron nitride powder, heterodiamond, boron nitride nanotubes, silicon nitride, aluminum nitride, titanium nitride (TiN), titanium aluminum nitride (TiAlN), tungsten nitride, a metal or alloy, preferably nanopowder, coated with carbon such as at least one of Co, Ni, Fe, Mn, and other transition metal powders having preferably one to ten carbon layers and more preferably three layers, metal or alloy coated carbon, preferably nanopowder, such as a transition metal preferably at least one of Ni, Co, and Mn coated carbon, a carbide, preferably a powder, beryllium oxide (BeO) powder, rare earth oxide powder such as $La_2O_3$, $Zr_2O_3$, $Al_2O_3$, sodium aluminate, and carbon such as fullerene, graphene, or nanotubes, preferably single-walled.

The carbide may comprise one or more of the bonding types: salt-like such as calcium carbide ($CaC_2$), covalent compounds such as silicon carbide (SiC) and boron carbide ($B_4C$ or $BC_3$), and interstitial compounds such as tungsten carbide. The carbide may be an acetylide such as $Au_2C_2$, $ZnC_2$, and $CdC_2$ or a methide such as $Be_2C$, aluminum carbide ($Al_4C_3$), and carbides of the type $A_3MC$ where A is mostly a rare earth or transition metal such as Sc, Y, La—Na, Gd—Lu, and M is a metallic or semimetallic main group element such as Al, Ge, In, Tl, Sn, and Pb. The carbide having $C_2^{2-}$ ions may comprise at least one of carbides $M_2^IC_2$ with the cation $M^I$ comprising an alkali metal or one of the coinage metals, carbides $M^{II}C_2$ with the cation $M^{II}$ comprising an alkaline earth metal, and preferably carbides $M_2^{III}(C_2)_3$ with the cation $M^{III}$ comprising Al, La, Pr, or Tb. The carbide may comprise an ion other than $C_2^{2-}$ such as those of the group of $YC_2$, $TbC_2$, $YbC_2$, $UC_2$, $Ce_2C_3$, $Pr_2C_3$, and $Tb_2C_3$. The carbide may comprise a sesquicarbide such as $Mg_2C_3$, $Sc_3C_4$, and $Li_4C_3$. The carbide may comprise a ternary carbide such as those containing lanthanide metals and transition metals that may further comprise $C_2$ units such as $Ln_3M(C_2)_2$ where M is Fe, Co, Ni, Ru, Rh, Os, and Ir, $Dy_{12}Mn_5C_{15}$, $Li_{3.67}FeC_6$, $Ln_3Mn(C_2)_2$ (Ln=Gd and Tb), and $ScCrC_2$. The carbide may further be of the classification "intermediate" transition metal carbide such as iron carbide ($Fe_3C$ or $FeC_2$:Fe). The carbide may be at least one from the group of, lanthanides ($MC_2$ and $M_2C_3$) such as lanthanum carbide ($LaC_2$ or $La_2C_3$), yttrium carbide, actinide carbides, transition metal carbides such as scandium carbide, titanium carbide (TiC), vanadium carbide, chromium carbide, manganese carbide, and cobalt carbide, niobium carbide, molybdenum carbide, tantalum carbide, zirconium carbide, and hafnium carbide. Further suitable carbides comprise at least one of $Ln_2FeC_4$, $Sc_3CoC_4$, $Ln_3MC_4$ (M=Fe, Co, Ni, Ru, Rh, Os, Ir), $Ln_3Mn_2C_6$, $Eu_{3.16}NiC_6$, $ScCrC_2$, $Th_2NiC_2$, $Y_2ReC_2$, $Ln_{12}M_5C_{15}$ (M=Mn, Re), YCoC, $Y_2ReC_2$, and other carbides known in the art.

In an embodiment, the support is an electrically-conductive carbide such as TiC or WC and HfC, $Mo_2C$, TaC, $YC_2$, ZrC, $Al_4C_3$, and $B_4C$. The support may be a metal boride such as MB2 borides including. The support or HSA material may be a boride, preferably a two-dimensional network boride that may be conducting such as $MB_2$ wherein M is a metal such as at least one of Cr, Ti, Mg, Zr, and Gd ($CrB_2$, $TiB_2$, $MgB_2$, $ZrB_2$, $GdB_2$).

In a carbon-HSA material embodiment, Na does not intercalate into the carbon support or form an acetylide by reacting with the carbon. In an embodiment, the catalyst or source of catalyst, preferably NaH, is incorporated inside of the HSA material such as fullerene, carbon nanotubes, and zeolite. The HSA material may further comprise graphite, graphene, diamond-like carbon (DLC), hydrogenated diamond-like carbon (HDLC), diamond powder, graphitic carbon, glassy carbon, and carbon with other metals such as at least one of Co, Ni, Mn, Fe, Y, Pd, and Pt, or dopants comprising other elements such as fluorinated carbon, preferably fluorinated graphite, fluorinated diamond, or tetracarbon fluoride ($C_4F$). Preferably the metals are a mixture of such as a mixture of Co, Ni, Mn. The metals may be in any wt % ratio. Preferably, the composition and weight percent (%) ratios are about 20 to 25% Ni, 60 to 70% Co, and 5 to 15% Mn. The HSA material may be fluoride passivated such as fluoride coated metal or carbon or comprise a fluoride such as a metal fluoride, preferably an alkali or rare earth fluoride.

In another embodiment, the support has a pore size or interlayer spacing that will accommodate only one catalyst radius such as the atomic radius in the case of Li or K and the molecular dimensions in the case of NaH. In the Li case, the pore size or interlayer spacing is ideally between about 1.35 Å and 3 k In the K case, the pore size or interlayer spacing is ideally between about 1.7 Å and 3.5 Å. In the NaH case, the pore size or interlayer spacing is ideally between about 1.5 Å and 5 Å. In an embodiment, the support provides atomic catalyst such as Li or K and single catalyst molecules such as NaH based on size discrimination and selection. A suitable support having a large surface area and an interlayer separation distance of about 3.5 Å is activated carbon. The activated carbon can be activated or reactivated by physical or chemical activation. The former activation may comprise carbonization or oxidation, and the latter activation may comprise impregnation with chemicals.

The reaction mixture may further comprise a support such as a polymer support. The polymer support may be chosen from poly(tetrafluoroethylene) such as TEFLON™, polyvinylferrocene, polystyrene, polypropylene, polyethylene, polyisoprene, poly(aminophosphazene), a polymer comprising ether units such as polyethylene glycol or oxide and polypropylene glycol or oxide, preferably arylether, a polyether polyol such as poly(tetramethylene ether) glycol (PTMEG, polytetrahydrofuran, "Terathane", "polyTHF"), polyvinyl formal, and those from the reaction of epoxides such as polyethylene oxide and polypropylene oxide. In an embodiment, the HSA comprises fluorine. Exemplary fluorinated HSAs are TEFLON™, TEFLON™-PFA, polyvinyl fluoride, PVF, poly(vinylidene fluoride), poly(vinylidene fluoride-co-hexafluoropropylene), and perfluoroalkoxy polymers.

B. Solid Fuels

The solid fuel comprises a catalyst or source of catalyst to form hydrinos such as at least one catalyst chosen from LiH, Li, NaH, Na, KH, K, RbH, Rb, and CsH, a source of atomic hydrogen, and other solid chemical reactants that perform the one or more of the following functions (i) the reactants form the catalyst or atomic hydrogen by undergoing a reaction such as one between one or more components of the reaction mixture or by undergoing a physical or chemical change of at least one component of the reaction mixture and (ii) the reactants initiate, propagate, and maintain the catalysis reaction to form hydrinos. The many examples of solid fuels given in the present disclosure including the reaction mixtures of liquid fuels comprising a solvent except with the exception of the solvent are not meant to be exhaustive. Based on the present disclosure other reaction mixtures are taught to those skilled in the art.

In a sold fuel embodiment, the reaction mixture comprises a catalyst, a source of hydrogen, and at least one of a HSA support, getter, a dispersant, and an inert gas. The catalyst may be NaH. The inert gas may be at least one of a noble gas and nitrogen. Preferably the inert gas is a mixture of Ne and $N_2$, more preferably, the mixture is about 50% Ne and 50% $N_2$. The pressure may preferably be in the range of about 1 Torr to 100 atmosphere. Preferably, the pressure of a Ne—$N_2$ mixture is one atmosphere. The reaction temperature is preferably in the range of about 100° to 900° C. The reaction mixture may further comprise at least one of Na and NaOH, and additionally a reductant such as NaH, Sn, Zn, Fe, and an alkali metal. In the case that the reaction mixture comprises NaOH, preferably $H_2$ is also supplied, and $H_2$ comprises a gas of any mixture in the case that the reaction mixture comprises one or more inert gases. The source of hydrogen may comprise hydrogen or a hydride and a dissociator such as Pt/Ti, hydrided Pt/Ti, Pd, Pt, or Ru/$Al_2O_3$, Ni, Ti, or Nb powder. At least one of the HSA support, getter, and dispersant may comprise at least one of the group of a metal powder such as Ni, Ti, or Nb powder, R-Ni, $ZrO_2$, $Al_2O_3$, NaX (X=F, Cl, Br, I), $Na_2O$, NaOH, and $Na_2CO_3$. In an embodiment, a metal catalyzes the formation of NaH molecules from a source such as a Na species and a source of H. The metal may be a transition, noble, intermetallic, rare earth, lanthanide, and actinide metal, as well as others such as aluminum, and tin.

C. Hydrino Reaction Activators

The hydrino reaction may be activated or initiated and propagated by one or more chemical other reactions. These reactions can be of several classes such as (i) exothermic reactions which provide the activation energy for the hydrino reaction, (ii) coupled reactions that provide for at least one of a source of catalyst or atomic hydrogen to support the hydrino reaction, (iii) free radical reactions that, in an embodiment, serve as an acceptor of electrons from the catalyst during the hydrino reaction, (iv) oxidation-reduction reactions that, in an embodiment, serve as an acceptor of electrons from the catalyst during the hydrino reaction, (v) exchange reactions such as anion exchange including halide, sulfide, hydride, arsenide, oxide, phosphide, and nitride exchange that in an embodiment, facilitate the action of the catalyst to become ionized as it accepts energy from atomic hydrogen to form hydrinos, and (vi) getter, support, or matrix-assisted hydrino reaction that may provide at least one of a chemical environment for the hydrino reaction, act to transfer electrons to facilitate the H catalyst function, undergoes a reversible phase or other physical change or change in its electronic state, and binds a lower-energy hydrogen product to increase at least one of the extent or rate of the hydrino reaction. In an embodiment, the reaction mixture comprises a support, preferably an electrically conductive support, to enable the activation reaction.

In an embodiment a catalyst such as Li, K, and NaH serves to form hydrinos at a high rate by speeding up the rate limiting step, the removal of electrons from the catalyst as it is ionized by accepting the nonradiative resonant energy transfer from atomic hydrogen to form hydrinos. The typical metallic form of Li and K may be converted to the atomic form and the ionic form of NaH may be converted to the molecular form by using a support or HSA material such as activated carbon (AC), Pt/C, Pd/C, TiC, or WC to disperse the catalyst such as Li and K atoms and NaH molecules, respectively. Preferably, the support has a high surface area and conductivity considering the surface modification upon reaction with other species of the reaction mixture. The reaction to cause a transition of atomic hydrogen to form hydrinos requires a catalyst such as Li, K, or NaH and atomic hydrogen wherein NaH serves as a catalyst and source of atomic hydrogen in a concerted reaction. The reaction step of a nonradiative energy transfer of an integer multiple of 27.2 eV from atomic hydrogen to the catalyst results in ionized catalyst and free electrons that causes the reaction to rapidly cease due to charge accumulation. The support such as AC may also act as a conductive electron acceptor, and final electron-acceptor reactants comprising an oxidant, free radicals or a source thereof, are added to the reaction mixture to ultimately scavenge electrons released from the catalyst reaction to form hydrinos. In addition a reductant may be added to the reaction mixture to facilitate the oxidation reaction. The concerted electron-acceptor reaction is preferably exothermic to heat the reactants and enhance the rates. The activation energy and propagation of the reaction may be provided by a fast, exothermic, oxidation or free radical reaction such as that of $O_2$ or $CF_4$ with Mg or Al wherein radicals such as CF and F and $O_2$ and O serve to ultimately accept electrons from the catalyst via support such as AC. Other oxidants or sources of radicals singly or in combination may be chosen from the group of $O_2$, $O_3$, $N_2O$ $NF_3$, $M_2S_2O_8$ (M is an alkali metal), S, $CS_2$, and $SO_2$, $MnI_2$, $EuBr_2$, AgCl, and others given in the Electron Acceptor Reactions section.

Preferably, the oxidant accepts at least two electrons. The corresponding anion may be $O_2^{2-}$, $S^{2-}$, $C_2S_4^{2-}$ (tetrathiooxalate anion), $SO_3^{2-}$, and $SO_4^{2-}$. The two electrons may be accepted from a catalyst that becomes doubly ionized during catalysis such as NaH and Li (Eqs. (25-27) and (37-39)). The addition of an electron acceptor to the reaction mixture or reactor applies to all cell embodiments of the present disclosure such as the solid fuel and heterogeneous catalyst embodiments as well as electrolysis cells, and plasma cells such as glow discharge, RF, microwave, and barrier-electrode plasma cells and plasma electrolysis cells operated continuously or in pulsed mode. An electron conductive, preferably unreactive, support such as AC may also be added to the reactants of each of these cell embodiments. An embodiment of the microwave plasma cell comprises a hydrogen dissociator such as a metal surface inside of the plasma chamber to support hydrogen atoms.

In embodiments, mixtures of species, compounds, or materials of the reaction mixture such as a source of catalyst, a source of an energetic reaction such as a metal and at least one of a source of oxygen, a source of halogen, and a source of free radicals, and a support may be used in combinations. Reactive elements of compounds or materials of the reaction mixture may also be used in combinations. For example, the source of fluorine or chlorine may be a mixture of $N_xF_y$ and $N_xCl_y$, or the halogen may be intermixed such as the in compound $N_xF_yCl_z$. The combinations could be determined by routine experimentation by those skilled in the art.

a. Exothermic Reactions

In an embodiment, the reaction mixture comprises a source of catalyst or a catalyst such as at least one of NaH, K, and Li and a source of hydrogen or hydrogen and at least one species that undergoes reaction. The reaction is preferably very exothermic and preferably has fast kinetics such that it provides the activation energy to the hydrino catalyst reaction. The reaction may be an oxidation reaction. Suitable oxidation reactions are the reaction of species comprising oxygen such as the solvent, preferably an ether solvent, with a metal such as at least one of Al, Ti, Be, Si, P, rare earth metals, alkali metals, and alkaline earth metals. More preferably, the exothermic reaction forms an alkali or alkaline earth halide, preferably $MgF_2$, or halides of Al, Si, P, and rare earth metals. Suitable halide reactions are the reaction of a species comprising a halide such as the solvent, preferably a fluorocarbon solvent, with at least one of a metal and a metal hydride such as at least one of Al, rare earth metals, alkali metals, and alkaline earth metals. The metal or metal hydride may be the catalyst or a source of the catalyst such as NaH, K, or Li. The reaction mixture may comprise at least NaH and $NaAlCl_4$ or $NaAlF_4$ having the products NaCl and NaF, respectively. The reaction mixture may comprise at least NaH a fluorosolvent having the product NaF.

In general, the product of the exothermic reaction to provide the activation energy to the hydrino reaction may be a metal oxide or a metal halide, preferably a fluoride. Suitable products are $Al_2O_3$, $M_2O_3$ (M=rare earth metal), $TiO_2$, $Ti_2O_3$, $SiO_2$, $PF_3$ or $PF_5$, $AlF_3$, $MgF_2$, $MF_3$ (M=rare earth metal), NaF, $NaHF_2$, KF, $KHF_2$, LiF, and $LiHF_2$. In an embodiment wherein Ti undergoes the exothermic reaction, the catalyst is $Ti^{2+}$ having a second ionization energy of 27.2 eV (m=1 in Eq. (5)). The reaction mixture may comprise at least two of NaH, Na, NaNH2, NaOH, Teflon, fluorinated carbon, and a source of Ti such as Pt/Ti or Pd/Ti. In an embodiment wherein Al undergoes the exothermic reaction, the catalyst is AlH as given in TABLE 3. The reaction mixture may comprise at least two of NaH, Al, carbon powder, a fluorocarbon, preferably a solvent such as hexafluorobenzene or perfluoroheptane, Na, NaOH, Li, LiH, K, KH, and R-Ni. Preferably, the products of the exothermic reaction to provide the activation energy are regenerated to form the reactants for another cycle of forming hydrinos and releasing the corresponding power. Preferably, metal fluoride products are regenerated to metals and fluorine gas by electrolysis. The electrolyte may comprise a eutetic mixture. The metal may be hydrided and the carbon product and any $CH_4$ and hydrocarbons products may be fluorinated to form the initial metal hydride and fluorocarbon solvent, respectively.

In an embodiments of the exothermic reaction to activate the hydrino transition reaction at least one of the group of a rare earth metal (M), Al, Ti, and Si is oxidized to the corresponding oxide such as $M_2O_3$, $Al_2O_3$, $Ti_2O_3$, and $SiO_2$, respectively. The oxidant may be an ether solvent such as 1,4-benzodioxane (BDO) and may further comprise a fluorocarbon such as hexafluorobenzene (HFB) or perfluoroheptane to accelerate the oxidation reaction. In an exemplary reaction, the mixture comprises NaH, activated carbon, at least one of Si and Ti, and at least one of BDO and HFB. In the case of Si as the reductant, the product $SiO_2$ may be regenerated to Si by $H_2$ reduction at high temperature or by reaction with carbon to form Si and CO and $CO_2$. A certain embodiment of the reaction mixture to form hydrinos comprises a catalyst or a source of catalyst such as at least one of Na, NaH, K, KH, Li, and LiH, a source of exothermic reactants or exothermic reactants, preferably having fast kinetics, that activate the catalysis reaction of H to form hydrinos, and a support. The exothermic reactants may comprise a source of oxygen and a species that reacts oxygen to form an oxide. For x and y being integers, preferably the oxygen source is $H_2O$, $O_2$, $H_2O_2$, $MnO_2$, an oxide, an oxide of carbon, preferably CO or $CO_2$, an oxide of nitrogen, $N_xO_y$, such as $N_2O$ and $NO_2$, an oxide of sulfur, $S_xO_y$, preferably an oxidant such as $M_2S_xO_y$ (M is an alkali metal) that may optionally be used with an oxidation catalyst such as silver ion, $Cl_xO_y$, such as $Cl_2O$, and $ClO_2$ preferably from $NaClO_2$, concentrated acids and their mixtures such as $HNO_2$, $HNO_3$, $H_2SO_4$, $H_2SO_3$, HCl, and HF, preferably, the acid forms nitronium ion ($NO_2^+$), NaOCl, $I_xO_y$, preferably $I_2O_5$, $P_xO_y$, $S_xO_y$, an oxyanion of an inorganic compound such as one of nitrite, nitrate, chlorate, sulfate, phosphate, a metal oxide such as cobalt oxide, and oxide or hydroxide of the catalyst such as NaOH, and perchlorate wherein the cation is a source of the catalyst such as Na, K, and Li, an oxygen-containing functional group of an organic compound such as an ether, preferably one of dimethoxyethane, dioxane, and 1,4-benzodioxane (BDO), and the reactant species may comprise at least one of the group of a rare earth metal (M), Al, Ti, and Si, and the corresponding oxide is $M_2O_3$, $Al_2O_3$, $Ti_2O_3$, and $SiO_2$, respectively. The reactant species may comprise the metal or element of the oxide products of at least one of the group of $Al_2O_3$ aluminum oxide, $La_2O_3$ lanthanum oxide, MgO magnesium oxide, $Ti_2O_3$ titanium oxide, $Dy_2O_3$ dysprosium oxide, $Er_2O_3$ erbium oxide, $Eu_2O_3$ europium oxide, LiOH lithium hydroxide, $Ho_2O_3$ holmium oxide, $Li_2O$ lithium oxide, $Lu_2O_3$ lutetium oxide, $Nb_2O_5$ niobium oxide, $Nd_2O_3$ neodymium oxide, $SiO_2$ silicon oxide, $Pr_2O_3$ praseodymium oxide, $Sc_2O_3$ scandium oxide, $SrSiO_3$ strontium metasilicate, $Sm_2O_3$ samarium oxide, $Tb_2O_3$ terbium oxide, $Tm_2O_3$ thulium oxide, $Y_2O_3$ yttrium oxide, and $Ta_2O_5$ tantalum oxide, $B_2O_3$ boron oxide, and zirconium oxide. The support may comprise carbon, preferably activated carbon. The metal or element may be at a least one of Al, La, Mg, Ti, Dy, Er, Eu, Li, Ho, Lu, Nb, Nd, Si, Pr, Sc, Sr, Sm, Tb, Tm, Y, Ta, B, Zr, S, P, C, and their hydrides.

In another embodiment, the oxygen source may be at least one of an oxide such as $M_2O$ where M is an alkali metal, preferably $Li_2O$, $Na_2O$, and $K_2O$, a peroxide such as $M_2O_2$ where M is an alkali metal, preferably $Li_2O_2$, $Na_2O_2$, and $K_2O_2$, and a superoxide such as $MO_2$ where M is an alkali metal, preferably $Li_2O_2$, $Na_2O_2$, and $K_2O_2$. The ionic peroxides may further comprise those of Ca, Sr, or Ba.

In another embodiment, at least one of the source of oxygen and the source of exothermic reactants or exothermic reactants, preferably having fast kinetics, that activate the catalysis reaction of H to form hydrinos comprises one or more of the group of $MNO_3$, MNO, $MNO_2$, $M_3N$, $M_2NH$, $MNH_2$, MX, $NH_3$, $MBH_4$, $MAlH_4$, $M_3AlH_6$, MOH, $M_2S$, MHS, MFeSi, $M_2CO_3$, $MHCO_3$, $M_2SO_4$, $MHSO_4$, $M_3PO_4$, $M_2HPO_4$, $MH_2PO_4$, $M_2MoO_4$, $MNbO_3$, $M_2B_4O_7$ (lithium tetraborate), $MBO_2$, $M_2WO_4$, $MAlCl_4$, $MGaCl_4$, $M_2CrO_4$, $M_2Cr_2O_7$, $M_2TiO_3$, $MZrO_3$, $MAlO_2$, $MCoO_2$, $MGaO_2$, $M_2GeO_3$, $MMn_2O_4$, $M_4SiO_4$, $M_2SiO_3$, $MTaO_3$, $MCuCl_4$, $MPdCl_4$, $MVO_3$, $MIO_3$, $MFeO_2$, $MIO_4$,$MClO_4$, $MScO_n$, $MTiO_n$, $MVO_n$, $MCr_2O_n$, $MMn_2O_n$, $MCoO_n$, $MNiO_n$, $MNi_2O_n$, $MCuO_n$, and $MZnO_n$, where M is Li, Na or K and n=1, 2, 3, or 4, an oxyanion, an oxyanion of a strong acid, an oxidant, a molecular oxidant such as $V_2O_3$, $I_2O_5$, $MnO_2$, $Re_2O_7$, $CrO_3$, $RuO_2$, AgO, PdO, $PdO_2$, PtO, $PtO_2$, $I_2O_4$, $I_2O_5$, $I_2O_9$, $SO_2$, $SO_3$, $CO_2$, $N_2O$, NO, $NO_2$, $N_2O_3$, $N_2O_4$, $N_2O_5$, $Cl_2O$, $ClO_2$, $Cl_2O_3$, $Cl_2O_6$, $Cl_2O_7$, $PO_2$, $P_2O_3$, and $P_2O_5$, $NH_4X$ wherein X is a nitrate or other suitable anion known to those skilled in the art such as one of the group comprising $F^-$, $Cl^-$, $Br^-$, $I^-$, $NO_3^-$, $NO_2^-$, $SO_4^{2-}$, $HSO_4^-$, $CoO_2^-$, $IO_3^-$, $IO_4^-$, $TiO_3^-$, $CrO_4^-$, $FeO_2^-$, $PO_4^{3-}$, $HPO_4^{2-}$, $H_2PO_4^-$, $VO_3^-$, $ClO_4^-$ and $Cr_2O_7^{2-}$ and other anions of the reactants. The reaction mixture may additionally comprise a reductant. In an embodiment, $N_2O_5$ is formed from a reaction of a mixture of reactants such as $HNO_3$ and $P_2O_5$ that reacts according to $2P_2O_5+12\ HNO_3$ to $4H_3PO_4+6N_2O_5$.

In an embodiment wherein oxygen or a compound comprising oxygen participates in the exothermic reaction, $O_2$ may serve as a catalyst or a source of a catalyst. The bond energy of the oxygen molecule is 5.165 eV, and the first, second, and third ionization energies of an oxygen atom are 13.61806 eV, 35.11730 eV, and 54.9355 eV, respectively. The reactions $O_2 \rightarrow O+O^{2+}$, $O_2 \rightarrow O+O^{3+}$ and $2O \rightarrow 2O^+$ provide a net enthalpy of about 2, 4, and 1 times $E_h$, respectively, and comprise catalyst reactions to from hydrino by accepting these energies from H to cause the formation of hydrinos.

Additionally, the source of an exothermic reaction to activate the hydrino reaction may be a metal alloy forming reaction, preferably between Pd and Al initiated by melting the Al. The exothermic reaction preferably produces energetic particles to activate the hydrino-forming reaction. The reactants may be a pyrogen or pyrotechnic composition. In another embodiment, the activation energy may be provided by operating the reactants at a very high temperature such as in the range of about 1000-5000° C., preferably in the range of about 1500-2500° C. The reaction vessel may comprise a high-temperature stainless steel alloy, a refractory metal or alloy, alumina, or carbon. The elevated reactant temperature may be achieved by heating the reactor or by an exothermic reaction.

The exothermic reactants may comprise a halogen, preferably fluorine or chlorine, and a species that reacts with the fluorine or chlorine to form a fluoride or chloride, respectively. Suitable fluorine sources are fluorocarbons such as $CF_4$, hexafluorbenzene, and hexadecafluoroheptane, xenon fluorides such as $XeF_2$, $XeF_4$, and $XeF_6$, $BX_y$, preferably $BF_3$, $B_2F_4$, $BCl_3$, or $BBr_3$, SF such as, fluorosilanes, fluorinated nitrogen, $N_xF_y$, preferably $NF_3$, $NF_3O$, SbFx, BiFx, preferably $BiF_5$, $N_xCl_y$, preferably $NCl_3$, $SX_y$, preferably $SCl_2$ or $S_xF_y$ (X is a halogen; x and y are integers) such as $SF_4$, $SF_6$, or $S_2F_{10}$, fluorinated phosphorous, $M_2SiF_6$ wherein M is an alkali metal such as $Na_2SiF_6$ and $K_2SiF_6$, $MSiF_6$ wherein M is an alkaline earth metal such as $MgSiF_6$, $GaF_3$, $PF_5$, $MPF_6$ wherein M is an alkali metal, $MHF_2$ wherein M is an alkali metal such as $NaHF_2$ and $KHF_2$, $K_2TaF_7$, $KBF_4$, $K_2MnF_6$, and $K_2ZrF_6$ wherein other similar compounds are anticipated such as those having another alkali or alkaline earth metal substitution such as one of Li, Na, or K as the alkali metal. Suitable sources of chlorine are $Cl_2$ gas, $SbCl_5$, and chlorocarbons such as $CCl_4$ and chloroform. The reactant species may comprise at least one of the group of an alkali or alkaline earth metal or hydride, a rare earth metal (M), Al, Si, Ti, and P that forms the corresponding fluoride or chloride. Preferably the reactant alkali metal corresponds to that of the catalyst, the alkaline earth hydride is $MgH_2$, the rare earth is La, and Al is a nanopowder. The support may comprise carbon, preferably activated carbon, mesoporous carbon, and the carbon using in Li ion batteries. The reactants may be in any molar ratios. Preferably, the reactant species and the fluorine or chlorine are in about the stoichiometric ratio as the elements of the fluoride or chlorine, the catalyst is in excess, preferably in about the same molar ratio as the element that reacts with the fluorine or chlorine, and the support is in excess.

The exothermic reactants may comprise a halogen gas, preferably chlorine or bromine, or a source of halogen gas such as HF, HCl, HBr, HI, preferably $CF_4$ or $CCl_4$, and a species that reacts with the halogen to form a halide. The source of halogen may also be a source of oxygen such as $C_xO_yX_r$, wherein X is halogen, and x, y, and r are integers and are known in the art. The reactant species may comprise at least one of the group of an alkali or alkaline earth metal or hydride, a rare earth metal, Al, Si, and P that forms the corresponding halide. Preferably the reactant alkali metal corresponds to that of the catalyst, the alkaline earth hydride is $MgH_2$, the rare earth is La, and Al is a nanopowder. The support may comprise carbon, preferably activated carbon. The reactants may be in any molar ratios. Preferably, the reactant species and the halogen are in about an equal stoichiometric ratio, the catalyst is in excess, preferably in about the same molar ratio as the element that reacts with the halogen, and the support is in excess. In an embodiment, the reactants comprise, a source of catalyst or a catalyst such as Na, NaH, K, KH, Li, LiH, and $H_2$, a halogen gas, preferably, chlorine or bromine gas, at least one of Mg, $MgH_2$, a rare earth, preferably La, Gd, or Pr, Al, and a support, preferably carbon such as activated carbon.

b. Free Radical Reactions

In an embodiment, the exothermic reaction is a free radical reaction, preferably a halide or oxygen free radical reaction. The source of halide radicals may be a halogen, preferably $F_2$ or $Cl_2$, or a fluorocarbon, preferably $CF_4$. A source of F free radicals is $S_2F_{10}$. The reaction mixture comprising a halogen gas may further comprise a free radical initiator. The reactor may comprise a source of ultraviolet light to form free radials, preferably halogen free radicals and more preferably chlorine or fluorine free radicals. The free radical initiators are those commonly known in the art such as peroxides, azo compounds and a source of metal ions such as a metal salt, preferably, a cobalt halide such as $CoCl_2$ that is a source of $Co^{2+}$ or $FeSO_4$ which is a source of $Fe^{2+}$. The latter are preferably reacted with an oxygen species such as $H_2O_2$ or $O_2$. The radical may be neutral.

The source of oxygen may comprise a source of atomic oxygen. The oxygen may be singlet oxygen. In an embodiment, singlet oxygen is formed from the reaction of NaOCl with $H_2O_2$. In an embodiment, the source of oxygen comprises $O_2$ and may further comprise a source of free radicals or a free radical initiator to propagate a free radical reaction, preferably a free radical reaction of O atoms. The free radical source or source of oxygen may be at least one of ozone or an ozonide. In an embodiment, the reactor comprises an ozone source such as an electrical discharge in oxygen to provide ozone to the reaction mixture.

The free radical source or source of oxygen may further comprise at least one of a peroxo compound, a peroxide, $H_2O_2$, a compound containing an azo group, $N_2O$, NaOCl, Fenton's reagent, or a similar reagent, OH radical or a source thereof, perxenate ion or a source thereof such as an alkali or alkaline earth perxenate, preferably, sodium perxenate ($Na_4XeO_6$) or potassium perxenate ($K_4XeO_6$), xenon tetraoxide ($XeO_4$), and perxenic acid ($H_4XeO_6$), and a source of metal ions such as a metal salt. The metal salt may be at least one of $FeSO_4$, $AlCl_3$, $TiCl_3$, and, preferably, a cobalt halide such as $CoCl_2$ that is a source of $Co^{2+}$.

In an embodiment, free radicals such as Cl are formed from a halogen such as $Cl_2$ in the reaction mixture such as $NaH+MgH_2$+support such as activated carbon (AC)+halogen gas such as $Cl_2$. The free radicals may be formed by the reaction of a mixture of $Cl_2$ and a hydrocarbon such as $CH_4$ at an elevated temperature such as greater than 200° C. The halogen may be in molar excess relative to the hydrocarbon. The chlorocarbon product and Cl radicals may react with the reductant to provide the activation energy and pathway for forming hydrinos. The carbon product may be regenerated using the synthesis gas (syngas) and Fischer-Tropsch reactions or by direct hydrogen reduction of carbon to methane. The reaction mixture may comprise a mixture of $O_2$ and $Cl_2$ at an elevated temperature such as greater than 200° C. The mixture may react to form $Cl_xO_y$ (x and y are integers) such as ClO, $Cl_2O$, and $ClO_2$. The reaction mixture may comprise $H_2$ and $Cl_2$ at an elevated temperature such as greater than 200° C. that may react to form HCl. The reaction mixture may comprise $H_2$ and $O_2$ with a recombiner such as Pt/Ti, Pt/C, or Pd/C at a slightly elevated temperature such as greater than 50° C. that may react to form $H_2O$. The recombiner may operate at elevated pressure such as in the range of greater than one atmosphere, preferably in the range of about 2 to 100 atmospheres. The reaction mixture may be nonstoichiometric to favor free radical and singlet oxygen formation. The system may further comprise a source of ultraviolet light or plasma to form free radicals such as a RF, microwave, or glow discharge, preferably high-voltage pulsed, plasma source. The reactants may further comprise a catalyst to form at least one of atomic free radicals such as Cl, O, and H, singlet oxygen, and ozone. The catalyst may be a noble metal such as Pt. In an embodiment to form Cl radicals, the Pt catalyst is maintained at an temperature greater than the decomposition temperature of platinum chlorides such as $PtCl_2$, $PtCl_3$, and $PtCl_4$ which have decomposition temperatures of 581° C., 435° C., and 327° C., respectively. In an embodiment, Pt may be recovered from a product mixture comprising metal halides by dissolving the metal halides in a suitable solvent in which the Pt, Pd or their halides are not soluble and removing the solution. The solid that may comprise carbon and Pt or Pd halide may be heated to form Pt or Pd on carbon by decomposition of the corresponding halide.

In an embodiment, $N_2O$, $NO_2$, or NO gas is added reaction mixture. $N_2O$ and $NO_2$ may serve as a source of NO radical. In another embodiment, the NO radical is produced in the cell, preferably by the oxidation of $NH_3$. The reaction may be the reaction of $NH_3$ with $O_2$ on platinum or platinum-rhodium at elevated temperature. NO, $NO_2$, and $N_2O$ can be generated by known industrial methods such as by the Haber process followed by the Ostwald process. In one embodiment, the exemplary sequence of steps are:

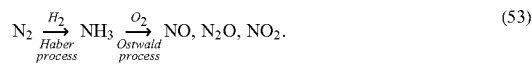  (53)

Specifically, the Haber process may be used to produce $NH_3$ from $N_2$ and $H_2$ at elevated temperature and pressure using a catalyst such as α-iron containing some oxide. The Ostwald process may be used to oxidize the ammonia to NO, $NO_2$, and $N_2O$ at a catalyst such as a hot platinum or platinum-rhodium catalyst. Alkali nitrates can be regenerated using the methods disclosed supra.

The system and reaction mixture may initiate and support a combustion reaction to provide at least one of singlet oxygen and free radicals. The combustion reactants may be nonstoichiometric to favor free radical and singlet oxygen formation that react with the other hydrino reaction reactants. In an embodiment, an explosive reaction is suppressed to favor a prolonged steady reaction, or an explosive reaction is caused by the appropriate reactants and molar ratios to achieve the desired hydrino reaction rate. In an embodiment, the cell comprises at least one cylinder of an internal combustion engine.

c. Electron Acceptor Reactions

In an embodiment, the reaction mixture further comprises an electron acceptor. The electron acceptor may act as a sink for the electrons ionized from the catalyst when energy is transferred to it from atomic hydrogen during the catalytic reaction to form hydrinos. The electron acceptor may be a at least one of a conducting polymer or metal support, an oxidant such as group VI elements, molecules, and compounds, a free radical, a species that forms a stable free radical, and a species with a high electron affinity such as halogen atoms, $O_2$, C, $CF_{1, 2, 3\ or\ 4}$, Si, S, $P_xS_y$, $CS_2$, $S_xN_y$ and these compounds further comprising O and H, Au, At, $Al_xO_y$ (x and y are integers), preferably $AlO_2$ that in an embodiment is an intermediate of the reaction of $Al(OH)_3$ with Al of R-Ni, ClO, $Cl_2$, $F_2$, $AlO_2$, $B_2N$, $CrC_2$, $C_2H$, $CuCl_2$, $CuBr_2$, $MnX_3$ (X=halide), $MoX_3$ (X=halide), $NiX_3$ (X=halide), $RuF_{4, 5,\ or\ 6}$, $ScX_4$ (X=halide), $WO_3$, and other atoms and molecules with a high electron affinity as known by those skilled in the art. In an embodiment, the support acts as an electron acceptor from the catalyst as it is ionized by accepting the nonradiative resonant energy transfer from atomic hydrogen. Preferably, the support is at least one of conductive and forms stable free radicals. Suitable such supports are conductive polymers. The support may form a negative ion over a macrostructure such as carbon of Li ion batteries that form $C_6$ ions. In another embodiment, the support is a semiconductor, preferably doped to enhance the conductivity. The reaction mixture further comprises free radicals or a source thereof such as O, OH, $O_2$, $O_3$, $H_2O_2$, F, Cl, and NO that may serve as a scavenger for the free radicals formed by the support during catalysis. In an embodiment, the free radical such as NO may form a complex with the catalyst or source of catalyst such an alkali metal. In another embodiment, the support has unpaired electrons. The support may be paramagnetic such as a rare earth element or compound such as $Er_2O_3$. In an embodiment, the catalyst or source of catalyst such as Li, NaH, K, Rb, or Cs is impregnated into the electron acceptor such as a support and the other components of the reaction mixture are add. Preferably, the support is AC with intercalated NaH or Na.

d. Oxidation-Reduction Reactions

In an embodiment, the hydrino reaction is activated by an oxidation-reduction reaction. In an exemplary embodiment, the reaction mixture comprises at least two species of the group of a catalyst, a source of hydrogen, an oxidant, a reductant, and a support. The reaction mixture may also comprise a Lewis acid such as Group 13 trihalides, preferably at least one of $AlCl_3$, $BF_3$, $BCl_3$, and $BBr_3$. In certain embodiments, each reaction mixture comprises at least one species chosen from the following genus of components (i)-(iii).

(i) A catalyst chosen from Li, LiH, K, KH, NaH, Rb, RbH, Cs, and CsH.

(ii) A source of hydrogen chosen from $H_2$ gas, a source of $H_2$ gas, or a hydride.

(iii) And an oxidant chosen from a metal compound such as one of halides, phosphides, borides, oxides, hydroxides, silicides, nitrides, arsenides, selenides, tellurides, antimonides, carbides, sulfides, hydrides, carbonate, hydrogen carbonate, sulfates, hydrogen sulfates, phosphates, hydrogen phosphates, dihydrogen phosphates, nitrates, nitrites, permanganates, chlorates, perchlorates, chlorites, perchlorites, hypochlorites, bromates, perbromates, bromites, perbromites, iodates, periodates, iodites, periodites, chromates, dichromates, tellurates, selenates, arsenates, silicates, borates, colbalt oxides, tellurium oxides, and other oxyanions such as those of halogens, P, B, Si, N, As, S, Te, Sb, C, S, P, Mn, Cr, Co, and Te wherein the metal preferably comprises a transition metal, Sn, Ga, In, an alkali metal or alkaline earth metal; the oxidant further comprising a lead compound such as a lead halide, a germanium compound such as a halide, oxide, or sulfide such as $GeF_2$, $GeCl_2$, $GeBr_2$, $GeI_2$, GeO, GeP, GeS, $GeI_4$, and $GeCl_4$, fluorocarbon such as CF, or $ClCF_3$, chlorocarbon such as $CCl_4$, $O_2$, $MNO_3$, $MClO_4$, $MO_2$ $NF_3$, $N_2O$, NO, $NO_2$, a boron-nitrogen compound such as $B_3N_3H_6$, a sulfur compound such as $SF_6$, S, $SO_2$, $SO_3$, $S_2O_5Cl_2$, $F_5SOF$, $M_2S_2O_8$, $S_xX_y$ such as $S_2Cl_2$, $SCl_2$, $S_2Br_2$, or $S_2F_2$, $CS_2$, $SO_xX_y$ such as $SOCl_2$, $SOF_2$, $SO_2F_2$, or $SOBr_2$, $X_xX'_y$ such as $ClF_5$, $X_xX'_yO$, such as $ClO_2F$, $ClO_2F_2$, $ClOF_3$, $ClO_3F$, and $ClO_2F_3$, boron-nitrogen compound such as $B_3N_3H_6$, Se, Te, Bi, As, Sb, Bi, $TeX_x$, preferably $TeF_4$, $TeF_6$, $TeO_x$, preferably $TeO_2$ or $TeO_3$, $SeX_x$, preferably $SeF_6$, $SeO_x$, preferably $SeO_2$ or $SeO_3$, a tellurium oxide, halide, or other tellurium compound such as $TeO_2$, $TeO_3$, $Te(OH)_6$, $TeBr_2$, $TeCl_2$, $TeBr_4$, $TeCl_4$, $TeF_4$, $TeI_4$, $TeF_6$, CoTe, or NiTe, a selenium oxide, halide, sulfide, or other selenium compound such as $SeO_2$, $SeO_3$, $Se_2Br_2$, $Se_2Cl_2$, $SeBr_4$, $SeCl_4$, $SeF_4$, $SeF_6$, $SeOBr_2$, $SeOCl_2$, $SeOF_2$, $SeO_2F_2$, $SeS_2$, $Se_2S_6$, $Se_4S_4$, or $Se_6S_2$, P, $P_2O_5$, $P_2S_5$, $P_xX_y$ such as $PF_3$, $PCl_3$, $PBr_3$, $PI_3$, $PF_5$, $PCl_5$, $PBr_4F$, or $PCl_4F$, $PO_xX_y$ such as $POBr_3$, $POI_3$, $POCl_3$ or $POF_3$, $PS_xX_y$ (M is an alkali metal, x, y and z are integers, X and X' are halogen) such as $PSBr_3$, $PSF_3$, $PSCl_3$, a phosphorous-nitrogen compound such as $P_3N_5$, $(Cl_2PN)_3$, $(Cl_2PN)_4$, or $(Br_2PN)$, an arsenic oxide, halide, sulfide, selenide, or telluride or other arsenic compound such as AlAs, $As_2I_4$, $As_2Se$, $As_4S_4$, $AsBr_3$, $AsCl_3$, $AsF_3$, $AsI_3$, $As_2O_3$, $As_2Se_3$, $As_2S_3$, $As_2Te_3$, $AsCl_5$, $AsF_5$, $As_2O_5$, $As_2Se_5$, or $As_2S_5$, an antimony oxide, halide, sulfide, sulfate, selenide, arsenide, or other antimony compound such as SbAs, $SbBr_3$, $SbCl_3$, $SbF_3$, $SbI_3$, $Sb_2O_3$, SbOCl, $Sb_2Se_3$, $Sb_2(SO4)_3$, $Sb_2S_3$, $Sb_2Te_3$, $Sb_2O_4$, $SbCl_5$, $SbF_5$, $SbCl_2F_3$, $Sb_2O_5$, or $Sb_2S_5$, an bismuth oxide, halide, sulfide, selenide, or other bismuth compound such as $BiAsO_4$, $BiBr_3$, $BiCl_3$, $BiF_3$, $BiF_5$, $Bi(OH)_3$, Bib, $Bi_2O_3$, BiOBr, BiOCl, BiOI, $Bi_2Se_3$, $Bi_2S_3$, $Bi_2Te_3$, or $Bi_2O_4$, $SiCl_4$, $SiBr_4$, a metal oxide, hydroxide, or halide such as a transition metal halide such as $CrCl_3$, $ZnF_2$, $ZnBr_2$, $ZnI_2$, $MnCl_2$, $MnBr_2$, $MnI_2$, $CoBr_2$, $CoI_2$, $CoCl_2$, $NiCl_2$, $NiBr_2$, $NiF_2$, $FeF_2$, $FeCl_2$, $FeBr_2$, $FeCl_3$, $TiF_3$, CuBr, $CuBr_2$, $VF_3$, and $CuCl_2$, a metal halide such as $SnF_2$, $SnCl_2$, $SnBr_2$, $SnI_2$, $SnF_4$, $SnCl_4$, $SnBr_4$, $SnI_4$, InF, InCl, InBr, InI, AgCl, AgI, $AlF_3$, $AlBr_3$, $AlI_3$, $YF_3$, $CdCl_2$, $CdBr_2$, $CdI_2$, $InCl_3$, $ZrCl_4$, $NbF_5$, $TaCl_5$, $MoCl_3$, $MoCl_5$, $NbCl_5$, $AsCl_3$, $TiBr_4$, $SeCl_2$, $SeCl_4$, $InF_3$, $InCl_3$, $PbF_4$, $TeI_4$, $WCl_6$, $OsCl_3$, $GaCl_3$, $PtCl_3$, $ReCl_3$, $RhCl_3$, $RuCl_3$, metal oxide or hydroxide such as $Y_2O_3$, FeO, $Fe_2O_3$, or NbO, NiO, $Ni_2O_3$, SnO, $SnO_2$, $Ag_2O$, AgO, $Ga_2O$, $As_2O_3$, $SeO_2$, $TeO_2$, $In(OH)_3$, $Sn(OH)_2$, In$(OH)_3$, $Ga(OH)_3$, and $Bi(OH)_3$, $CO_2$, $As_2Se_3$, $SF_6$, S, $SbF_3$, $CF_4$, $NF_3$, a permanganate such as $KMnO_4$ and $NaMnO_4$, $P_2O_5$, a nitrate such as $LiNO_3$, $NaNO_3$ and $KNO_3$, and a boron halide such as $BBr_3$ and $BI_3$, a group 13 halide, preferably an indium halide such as $InBr_2$, $InCl_2$, and $InI_3$, a silver halide, preferably AgCl or AgI, a lead halide, a cadmium halide, a zirconoium halide, preferably a transition metal oxide, sulfide, or halide (Sc, Ti, V, Cr, Mn, Fe, Co, Ni, Cu, or Zn with F, Cl, Br or I), a second or third transition series halide, preferably $YF_3$, oxide, sulfide preferably $Y_2S_3$, or hydroxide, preferably those of Y, Zr, Nb, Mo, Tc, Ag, Cd, Hf, Ta, W, Os, such as $NbX_3$, $NbX_5$, or $TaX_5$ in the case of halides, a metal sulfide such as $Li_2S$, ZnS, FeS, NiS, MnS, $Cu_2S$, CuS, and SnS, an alkaline earth halide such as $BaBr_2$, $BaCl_2$, $BaI_2$, $SrBr_2$, $SrI_2$, $CaBr_2$, $CaI_2$, $MgBr_2$, or $MgI_2$, a rare earth halide such as $EuBr_3$, $LaF_3$, $LaBr_3$, $CeBr_3$, $GdF_3$, $GdBr_3$, preferably in the II state such as one of $CeI_2$, $EuF_2$, $EuCl_2$, $EuBr_2$, $EuI_2$, $DyI_2$, $NdI_2$, $SmI_2$, $YbI_2$, and $TmI_2$, a metal boride such as a europium boride, an $MB_2$ boride such as $CrB_2$, $TiB_2$, $MgB_2$, $ZrB_2$, and $GdB_2$ an alkali halide such as LiCl, RbCl, or CsI, and a metal phosphide such as $Ca_3P_2$, a noble metal halide, oxide, sulfide such as $PtCl_2$, $PtBr_2$, $PtI_2$, $PtCl_4$, $PdCl_2$, $PbBr_2$, and $PbI_2$, a rare earth sulfide such as CeS, other suitable rare earths are those of La and Gd, a metal and an anion such as $Na_2TeO_4$, $Na_2TeO_3$, $Co(CN)_2$, CoSb, CoAs, $Co_2P$, CoO, CoSe, CoTe, NiSb, NiAs, NiSe, $Ni_2Si$, MgSe, a rare earth telluride such as EuTe, a rare earth selenide such as EuSe, a rare earth nitride such as EuN, a metal nitride such as MN, GdN, and $Mg_3N_2$, a compound containing at least two atoms from the group of oxygen and different halogen atoms such as $F_2O$, $Cl_2O$, $ClO_2$, $Cl_2O_6$, $Cl_2O_7$, ClF, $ClF_3$, $ClOF_3$, $ClF_5$, $ClO_2F$, $ClO_2F_3$, $ClO_3F$, $BrF_3$, BrF5, $I_2O_5$, IBr, ICl, $ICl_3$, IF, $IF_3$, $IF_5$, $IF_7$, and a metal second or third transition series halide such as $OsF_6$, $PtF_6$, or $IrF_6$, an alkali metal compound such as a halide, oxide or sulfide, and a compound that can form a metal upon reduction such as an alkali, alkaline earth, transition, rare earth, Group 13, preferably In, and Group 14, preferably Sn, a metal hydride such as a rare earth hydride, alkaline earth hydride, or alkali hydride wherein the catalyst or source of catalyst may be a metal such as an alkali metal when the oxidant is a hydride, preferably a metal hydride. Suitable oxidants are metal halides, sulfides, oxides, hydroxides, selenides, and phosphides such as alkaline earth halides such as $BaBr_2$, $BaCl_2$, $BaI_2$, $CaBr_2$, $MgBr_2$, or $MgI_2$, a rare earth halide such as $EuBr_2$, $EuBr_3$, $EuF_3$, $LaF_3$, $GdF_3$ $GdBr_3$, $LaF_3$, $LaBr_3$, $CeBr_3$, a second or third series transition metal halide such as $YF_3$, a metal boride such as $CrB_2$ or $TiB_2$, an alkali halide such as LiCl, RbCl, or CsI, a metal sulfide such as $Li_2S$, ZnS, $Y_2S_3$, FeS, MnS, $Cu_2S$, CuS, and $Sb_2S_5$, a metal phosphide such as $Ca_3P_2$, a transition metal halide such as $CrCl_3$, $ZnF_2$, $ZnBr_2$, $ZnI_2$, $MnCl_2$, $MnBr_2$, $MnI_2$, $CoBr_2$, $CoI_2$, $CoCl_2$, $NiBr_2$, $NiF_2$, $FeF_2$, $FeCl_2$, $FeBr_2$, $TiF_3$, CuBr, $VF_3$, and $CuCl_2$, a metal halide such as $SnBr_2$, $SnI_2$, InF, InCl, InBr, InI, AgCl, AgI, $AlI_3$, $YF_3$, $CdCl_2$, $CdBr_2$, $CdI_2$, $InCl_3$, $ZrCl_4$, $NbF_5$, $TaCl_5$, $MoCl_3$, $MoCl_5$, $NbCl_5$, $AsCl_3$, $TiBr_4$, $SeCl_2$, $SeCl_4$, $InF_3$, $PbF_4$, and $TeI_4$, metal oxide or hydroxide such as $Y_2O_3$, FeO, NbO, $In(OH)_3$, $As_2O_3$, $SeO_2$, $TeO_2$, $BI_3$, $CO_2$, $As_2Se_3$, metal nitride such a $Mg_3N_2$, or AlN, metal phosphide such as $Ca_3P_2$, $SF_6$, S, $SbF_3$, $CF_4$, $NF_3$, $KMnO_4$, $NaMnO_4$, $P_2O_5$, $LiNO_3$, $NaNO_3$, $KNO_3$, and a metal boride such as $BBr_3$. Suitable oxidants include at least one of the list of $BaBr_2$, $BaCl_2$, $EuBr_2$, $EuF_3$, $YF_3$, $CrB_2$, $TiB_2$, LiCl, RbCl, CsI, $Li_2S$, ZnS, $Y_2S_3$, $Ca_3P_2$, $MnI_2$, $CoI_2$, $NiBr_2$, $ZnBr_2$, $FeBr_2$, $SnI_2$, AgCl, $Y_2O_3$, $TeO_2$, $CO_2$, $SF_6$, S, $CF_4$, $NaMnO_4$, $P_2O_5$, $LiNO_3$. Suitable oxidants include at least one of the list of $EuBr_2$, $BaBr_2$, $CrB_2$, $MnI_2$, and AgCl. Suitable sulfide oxidants comprise at least one $Li_2S$, ZnS, and $Y_2S_3$. In certain embodiments, the oxide oxidant is $Y_2O_3$.

In additional embodiments, each reaction mixture comprises at least one species chosen from the following genus of components (i)-(iii) described above, and further comprises (iv) at least one reductant chosen from a metal such as an alkali, alkaline earth, transition, second and third series transition, and rare earth metals and aluminum. Preferably the reductant is one from the group of Al, Mg, $MgH_2$, Si, La, B, Zr, and Ti powders, and $H_2$.

In further embodiments, each reaction mixture comprises at least one species chosen from the following genus of components (i)-(iv) described above, and further comprises (v) a support, such as a conducting support chosen from AC, 1% Pt or Pd on carbon (Pt/C, Pd/C), and a carbide, preferably TiC or WC.

The reactants may be in any molar ratio, but preferably they are in about equal molar ratios.

A suitable reaction system comprising (i) a catalyst or a source of catalyst, (ii) a source of hydrogen, (iii) an oxidant, (iv) a reductant, and (v) a support comprises NaH or KH as the catalyst or source of catalyst and source of H, one of $BaBr_2$, $BaCl_2$, $MgBr_2$, $MgI_2$, $CaBr_2$, $EuBr_2$, $EuF_3$, $YF_3$, $CrB_2$, $TiB_2$, LiCl, RbCl, CsI, $Li_2S$, ZnS, $Y_2S_3$, $Ca_3P_2$, $MnI_2$, $CoI_2$, $NiBr_2$, $ZnBr_2$, $FeBr_2$, $SnI_2$, InCl, AgCl, $Y_2O_3$, $TeO_2$, $CO_2$, $SF_6$, S, $CF_4$, $NaMnO_4$, $P_2O_5$, $LiNO_3$, as the oxidant, Mg or $MgH_2$ as the reductant wherein $MgH_2$ may also serve as the source of H, and AC, TiC, or WC as the support. In the case that a tin halide is the oxidant, Sn product may serve as at least one of the reductant and conductive support in the catalysis mechanism.

In another suitable reaction system comprising (i) a catalyst or a source of catalyst, (ii) a source of hydrogen, (iii) an oxidant, and (iv) a support comprises NaH or KH as the catalyst or source of catalyst and source of H, one of $EuBr_2$, $BaBr_2$, $CrB_2$, $MnI_2$, and AgCl as the oxidant, and AC, TiC, or WC as the support. The reactants may be in any molar ratio, but preferably they are in about equal molar ratios.

The catalyst, the source of hydrogen, the oxidant, the reductant, and the support may be in any desired molar ratio. In an embodiment having the reactants, the catalyst comprising KH or NaH, the oxidant comprising at least one of $CrB_2$, $AgCl_2$, and a metal halide from the group of an alkaline earth, transition metal, or rare earth halide, preferably a bromide or iodide, such as $EuBr_2$, $BaBr_2$, and $MnI_2$, the reductant comprising Mg or $MgH_2$, and the support comprising AC, TiC, or WC, the molar ratios are about the same. Rare earth halides may be formed by the direct reaction of the corresponding halogen with the metal or the hydrogen halide such as HBr. The dihalide may be formed from the trihalide by $H_2$ reduction.

Additional oxidants are those that have a high dipole moment or form an intermediate with a high dipole moment. Preferably, the species with a high dipole moment readily accepts electrons from the catalyst during the catalysis reaction. The species may have a high electron affinity. In an embodiment, electron acceptors have a half-filled or about half-filled electron shell such as Sn, Mn, and Gd or Eu compounds having half-filled $sp^3$, 3d, and 4f shells, respectively. Representative oxidants of the latter type are metals corresponding to $LaF_3$, $LaBr_3$, $GdF_3$, $GdCl_3$, $GdBr_3$, $EuBr_2$, $EuI_2$, $EuCl_2$, $EuF_2$, $EuBr_3$, $EuI_3$, $EuCl_3$, and $EuF_3$. In an embodiment, the oxidant comprises a compound of a non-metal such as at least one of P, S, Si, and C that preferably has a high oxidation state and further comprises atoms with a high electronegativity such as at least one of F, Cl, or O. In another embodiment, the oxidant comprises a compound of a metal such as at least one of Sn and Fe that has a low oxidation state such as II and further comprises atoms with a low electronegativity such as at least one of Br or I. A singly-negatively charged ion such as $MnO_4^-$, $ClO_4^-$, or $NO_3^-$ is favored over a doubly-negatively charged one such as $CO_3^{2-}$ or $SO_4^{2-}$. In an embodiment, the oxidant comprises a compound such as a metal halide corresponding to a metal with a low melting point such that it may be melted as a reaction product and removed from the cell. Suitable oxidants of low-melting-point metals are halides of In, Ga, Ag, and Sn. The reactants may be in any molar ratio, but preferably they are in about equal molar ratios.

In an embodiment, the reaction mixture comprises (i) a catalyst or a source of catalyst comprising a metal or a hydride from the Group I elements, (ii) a source of hydrogen such as $H_2$ gas or a source of $H_2$ gas, or a hydride, (iii) an oxidant comprising an atom or ion or a compound comprising at least one of the elements from Groups 13, 14, 15, 16, and 17; preferably chosen from the group of F, Cl, Br, I, B, C, N, O, Al, Si, P, S, Se, and Te, (iv) a reductant comprising an element or hydride, preferably one or more element or hydride chosen Mg, $MgH_2$, Al, Si, B, Zr, and a rare earth metal such as La, and (v) a support that is preferably conductive and preferably does not react to form another compound with other species of the reaction mixture. Suitable supports preferably comprise carbon such as AC, graphene, carbon impregnated with a metal such as Pt or Pd/C, and a carbide, preferably TiC or WC.

In an embodiment, the reaction mixture comprises (i) a catalyst or a source of catalyst comprising a metal or a hydride from the Group I elements, (ii) a source of hydrogen such as $H_2$ gas or a source of $H_2$ gas, or a hydride, (iii) an oxidant comprising a halide, oxide, or sulfide compound, preferably a metal halide, oxide, or sulfide, more preferably a halide of the elements from Groups IA, IIA, 3d, 4d, 5d, 6d, 7d, 8d, 9d, 10d, 11d, 12d, and lanthanides, and most preferably a transition metal halide or lanthanide halide, (iv) a reductant comprising an element or hydride, preferably one or more element or hydride chosen from Mg, $MgH_2$, Al, Si, B, Zr, and a rare earth metal such as La, and (v) a support that is preferably conductive and preferably does not react to form another compound with other species of the reaction mixture. Suitable supports preferably comprise carbon such as AC, carbon impregnated with a metal such as Pt or Pd/C, and a carbide, preferably TiC or WC.

e. Exchange Reactions, Thermally Reversible Reactions, and Regeneration

In an embodiment, the oxidant and at least one of the reductant, the source of catalyst, and the catalyst may undergo a reversible reaction. In an embodiment, the oxidant is a halide, preferably a metal halide, more preferably at least one of a transition metal, tin, indium, alkali metal, alkaline earth metal, and rare earth halide, most preferably a rare earth halide. The reversible reaction is preferably a halide exchange reaction. Preferably, the energy of the reaction is low such that the halide may be reversibly exchanged between the oxidant and the at least one of the reductant, source of catalyst, and catalyst at a temperature between ambient and 3000° C., preferably between ambient and 1000° C. The reaction equilibrium may be shifted to drive the hydrino reaction. The shift may be by a temperature change or reaction concentration or ratio change. The reaction may be sustained by addition of hydrogen. In a representative reaction, the exchange is $$n_1 M_{ox} X_x + n_2 M_{cat/red} \leftrightarrows n_1 M_{ox} + n_2 M_{cat/red} Y_y. \quad (54)$$

where $n_1$, $n_2$, x, and y are integers, X is a halide, and $M_{ox}$ is the metal of the oxidant, $M_{red/cat}$ the metal of the at least one of the reductant, source of catalyst, and catalyst. In an embodiment, one or more of the reactants is a hydride and the reaction further involves a reversible hydride exchange in addition to a halide exchange. The reversible reaction may be controlled by controlling the hydrogen pressure in addition to other reaction conditions such as the temperature and concentration of reactants. An exemplary reaction is $$n_1 M_{ox} X_x + n_2 M_{cat/red} \leftrightarrows n_1 M_{ox} H + n_2 M_{cat/red} X_y. \quad (55)$$

In an embodiment, the oxidant such as an alkali metal halide, alkaline earth metal halide, or a rare earth halide, preferably RbCl, $BaBr_2$, $BaCl_2$, $EuX_2$ or $GdX_3$ wherein X is halide or sulfide, most preferably $EuBr_2$, is reacted with the catalyst or source of catalyst, preferably NaH or KH, and optionally a reductant, preferably Mg or $MgH_2$, to form $M_{ox}$ or $M_{ox}H_2$ and the halide or sulfide of the catalyst such as NaX or KX. The rare earth halide may be regenerated by selectively removing the catalyst or source of catalyst and optionally the reductant. In an embodiment, $M_{ox}H_2$ may be thermally decomposed and the hydrogen gas removed by methods such as pumping. The halide exchange (Eqs. (54-55)) forms the metal of the catalyst. The metal may be removed as a molten liquid or as an evaporated or sublimed gas leaving the metal halide such as the alkaline earth or rare earth halide. The liquid may be removed, for example, by methods such as centrifugation or by a pressurized inert gas stream. The catalyst or source of catalyst may be rehydrided where appropriate to regenerate the original reactants that are recombined into the originally mixture with the rare earth halide and the support. In the case that Mg or $MgH_2$ is used as the reductant, Mg may be first removed by forming the hydride with $H_2$ addition, melting the hydride, and removing the liquid. In an embodiment wherein X=F, $MgF_2$ product may be converted to $MgH_2$ by F exchange with the rare earth such as $EuH_2$ wherein molten $MgH_2$ is continuously removed. The reaction may be carried out under high pressure $H_2$ to favor the formation and selective removal of $MgH_2$. The reductant may be rehydrided and added to the other regenerated reactants to form the original reaction mixture. In another embodiment, the exchange reaction is between metal sulfides or oxides of the oxidant and the at least one of the reductant, source of catalyst, and catalyst. An exemplary system of each type is 1.66 g KH+1 g Mg+2.74 g $Y_2S_3$+4 g AC and 1 g NaH+1 g Mg+2.26 g $Y_2O_3$+4 g AC.

The selective removal of the catalyst, source of catalyst, or the reductant may be continuous wherein the catalyst, source of catalyst, or the reductant may be recycled at least partially with in the reactor. The reactor may further comprise a still or reflux component to remove the catalyst such as still 34 of FIG. 4, source of catalyst, or the reductant and return it to the cell. Optionally it may be hydrided or further reacted and this product may be returned. The reaction temperature may be cycled between two extremes to continuously recycle the reactants by an equilibrium shift. In an embodiment, the system heat exchanger has the capacity to rapidly change the cell temperature between a high and low value to shift the equilibrium back and forth to propagate the hydrino reaction.

The regeneration reaction may comprise a catalytic reaction with an added species such as hydrogen. In an embodiment, the source of catalyst and H is KH and the oxidant is $EuBr_2$. The thermally driven regeneration reaction may be $$2KBr + Eu \text{ to } EuBr_2 + 2K \quad (56)$$

or $$2KBr + EuH_2 \text{ to } EuBr_2 + 2KH. \quad (57)$$

Alternatively, $H_2$ may serve as a regeneration catalyst of the catalyst or source of catalyst and oxidant such as KH and $EuBr_2$, respectively:

$$3KBr + \tfrac{1}{2}H_2 + EuH_2 \text{ to } EuBr_3 + 3KH. \quad (58)$$

Then, $EuBr_2$ is formed from $EuBr_3$ by $H_2$ reduction. A possible route is $$EuBr_3 + \tfrac{1}{2}H_2 \text{ to } EuBr_2 + HBr. \quad (59)$$

The HBr may be recycled:

$$HBr + KH \text{ to } KBr + H_2 \quad (60)$$

with the net reaction being:

$$2KBr + EuH_2 \text{ to } EuBr_2 + 2KH. \quad (61)$$

The rate of the thermally driven regeneration reaction can be increased by using a different pathway with a lower energy known to those skilled in the art:

$$2KBr + H_2 + Eu \text{ to } EuBr_2 + 2KH \quad (62)$$

$$3KBr + \tfrac{3}{2}H_2 + Eu \text{ to } EuBr_3 + 3KH \text{ or} \quad (63)$$

$$EuBr_3 + \tfrac{1}{2}H_2 \text{ to } EuBr_2 + HBr. \quad (64)$$

The reaction given by Eq. (62) is possible since an equilibrium exists between a metal and the corresponding hydride in the presence of $H_2$ such as $$Eu + H_2 \leftrightarrows EuH_2. \quad (65)$$

The reaction pathway may involve intermediate steps of lower energy known to those skilled in the art such as $$2KBr + Mg + H_2 \text{ to } MgBr_2 + 2KH \text{ and} \quad (66)$$

$$MgBr_2 + Eu + H_2 \text{ to } EuBr_2 + MgH_2. \quad (67)$$

The KH or K metal may be removed as a molten liquid or as an evaporated or sublimed gas leaving the metal halide such as the alkaline earth or rare earth halide. The liquid may be removed by methods such as centrifugation or by a pressurized inert gas stream. In other embodiments, another catalyst or catalyst source such as NaH, LiH, RbH, CsH, Na, Li, Rb, Cs may substitute for KH or K, and the oxidant may comprise another metal halide such as another rare earth halide or an alkaline earth halide, preferably $BaCl_2$ or $BaBr_2$.

In other embodiments, the thermally reversible reaction comprises further exchange reactions, preferable between two species each comprising at least one metal atom. The exchange may be between a metal of the catalyst such as an alkali metal and the metal of the exchange partner such as an oxidant. The exchange may also be between the oxidant and the reductant. The exchanged species may be a anion such as a halide, hydride, oxide, sulfide, nitride, boride, carbide, silicide, arsenide, selenide, telluride, phosphide, nitrate, hydrogen sulfide, carbonate, sulfate, hydrogen sulfate, phosphate, hydrogen phosphate, dihydrogen phosphate, perchlorate, chromate, dichromate, cobalt oxide, and other oxyanions and anions known to those skilled in the art. The at least one of an exchange-partners may be comprise an alkali metal, alkaline earth metal, transition metal, second series transition metal, third series transition metal, noble metal, rare earth metal, Al, Ga, In, Sn, As, Se, and Te. Suitable exchanged anions are halide, oxide, sulfide, nitride, phosphide, and boride. Suitable metals for exchange are alkali, preferably Na or K, alkaline earth metal, preferably Mg or Ba, and a rare earth metal, preferably Eu or Dy, each as the metal or hydride. Exemplary catalyst reactants with an exemplary exchange reaction are given infra. These reactions are not meant to be exhaustive and further examples would be known to those skilled in the art.

4 g AC3-3+1 g Mg+1.66 g KH+2.5 g DyI2, Ein: 135.0 kJ, dE: 6.1 kJ, TSC: none, Tmax: 403 V, theoretical is 1.89 kJ, gain is 3.22 times,

  (68)

4 g AC3-3+1 g Mg+1 g NaH+2.09 g EuF3, Ein: 185.1 kJ, dE: 8.0 kJ, TSC: none, Tmax: 463° C., theoretical is 1.69 kJ, gain is 4.73 times,

 (69)

 (70)

KH 8.3 gm+Mg 5.0 gm+CAII-300 20.0 gm+$CrB_2$ 3.7 gm, Ein: 317 kJ, dE: 19 kJ, no TSC with Tmax ~340° C., theoretical energy is endothermic 0.05 kJ, gain is infinite,

 (71)

0.70 g of $TiB_2$, 1.66 g of KH, 1 g of Mg powder and 4 g of CA-III 300 activated carbon powder (AC3-4) was finished. The energy gain was 5.1 kJ, but no cell temperature burst was observed. The maximum cell temperature was 431° C., theoretical is 0.

 (72)

0.42 g of LiCl, 1.66 g of KH, 1 g of Mg powder and 4 g of AC3-4 was finished. The energy gain was 5.4 kJ, but no cell temperature burst was observed. The maximum cell temperature was 412° C., theoretical is 0, the gain is infinity.

$LiCl+KH \leftrightarrows KCl+LiH$. (73)

1.21 g of RbCl, 1.66 g of KH, 1 g of Mg powder and 4 g of AC3-4, energy gain was 6.0 kJ, but no cell temperature burst was observed. The maximum cell temperature was 442° C., theoretical is 0.

$RbCl+KH \leftrightarrows KCl+RbH$. (74)

4 g AC3-5+1 g Mg+1.66 g KH+0.87 g LiBr; EM: 146.0 kJ; dE: 6.24 kJ; TSC: not observed; Tmax: 439° C., theoretical is endothermic, $LiBr+KH \leftrightarrows KBr+LiH$ (75).

KH 8.3 gm+Mg_5.0 gm+CAII-300 20.0 gm+$YF_3$ 7.3 gm; Ein: 320 kJ; dE: 17 kJ; no TSC with Tmax ~340° C.; Energy Gain ~4.5 X (X~0.74 kJ 5=3.7 kJ),

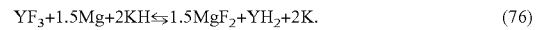 (76)

NaH 5.0 gm+Mg 5.0 gm+CAII-300 20.0 gm+$BaBr_2$ 14.85 gm (Dried); Ein: 328 kJ; dE: 16 Id; no TSC with Tmax ~320° C.; Energy Gain 160X (X~0.02 kJ*5=0.1 kJ),

 (77)

KH 8.3 gm+Mg 5.0 gm+CAII-300 20.0 gm+$BaCl_2$ 10.4 gm; Ein: 331 kJ; dE: 18 kJ No TSC with Tmax ~320° C. Energy Gain ~6.9X (X~0.52×5=2.6 kJ)

 (78)

NaH 5.0 gm+Mg 5.0 gm+CAII-300 20.0 gm+MgI2 13.9 gm; Ein: 315 kJ; dE: 16 kJ No TSC with Tmax ~340° C. Energy Gain ~1.8X (X~1.75×5=8.75 kJ)

 (79)

4 g AC3-2+1 g Mg+1 g NaH+0.97 g ZnS; Ein: 132.1 kJ; dE: 7.5 kJ; TSC: none; Tmax: 370° C., theoretical is 1.4 kJ, gain is 5.33 times,

 (80)

 (81)

2.74 g of $Y_2S_3$, 1.66 g of KH, 1 g of Mg powder and 4 g of CA-III 300 activated carbon powder (dried at 300° C.), energy gain was 5.2 kJ, but no cell temperature burst was observed. The maximum cell temperature was 444° C., theoretical is 0.41 kJ, gain is 12.64 times,

 (82)

 (83)

 (84)

4 g AC3-5+1 g Mg+1.66 g KH+1.82 g $Ca_3P_2$; Ein: 133.0 kJ; dE: 5.8 kJ; TSC: none; Tmax: 407° C., the theoretical is endothermic, the gain is infinity.

20 g AC3-5+5 g Mg+8.3 g KH+9.1 g $Ca_3P_2$, Ein: 282.1 kJ, dE: 18.1 kJ, TSC: none, Tmax: 320° C., theoretical is endothermic, the gain is infinity.

 (85)

In an embodiment, the thermally regenerative reaction system comprises:

(i) at least one catalyst or a source of catalyst chosen from NaH and KH;

(ii) at least one source of hydrogen chosen from NaH, KH, and $MgH_2$;

(iii) at least one oxidant chosen from an alkaline earth halide such as $BaBr_2$, $BaCl_2$, $BaI_2$, $CaBr_2$, $MgBr_2$, or $MgI_2$, a rare earth halide such as $EuBr_2$, $EuBr_3$, $EuF_3$, $DyI_2$, $LaF_3$, or $GdF_3$, a second or third series transition metal halide such as $YF_3$, a metal boride such as $CrB_2$ or $TiB_2$, an alkali halide such as LiCl, RbCl, or CsI, a metal sulfide such as $Li_2S$, ZnS or $Y_2S_3$, a metal oxide such as $Y_2O_3$, and a metal phosphide such as $Ca_3P_2$;

(iv) at least one reductant chosen from Mg and $MgH_2$; and (v) a support chosen from AC, TiC, and WC.

f. Getter, Support, or Matrix-Assisted Hydrino Reaction

In another embodiment, the exchange reaction is endothermic. In such an embodiment, the metal compound may serve as at least one of a favorable support or matrix for the hydrino reaction or getter for the product to enhance the hydrino reaction rate. Exemplary catalyst reactants and with an exemplary support, matrix, or getter are given infra. These reactions are not meant to be exhaustive and further examples would be known to those skilled in the art.

4 g AC3-5+1 g Mg+1.66 g KH+2.23 g $Mg_3As_2$, Ein: 139.0 kJ, dE: 6.5 kJ, TSC: none, Tmax: 393° C., the theoretical is endothermic, the gain is infinity.

20 g AC3-5+5 g Mg+8.3 g KH+11.2 g Mg3As2, Ein: 298.6 kJ, dE: 21.8 kJ, TSC: none, Tmax: 315° C., theoretical is endothermic, the gain is infinity.

1.01 g of $Mg_3N_2$, 1.66 g of KH, 1 g of Mg powder and 4 g of AC3-4 in a 1" heavy duty cell, energy gain was 5.2 kJ, but no cell temperature burst was observed. The maximum cell temperature was 401° C., theoretical is 0, the gain is infinity.

0.41 g of AlN, 1.66 g of KH, 1 g of Mg powder and 4 g of AC3-5 in a 1" heavy duty cell, energy gain was 4.9 kJ, but no cell temperature burst was observed. The maximum cell temperature was 407° C., theoretical is endothermic.

In an embodiment, the thermally regenerative reaction system comprises at least two components chosen from (i)-(v):

(i) at least one catalyst or a source of catalyst chosen from NaH, KH, and $MgH_2$;

(ii) at least one source of hydrogen chosen from NaH and KH;

(iii) at least one oxidant, matrix, second support, or getter chosen from a metal arsenide such as $Mg_3As_2$ and a metal nitride such as $Mg_3N_2$ or AlN;

(iv) at least one reductant chosen from Mg and $MgH_2$; and (v) at least one support chosen from AC, TiC, or WC.

D. Liquid Fuels: Organic and Molten Solvent Systems

Further embodiments comprise a molten solid such as a molten salt or a liquid solvent contained in chamber 200. The liquid solvent may be vaporized by operating the cell at a temperature above the boiling point of the solvent. The reactants such as the catalyst may be dissolved or suspended in the solvent or reactants that form the catalyst and H may be suspended or dissolved in the solvent. A vaporized solvent may act as a gas with the catalyst to increase the rate of the hydrogen catalyst reaction to form hydrinos. The molten solid or vaporized solvent may be maintained by applying heat with heater 230. The reaction mixture may further comprise a solid support such as a HSA material. The reaction may occur at the surface due to the interaction of a molten solid, a liquid, or a gaseous solvent with the catalyst and hydrogen such as K or Li plus H or NaH. In an embodiment using a heterogeneous catalyst, a solvent of the mixture may increase the catalyst reaction rate.

In embodiments comprising hydrogen gas, the $H_2$ may be bubbled through the solution. In another embodiment, the cell is pressurized to increase the concentration of dissolved $H_2$. In a further embodiment, the reactants are stirred, preferably at high speed and at a temperature that is about the boiling point of the organic solvent and about the melting point of the inorganic solvent.

The organic solvent reaction mixture may be heated, preferably in the temperature range of about 26° C. to 400° C., more preferably in the range of about 100° C. to 300° C. The inorganic solvent mixture may be heated to a temperature above that at which the solvent is liquid and below a temperature that causes total decomposition of the NaH molecules.

a. Organic Solvents

The organic solvent may comprise one or more of the moieties that can be modified to further solvents by addition of functional groups. The moieties may comprise at least one of a hydrocarbon such as an alkane, cyclic alkane, alkene, cyclic alkene, alkyne, aromatic, heterocyclic, and combinations thereof, ether, halogenated hydrocarbon (fluoro, chloro, bromo, iodo hydrocarbon), preferably fluorinated, amine, sulfide, nitrile, phosphoramide (e.g. $OP(N(CH_3)_2)_3$), and aminophosphazene. The groups may comprise at least one of alkyl, cycloalkyl, alkoxycarbonyl, cyano, carbamoyl, heterocyclic rings containing C, O, N, S, sulfo, sulfamoyl, alkoxysulfonyl, phosphono, hydroxyl, halogen, alkoxy, alkylthiol, acyloxy, aryl, alkenyl, aliphatic, acyl, carboxyl, amino, cyanoalkoxy, diazonium, carboxyalkylcarboxamido, alkenylthio, cyanoalkoxycarbonyl, carbamoylalkoxycarbonyl, alkoxy carbonylamino, cyanoalkylamino, alkoxycarbonylalkylamino, sulfoalkylamino, alkylsulfamoylaklylamino, oxido, hydroxy alkyl, carboxy alkylcarbonyloxy, cyanoalkyl, carboxyalkylthio, arylamino, heteroarylamino, alkoxycarbonyl, alkylcarbonyloxy, cyanoalkoxy, alkoxycarbonylalkoxy, carbamoylalkoxy, carbamoylalkyl carbonyloxy, sulfoalkoxy, nitro, alkoxyaryl, halogenaryl, amino aryl, alkylaminoaryl, tolyl, alkenylaryl, allylaryl, alkenyloxyaryl, allyloxyaryl, cyanoaryl, carbamoylaryl, carboxyaryl, alkoxycarbonylaryl, alkylcarbonyoxyaryl, sulfoaryl, alkoxysulfoaryl, sulfamoylaryl, and nitroaryl. Preferably, the groups comprise at least one of alkyl, cycloalkyl, alkoxy, cyano, heterocyclic rings containing C, O, N, S, sulfo, phosphono, halogen, alkoxy, alkylthiol, aryl, alkenyl, aliphatic, acyl, alkyl amino, alkenylthio, arylamino, heteroarylamino, halogenaryl, amino aryl, alkylaminoaryl, alkenylaryl, allylaryl, alkenyloxyaryl, allyloxyaryl, and cyanoaryl groups.

The catalyst may be at least one of NaH molecules, Li, and K. In the latter case, LiH and KH may serve as the source of catalyst. The solvent may be an organic solvent. The solvent may be substantially vaporized at the operating temperature of the cell that is preferably above the boiling point of the solvent. Preferably, the solvent is polar. The solvent may be an aprotic solvent. Polar aprotic solvents are solvents that share ion dissolving power with protic solvents such as water, methanol, ethanol, formic acid, hydrogen fluoride and ammonia, but lack an acidic hydrogen. These solvents generally have high dielectric constants and high polarity. Examples are dimethyl sulfoxide, dimethylformamide, 1,4-dioxane, and hexamethylphosphoramide.

In one embodiment of the present disclosure, the solvent comprises an ether such as at least one of the group of 1,4-dioxane, 1,3-dioxane, trioxane, acetylacetaldehyde dimethyl acetal, 1,4-benzodioxane, 3-dimethylaminoanisole, 2,2-dimethyl-1,3-dioxolane, 1,2-dimethoxyethane, N—N-dimethylformamide dimethyl acetal, N—N-dimethylformamide ethylene acetal, diethyl ether, diisopropyl ether, methylal (dimethoxymethane), tetrahydropyran dibenzodioxane, n-butyl ethyl ether, di-n-butyl ether, allyl ethyl ether, diethylene glycol dibutyl ether, bis(2-ethylhexyl) ether, sec-butyl ethyl ether, dicyclohexyl ether, diethylene glycol diethyl ether, 3,4-dihydro-1H-2-benzopyran, 2,2'-dimethoxybiphenyl, 1,6-dimethoxyhexane, substituted aromatic ethers such as methoxy benzene, methoxy toluene, 2,5-dimethoxytoluene, diphenoxybenzene such as 1,4-diphenoxybenzene, allyl phenyl ether, dibenzyl ether, benzyl phenyl ether, n-butyl phenyl ether, trimethoxytoluene such as 3,4,5-trimethoxytoluene, 2,2'-dinaphthyl ether, 2-[2-(benzyl oxy)ethyl]-5,5-dimethyl-1,3-dioxane, 1,3-benzodioxole, veratrole (1,2-dimethoxybenzene), anisole, bis(phenyl) ether, 1,4-dioxin, dibenzodioxin or dibenzo[1,4]dioxin, divinyl ether, crown ethers such as dicyclohexano-18-crown-6, dibenzo-18-crown-6,15-crown-5, and 18-crown-6, bis(4-methylphenyl)

ether, bis(2-cyanoethyl) ether, bis(2-dimethylaminoethyl) ether, and bis[2-(vinyloxy)ethyl] ether. In an embodiment comprising Na and a source of hydrogen, an ether is an exemplary solvent since Na is somewhat soluble in ether, and also stabilizes sodium ions. These features favor the hydrino reaction. Additionally to NaH, K or Li may serve as the catalyst of a reaction mixture further comprising an ether solvent.

In an embodiment, the solvent or HSA material comprises functional groups with a high bond moment such as C—O, C=O, C≡N and C—F. The molecules of the solvent or HSA material may have a high dipole moment. Preferably, the solvent or HSA comprises at least one of an ether, nitrile, or halogenated hydrocarbons, preferably having very stable bonds, preferably polar, such as fluorinated hydrocarbons. Preferably, the fluorocarbon solvent has the formula $C_nF_{2n+2}$ and may also have some H in place of F or may be aromatic. In another embodiment, the solvent or HSA comprises as at least one of the group of fluorinated organic molecules, fluorinated hydrocarbons, fluorinated alkoxy compounds, and fluorinated ethers. Exemplary fluorinated solvents are 1,2-dimethoxy-4-fluorobenzene, hexaflorobenzene, perfluoroheptane, octafluoronaphthalene, octafluorotoluene, 2H-perfluoro-5,8,11,14-tetramethyl-3,6,9,12,15-pentaoxaoctadecane, perfluoro-5,8,11,14-tetramethyl-3,6,9,12, 15-pentaoxaoctadecane, perfluoro(tetradecahydrophenanthrene), and perfluoro-1,3,5-trimethylcyclohexane. Exemplary fluorinated HSAs are TEFLON UM, TEFLON™-PFA, polyvinyl fluoride, PVF, poly(vinylidene fluoride), poly(vinylidene fluoride-co-hexafluoropropylene), and perfluoroalkoxy polymers. A suitable reaction mixture comprises octafluoronaphthalene, NaH, and and a support such as Ac, TiC, WC, or R-Ni. The reactants can be in any desired proportions such as octafluoronaphthalene (45 wt %), NaH (10 wt %), and R-Ni (45 wt %).

Another exemplary solvent is a fluorocarbon such as one having the formula $C_nF_{2n+2}$, and it may also have some H in place of F or may be aromatic. In an embodiment, the fluorinated solvent comprises at least one of the group and derivatives of perfluoro-methane, perfluoro-ethane, perfluoro-propane, perfluoro-heptane, perfluoro-pentane, perfluoro-hexane, and perfluoro-cyclohexane as well as other straight and branched chain perfluoro-alkanes and partially F substituted alkanes, bis(difluoromethyl) ether, 1,3-bis(trifluoromethyl)benzene, 1,4-bis(trifluoromethyl)benzene, 2,2',3,3',4,4',5,5',6,6'-decafluoro-1,1'-biphenyl, o-difluorobenzene, m-difluorobenzene, p-difluorobenzene, 4,4'-difluoro-1,1'-biphenyl, 1,1-difluorocyclohexane, 1,1-difluoroethane, 1,2-difluoroethane, 1,1-difluorethene, cis-1,2-difluoroethene, trans-1,2-difluoroethene, difluoromethane, 2-(difluoromethoxy)-1,1,1-trifluoroethane, 2,2-difluoropropane, fluorobenzene, 2-fluoro-1,1'-biphenyl, 4-fluoro-1,1'-biphenyl, 1-fluorobutane, 2-fluorobutane, fluorocyclohexane, 1-fluorocyclohexene, 1-fluorodecane, fluoroethane, fluoroethene, 1-fluoroheptane, 1-fluorohexane, fluoromethane, 1-fluoro-2-methoxybenzene, 1-fluoro-3-methoxybenzene, 1-fluoro-4-methoxybenzene, (fluoromethyl)benzene, 2-fluoro-2-methylpropane, 1-fluoronaphthalene, 2-fluoronaphthalene, 1-fluorooctane, 1-fluoropentane, 1-fluoropropane, 2-fluoropropane, cis-1-fluoropropene, trans-1-fluoropropene, 2-fluoropropene, 3-fluoropropene, 2-fluoropyridine, 3-fluoropyridine, 2-fluorotoluene, 3-fluorotoluene, 4-fluorotoluene, 1-fluoro-2-(trifluoromethyl)benzene, 1-fluoro-3-(trifluoromethyl)benzene, 1-fluoro-4-(trifluoromethyl)benzene, 1,1,1,2,3,3,3-heptafluoropropane, hexafluorobenzene, 1,1,2,3,4,4-hexafluoro-1,3-butadiene, 1,1,1,4,4,4-hexafluoro-2-butyne, hexafluorocyclobutene, hexafluoroethane, 1,1,1,2,3,3-hexafluoropropane, methyl pentafluorethyl ether, pentafluorobenzene, pentafluoroethane, pentafluoromethoxybenzene, 1,1,1,2,2-pentafluoropropane, 2,3,4,5,6-pentafluorotoluene, 1,1,2,4,4-pentafluoro-3-(trifluoromethyl)-1,3-butadiene, perfluorobutane, perfluoro-2-butene, perfluoro-2-butyltetrahydrofuran, perfluorocyclobutane, perfluorocyclohexane, perfluorocyclohexene, perfluorodecalin, perfluorodecane, perfluorodimethoxymethane, perfluoro-2,3-dimethylbutane, perfluoroethyl ethyl ether, perfluoroethyl2,2,2-trifluoroethyl ether, perfluoroheptane, perfluoro-1-heptane, perfluorohexane, perfluoro-1-hexene, perfluoroisobutane, perfluoroisobutene, perfluoroisopropyl methyl ether, perfluoromethylcyclohexane, perfluoro-2-methylpentane, perfluoro-3-methylpentane, perfluoronaphthalene, perfluorononane, perfluorooctane, perfluorooctylsulfonyl fluoride, perfluorooxetane, perfluoropentane, perfluoropropane, perfluoropropene, perfluoropropyl methyl ether, perfluoropyridine, perfluorotoluene, perfluorotripropylamine, 1,1,1,2-tetrafluoroethane, 1,1,2,2-tetrafluoroethane, 1,2,2,2-tetrafluoroethyl difluoromethyl ether, tetrafluoromethane, triflumizole, trifluoperazine, 1,2,4-trifluorobenzene, 1,3,5-trifluorobenzene, 1,1,1-trifluoroethane, 1,1,2-trifluoroethane, trifluoroethene, 2,2,2-trifluoroethyl methyl ether, trifluoromethane, trifluoromethyl difluoromethyl ether, trifluoromethyl 1,1,2,2-tetrafluoroethyl ether, 1,1,1-trifluoropropane, 3,3,3-trifluoropropene, 3,3,3-trifluoro-1-propyne, triflupromazine, undecafluorocyclohexane, pentafluorbenzonitrile, trifluoroacetonitrile, (trifluoromethyl)benzene, 3-(trifluoromethyl) benzonitrile, 4-(trifluoromethyl)benzonitrile, trifluoro(trifluoromethyl)loxirane, and tris(perfluorobutyl)lamine.

In another embodiment, the solvent comprises a hydrocarbon such as those having functional groups for the list of straight and branched-chain alkanes, alkenes, alkynes, and aromatics. The hydrocarbon solvent may be at least one of or derivatives of the group comprising acenaphthene, acenaphthylene, allylbenzene, 1-allylcyclohexene, allylcyclopentane, anthracene, benz[a]anthracene, benzene, benzo[c]chrysene, benzo[g]chrysene, benzo[b]fluoranthene, benzo[j]fluoranthene, benzo[k]fluoranthene, 11H-benzo[a]fluorine, 11H-benzo[b]fluorine, benzo[ghi]perylene, benzo[c]phenanthrene, benzo[a]pyrene, benzo[e]pyrene, benzo[b]triphenylene, 9,9'-bianthracene, bicyclo[2.2.1]heptane, bicyclo [4.1.0]heptane, bicyclo[2,2,1]hept-2-ene, 1,1'-bicyclopentyl, 1,1'-binaphthalene, 2,2'-binaphthalene, biphenyl, 1,3-bis(1-methylethenyl)benzene, (trans)-1,3-butadienylbenzene, 1,3-butadiyne, butane, 1-butene, cis-2-butene, trans-2-butene, (trans-1-butenyl)benzene, 2-butenylbenzene, 3-butenylbenzene, 1-buten-3-yne, butylbenzene, sec-butylbenzene, (±), tert-butylbenzene, 2-butyl-1,1'-biphenyl, butylcyclohexane, sec-butylcyclohexane, tert-butylcyclohexane, butylcyclopentane, 1-tert-butyl-3,5-dimethylbenzene, 5-butyldocosane, 11-butyldocosane, 1-tert-butyl-4-ethylbenzene, 1-tert-butyl-2-methylbenzene, 1-tert-butyl-3-methylbenzene, 1-tert-butyl-4-methylbenzene, 1-butylnaphthalene, 2-butylnaphthalene, 5-butylnonane, camphene, (+), camphene, (−), 3-carene, (+), α-carotene, β-carotene, β,Ψ-carotene, Ψ,Ψ-carotene, Ψ,Ψ-caroten-16-ol, cholestane, (5α), cholestane, (5β), cyclobutane, cyclobutene, cyclodecane, cyclododecane, 1,5,9-cyclododecatriene, cis-cyclododecene, trans-cyclododecene, 1,3-cycloheptadiene, cycloheptane, 1,3,5-cycloheptatriene, cycloheptene, 1,3-cyclohexadiene, 1,4-cyclohexadiene, cyclohexane, cyclohexene, 1-cyclohexen-1-ylbenzene, cyclohexylbenzene, cyclohexylcyclohexane, cyclononane, 1,4-cyclooctadiene, cis,cis-1,5-cyclooctadiene, cyclooctane, 1,3,5,7-cyclooctatetraene, 1,3,5-cyclooctatriene, cis-cyclooctene, trans-cyclooctene, cyclooctyne, cyclopentadecane, 1,3-cyclopentadiene, cyclopentane, cyclopentene, cyclopentylbenzene, 1,3-decadiene, 1,9-decadiene, cis-decahydronaphthalene, trans-decahydronaphthalene, decane, 1-decene, cis-2-decene, trans-2-decene, cis-5-decene, trans-5-decene, decylbenzene, decylcyclohexane, decylcyclopentane, 11-decylheneicosane, 1-decylnaphthalene, 1-decyne, 5-decyne, dibenz[a,h]anthracene, dibenz[a,j]anthracene, dibenzo[b,k]chrysene, dibenzo[a,e]pyrene, dibenzo[a,h]pyrene, dibenzo[a,i]pyrene, dibenzo[a,l]pyrene, o-diethylbenzene, m-diethylbenzene, p-diethylbenzene, 1,1-diethylcyclohexane, 1,2-dihydrobenz[j]aceanthrylene, 9,10-dihydro-9,10 [1',2']-benzenoanthracene, 16,17-dihydro-15H-cyclopenta[a]phenanthrene, 2,3-dihydro-1-methyl-1H-indene, 1,2-dihydronaphthalene, 1,4-dihydronaphthalene, 9,10-dihydrophenanthrene, 2,3-dihydro-1,1,3-trimethyl-3-phenyl-1H-indene, 1,2-diisopropylbenzene, 1,3-diisopropylbenzene, 1,4-diisopropylbenzene, 2,6-diisopropylnaphthalene, 7,12-dimethylbenz[a]anthracene, 2,2'-dimethylbiphenyl, 2,3-dimethyl-1,3-butadiene, 2,2-dimethylbutane, 2,3-dimethylbutane, 2,3-dimethyl-1-butene, 3,3-dimethyl-1-butene, 2,3-dimethyl-2-butene, 3,3-dimethyl-1-butyne, 1,1-dimethylcyclohexane, cis-1,3-dimethylcyclohexane, trans-1,3-dimethylcyclohexane, cis-1,4-dimethylcyclohexane, trans-1,4-dimethylcyclohexane, 1,2-dimethylcyclohexene, 1,3-dimethylcyclohexene, 1,1-dimethylcyclopentane, cis-1,2-dimethylcyclopentane, trans-1,2-dimethylcyclopentane, cis-1,3-dimethylcyclopentane, trans-1,3-dimethylcyclopentane, 1,2-dimethylcyclopentene, 1,5-dimethylecyclopentene, 1,2-dimethylenecyclohexane, 2,6-dimethyl-1,5-heptadiene, 2,2-dimethylheptane, 2,3-dimethylheptane, 2,4-dimethylheptane, 2,5-dimethylheptane, 2,6-dimethylheptane, 3,3-dimethylheptane, 3,4-dimethylheptane, 3,5-dimethylheptane, 4,4-dimethylheptane, 2,5-dimethyl-1,5-hexadiene, 2,5-dimethyl-2,4-hexadiene, 2,2-dimethylhexane, 2,3-dimethylhexane, 2,4-dimethylhexane, 2,5-dimethylhexane, 3,3-dimethylhexane, 3,4-dimethylhexane, 2,3-dimethyl-1-hexene, 5,5-dimethyl-1-hexene, 2,3-dimethyl-2-hexene, 2,5-dimethyl-2-hexene, cis-2,2-dimethyl-3-hexene, trans-2,2-dimethyl-3-hexene, 1-(1,5-dimethyl-4-hexenyl)-4-methylbenzene, 1,1-dimethylindan, 1,4-dimethyl-7-isopropylazulene, 1,6-dimethyl-4-isopropylnaphthalene, 2,4-dimethyl-3-isopropylpentane, 1,2-dimethylnaphthalene, 1,3-dimethylnaphthalene, 1,4-dimethylnaphthalene, 1,5-dimethylnaphthalene, 1,6-dimethylnaphthalene, 1,7-dimethylnaphthalene, 1,8-dimethylnaphthalene, 2,3-dimethylnaphthalene, 2,6-dimethyl naphthalene, 2,7-dimethylnaphthalene, 3,7-dimethyl-1,6-octadiene, 2,2-dimethyloctane, 2,3-dimethyloctane, 2,4-dimethyloctane, 2,5-dimethyloctane, 2,6-dimethyloctane, 2,7-dimethyloctane, 3,4-dimethyloctane, 3,6-dimethyloctane, cis-3,7-dimethyl-1,3,6-octatriene, trans-3,7-dimethyl-1,3,6-octariene, 3,7-dimethyl-1,3,7-octariene, cis,cisi-2,6-dimethyl-2,4,6-octariene, trans, trans-2,6-dimethyl,2,4,6-octariene, 3,7-dimethyl-1-octene, dimethyl-1,3-pentadiene, 2,2-dimethylpentane, 2,3-dimethylpentane, 2,4-dimethylpentane, 3,3-dimethylpentane, 2,3-dimethyl-1-pentene, 2,4-dimethyl-1-pentene, 3,3-dimethyl-1-pentene, 3,4-dimethyl-1-pentene, 2,3-dimethyl-2-pentene, 2,4-dimethyl-2-pentene, cis-3,4-dimethyl-2-pentene, cis-3,4-dimethyl-2-pentene, trans-3,4-dimethyl-2-pentene, cis-4,4-dimethyl-2-pentene, trans-4,4-dimethyl-2-pentene, 4,4-dimethyl-1-pentyne, 4,4-di methyl-2-pentyne,(1,1-dimethylpropyl)benzene, (2,2-dimethylpropyl)benzene, 2,7-dimethylpyrene, 9,10-diphenyl anthracene, trans,trans-1,4-diphenyl-1,3-butadiene, 1,4-diphenyl-1,3-butadiyne, 1,1-diphenylbutane, 1,2-diphenylbutane, 1,4-diphenylbutane, 1,3-diphenyl-1-butene, 1,1-diphenylethane, 1,2-diphenylethane, 1,1-diphenylethene, 1,6-diphenyl-1,3,5-hexatriene, diphenylmethane, 1,3-diphenylpropane, 2,2-diphenylpropane, 1,1-diphenyl-1-propene, 1,2-di(p-tolyl)ethane, o-divinylbenzene, m-divinylbenzene, p-divinylbenzene, docosane, 1-docosene, 5,7-dodecadiyne, dodecane, dodecylcyclohexane, 1-dodecyne, 6-dodecyne, dotriacontane, eicosane, ergostane, (5α), ergostane, (5β), ethane, ethylbenzene, ethylcyclohexane, 1-ethylcyclohexene, ethylcyclopentane, 1-ethylcyclopentene, 1-ethyl-2,4-dimethylbenzene, 1-ethyl-3,5-dimethylbenzene, 2-ethyl-1,3-dimethylbenzene, 3-ethyl-1,2-dimethylbenzene, 4-ethyl-1,2-dimethylbenzene, 3-ethyl-2,2-dimethylpentane, 3-ethyl-2,3-dimethylpentane, 3-ethylheptane, 4-ethylheptane, 3-ethylhexane, ethylidenecyclohexane, 1-ethyl-2-isopropylbenzene, 2-ethyl-3-methyl-1-butene, trans-1-ethyl-4-methylcyclohexane, 1-ethyl-1-methylcyclopentane, cis-1-ethyl-2-methylcyclopentane, trans-1-ethyl-2-methylcyclopentane, cis-1-ethyl-3-methylcyclopentane, trans-1-ethyl-3-methylcyclopentane, 3-ethyl-4-methylhexane, 4-ethyl-2methylhexane, 3-ethyl-2-methylpentane, 3-ethyl-3-methylpentane, 3-ethyl-2-methyl-1-pentene, 1-ethylnaphthalene, 2-ethylnaphthalene, 3-ethyloctane, 4-ethyloctane, 3-ethylpentane, 2-ethyl-1-pentene, 3-ethyl-1-pentene, 3-ethyl-1-pentene, 3-ethyl-2-pentene, 2-ethylstyrene, 3-ethylstyrene, 4-ethylstyrene, 2-ethyltoluene, 3-ethyltoluene, 4-ethyltoluene, 1-ethyl-2,4,5-trimethylbenzene, 2-ethyl-1,3,5-trimethylbenzene, Fluoranthene, Fulvene, heneicosane, hentriacontane, heptacosane, heptadecane, 1-heptadecene, heptadecylbenzene, 1,6-heptadiene, 1,6-heptadiyne, 2,2,4,4,6,8,8-heptamethylnonane, heptane, 1-heptene, cis-2-heptene, trans-2-heptene, cis-3-heptene, trans-3-heptene, heptylcyclohexane, heptylcyclopentane, 1-heptyne, 2-heptyne, 3-heptyne, hexacene, hexacosane, hexadecane, 1-hexadecene, hexadecylbenzene, 1-hexadecyne, cis-1,3-hexadiene, trans-1,3-hexadiene, cis-1,4-hexadiene, trans-1,4-hexadiene, 1,5-hexadiene, cis,cis-2,4-hexadiene, trans,cis-2,4-hexadiene, trans, trans-2,4-hexadiene, 1,5-hexadien-3-yne, 1,5-hexadiyne, 2,4-hexadiyne, hexaethylbenzene, cis-1,2,3,5,6,8a-hexahydro-4,7-dimethyl-1-isopropylnaphthalene, hexamethylbenzene, 2,6,10,15,19,23-hexamethyltetracosane, hexane, hexatriacontane, cis-1,3,5-hexatriene, trans-1,3,5-hexatriene, 1-hexene, cis-2-hexene, trans-2-hexene, cis-3-hexene, trans-3-hexene, hexylcyclohexane, hexylcyclohexane, hexylcyclopentane, 1-hexylnapthalene, 1-hexyl-1,2,3,4-tetrahydronaphthalene, 1-hexyne, 2-hexyne, 3-hexyne, indan, indeno[1,2,3-cd]pyrene, isobutane, isobutene, isobutylbenzene, isobutylcyclohexane, isobutylcyclopentane, isopentane, isopentylbenzene, isopropenylbenzene, p-isopropenylizopropylbenzene, p-isopropenylstyrene, isopropylcyclohexane, 4-isopropylheptane, 1-isopropyl-2-methylbenzene, 1-isopropyl-3-methylbenzene, 1-isopropyl-4-methylbenzene, 5-isopropyl-2-methyl-1,3-cyclohexadiene, (R), 1-isopropylnaphthalene, 2-isopropylnaphthalene, d-limonene, l-limonene, [2,2]metacyclophane, 1-methylanthracene, 2-methylanthracene, 9-methylanthracene, 7-methylbenz[a]anthracene, 8-methylbenz[a]anthracene, 9-methylbenz[a]anthracene, 10-methylbenz[a]anthracene, 12-methylbenz[a]anthracene, 1-methyl-2-benzylbenzene, 1-methyl-4-benzylbenzene, 2-methylbiphenyl, 3-methylbiphenyl, 4-methylbiphenyl, 3-methyl-1,2-butadiene, 2-methyl-1,3-butadiene, 2-methyl-1-butene, 3-methyl-1-butene, 2-methyl-2-butene, 2-methyl-1-buten-3-yne, 3-methyl-1-butyne, 3-methylchrysene, 5-methylchrysene, 6-methylchrysene, 2-methyl-1,3-cyclohexadiene, 1-methylcyclohexene, 3-methylcyclohexene, (±), 4-methylcyclohexene, 1-methyl-1,3-cyclopentadiene, methylcyclopentane, 1-methylcyclopentene, 3-m ethylcyclopentene, 4-methylcyclopentene, 2-methyldecane, 3-methyldecane, 4-methyldecane, 4-methyl-2,4-diphenyl-1-pentene, methylenecyclohexane, 3-methyleneheptane, 4-methylene-1-isopropylcyclohexene, 5-(1-methylethylidene)-1,3-cyclopentadiene, 1-methyl-9H-fluorene, 9-methyl-9H-fluorene, 2-methylheptane, 3-methylheptane, 4-methylheptane, 2-methyl-1-heptene, 6-methyl-1-heptene, 2-methyl-2-heptene, cis-3-methyl-2-heptene, 2-methylhexane, 3-methylhexane, 2-methyl-1-hexene, 3-methyl-1-hexene, 4-methyl-1-hexene, 5-methyl-1-hexene, 2-methyl-2-hexene, cis-3-methyl-2-hexene, cis-4-methyl-2-hexene, trans-4-methyl-2-hexene, cis-5-methyl-2-hexene, trans-5-methyl-2-hexene, cis-2-methyl-3-hexene, trans-2-methyl-3-hexene, cis-3-methyl-3-hexene, trans-3-methyl-3-hexene, 5-methyl-1-hexyne, 5-methyl-2-hexyne, 2-methyl-3-hexyne, cis-1-methyl-4-isopropylcyclohexane, trans-1-methyl-4-isopropylcyclohexane, 1-methyl-4-isopropylcyclohexene, 1-methyl-7-isopropylphenanthrene, 3-methyl-4-methylenehexane, 1-methyl-4-(5-methyl-1-methylene-4-hexenyl)cyclohexene, (S), 1-methyl-4-(1-methylvinyl)benzene, 1-methylnaphthalene, 2-methylnaphthalene, 2-methylnonane, 3-methylnonane, 4-methylnonane, 5-methylnonane, 2-methyl-1-nonene, 2-methyl-2-norbornene, 2-methyloctane, 3-methyloctane, 4-methyloctane, 2-methyl-1-octene, 7-methyl-1-octene, cis-2-methyl-1,3-pentadiene, 3-methyl-1,3-pentadiene, 4-methyl-1,3-pentadiene, 2-methylpentane, 3-methylpentane, 2-methyl-1-pentene, 3-methyl-1-pentene, 4-methyl-1-pentene, 2-methyl-2-pentene, 3-methyl-cis-2-pentene, 3-methyl-trans-2-pentene, 4-methyl-cis-2-pentene, 4-methyl-trans-2-pentene, 3-methyl-3-penten-1-yne, 4-methyl-1-pentyne, 4-methyl-2-pentyne, 1-methylphenanthrene, 3-methylphenanthrene, 4-methylphenanthrene, 2-methyl-1-propene, tetramer, cis-(1-methyl-1-propenyl)benzene, trans-(1-methyl-1-propenyl)benzene, 1-methyl-2-propylbenz ene, 1-methyl-3-propylbenzene, 1-methylpyrene, 2-methylpyrene, 2-methylstyrene, 3-methylstyrene, 4-methylstyrene, 2-methylundecane, 3-methylundecane, 1-methyl-4-vinylcyclohexane, 13-myrcene, naphthacene, naphthalene, nonadecane, 1,8-nonadiene, 1,8-nonadiyne, nonane, 1-nonene, nonylbenzene, nonylcyclohexane, nonylcyclopentane, 1-nonylnaphthalene, 1-nonyne, octacosane, octadecahydrochrysene, octadecane, 1-octadecene, octadecylbenzene, octadecylcyclohexane, 1,7-octadiene, 1,7-octadiyne, 1,2,3,4,5,6,7,8-octahydroanthracene, octahydroindene, 1,2,3,4,5,6,7,8-octahydrophenanthrene, octane, 1,3,5,7-octatetraene, 1-octene, cis-2-octene, cis-3-octene, trans-3-octene, cis-4-octene, trans-4-octene, 1-octen-3-yne, octylbenzene, octylcyclohexane, octylcyclopentane, 1-octyne, 2-octyne, 3-octyne, 4-octyne, 1,3-pentadiyne, pentaethylbenzene, pentamethylbenzene, 2,2,4,6,6-pentamethylheptane, 2,2,4,6,6-pentamethyl-3-heptene, 2,2,3,3,4-pentamethylpentane, 2,2,3,4,4-pentamethylpentane, pentane, pentaphene, pentatriacontane, 1-pentene, cis-2-pentene, trans-2-pentene, 1-penten-3-yne, 1-penten-4-yne, cis-3-penten-1-yne, trans-3-penten-1-yne, pentylbenzene, pentylcyclohexane, pentylcyclopentane, 1-pentylnaphthalene, 1-pentyne, 2-pentyne, perylene, α-phellandrene, β-phellandrene, phenanthrene, phenylacetylene, 9-phenylanthracene, 2-phenyl-1,3-butadiene, 2-phenyl-1-butene, 1-phenyl-1H-indene, 1-phenylnaphthalene, 2-phenylnaphthalene, 5'-phenyl-1,1':3',1''-terphenyl, picene, propane, propene, cis-1-propenylbenzene, trans-1-propenylbenzene, propylbenzene, propylcyclohexane, propylcyclopentane, 4-propylheptane, 1-propylnaphthalene, pyrene, 1,1':4',1'':4'',1'''-quaterphenyl, spiro[5.5]undecane, squalene, cis-stilbene, trans-stilbene, styrene, o-terphenyl, m-terphenyl, p-terphenyl, α-terpinene, γ-terpinene, tetracosane, tetradecahydrophenanthrene, tetradecane, tetradecylbenzene, tetradecylcyclohexane, 1,2,3,5-tetraethylbenzene, 1,2,3,4-tetrahydro-1,5-dimethylnaphthalene, 1,2,3,4-tetrahydro-1-methylnaphthalene, 1,2,3,4-tetrahydro5-methylnaphthalene, 1,2,3,4-tetrahydro-6-methylnaphthalene, 1,2,3,4-tetrahydronaphthalene, 1,2,3,4-tetrahydrophenanthrene, 1,2,3,4-tetrahydro-1,1,6-trimethylnaphthalene, 1,2,3,4-tetramethylbenzene, 1,2,3,5-tetramethylbenzene, 1,2,4,5-tetramethylbenzene, 2,2,3,3-tetramethylbutane, 1,2,3,4-tetramethylcyclohexane, 1,1,3,3-tetramethylcyclopentane, 1,1,2,2-tetramethylcyclopropane, 2,2,3,3-tetramethylhexane, 2,2,5,5-tetramethylhexane, 3,3,4,4-tetramethylhexane, 2,2,3,3-tetramethylpentane, 2,2,3,4-tetramethylpentane, 2,2,4,4-tetramethylpentane, 2,3,3,4-tetramethylpentane, 1,1,4,4-tetraphenyl-1,3-butadiene, 1,1,2,2-tetraphenylethane, 1,1,2,2-tetraphenylethene, tetraphenylmethane, 5,6,11,12-tetraphenylnaphthacene, triacontane, tricosane, tricyclo[3.3.1$^{3,7}$]decane, tridecane, 1-tridecene, tridecylbenzene, tridecylcyclohexane, 1-tridecyne, 1,2,3-triethylbenzene, 1,2,4-triethylbenzene, 1,3,5-triethylbenzene, 1,2,4-triisopropylbenzene, 1,3,5-triisopropylbenzene, 1,2,3-trimethylbenzene, 1,2,4-trimethylbenzene, 1,3,5-trimethylbenzene, 1,7,7-trimethylbicyclo[2.2.1]heptane, 1,7,7-trimethylbicyclo[2.2.1]hept-2-ene, 2,2,3-trimethylbutane, 2,3,3-trimethyl-1-butene, 1,1,2-trimethylcyclohexane, 1,1,3-trimethylcyclopentane, 1α,2α,4β-1,2,4-trimethylcyclopentane, 2,2,6-trimethylheptane, 2,5,5-trimethylheptane, 3,3,5-trimethylheptane, 3,4,5-trimethylheptane, 2,2,3-trimethylhexane, 2,2,4-trimethylhexane, 2,3,3-trimethylpentane, 2,3,4-trimethylpentane, 2,3,3-trimethyl-1-pentene, 2,4,4-trimethyl-1-pentene, 2,3,4-trimethyl-2-pentene, 1,1,2-triphenylethane, 1,1,2-triphenylethene, triphenylmethane, tritriacontane, 1,10-undecadiyne, undecane,1-undecane, cis-2-undecane, trans-2-undecane, cis-4-undecane, trans-4-undecane, cis-5-undecane, trans-5-undecane, undecylbenzene, 1-undecyne, 2-undecyne, vinylcyclohexane, 1-vinylcyclohexane, 4-vinylcyclohexane, vinylcyclopentane, 6-vinyl-6-methyl-1-isopropyl-3-1-(1-methylethylidene)cyclohexane, (S), 1-vinylnaphthalene, 2-vinylnaphthalene, 2-vinyl-5-norbornene, o-xylene, m-xylene, and p-xylene.

In another embodiment, the solvent comprises as at least one of the group of amines such as tributylamine, triethyamine, triisopropylamine, N,N-dimethylaniline, tris(N, N-dimethylaniline), allyldiethylamine, allyldimethylamine, benzo[f]quinoline, bis[4-(dimethylamino)phenyl]methane, 4,4'bis-(dimethylamino)triphenylmethane, butyldimethylamine, hydrocarbons solvents such as alkanes, alkenes, and alkynes such as pentane, hexane, heptane, octane, cyclopentane, cyclohexane, dipentene, methylcyclohexane, 2-methylpentane, octane, tetrahydrofuran (THF), pinene, styrene, terpinene, and mineral oil, aromatics and heterocyclic aromatic such as toluene, o-xylene, m-xylene, p-xylene, ethylbenzene, cumene (isopropylbenzene), p-cymene (1-methyl-4-isopropylbenzene), mesitylene (1,3,5-trimethylbenzene), propylbenzene, pseudocumene (1,2,4-trimethylbenzene), naphthalene, decalin (cis and trans decahydronaphthalene), tetralin (1,2,3,4-tetrahydronaphthalene), pyrrole, furan, 2,5-diphenylfuran, thiophene, imidazole, pyridine, pyrimidine, pyrazine, quinoline, isoquinoline, indole, acridine, 1,2-dimethylindole, 9,9'-dixanthylidene, 2,6-lutidine (2,6-dimethylpyridine), 2-picoline (2-methylpyridine), and nitriles such as acetonitrile and propanenitrile. In an embodiment, the amino group is bound to aryl. Suitable amino solvents are N,N-dimethylanline analogs such as N-benzyl-N-ethylaniline, preferably with multiple alkylated amino groups 0 on an aryl such as 1, 3, 5-tris-(N,N-dimethylamino)benzene.

In another embodiment, the solvent comprises as at least one of the group and derivatives of dimethylformamide (DMF), dimethylacetamide (DMA), dimethylsulfoxide (DMSO), 1,3-dimethyl-2-imidazolidinone (DMI), hexamethylphosphoramide (HMPA), N-methyl-2-pyrrolidone (NMP), 4-dimethylaminobenzaldehyde, acetone, dimethyl acetone-1,3-dicarboxylate, 3',4'-dimethylacetophenone, dimethyl methylphosphonate, hexamethylcyclotrisiloxane, hexamethylphosphorous triamide, tributyl phosphite, tributyl borate, triethyl borate, tri-n-butyl borate, triphenylboron, triethyl phosphite, triethylphosphine, tri-n-butylphosphine, trimethyl borate, trimethylene borate, trimethyl phosphite, triphenyl phosphite, tris(phenyl)phosphine, organometallic such as ferrocene, nickelocene, organometallics, dimethyl selenium, dimethyl telluride, tretraethyl lead, ethyltrimethyllead, tetra-n-butyllead, phenylthiobenzene, and diphenyl seleninde, trimethyl stibine, tetra-n-butylgermanium, tetrapropyl titanate, tetrabutyl titanate, tributyl aluminate, tributyl aluminum, triethyl stibine, trimethylarsine, trimethyl indium, and triphenylstibine, alkyl sulfides such as diethyl sulfide and bis(phenyl) sulfide, alkyl selenides such as diethyl selenides, alkyl tellurides such as diethyl telluride, diethylsulfoxide, allyl ethyl ether, aluminum ethanolate, aluminum ethoxide, aluminum sec-butoxide, trimethyl borate, triethyl borate, tripropyl borate, tributyl borate, trihexyl borate, triphenylstibine, 1,3-benzodioxole, benzofuran, 2H-1-benzopyran, benzothiazole, benzo[b]thiophene, benzoxazole, N-benzyl-N-ethylaniline, benzyl ethyl ether, benzyl methyl ether, benzyl phenyl ether, 2,2'-bipyridine, 1,3-bis(1-methyl-4-piperidyl)propane, bis (4-methylphenyl) ether, bis(phenyl) ether, bis(4-methylphenyl) sulfide, bis(methylthio)methane, 1,2-bis(N-morpholino)ethane, 2,2'-bithiophene, 1-(2-butoxyethoxy)-2-propanol, 1-butoxy-4-methylbenzene, 4-[3-(4-butoxyphenoxy)propyl]morpholine, butyl ethyl ether, sec-butyl ether, t-butyl ethyl ether, butyl ethyl sulfide, t-butyl ethyl sulfide, butyl isobutyl ether, t-butyl isobutyl ether, t-butyl isopropyl ether, 1-t-butyl-4-methoxybenzene, butyl methyl ether, sec-butyl methyl ether, butyl phenyl ether, N-butylpiperidine, butyl propyl ether, butyl vinyl ether, t-butyl vinyl ether, dibenzyl ether, 1,4-dibutoxybenzene, 1,2-dibutoxyethane, dibutoxymethane, dibutyl ether, di-sec-butyl ether, di-tert-butyl ether, dicyclomine hydrochloride, diethyl ether, dicyclopentyl ether, 1,2-diethoxybenzene, 1,4-diethoxybenzene, 1,1-diethoxy-N,N-dimethylmethanamine, 1,1-diethoxyethane, 1,2-diethoxyethane, diethoxymethane, 2-(diethoxymethyl)furan, 1,1-diethoxypentane, 1,1-diethoxypropane, 2,2-diethoxypropane, 3,3-diethoxy-1-propene, 3,3-diethoxy-1-propyne, N,N-diethylaniline, diethylene glycol dibutyl ether, diethylene glycol diethyl ether, diethylene glycol dimethyl ether, diethyl telluride, difurfuryl ether, diheptyl ether, dihexyl ether, 2,3-dihydro-1,4-benzodioxin, 2,3-dihydrobenzofuran, 3,4-dihydro-1H-2-benzopyran, 3,4-dihydro-2H-1-benzopyran, 2,5-dihydro-2,5-dimethoxyfuran, 2,3-dihydro-1,4-dioxin, 3,6-dihydro-4-methyl-2H-pyran, 4,5-dihydro-2-methylthiazole, 3,4-dihydro-2H-pyran, 3,6-dihydro-2H-pyran, diisopentyl ether, diisopropyl ether, 1,2-dimethoxybenzene, 1,3-dimethoxybenzene, 1,4-dimethoxybenzene, 1,2-dimethoxyethane, 4,8-dimethoxyfuro[2,3-b]quinoline, dimethoxymethane, 1,2-dimethoxy-4-methylbenzene, 1,3-dimethoxy-5-methylbenzene, 1,4-dimethoxy-2-methylbenzene, 1,2-dimethyl-1H-imidazole, 1,3-dimethyl-1H-indole, dimethyl selenide, 1,3-dioxane, 1,3-dioxepane, 1,3-dioxolane, 1,2-diphenoxythane, diphenyl selenide, 1,2-dipropoxyethane, dipropoxymethane, dipropyl ether, divinyl ether, divinyl sulfide, 3-ethoxy-N,N-diethylaniline, 2-ethoxy-3,4-dihydro-2H-pyran, 1-ethoxy-2-methoxyethane, ethyltrimethyllead, Indolizine, 4-methoxypyridine, 6-methoxyquinoline, 1-methyl-3-phenoxybenzene, 1-methyl-4-(phenylthio)benzene, methyltriethyllead, 1,4-oxathiane, oxazole, oxepane, pteridine, tetraethoxygermane, titanium(IV) n-butoxide, tetrapropyl titanate, tributyl aluminate, tributylaluminum, tributyl borate, tributyl phosphite, 1,3,5-triethoxybenzene, triethyl borate, triethylphosphine, triethyl phosphite, triethylstibine, trimethylindiuim, trimethyl phosphite, trimethylstibine, triphenylstibine, N-(1-cyclopenten-1-yl)pyrrolidine, cyclopentyl methyl sulfide, decamethylcyclopentasiloxane, decamethyltetrasiloxane, N,N-diallyl-2-propen-1-amine, diallyl sulfide, dibenzofuran, benzo[b]thiophene, dibenzothiophene, dibenzyl sulfide, N,N-dibutylaniline, 2,6-di-tert-butylpyridine, dibutyl sulfide, di-sec-butyl sulfide, di-tert-butyl sulfide, didecyl ether, diethylmethylamine, N,N-diethyl-2-methylaniline, N,N-diethyl-4-methylaniline, N,N-diethyl-1-naphthalenamine, N,N-diethyl-10H-phenothiazine-10-ethanamine, N,N-diethyl-a-phenylbenzenemethanamine, diethyl sulfide, diheptyl sulfide, dihexyl sulfide, 2,3-dihydrofuran, 2,5-dihydrofuran, 2,3-dihydro-2-methylbenzofuran, 2,3-di hydrothiophene, 2,5-dihydrothiophene, diisobutyl sulfide, diisopentyl sulfide, diisopropyl sulfide, 1,2-dimethoxy-4-allylbenzene, 4,7-dimethoxy-5-allyl-1,3-benzodioxole, 4,4'-dimethoxy-1,1'-biphenyl, 1,1-dimethoxydodecane, (2,2-dimethoxyethyl)benzene, 1,1-dimethoxyhexadecane, 1,2-dimethoxy-4-(1-propenyl)benzene, 4,5-dimethoxy-6-(2-propenyl)-1,3benzodioxole, 1,2-dimethoxy-4-vinylbenzene, 2-(p-dimethylaminostyryl)benzothiazole, 2,6-dimethyl anisole, 3,5-dimethylanisole, 2,5-dimethylbenzoxazole, N,N-dimethylbenzylamine, N,N-dimethyl-N'-benzyl-N'-2-pyridinyl-1,2-ethanediamine, 4'-dimethyl-2,2'-bipyridine, dimethyldecylamine, dimethyl ether, (1,1-dimethylethoxy)benzene, 2,5-dimethylfuran, N,N-dimethyl-1-naphthylamine, N,N-dimethyl-2-naphthylamine, 2,9-dimethyl-1,10-phenanthroline, 1,4-dimethylpiperazine, 1,2-dimethylpiperidine, N,N-dimethyl-1-propanamine, 2,3-dimethylpyrazine, 2,5-dimethylpyrazine, 2,6-dimethylpyrazine, 1,3-dimethyl-1H-pyrazole, N,N-dimethyl-2-pyridinamine, N,N-dimethyl-4-pyridinamine, 2,3-dimethylpyridine, 2,4-dimethylpyridine, 2,5-dimethylpyridine, 2,6-dimethylpyridine, 3,4-dimethylpyridine, 3,5-dimethylpyridine, 4,6-dimethylpyrimidine, 1,2-dimethylpyrrolidine, 2,4-dimethylquinoline, 2,6-dimethylquinoline, 2,7-dimethylquinoline, 2,3-dimethylquinoxaline, dimethyl sulfide, dimethyl telluride, 2,5-dimethyl-1,3,4-thiadiazole, 2,7-dimethylthianthrene, 2,4-dimethylthiazole, 4,5-dimethylthiazole, 2,3-dimethylthiophene, 2,4-dimethylthiophene, 2,5-dimethylthiophene, 3,4-dimethylthiophene, 2,6-dimethyl-4-tridecylmorpholine, dinonyl ether, dioctyl ether, dioctyl sulfide, dipentyl ether, dipentyl sulfide, 2,5-diphenyloxazole, diphenylpropyl)piperidine, 1,4-bis(4-methyl-5-phenloxazol-2-yl)benzene, diphenyl sulfide, N,N-dipropylaniline, dipropyl sulfide, 1,3-dithiane, 1,4-dithiane, 1,3-dithiolane, 1-dodecylpiperidine, dothiepin, doxepin, doxylamine, 1-ethoxy-3-methylbenzene, 1-ethoxy-4-methylbenzene, 2-ethoxy-2-methylbutane,1-ethoxynaphthalene, 2-ethoxynaphthalene, 2-ethyl-1H-benzimidazole, 9-ethyl-9H-carbazole, ethyldimethyl amine, 3-ethyl-2,5-dimethylpyrazine, 2-ethylfuran, ethyl hexyl ether, 1-ethyl-1H-imidazole, ethyl isopentyl ether, ethyl isopropyl ether, N-ethyl-N-isopropyl-2-propanamine, ethyl isopropyl sulfide, 1-ethyl-4-methoxybenzene, N-ethyl-N-methylaniline, 1-ethyl-2-methyl-1H-benzimidazole, 2-ethyl-2-methyl-1,3- dioxolane, ethyl methyl ether, 2-ethyl-5-methylpyrazine, 3-ethyl-4-methylpyridine, 4-ethyl-2-methylpyridine, ethyl methyl sulfide, N-ethylmorpholine, 1-ethylpiperidine, ethyl propyl ether, 2-(1-ethylpropyl)pyridine, 4-(1-ethylpropyl) pyridine, ethyl propyl sulfide, 2-ethylpyrazine, 2-ethylpyridine, 3-ethylpyridine, 4-ethylpyridine, 1-ethyl-1H-pyrrole, 2-ethyltetrahydrofuran, (ethylthio)benzene, ethyl thiocyanate, 1-(ethylthio)-4-methylbenzene, 2-ethylthiophene, ethyl vinyl ether, hexabutyldistannoxane, hexadecyldimethylamine, hexadecyl vinyl ether, 2,3,4,6,7,8-hexahydropyrrolo[1,2-a]pyrimidine, hexahydro-1,3,5-triphenyl-1,3,5-triazine, hydrocotarnine, hydrohydrastinine, imipramine, isobutyldimethylamine, isopropyl methyl ether, isopropyl methyl sulfide, isorpopyl propyl sulfide, (isopropylthio)benzene, isopropyl vinyl ether, mebhydroline, 2-methoxy-1,1'-biphenyl, 4-methoxy-1,1'-biphenyl, 1-methoxy-1,3-butadiene, 2-methoxy-1,3-butadiene, 1-methoxy-1-buten-3-yne, methoxycyclohexane, (2-methoxyethoxy)ethene, 2-(2-methoxyethyl)pyridine, 2-methoxyfuran, 4-methoxyfuro[2,3-b]quinoline, 2-methoxy-2-methlybutane, 2-(methoxymethyl)furan, 1-methoxynaphthalene, 2-methoxynaphthalene, trans-1-methoxy-4-(2-phenylvinyl)benzene, 2-methoxy-1-propene, 3-methoxy-1-propene, trans-1-methoxy-4-(1-propenyl)benzene, 1-methoxy-4-(2-propenyl)benzene, 1-methoxy-4-propylbenzene, 2-methoxypyridine, 3-methoxypyridine, 3-methoxypyridine, (2-methoxyvinyl)benzene, 2-methylanisole, 3-methylanisole, 4-methylanisole, 1-methyl-1H-benzimazole, 2-methylbenzofuran, 2-methylbenzothiazole, 2-methylbenzoxazole, 4-methyl-N,N-bis(4-methylphenyl)aniline, [(3-methylbutoxy)methyl] benzene, 1-[2-(3-methylbutoxy)-2-phenylethyl]pyrrolidine, methyl tert-butyl ether, 3-methyl-9H-carbazole, 9-methyl-9H-carbazole, 2-methyl-N,N-dimethylaniline, 3-methyl-N,N-dimethylaniline, 4-methyl-N,N-dimethylaniline, methyldioctylamine, 4-methyl-1,3-dioxane, 2-methyl-1,3-dioxolane, methyldiphenylamine, 1-(1-methylethoxy) butane, 2-[2-(1-methylethoxy)ethyl]pyridine, 1-(1-methylethoxy)propane, 2-methylfuran, 3-methylfuran, 1-methylimidazol, 1-methyl-1H-indole, 1-methylisoquinoline, 3-methylisoquinoline, 4-methylisoxazole, 5-methylisoxazole, 4-methylmorpholine, methyl-1-naphthylamine, 2-methyloxazole, 4-methyloxazole, 5-methyloxazole, 2-methyl-2-oxazoline, 3-(4-methyl-3-pentenyl)furan, methyl pentyl ether, methyl pentyl sulfide, methyl tert-pentyl sulfide, 10-methyl-10H-phenothiazine, N-methyl-N-phenylbenzenemethanamine, 1-methyl-N-phenyl-N-benzyl-4-piperidinamine, 2-methyl-5-phenylpyridine, 1-methylpiperidine, 4-(2-methylpropenyl)morpholine, methyl propyl ether, 1-methyl-2-propylpiperidine, (S), methyl propyl sulfide, N-methyl-N-2-propynylbenzenemethanamine, 2-methylpyrazine, 1-methyl-1H-pyrazole, 3-methylpyridine, 4-methylpyridine, 2-methylpyrimidine, 4-methylpyrimidine, 5-methylpyrimidine, 1-methylpyrrole, N-methylpyrrolidine, 3-(1-methyl-2-pyrrolidinyl)pyridine, (±), 2-methylquinoline, 3-methylquinoline, 4-methylquinoline, 5-methylquinoline, 6-methylquinoline, 7-methylquinoline, 8-methylquinoline, 2-methylquinoxaline, 2-methyltetrahydrofuran, 2-methylthiazole, 4-methylthiazole, (methylthio)benzene, (methylthio)ethene, [(methylthio) methyl]benzene, 2-methylthiophene, 3-methylthiophene, 3-(methylthio)-1-propene, methysticin, 2-(4-morpholinothio)benzothiazole, myristicin, 1,5-naphthyridine, 1,6-naphthyridine, nicotelline, octyl phenyl ether, orphenadrine, papaverine, 2-(3-pentenyl)pyridine, perazine, phenanthridine, 1,7-phenanthroline, 1,10-phenanthroline, 4,7-phenanthroline, phenazine, phendimetrazine, phenindamine, 9-phenylacridine, N-phenyl-N-benzylbenzenemethanamine, 2-(2-phenylethyl)pyridine, 2-phenylfuran, 1-phenyl-1H-imidazole, 4-phenylmorpholine, 1-phenylpiperidine, phenyl propyl ether, 4-(3-phenylpropyl)pyridine, 2-phenylpyridine, 3-phenylpyridine, 4-phenylpyridine, 1-phenyl-1H-pyrrole, 1-phenylpyrroleidine, 2-phenylquinoline, phenyl vinyl ether, piprotal, promazine, promethazine, trans-5-(1-propenyl)-1,3-benzodioxole, 5-propyl-1,3-benzodioxole, 2-propylpyridine, 4-propylpyridine, (propylthio)benzene, propyl vinyl ether, 4H-pyran, pyrantel, pyrilamine, quinazoline, safrole, 2,2':6',2''-terpyridine, 2,2':5,2''-terthiophene, tetrabutyl titanate, tetraethoxymethane, tetraethylene glycol dimethyl ether, N,N,N',N'-tetraethyl-1,2-ethanediamine, 1,2,3,4-tetrahydro-6,7-dimethoxy-1,2-dimethylisoquinoline, (±), 4,5,6,7-tetrahydro-3,6-dimethylbenzofuran, cis-tetrahydro-2,5-dimethylthiophene, 3,4,5,6-tetrahydro-7-methoxy-2H-azepine, 1,2,3,6-tetrahydro-1-methyl-4-phenylpyridine, tetrahydro-3-methyl-2H-thipyran, 2,3,4,5-tetrahydro-6-propylpyridine, tetrahydropyran, 5,6,7,8-tetrahydroquinoline, tetrahydrothiophene, N,N,2,6-tetramethylaniline, N,N,N',N'-tetramethyl-1,4-benzenediamine, N,N,N',N'-tetramethyl-[1,1'-biphenyl]-4,4'-diamine, N,N,N',N'-tetramethyl-1,4-butanediamine, N,N,N',N'-tetramethyl-1,2-ethanediamine, N,N,N',N'-tetramethyl-1,6-hexanediamine, thenaldine, thenyldiamine, thiacyclohexane, 1,2,5-thiadiazole, thianthrene, thiazole, thiepane, thiethylperazine, thioridazine, 9H-thioxanthene, tipepidine, tributylamine, 1,1,1-triethoxyethane, triethoxymethane, 1,1,1-triethoxypropane, triethylaluminum, triethylamine, triethylarsine, triethylene glycol dimethyl ether, trifenmorph, trihexylamine, trihexyl borate, triisobutyl aluminate, triisobutylaluminum, triisobutylamine, triisopentylamine, triisopropoxymethane, triisopropyl borate, triisopropyl phosphite, 1,3,5-trimethoxybenzene, trimethoxyboroxin, 1,1,1-trimethoxyethane, trimethoxymethane, trimethyl aluminum, trimethylamine, trimethylarsine, trimethylborane, trimethyl borate, 1,2,4-trimethylpiperazine, trimethylpyrazine, 2,3,6-trimethylpyridine, 2,4,6-trimethylpyridine, 1,2,5-trimethyl-1H-pyrrole, N,N,2-trimethyl-6-quinolinamine, triphenylarsine, triphenyl phosphite, 2,4,6-triphenyl-1,3,5-triazine, triprolidine, tripropylamine, tripropylborane, tripropyl borate, tripropyl phosphite, tris(4-dimethylaminophenyl)methane, tris(ethylthio) methane, tris(2-methylphenyl)phosphine, tris(3-methylphenyl)phosphine, tris(4-methylphenyl)phosphine, 2,46-tris(2-pyridinyl)-1,3,5-tiazine, tris(o-tolyl)phosphite, 9-vinyl-9H-carbazole, 2-vinylfuran, 1-vinyl-2-methoxybenzene, 1-vinyl-3-methoxybenzene, 1-vinyl-4-methoxybenzene, 2-vinylpyridine, 3-vinylpyridine, 4-vinylpyridine, 9H-xanthene, dibenzofuran, 3,4-dihydro-2H-benzopyran, alverine, aluminum 2-butoxide, aluminum isopropoxide, antazoline, 1-benzylpiperidine, 2-benzylpyridne, 4-benzylpyridne, 1-benzyl-1H-pyrrole, (benzylthio)benzene, 2,2'-bipyridine, 2,3'-bipyridine, 2,4'-bipyridine, 3,3'-bipyridine, 4,4'-bipyridine, 2,2'-biquinoline, 1,3-bis(1-methyl-4-piperidyl)propane, butyl methyl sulfide, t-butyl methyl sulfide, 4-butyl morpholine, 4-t-butylpyridine, 2-butylthiophene, cusparine, cyclizine, 4-(3-cyclohexen-1-yl)pyridine, cyclohexyldiethylamine, cyclohexyldimethylamine, silicon-based solvents such as silanes, disilanes, siloxanes, and disiloaxanes preferably hexamethyldisiloxane, $(CH_3)_3SiOCH_2CH_2CH_3$, and $(CH_3)_2Si(OCHCH_2CH_3)_2$, halogenated silanes, siloxanes, and disiloxanes, preferably fluorinated, and ionic liquids such as imidazolium and alkyl imidazolium salts, preferably methylimidazolium chloride and other similar compounds. Further fluorosolvents or sources thereof comprise tetrafluorosilane, hexafluorodisilane, $Si_nF_{2n+2}$ such as $Si_{16}F_{34}$, $M_2SiF_6$ wherein M is an alkali metal such as $Na_2SiF_6$ and $K_2SiF_6$, $MSiF_6$ wherein M is an alkaline earth metal such as $MgSiF_6$, $GaF_3$, $PF_5$, and $MPF_6$ wherein M is an alkali metal.

The solvent may comprise a polymer. The polymer solvent may provide a low vapor pressure at the operating temperature of the cell, preferably the polymer is a liquid at the operating temperature of the cell. One such polymeric solvent is polypropylene glycol or polypropylene oxide.

Other solvents are those known in the art having the property that they solvate NaH molecules. Mixtures of solvents may be in any molar ratio. Suitable solvents comprise at least one of the group of toluene, naphthalene, heaxfluorbenzene, 1,4-dioxane, 1,3-dioxane, trioxane, 1,4-benzodioxane, 1,2-dimethoxyethane, and N,N-dimethylaniline, bis(phenyl) ether, 1,4-dioxin, dibenzodioxin or dibenzo[1,4]dioxin, and divinyl ether.

In an embodiment comprising a liquid solvent, the catalyst NaH is at least one of a component of the reaction mixture and is formed from the reaction mixture. The reaction mixture may further comprise at least one of the group of NaH, Na, $NH_3$, $NaNH_2$, $Na_2NH$, $Na_3N$, $H_2O$, NaOH, NaX (X is an anion, preferably a halide), $NaBH_4$, $NaAlH_4$, Ni, Pt black, Pd black, R-Ni, R-Ni doped with a Na species such as at least one of Na, NaOH, and NaH, a HSA support, getter, a dispersant, a source of hydrogen such as $H_2$, and a hydrogen dissociator. Preferably, the support does not form an oxide with components of the reaction mixture such NaOH and the solvent such an ether, preferably BDO. In this case, the support may be a noble metal such as at least one of Pt, Pd, Au, Ir, and Rh or a supported noble metal such as Pt or Pd on titanium (Pt or Pd/Ti).

An exemplary reaction mixture comprises NaH or a source of NaH, at least one of high-surface area nickel powder, high-surface area cobalt powder, and a rare earth metal powder, preferably La, and an ether solvent, preferably, 1,4-benzodioxane (BDO).

In an embodiment, the reaction mixture comprises NaH+solvent+support wherein (1) the support comprises at least one support chosen from reduced high-surface-area Ni powder, La powder, and carbon such as nanotubes, preferably single-walled, graphite, graphene, diamond-like carbon (DLC), hydrogenated diamond-like carbon (HDLC), diamond powder, graphitic carbon, glassy carbon, and carbon with other metals such as Pd or Pt/carbon or dopants comprising other elements such as fluorinated carbon, preferably fluorinated graphite or fluorinated diamond; and (2) the solvent comprises an ether such as 1,4-dibenzodioxane (BDO), dimethoxyethane (DME), 1,4-dioxane, and biphenylether, N,N-dimethylaniline (DMAn), perfluorinated alkane or aryl such as hex afluorbenzene, hexamethylphosphoramide (HMPA), protic amine, and toluene. In other embodiments, at least one of Na, K, KH, Li, and LiH replaces NaH. In an embodiment, the reaction mixture comprises species from the group of Na, NaH, NaF, a solvent, preferably a fluorinated carbon-based solvent, and a HSA material such as carbon, preferably single-walled nanotubes.

Suitable reaction mixtures comprises at least one of the group of (1) NaH, hexafluorobenzene, and at least one of single-walled nanotubes, Pr powder, activated carbon, and mesoporous carbon doped with Al, La, Y, or Ni powder or the corresponding carbide, (2) NaH or KH, 1,4-dibenzodioxane (BDO), and at least one of La powder, Nd powder, and a carbide of Al, La, Y, and Ni, (3) NaH, dioxane, and Co or Nd powder, (4) NaH, NaOH, BDO, and Teflon powder. The weight percentages may be in any proportions, preferably they are about equivalent. In another embodiment, the reaction mixture comprises species chosen from Na, NaH, a solvent, preferably an ether solvent, and a HSA material such as a metal, preferably a rare earth. A suitable reaction mixture comprises NaH, 1,4-dibenzodioxane (BDO), and La. The weight percentages may be in any proportions, preferably they are about 10/45/45 wt %, respectively. In another exemplary power cell embodiment, the reaction mixture comprises NaH, R-Ni or high-surface-area Ni powder, and an ether solvent. In certain chemical cell embodiments, the reaction mixture further comprises a getter for hydrino hydride ions and molecular hydrino such as an alkali halide, preferably a sodium halide such as at least one of NaF, NaCl, NaBr, and NaI.

In an embodiment, the solvent has a halogen functional group, preferably fluorine. A suitable reaction mixture comprises at least one of hexafluorobenzene and octafluoronaphthalene added to a catalyst such as NaH, and mixed with a support such as activated carbon, a fluoropolymer or R-Ni. In an embodiment, the reaction mixture comprises one or more species from the group of Na, NaH, a solvent, preferably a fluorinated solvent, and a HSA material. The HSA material may comprise at least one of a metal or alloy coated with carbon such as at least one of Co, Ni, Fe, Mn, and other transition metal powders, preferably nanopowder, having preferably one to ten carbon layers and more preferably three layers according to methods known by those skilled in the art; metal or alloy coated carbon, preferably nanopowder, such as a transition metal preferably at least one of Ni, Co, and Mn coated carbon, and a fluoride, preferably a metal fluoride. Preferably, the metal is capable of being coated with an unreactive layer of fluoride such as steel, nickel, copper, or Monel metal. The coated metal may be a powder having a high surface area. Other suitable metals are the rare earths such as La with a fluoride coating that may comprise $LaF_x$ such as $LaF_3$. In certain embodiments, the metal fluoride is more stable than MF wherein M is the catalyst or a source of catalyst such as Li, Na, and K. In a further embodiment, the reaction mixture further comprises a fluoride such as a metal fluoride. The fluoride may comprise the metal of the catalyst such as NaF, KF, and LiF and may further comprise transition, noble, intermetallic, rare earth, lanthanide, preferably La or Gd, and actinide metal, Al, Ga, In, Tl, Sn, Pb, metalloids, B, Si, Ge, As, Sb, Te, Y, Zr, Nb, Mo, Tc, Ru, Rh, Pd, Ag, Cd, Hf, Ta, W, Re, Os, Ir, Pt, Au, Hg, alkali metal, and alkaline earth metals. The fluoride may comprise a getter as well as a HSA material. In an embodiment, the metal may comprise an alloy such as $LaNi_5$ and Ni—Y alloy or a carbide, preferably resistant to forming an inorganic fluoride.

A suitable fluorinated solvent for regeneration is $CF_4$. A suitable support or HSA material for a fluorinated solvent with NaH catalysts is NaF. In an embodiment, the reaction mixture comprises at least NaH, $CF_4$, and NaF. Other fluorine-based supports or getters comprise $M_2SiF_6$ wherein M is an alkali metal such as $Na_7SiF_6$ and $K_2SiF_6$, $MSiF_6$ wherein M is an alkaline earth metal such as $MgSiF_6$, $GaF_3$, $PF_5$, $MPF_6$ wherein M is an alkali metal, $MHF_2$ wherein M is an alkali metal such as $NaHF_2$ and $KHF_2$, $K_2TaF_7$, $KBF_4$, $K_2MnF_6$, and $K_2ZrF_6$ wherein other similar compounds are anticipated such as those having another alkali or alkaline earth metal substitution such as one of Li, Na, or K as the alkali metal.

In an embodiment, the solvent comprises fluorine and at least one other element wherein the at least one-other-element-based fluorides are stable thermodynamically or kinetically to NaH reaction and are preferably liquid at the cell operating temperature which can be between 200° C. to 700° C. The other element may be Si, Te, Se, or Sb. The solvent may be $Si_xF_y$ wherein x and y are integers. In another embodiment, the solvent chemistry with NaH or any other reactant of the reaction mixture is reversible chemistry such as a reversible reaction of NaF and $H_2$ to a fluorinated solvent, preferably comprising carbon, and NaH. In an embodiment comprising NaH and a fluorinated solvent, $H_2$ is supplied to the fluorinated solvent reaction such that NaH is less reactive than Na towards any C—F bonds and the $H_2$ reduces the amount of Na.

In an embodiment, at least one of a fluorinated solvent and a HSA material are protected from attack to form NaF. Fluorocarbons are stable to strong bases, and in an embodiment, the source of NaH catalysts is a strong base. The source may be at least one of Na, NaH, $NaNH_2$, $NH_3$, NaOH, $Na_2O$, and a source of hydrogen such as at least one of a hydride and $H_2$ and dissociator. Exemplary reactions to form the catalyst NaH, some regenerative, are given by Eqs. (158-161), (168), and (177-183), set forth below. A cycle of NaOH to form the NaH catalyst is given by Eqs. (158-161). The reaction given by Eq. (158) may limit the amount of Na to react with a fluorocarbon solvent. A reductant may be added to the reaction mixture having NaOH to form NaH and an oxide of the reductant. The reactant may be recycled by reduction of the oxide with hydrogen that may further yield NaOH. The hydrogen may be dissociated by a dissociator. The reductant may be a metal having a corresponding oxide that can be reduced by hydrogen such as Cr, Fe, Sn, and Zn. Alternatively, the oxide such as ZnO can be reduced to the metal by heating to high temperature such as about 1750° C. In other embodiments, the fluorinated solvent may be replaced by another type such as at least one of an ether, preferably one of dibenzodioxin, dibenzo-1,4-dioxane, dioxane, and dimethoxyethane, and a hydrocarbon such as at least one of toluene, xylene, benzene, naphthalene, naphthacene, phenanthrene, chrysene, fluoranthene, and pyrene. The support may be a metal preferably at least one of La, Pr, Co, and Nd.

A suitable reaction mixture comprises NaH or a source of NaH, a solvent, preferably a fluorocarbon such as $CF_4$, hexafluorobenzene (HFB), or perfluoroheptane, a support, preferably comprising carbon and a metal, and optionally hydrogen. The carbon may preferably comprise activated carbon (AC), but may also comprise other forms such as glassy carbon, coke, graphitic carbon, and carbon with a dissociator metal such as Pt or Pd wherein the wt % is 0.1 to 5 wt %. The metal may be in the form of at least one of a metal powder, hydride, or carbide, such as at least one of the group of an alkali metal, an alkaline earth metal, preferably Mg as $MgH_2$, Al as a metal or carbide such as $Al_4C_3$, a rare earth metal or carbide, preferably La, a metal or alloy, preferably nanopowder, coated with carbon such as at least one of Co, Ni, Fe, Mn, and other transition metal powders having preferably one to ten carbon layers and more preferably three layers, and a metal or alloy coated carbon, preferably nanopowder, such as a transition metal preferably at least one of Ni, Co, and Mn coated carbon. The metal may be intercalated with the carbon. In the case that the intercalated metal is Na and the catalyst is NaH, preferably the Na intercalation is saturated. The reactants can be in any desired proportions such as (1) NaH (14 wt %), HFB (14 wt %), AC (58 wt %), and $MgH_2$(14 wt %); (2) NaH (14 wt %), HFB (14 wt %), AC (58 wt %), and Al (14 wt %); (3) NaH (14 wt %), HFB (14 wt %), AC (58 wt %), and $Al_4C_3$ (14 wt %); (4) NaH (14 wt %), HFB (14 wt %), AC (58 wt %), and carbon-coated Co nanopowder (14 wt %); (5) NaH (14 wt %), HFB (14 wt %), AC (58 wt %), and La (14 wt %). In other embodiments, AC, activated carbon, is replaced by mesoporous carbon, and in others the solvent is increased, preferably by a factor of two to three relative to the other reactants. In other embodiments, another catalyst such as K or Li replaces NaH catalyst.

In one general embodiments, the reaction mixture comprises a component called a protecting agent or blocking agent that at least partially suppresses an undesired reaction of one component of the mixture with another. Preferably, the protecting agent or blocking agent is nonreactive with a solvent or a support. Strong bases are nonreactive towards fluorocarbons; whereas, Na is. Thus, in an embodiment, at least one of $H_2$, NaOH, $NaNH_2$ and $NH_3$ may be added to the reaction mixture as a blocking agent to react with any Na formed during the reaction to form hydrino to prevent it from reacting with a support such as a fluorocarbon support. An exemplary reaction mixture comprises NaH, a blocking agent such as at least one of NaOH, $NaNH_2$, $NH_3$, $H_2$, a solvent such as at least one of BDO, crown ether, polypropylene oxide, $CF_4$, and HFB, and a support comprising at least a fluorocarbon such as Teflon powder. Exemplary protective agents are hydride and carbide. The protected reactant may be a metal support. The reaction may comprise NaH, and ether solvent such as BDO, and a metal hydride such as a rare earth metal hydride or a carbide such as at least one of Al, rare earth, and transition metal carbides.

In a second general embodiments, the reaction mixture is substantially stable over long duration towards reaction amongst components other than forming hydrinos. Preferably, the solvent such as a polar solvent is nonreactive with the catalyst or a support. For example, an ether solvent is nonreactive towards NaH as a source of catalyst, a fluorocarbon support, or a rare earth powder, hydride or carbide at a suitably low reaction temperature such as less than 350° C. Thus, an exemplary reaction mixture comprises NaH, an ether solvent such as BDO, dioxane, or a crown ether, and a rare metal powder support such as La powder. Another support comprises an alloy resistant to reaction with the solvent such as $LaNi_5$.

In a third general embodiments, the reaction mixture comprises reactants that form hydrinos at a high yield as a side reaction amongst components also occurs. The reactants may be regenerated to run another cycle to form hydrinos. An exemplary reaction mixture comprises NaH, a fluorocarbon solvent such as $CF_4$, and a support such as at least one of Teflon, fluorinated graphite, activated carbon, graphene, and mesoporous carbon plus at least one of Al, La, Co, Ni, Mn, Y, and Fe powder and their carbides. Preferably the metal and carbide comprise a mixture such as one of Ni, Co, Mn. The metals and carbides may be in any wt % ratio. Preferably, the composition and weight percent (%) ratios are about 20 to 25% Ni, 60 to 70% Co, and 5 to 15% Mn. In another, the metal and carbide comprise a mixture with other elements such as one of Ni, Co, Mn, Fe, S, and Ca. The metals and carbides and other elements may be in any wt % ratio. Preferably, the composition and weight percent (%) ratios are about 20±5% Ni, 65±5% Co, 10±5% Mn, 1±5% Fe, 1%±2 S, and 0.5±2% Ca. In other embodiments, the carbon support comprises a high-surface-area carbon such as activated carbon or mesoporous carbon and at least one metal that forms a less thermodynamically stable fluoride than NaF such as nickel, iron, iridium, vanadium, lead, molybdenum, and tungsten.

Other embodiments comprise reaction mixtures involving any combination of these three general embodiments based on these, any combination of, or any alternative reaction strategy or pathway.

In an embodiment, the source or sources to provide the catalyst and atomic hydrogen comprise at least one of amides such as $LiNH_2$, imides such as $Li_2NH$, nitrides such as $Li_3N$, and catalyst metal with $NH_3$. Reactions of these species provide both Li atoms and atomic hydrogen. Additionally, K, Cs, and Na may replace Li, and the catalyst is atomic K, atomic Cs, and molecular NaH. In another embodiment of a reaction mixture comprising a liquid solvent, the catalyst is Li. The reaction mixture may further comprise species of the group of Li, $LiNH_2$, $Li_2NH$, $Li_3N$, $LiNO_3$, LiX, $NH_4X$ (X is an anion, preferably a halide), $NH_3$, R-Ni, a HSA support, getter, a dispersant, a source of hydrogen such as $H_2$, and a hydrogen dissociator.

b. Inorganic Solvents

In another embodiment, the reaction mixture comprises at least one inorganic solvent. The solvent may additionally comprise a molten inorganic compound such as a molten salt. The inorganic solvent may be molten NaOH. In an embodiment, the reaction mixture comprises a catalyst, a source of hydrogen, and an inorganic solvent for the catalyst. The catalyst may be at least one of NaH molecules, Li, and K. The solvent may be at least one of a molten or fused salt or eutectic such as at least one of the molten salts of the group of alkali halides and alkaline earth halides. The inorganic solvent of the NaH catalyst reaction mixture may comprise a low-melting eutectic of a mixture of alkali halides such as NaCl and KCl. The solvent may be a low-melting point salt, preferably a Na salt such as at least one of NaI (660° C.), $NaAlCl_4$ (160° C.), $NaAlF_4$, and compound of the same class as $NaMX_4$ wherein M is a metal and X is a halide having a metal halide that is more stable than NaX. The reaction mixture may further comprise a support such as R-Ni.

The inorganic solvent of the Li catalyst reaction mixture may comprise a low-melting eutectic of a mixture of alkali halides such as LiCl and KCl. The molten salt solvent may comprise a fluorine-based solvent that is stable to NaH. The melting point of $LaF_3$ is 1493° C. and the melting point of NaF is 996° C. A ball-milled mixture in appropriate ratios, with optionally other fluorides, comprises a fluoride-salt solvent that is stable to NaH and melts preferably in the range of 600° C.–700° C. In a molten-salt embodiment, the reaction mixture comprises NaH+salt mixture such as NaF—KF—LiF (11.5-42.0-46.5) MP=454° C. or NaH+salt mixture such as LiF—KF (52%-48%) MP=492° C.

V. Regeneration Systems and Reactions

Figure 4:
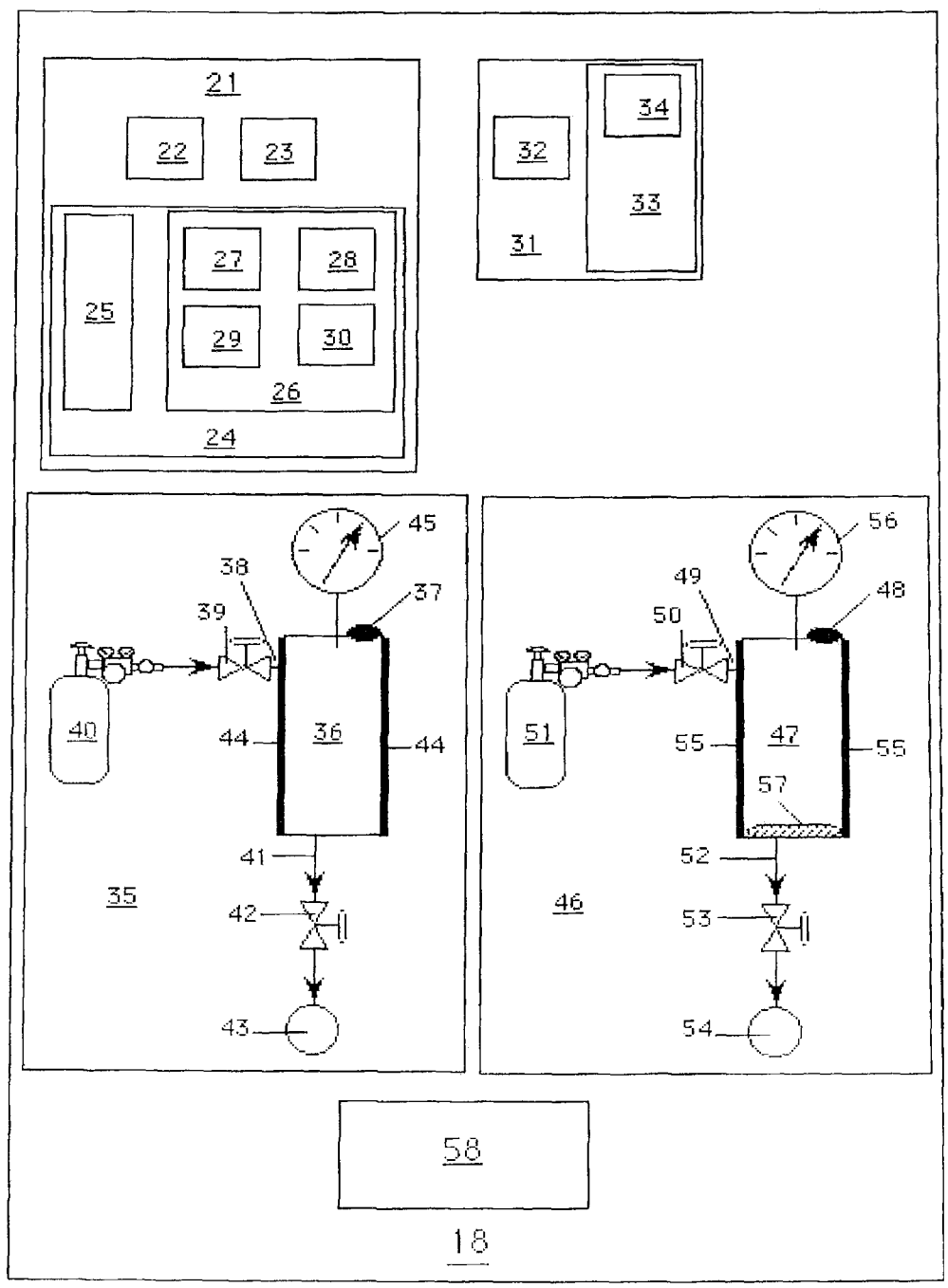
FIG. 4 is a schematic drawing of a system for recycling or regenerating the fuel in accordance with the present disclosure.

A schematic drawing of a system for recycling or regenerating the fuel in accordance with the present disclosure is shown in FIG. 4. In an embodiment, the byproducts of the hydrino reaction comprise a metal halide MX, preferably NaX or KX. Then, the fuel recycler 18 (FIG. 4) comprises a separator 21 to separate inorganic compounds such as NaX from the support. In an embodiment, the separator or a component thereof comprises a shifter or cyclone separator 22 that performs the separation based on density differences of the species. A further separator or component thereof comprises a magnetic separator 23 wherein magnetic particles such as nickel or iron are pulled out by a magnet while nonmagnetic material such as MX flow through the separator. In another embodiment, the separator or a component thereof comprises a differential product solubilization or suspension system 24 comprising a component solvent wash 25 that dissolves or suspends at least one component to a greater extent than another to permit the separation, and may further comprise a compound recovery system 26 such as a solvent evaporator 27 and compound collector 28. Alternatively, the recovery system comprises a precipitator 29 and a compound dryer and collector 30. In an embodiment, waste heat from the turbine 14 and water condensor 16 shown in FIG. 4 is used to heat at least one of the evaporator 27 and dryer 30 (FIG. 4). Heat for any other of the stages of the recycler 18 (FIG. 4) may comprise the waste heat.

The fuel recycler 18 (FIG. 4) further comprises an electrolyzer 31 that electrolyzes the recovered MX to metal and halogen gas or other halogenated or halide product. In an embodiment, the electrolysis occurs within the power reactor 36, preferably from a melt such as a eutectic melt. The electrolysis gas and metal products are separately collected at highly volatile gas collector 32 and a metal collector 33 that may further comprise a metal still or separator 34 in the case of a mixture of metals, respectively. If the initial reactant is a hydride, the metal is hydrided by a hydriding reactor 35 comprising a cell 36 capable of pressures less than, greater than, and equal to atmospheric, an inlet and outlet 37 for the metal and hydride, an inlet for hydrogen gas 38 and its valve 39, a hydrogen gas supply 40, a gas outlet 41 and its valve 42, a pump 43, a heater 44, and pressure and temperature gauges 45. In an embodiment, the hydrogen supply 40 comprises an aqueous electrolyzer having a hydrogen and oxygen gas separator. The isolated metal product is at least partially halogenated in a halogenation reactor 46 comprising a cell 47 capable of pressures less than, greater than, and equal to atmospheric, an inlet for the carbon and outlet for the halogenated product 48, an inlet for fluorine gas 49 and its valve 50, a halogen gas supply 51, a gas outlet 52 and its valve 53, a pump 54, a heater 55, and pressure and temperature gauges 56. Preferably, the reactor also contains catalysts and other reactants to cause the metal 57 to become the halide of the desired oxidation state and stoichiometry as the product. The at least two of the metal or metal hydride, metal halide, support, and other initial reactants are recycled to the boiler 10 after being mixed in a mixer 58 for another power-generation cycle.

In exemplary hydrino and regeneration reactions, the reaction mixture comprises NaH catalyst, Mg, $MnI_2$, and support, activated carbon, WC or TiC. In an embodiment, the source of exothermic reaction is the oxidation reaction of metal hydrides by $MnI_2$ such as $$2KH+MnI_2 \rightarrow 2KI+Mn+H_2 \tag{86}$$

$$Mg+MnI_2 \rightarrow MgI_2+Mn. \tag{87}$$

KI and $MgI_2$ may be electrolyzed to $I_2$, K, and Mg from a molten salt. The molten electrolysis may be performed using a Downs cell or modified Downs cell. Mn may be separated using a mechanical separator and optionally sieves. Unreacted Mg or $MgH_2$ may be separated by melting and by separation of solid and liquid phases. The iodides for the electrolysis may be from the rinse of the reaction products with a suitable solvent such as deoxygenated water. The solution may be filtered to remove the support such as AC and optionally the transition metal. The solid may be centrifuged and dried, preferably using waste heat from the power system. Alternative, the halides may be separated by melting them followed by separation of the liquid and solid phases. In another embodiment, the lighter AC may initially be separated from the other reaction products by a method such as cyclone separation. K and Mg are immiscible, and the separated metals such as K may be hydrided with $H_2$ gas, preferably from the electrolysis of $H_2O$. The metal iodide may be formed by know reactions with the separated metal or with the metal, unseparated from AC. In an embodiment, Mn is reacted with HI to form $MnI_2$, and $H_2$ that is recycled and reacted with $I_2$ to form HI. In other embodiments, other metals, preferably a transition metal, replaces Mn. Another reductant such as Al may replace Mg. Another halide, preferably chloride may replace iodide. LiH, KH, RbH, or CsH may replace NaH.

In exemplary hydrino and regeneration reactions, the reaction mixture comprises NaH catalyst, Mg, AgCl, and support, activated carbon. In an embodiment, the source of exothermic reaction is the oxidation reaction of metal hydrides by AgCl such as $$KH+AgCl \rightarrow KCl+Ag+½H_2 \qquad (88)$$

$$Mg+2AgCl \rightarrow MgCl_2+2Ag. \qquad (89)$$

KCl and $MgCl_2$ may be electrolyzed to $Cl_2$, K, and Mg from a molten salt. The molten electrolysis may be performed using a Downs cell or modified Downs cell. Ag may be separated using a mechanical separator and optionally sieves. Unreacted Mg or $MgH_2$ may be separated by melting and by separation of solid and liquid phases. The chlorides for the electrolysis may be from the rinse of the reaction products with a suitable solvent such as deoxygenated water. The solution may be filtered to remove the support such as AC and optionally the Ag metal. The solid may be centrifuged and dried, preferably using waste heat from the power system. Alternative, the halides may be separated by melting them followed by separation of the liquid and solid phases. In another embodiment, the lighter AC may initially be separated from the other reaction products by a method such as cyclone separation. K and Mg are immiscible, and the separated metals such as K may be hydrided with $H_2$ gas, preferably from the electrolysis of $H_2O$. The metal chloride may be formed by know reactions with the separated metal or with the metal, unseparated from AC. In an embodiment, Ag is reacted with $Cl_2$ to form AgCl, and $H_2$ that is recycled and reacted with $I_2$ to form HI. In other embodiments, other metals, preferably a transition metal or In, replaces Ag. Another reductant such as Al may replace Mg. Another halide, preferably chloride may replace iodide. LiH, KH, RbH, or CsH may replace NaH.

In an embodiment, the reaction mixture is regenerated from hydrino reaction products. In exemplary hydrino and regeneration reactions, the solid fuel reaction mixture comprises KH or NaH catalyst, Mg or $MgH_2$, and alkaline earth halide such as $BaBr_2$, and support, activated carbon, WC, or preferably TiC. In an embodiment, the source of exothermic reaction is the oxidation reaction of metal hydrides or metals by $BaBr_2$ such as $$2KH+Mg+BaBr_2 \rightarrow 2KBr+Ba+MgH_2 \qquad (90)$$

$$2NaH+Mg+BaBr_2 \rightarrow 2NaBr+Ba+MgH_2. \qquad (91)$$

The melting points of Ba, magnesium, $MgH_2$, NaBr, and KBr are 727° C., 650° C., 327° C., 747° C., and 734° C., respectively. Thus, $MgH_2$ can be separated from barium and any Ba—Mg intermetalic by maintaining the $MgH_2$ with optional addition of $H_2$, preferentially melting the $MgH_2$, and separating the liquid from the reaction-product mixture. Optionally, it may be thermally decomposed to Mg. Next, the remaining reaction products may be added to an electrolysis melt. Solid support and Ba precipitates to form preferably separable layers. Alternatively, Ba may be separated as a liquid by melting. Then, NaBr or KBr may be electrolyzed to form the alkali metal and $Br_2$. The latter is reacted with Ba to form $BaBr_2$. Alternatively, Ba is the anode, and $BaBr_2$ forms directly in the anode compartment. The alkali metal may be hydrided following electrolysis or formed in the cathode compartment during electrolysis by bubbling $H_2$ in this compartment. Then, $MgH_2$ or Mg, NaH or KH, $BaBr_2$, and support are returned to the reaction mixture. In other embodiments, another alkaline earth halide replaces $BaBr_2$, preferably $BaCl_2$. In another embodiment, the regeneration reactions may occur without electrolysis due to the small energy difference between the reactants and products. The reactions given by Eqs. (90-91) may be reversed by changing the reactions condition such as temperature or hydrogen pressure. Alternatively, a molten or volatile species such as K or Na may be selectively removed to drive the reaction backwards to regenerate a reactant or a species that can be further reacted and added back to the cell to form the original reaction mixture. In another embodiment, the volatile species may be continually refluxed to maintain the reversible reaction between the catalyst or source of catalyst such as NaH, KH, Na, or K and the initial oxidant such as an alkaline earth halide or rare earth halide. In an embodiment, the reflux is achieved using a still such as still 34 shown in FIG. 4. In another embodiment, the reaction conditions such as the temperature or hydrogen pressure may be changed to reverse the reaction. In this case, the reaction is initially run in the forward direction to form hydrinos and the reaction mixture products. Then, the products other than lower-energy hydrogen are converted to the initial reactants. This may be performed by changing the reaction conditions and possibly adding or removing at least partially the same or other products or reactant as those initially used or formed. Thus, the forward and regeneration reactions are carried out in alternating cycles. Hydrogen may be added to replace that consumed in the formation of hydrinos. In another embodiment, reaction conditions are maintained such as an elevated temperature wherein the reversible reaction is optimized such that both the forward and reverse reactions occur in a manner that achieves the desired, preferably maximum, rate of hydrino formation.

In exemplary hydrino and regeneration reactions, the solid fuel reaction mixture comprises NaH catalyst, Mg, $FeBr_2$, and support, activated carbon. In an embodiment, the source of exothermic reaction is the oxidation reaction of metal hydrides by $FeBr_2$ such as $$2NaH+FeBr_2 \rightarrow 2NaBr+Fe+H_2 \qquad (92)$$

$$Mg+FeBr_2 \rightarrow MgBr_2+Fe. \qquad (93)$$

NaBr and $MgBr_2$ may be electrolyzed to $Br_2$, Na, and Mg from a molten salt. The molten electrolysis may be performed using a Downs cell or modified Downs cell. Fe is ferromagnetic and may be separated magnetically using a mechanical separator and optionally sieves. In another embodiment, ferromagnetic Ni may replace Fe. Unreacted Mg or $MgH_2$ may be separated by melting and by separation of solid and liquid phases. The bromides for the electrolysis may be from the rinse of the reaction products with a suitable solvent such as deoxygenated water. The solution may be filtered to remove the support such as AC and optionally the transition metal. The solid may be centrifuged and dried, preferably using waste heat from the power system. Alternative, the halides may be separated by melting them followed by separation of the liquid and solid phases. In another embodiment, the lighter AC may initially be separated from the other reaction products by a method such as cyclone separation. Na and Mg are immiscible, and the separated metals such as Na may be hydrided with $H_2$ gas, preferably from the electrolysis of $H_2O$. The metal bromide may be formed by know reactions with the separated metal or with the metal, unseparated from AC. In an embodiment, Fe is reacted with HBr to form $FeBr_2$, and $H_2$ that is recycled and reacted with $Br_2$ to form HBr. In other embodiments, other metals, preferably a transition metal, replaces Fe. Another reductant such as Al may replace Mg. Another halide, preferably chloride may replace bromide. LiH, KH, RbH, or CsH may replace NaH.

In exemplary hydrino and regeneration reactions, the solid fuel reaction mixture comprises KH or NaH catalyst, Mg or MgH2, $SnBr_2$, and support, activated carbon, WC, or TiC. In an embodiment, the source of exothermic reaction is the oxidation reaction of metal hydrides or metals by $SnBr_2$ such as

$$2KH+SnBr_2 \rightarrow 2KBr+Sn+H_2 \qquad (94)$$

$$2NaH+SnBr_2 \rightarrow 2NaBr+Sn+H_2 \qquad (95)$$

$$Mg+SnBr_2 \rightarrow MgBr_2+Sn. \qquad (96)$$

The melting points of tin, magnesium, $MgH_2$, NaBr, and KBr are 119° C., 650° C., 327° C., 747° C., and 734° C., respectively. Tin-magnesium alloy will melt above a temperature such as 400° C. for about 5 wt % Mg as given in its alloys phase diagram. In an embodiment, tin and magnesium metals and alloys are separated from the support and halides by melting the metals and alloys and separating the liquid and solid phases. The alloy may be reacted with $H_2$ at a temperature that forms $MgH_2$ solid and tin metal. The solid and liquid phases may be separated to give $MgH_2$ and tin. The $MgH_2$ may be thermally decomposed to Mg and $H_2$. Alternatively, $H_2$ may be added to the reaction products in situ at a temperature selective to convert any unreacted Mg and any Sn—Mg alloy to solid $MgH_2$ and liquid tin. The tin may be selectively removed. Then, $MgH_2$ may be heated and removed as a liquid. Next, halides may be removed from the support by methods such (1) melting them and separation of the phases, (2) cyclone separation based on density differences wherein a dense support such as WC is preferred, or (3) sieving based on size differences. Alternatively, the halides may be dissolved in a suitable solvent, and the liquid and solid phases separated by methods such as filtering. The liquid may be evaporated and then the halides may be electrolyzed from the melt to Na or K and possibly Mg metals that are immiscible and each separated. In another embodiment K is formed by reduction of the halide using Na metal that is regenerated by electrolysis of a sodium halide, preferably the same halide as formed in the hydrino reactor. In addition, halogen gas such as $Br_2$ is collected from the electrolysis melt and reacted with isolated Sn to form $SnBr_2$ that is recycled for another cycle of the hydrino reaction together with NaH or KH, and Mg or $MgH_2$ wherein the hydrides are formed by hydriding with $H_2$ gas. In an embodiment, HBr is formed and reacted with Sn to from $SnBr_2$. HBr may be formed by reaction of $Br_2$ and $H_2$ or during electrolysis by bubbling $H_2$ at the anode that has an advantage of lowering the electrolysis energy. In other embodiment another metal replaces Sn, preferably a transition metal, and another halide may replace Br such as I.

In another embodiment, at the initial step, all of the reaction products are reacted with aqueous HBr, and the solution is concentrated to precipitate $SnBr_2$ from $MgBr_2$ and KBr solution. Other suitable solvents and separation methods may be used to separate the salts. $MgBr_2$ and KBr are then electrolyzed to Mg and K. Alternatively, Mg or $MgH_2$ is first removed using mechanical or by selective solvent methods such that only KBr need be electrolyzed. In an embodiment, Sn is removed as a melt from solid $MgH_2$ that may be formed by adding $H_2$ during or after the hydrino reaction. $MgH_2$ or Mg, KBr, and support are then added to the electrolysis melt. The support settles in a sedimentary zone due to its large particle size. $MgH_2$ and KBr form part of the melt and separate based on density. Mg and K are immiscible, and K also forms a separate phase such that Mg and K are collected separately. The anode may be Sn such that K, Mg, and $SnBr_2$ are the electrolysis products. The anode may be liquid tin or liquid tin may be sparged at the anode to react with bromine and form $SnBr_2$. In this case the energy gap for regeneration is the compound gap versus the higher elemental gap corresponding to elemental products at both electrodes. In a further embodiment, the reactants comprise KH, support, and $SnI_2$ or $SnBr_2$. The Sn may be removed as a liquid, and the remaining products such as KX and support may be added to the electrolysis melt wherein the support separates based on density. In this case, a dense support such as WC is preferred.

The reactants may comprise an oxygen compound to form an oxide product such as an oxide of the catalyst or source of catalyst such as that of NaH, Li, or K and an oxide of the reductant such as that of Mg, $MgH_2$, Al, Ti, B, Zr, or La. In an embodiment, the reactants are regenerated by reacting the oxide with an acid such as a hydrogen halide acid, preferably HCl, to form the corresponding halide such as the chloride. In an embodiment, an oxidized carbon species such as carbonate, hydrogen carbonate, a carboxylic acid species such as oxalic acid or oxalate may be reduced by a metal or a metal hydride. Preferably, at least one of Li, K, Na, LiH, KH, NaH, Al, Mg, and $MgH_2$ reacts with the species comprising carbon and oxygen and forms the corresponding metal oxide or hydroxide and carbon. Each corresponding metal may be regenerated by electrolysis. The electrolysis may be performed using a molten salt such as that of a eutectic mixture. The halogen gas electrolysis product such as chlorine gas may be used to form the corresponding acid such as HCl as part of a regeneration cycle. The hydrogen halide acid HX may be formed by reacting the halogen gas with hydrogen gas and by optionally dissolving the hydrogen halide gas into water. Preferably the hydrogen gas is formed by electrolysis of water. The oxygen may be a reactant of the hydrino reaction mixture or may be reacted to form the source of oxygen of the hydrino reaction mixture. The step of reacting the oxide hydrino reaction product with acid may comprise rinsing the product with acid to form a solution comprising the metal salts. In an embodiment, the hydrino reaction mixture and the corresponding product mixture comprises a support such as carbon, preferably activated carbon. The metal oxides may be separated from the support by dissolving them in aqueous acid. Thus, the product may be rinsed with acid and may further be filtered to separate the components of the reaction mixture. The water may be removed by evaporation using heat, preferably waste heat from the power system, and the salts such as metal chlorides may be added to the electrolysis mixture to form the metals and halogen gas. In an embodiment, any methane or hydrocarbon product may be reformed to hydrogen and optionally carbon or carbon dioxide. Alternatively, the methane was be separated from the gas product mixture and sold as a commercial product. In another embodiment, the methane may be formed into other hydrocarbon products by methods known in the art such as Fischer-Tropsch reactions. The formation of methane may be suppressed by adding an interfering gas such as an inert gas and by maintaining unfavorable conditions such as a reduced hydrogen pressure or temperature.

In another embodiment, metal oxides are directly electrolyzed from a eutectic mixture. Oxides such as MgO may be reacted to water to form hydroxides such as $Mg(OH)_2$. In an embodiment, the hydroxide is reduced. The reductant may be an alkaline metal or hydride such as Na or NaH. The product hydroxide may be electrolyzed directly as a molten salt. Hydrino reaction products such as alkali metal hydroxides may also be used as a commercial product and the corresponding halides acquired. The halides may then be electrolyzed to halogen gas and metal. The halogen gas may be used as a commercial industrial gas. The metal may be hydrided with hydrogen gas, preferably for the electrolysis of water, and supplied to the reactor as a part of the hydrino reaction mixture.

The reductant such as an alkali metal can be regenerated from the product comprising a corresponding compound, preferably NaOH or $Na_2O$, using methods and systems known to those skilled in the art. One method comprises electrolysis in a mixture such as a eutectic mixture. In a further embodiment, the reductant product may comprise at least some oxide such as a reductant metal oxide (e.g. MgO). The hydroxide or oxide may be dissolved in a weak acid such as hydrochloric acid to form the corresponding salt such as NaCl or $MgCl_2$. The treatment with acid may also be an anhydrous reaction. The gases may be streaming at low pressure. The salt may be treated with a product reductant such as an alkali or alkaline earth metal to form the original reductant. In an embodiment, the second reductant is an alkaline earth metal, preferably Ca wherein NaCl or $MgCl_2$ is reduced to Na or Mg metal. The additional product of $CaCl_2$ is recovered and recycled as well. In alternative embodiment, the oxide is reduced with $H_2$ at high temperature.

In exemplary hydrino and regeneration reactions, the reaction mixture comprises NaH catalyst, $MgH_2$, $O_2$, and support, activated carbon. In an embodiment, the source of exothermic reaction is the oxidation reaction of metal hydrides by $O_2$ such as $$MgH_2 + O_2 \rightarrow Mg(OH)_2 \tag{97}$$

$$MgH_2 + 1.5O_2 + C \rightarrow MgCO_3 + H_2 \tag{98}$$

$$NaH + \tfrac{3}{2}O_2 + C \rightarrow NaHCO_3 \tag{99}$$

$$2NaH + O_2 \rightarrow 2NaOH. \tag{100}$$

Any MgO product may be converted to the hydroxide by reaction with water $$MgO + H_2O \rightarrow Mg(OH)_2. \tag{101}$$

Sodium or magnesium carbonate, hydrogen carbonate, and other species comprising carbon and oxygen may be reduced with Na or NaH:

$$NaH + Na_2CO_3 \rightarrow 3NaOH + C + 1/H_2 \tag{102}$$

$$NaH + \tfrac{1}{3}MgCO_3 \rightarrow NaOH + \tfrac{1}{3}C + \tfrac{1}{3}Mg \tag{103}$$

$Mg(OH)_2$ can be reduced to Mg using Na or NaH:

$$2Na + Mg(OH)_2 \rightarrow 2NaOH + Mg. \tag{104}$$

Then, NaOH can be electrolyzed to Na metal and NaH and $O_2$ directly from the melt. The Castner process may be used. A suitable cathode and anode for a basic solution is nickel. The anode may also be carbon, a noble metal such as Pt, a support such as Ti coated with a noble metal such as Pt, or a dimensionally stable anode. In another embodiment, NaOH is converted to NaCl by reaction with HCl wherein the NaCl electrolysis gas $Cl_2$ may be reacted with $H_2$ from the electrolysis of water to form the HCl. The molten NaCl electrolysis may be performed using a Downs cell or modified Downs cell. Alternatively, HCl may be produced by chloralkali electrolysis. The aqueous NaCl for this electrolysis may be from the rinse of the reaction products with aqueous HCl. The solution may be filtered to remove the support such as AC that may be centrifuged and dried, preferably using waste heat from the power system.

In an embodiment, the reaction step comprise, (1) rinse the products with aqueous HCl to form metal chlorides from species such as hydroxides, oxides, and carbonates, (2) convert any evolved $CO_2$ to water and C by $H_2$ reduction using the water gas shift reaction and the Fischer Tropsch reaction wherein the C is recycled as the support at step 10 and the water may be used at steps, 1, 4, or 5, (3) filter and dry the support such as AC wherein the drying may include the step of centrifugation, (4) electrolyze water to $H_2$ and $O_2$ to supply steps 8 to 10, (5) optionally form $H_2$ and HCl from the electrolysis of aqueous NaCl to supply steps 1 and 9, (6) isolate and dry the metal chlorides, (7) electrolyze a melt of the metal chloride to metals and chlorine, (8) form HCl by reaction of $Cl_2$ and $H_2$ to supply step 1, (9) hydride any metal to form the corresponding starting reactant by reaction with hydrogen, and (10) form the initial reaction mixture with the addition of $O_2$ from step 4 or alternatively using $O_2$ isolated from the atmosphere.

In another embodiment, at least one of magnesium oxide and magnesium hydroxide are electrolyzed from a melt to Mg and $O_2$. The melt may be a NaOH melt wherein Na may also be electrolyzed. In an embodiment, carbon oxides such as carbonates and hydrogen carbonates may be decomposed to at least one of CO and $CO_2$ that may be added to the reaction mixture as a source of oxygen. Alternatively, the carbon oxide species such as $CO_2$ and CO may be reduced to carbon and water by hydrogen. $CO_2$ and CO and may be reduced by the water gas shift reaction and the Fischer Tropsch reaction.

In exemplary hydrino and regeneration reactions, the reaction mixture comprises NaH catalyst, $MgH_2$, $CF_4$, and support, activated carbon. In an embodiment, the source of exothermic reaction is the oxidation reaction of metal hydrides by $CF_4$ such as $$2MgH + CF_4 \rightarrow C + 2MgF_2 + 2H_2 \tag{105}$$

$$2MgH_2 + CF_4 \rightarrow CH_4 + 2MgF_2 \tag{106}$$

$$4NaH + CF_4 \rightarrow C + 4NaF + 2H_2 \tag{107}$$

$$4NaH + CF_4 \rightarrow CH_4 + 4NaF. \tag{108}$$

NaF and $MgF_2$ may be electrolyzed to $F_2$, Na, and Mg from a molten salt that may additionally comprise HF. Na and Mg are immiscible, and the separated metals may be hydrided with $H_2$ gas, preferably from the electrolysis of $H_2O$. The $F_2$ gas may be reacted with carbon and any $CH_4$ reaction product to regenerate $CF_4$. Alternatively and preferably, the anode of the electrolysis cell comprises carbon, and the current and electrolysis conditions are maintained such that $CF_4$ is the anode electrolysis product.

In exemplary hydrino and regeneration reactions, the reaction mixture comprises NaH catalyst, $MgH_2$, $P_2O_5$ ($P_4O_{10}$), and support, activated carbon. In an embodiment, the source of exothermic reaction is the oxidation reaction of metal hydrides by $P_2O_5$ such as $$5MgH_2 + P_2O_5 \rightarrow 5MgO + 2P + 5H_2 \tag{109}$$

$$5NaH + P_2O_5 \rightarrow 5NaOH + 2P. \tag{110}$$

Phosphorous can be converted to $P_2O_5$ by combustion in $O_2$ $$2P + 2.5O_2 \rightarrow P_2O_5. \tag{111}$$

The MgO product may be converted to the hydroxide by reaction with water $$MgO+H_2O \rightarrow Mg(OH)_2. \quad (112)$$

$Mg(OH)_2$ can be reduced to Mg using Na or NaH:

$$2Na+Mg(OH)_2 \rightarrow 2NaOH+Mg. \quad (113)$$

Then, NaOH can be electrolyzed to Na metal and NaH and $O_2$ directly from the melt, or it may be converted to NaCl by reaction with HCl wherein the NaCl electrolysis gas $Cl_2$ may be reacted with $H_2$ from the electrolysis of water to from the HCl. In embodiments, metals such as Na and Mg may be converted to the corresponding hydrides by reaction with $H_2$, preferably from the electrolysis of water.

In exemplary hydrino and regeneration reactions, the solid fuel reaction mixture comprises NaH catalyst, $MgH_2$, $NaNO_3$, and support, activated carbon. In an embodiment, the source of exothermic reaction is the oxidation reaction of metal hydrides by $NaNO_3$ such as $$NaNO_3+NaH+C \rightarrow Na_2CO_3+\tfrac{1}{2}N_2+\tfrac{1}{2}H_2 \quad (114)$$

$$NaNO_3+\tfrac{1}{2}H_2+2NaH \rightarrow 3NaOH+\tfrac{1}{2}N_2 \quad (115)$$

$$NaNO_3+3MgH \rightarrow 3MgO+NaH+\tfrac{1}{2}N_2+\tfrac{5}{2}H_2. \quad (116)$$

Sodium or magnesium carbonate, hydrogen carbonate, and other species comprising carbon and oxygen may be reduced with Na or NaH:

$$NaH+Na_2CO_3 \rightarrow 3NaOH+C+1/H_2 \quad (117)$$

$$NaH+\tfrac{1}{3}MgCO_3 \rightarrow NaOH+\tfrac{1}{3}C+\tfrac{1}{3}Mg. \quad (118)$$

Carbonates can also be decomposed from aqueous media to the hydroxides and $CO_2$ $$Na_2CO_3+H_2O \rightarrow 2NaOH+CO_2. \quad (119)$$

Evolved $CO_2$ may be reacted to water and C by $H_2$ reduction using the water gas shift reaction and the Fischer Tropsch reaction $$CO_2+H_2 \rightarrow CO+H_2O \quad (120)$$

$$CO+H_2 \rightarrow C+H_2O. \quad (121)$$

The MgO product may be converted to the hydroxide by reaction with water $$MgO+H_2O \rightarrow Mg(OH)_2. \quad (122)$$

$Mg(OH)_2$ can be reduced to Mg using Na or NaH:

$$2Na+Mg(OH)_2 \rightarrow 2NaOH+Mg. \quad (123)$$

Alkali nitrates can be regenerated using the methods known to those skilled in the art. In an embodiment, $NO_2$, can be generated by known industrial methods such as by the Haber process followed by the Ostwald process. In one embodiment, the exemplary sequence of steps are:

$$N_2 \xrightarrow[\text{Haber process}]{H_2} NH_3 \xrightarrow[\text{Ostwald process}]{O_2} NO_2. \quad (124)$$

Specifically, the Haber process may be used to produce $NH_3$ from $N_2$ and $H_2$ at elevated temperature and pressure using a catalyst such as α-iron containing some oxide. The Ostwald process may be used to oxidize the ammonia to $NO_2$, at a catalyst such as a hot platinum or platinum-rhodium catalyst. The heat may be waste heat from the power system. $NO_2$ may be dissolved in water to form nitric acid that is reacted with NaOH, $Na_2CO_3$, or $NaHCO_3$ to form sodium nitrate. Then, the remaining NaOH can be electrolyzed to Na metal and NaH and $O_2$ directly from the melt, or it may be converted to NaCl by reaction with HCl wherein the NaCl electrolysis gas $Cl_2$ may be reacted with $H_2$ from the electrolysis of water to from the HCl. In embodiments, metals such as Na and Mg may be converted to the corresponding hydrides by reaction with $H_2$, preferably from the electrolysis of water. In other embodiments, Li and K replace Na.

In exemplary hydrino and regeneration reactions, the reaction mixture comprises NaH catalyst, $MgH_2$, $SF_6$, and support, activated carbon. In an embodiment, the source of exothermic reaction is the oxidation reaction of metal hydrides by $SF_6$ such as $$4MgH_2+SF_6 \rightarrow 3MgF_2+4H_2+MgS \quad (125)$$

$$7\,NaH+SF_6 \rightarrow 6NaF+3H_2+NaHS. \quad (126)$$

NaF and $MgF_2$ and the sulfides may be electrolyzed to Na and Mg from a molten salt that may additionally comprise HF. The fluorine electrolysis gas may react with the sulfides to form $SF_6$ gas that may be removed dynamically. The separation of $SF_6$ from $F_2$ may be by methods known in the art such as cryo-distillation, membrane separation, or chromatography using a medium such as molecular sieves. NaHS melts at 350° C. and may be part of the molten electrolysis mixture. Any MgS product may be reacted with Na to form NaHS wherein the reaction may occur in situ during electrolysis. S and metals may be products formed during electrolysis. Alternatively, the metals may be in minority such that the more stable fluorides are formed, or $F_2$ may be added to form the fluorides.

$$3MgH_2+SF_6 \rightarrow 3MgF_2+3H_2+S \quad (127)$$

$$6NaH+SF_6 \rightarrow 6NaF+3H_2+S. \quad (128)$$

NaF and $MgF_2$ may be electrolyzed to $F_2$, Na, and Mg from a molten salt that may additionally comprise HF. Na and Mg are immiscible, and the separated metals may be hydrided with $H_2$ gas, preferably, the make up is from the electrolysis of $H_2O$. The $F_2$ gas may be reacted with sulfur to regenerate $SF_6$.

In exemplary hydrino and regeneration reactions, the reaction mixture comprises NaH catalyst, $MgH_2$, $NF_3$, and support, activated carbon. In an embodiment, the source of exothermic reaction is the oxidation reaction of metal hydrides by $NF_3$ such as $$3MgH_2+2NF_3 \rightarrow 3MgF_2+3H_2+N_2 \quad (129)$$

$$6MgH_2+2NF_3 \rightarrow 3MgF_2+Mg_3N_2+6H_2 \quad (130)$$

$$3NaH+NF_3 \rightarrow 3NaF+\tfrac{1}{2}N_2+1.5H_2. \quad (131)$$

NaF and $MgF_2$ may be electrolyzed to $F_2$, Na, and Mg from a molten salt that may additionally comprise HF. The conversion of $Mg_3N_2$ to $MgF_2$ may occur in the melt. Na and Mg are immiscible, and the separated metals may be hydrided with $H_2$ gas, preferably from the electrolysis of $H_2O$. The $F_2$ gas may be reacted with $NH_3$, preferably in a copper-packed reactor, to form $NF_3$. Ammonia may be created from the Haber process. Alternatively, $NF_3$ may be formed by the electrolysis of $NH_4F$ in anhydrous HF.

In exemplary hydrino and regeneration reactions, the solid fuel reaction mixture comprises NaH catalyst, $MgH_2$, $Na_2S_2O_8$ and support, activated carbon. In an embodiment, the source of exothermic reaction is the oxidation reaction of metal hydrides by $Na_2S_2O_8$ such as $$8MgH_2+Na_2S_2O_8 \rightarrow 2MgS+2NaOH+6MgO+6H_2 \quad (132)$$

$$7MgH_2+Na_2S_2O_8+C \rightarrow 2MgS+Na_2CO_3+5MgO+7H_2 \quad (133)$$

$$10NaH+Na_2S_2O_8 \rightarrow 2Na_2S+8NaOH+H_2 \quad (134)$$

$$9NaH+Na_2S_2O_8+C \rightarrow 2Na_2S+Na_2CO_3+5NaOH+2H_2. \quad (135)$$

Any MgO product may be converted to the hydroxide by reaction with water $$MgO+H_2O \rightarrow Mg(OH)_2. \quad (136)$$

Sodium or magnesium carbonate, hydrogen carbonate, and other species comprising carbon and oxygen may be reduced with Na or NaH:

$$NaH+Na_2CO_3 \rightarrow 3NaOH+C+1/H_2 \quad (137)$$

$$NaH+\tfrac{1}{3}MgCO_3 \rightarrow NaOH+\tfrac{1}{3}C+\tfrac{1}{3}Mg. \quad (138)$$

MgS can be combusted in oxygen, hydrolyzed, exchanged with Na to form sodium sulfate, and electrolyzed to $Na_2S_2O_8$ $$2MgS+10H_2O+2NaOH \rightarrow Na_2S_2O_8+2Mg(OH)_2+9H_2. \quad (139)$$

$Na_2S$ can be combusted in oxygen, hydrolyzed to sodium sulfate, and electrolyzed to form $Na_2S_2O_8$ $$2Na_2S+10H_2O \rightarrow Na_2S_2O_8+2NaOH+9H_2 \quad (140)$$

$Mg(OH)_2$ can be reduced to Mg using Na or NaH:

$$2Na+Mg(OH)_2 \rightarrow 2NaOH+Mg. \quad (141)$$

Then, NaOH can be electrolyzed to Na metal and NaH and $O_2$ directly from the melt, or it may be converted to NaCl by reaction with HCl wherein the NaCl electrolysis gas $Cl_2$ may be reacted with $H_2$ from the electrolysis of water to from the HCl.

In exemplary hydrino and regeneration reactions, the solid fuel reaction mixture comprises NaH catalyst, $MgH_2$, S, and support, activated carbon. In an embodiment, the source of exothermic reaction is the oxidation reaction of metal hydrides by S such as $$MgH_2+S \rightarrow MgS+H_2 \quad (142)$$

$$2NaH+S \rightarrow Na_2S+H_2. \quad (143)$$

The magnesium sulfide may be converted to the hydroxide by reaction with water $$MgS+2H_2O \rightarrow Mg(OH)_2+H_2S \quad (144)$$

$H_2S$ may be decomposed at elevated temperature or used to covert $SO_2$ to S. Sodium sulfide can be converted to the hydroxide by combustion and hydrolysis $$Na_2S+1.5O_2 \rightarrow Na_2O+SO_2$$

$$Na_2O+H_2O \rightarrow 2NaOH. \quad (145)$$

$Mg(OH)_2$ can be reduced to Mg using Na or NaH:

$$2Na+Mg(OH)_2 \rightarrow 2NaOH+Mg. \quad (146)$$

Then, NaOH can be electrolyzed to Na metal and NaH and $O_2$ directly from the melt, or it may be converted to NaCl by reaction with HCl wherein the NaCl electrolysis gas $Cl_2$ may be reacted with $H_2$ from the electrolysis of water to from the HCl. $SO_2$ can be reduced at elevated temperature using $H_2$ $$SO_2+2H_2S \rightarrow 3S+2H_2O. \quad (147)$$

In embodiments, metals such as Na and Mg may be converted to the corresponding hydrides by reaction with $H_2$, preferably from the electrolysis of water. In other embodiments, the S and metal may be regenerated by electrolysis from a melt.

In exemplary hydrino and regeneration reactions, the reaction mixture comprises NaH catalyst, $MgH_2$, $N_2O$, and support, activated carbon. In an embodiment, the source of exothermic reaction is the oxidation reaction of metal hydrides by $N_2O$ such as $$4MgH_2+N_2O \rightarrow MgO+Mg_3N_2+4H_2 \quad (148)$$

$$NaH+3N_2O+C \rightarrow NaHCO_3+3N_2+\tfrac{1}{2}H_2. \quad (149)$$

The MgO product may be converted to the hydroxide by reaction with water $$MgO+H_2O \rightarrow Mg(OH)_2. \quad (150)$$

Magnesium nitride may also be hydrolyzed to magnesium hydroxide:

$$Mg_3N_2+6H_2O \rightarrow 3Mg(OH)_2+3H_2+N_2. \quad (151)$$

Sodium carbonate, hydrogen carbonate, and other species comprising carbon and oxygen may be reduced with Na or NaH:

$$NaH+Na_2CO_3 \rightarrow 3NaOH+C+1/H_2. \quad (152)$$

$Mg(OH)_2$ can be reduced to Mg using Na or NaH:

$$2Na+Mg(OH)_2 \rightarrow 2NaOH+Mg. \quad (153)$$

Then, NaOH can be electrolyzed to Na metal and NaH and $O_2$ directly from the melt, or it may be converted to NaCl by reaction with HCl wherein the NaCl electrolysis gas $Cl_2$ may be reacted with $H_2$ from the electrolysis of water to from the HCl. Ammonia created from the Haber process is oxidized (Eq. (124)) and the temperature is controlled to favor production of $N_2O$ that is separated from other gasses of the steady state reaction product mixture.

In exemplary hydrino and regeneration reactions, the reaction mixture comprises NaH catalyst, $MgH_2$, $Cl_2$, and support, such as activated carbon, WC or TiC. The reactor may further comprise a source of high-energy light, preferably ultraviolet light to dissociate $Cl_2$ to initiate the hydrino reaction. In an embodiment, the source of exothermic reaction is the oxidation reaction of metal hydrides by $Cl_2$ such as $$2NaH+Cl_2 \rightarrow 2NaCl+H_2 \quad (154)$$

$$MgH_2+Cl_2 \rightarrow MgCl_2+H_2. \quad (155)$$

NaCl and $MgCl_2$ may be electrolyzed to $Cl_2$, Na, and Mg from a molten salt. The molten NaCl electrolysis may be performed using a Downs cell or modified Downs cell. The NaCl for this electrolysis may be from the rinse of the reaction products with aqueous solution. The solution may be filtered to remove the support such as AC that may be centrifuged and dried, preferably using waste heat from the power system. Na and Mg are immiscible, and the separated metals may be hydrided with $H_2$ gas, preferably from the electrolysis of $H_2O$. An exemplary result follows:

4 g WC+1 g MgH2+1 g NaH+0.01 mol Cl2 initiated with UV lamp to dissociate $Cl_2$ to Cl, Ein: 162.9 kJ, dE: 16.0 kJ, TSC: 23-42° C., Tmax: 85° C., theoretical is 7.10 kJ, gain is 2.25 times.

The reactants comprising a catalyst or a catalyst source such as NaH, K, or Li or their hydrides, a reductant such as an alkaline metal or hydride, preferably Mg, MgH2, or Al, and an oxidant such as $NF_3$ can be regenerated by electrolysis. Preferably, metal fluoride products are regenerated to metals and fluorine gas by electrolysis. The electrolyte may comprise a eutectic mixture. The mixture may further comprise HF. $NF_3$ may be regenerated by the electrolysis of $NH_4F$ in anhydrous HF. In another embodiment, $NH_3$ is reacted with $F_2$ in a reactor such as a copper-packed reactor. $F_2$ may be generated by electrolysis using a dimensionally stable anode or a carbon anode using conditions that favor $F_2$ production. $SF_6$ may be regenerated by reaction of S with $F_2$. Any metal nitride that may form in the hydrino reaction may be regenerated by at least one of thermal decomposition, $H_2$ reduction, oxidation to the oxide or hydroxide and reaction to the halide followed by electrolysis, and reaction with halogen gas during molten electrolysis of a metal halide. $NCl_3$ can be formed by reaction of ammonia and chlorine gas or by reaction of ammonium salts such as $NH_4Cl$ with chlorine gas. The chlorine gas may be from the electrolysis of chloride salts such as those from the product reaction mixture. The $NH_3$ may be formed using the Haber process wherein the hydrogen may be from electrolysis, preferably of water. In an embodiment, $NCl_3$ is formed in situ in the reactor by the reaction of at least one of $NH_3$ and an ammonium salt such as $NH_4Cl$ with $Cl_2$ gas. In an embodiment, $BiF_5$ can be regenerated by reaction of $BiF_3$ with $F_2$ formed from electrolysis of metal fluorides.

In an embodiment wherein the a source of oxygen or halogen optionally serves as a reactant of an exothermic activation reaction, an oxide or halide product is preferably regenerated by electrolysis. The electrolyte may comprise a eutectic mixture such as a mixture of $Al_2O_3$ and $Na_3AlF_6$; $MgF_2$, NaF, and HF; $Na_3AlF_6$; NaF, $SiF_4$, and HF; and $AlF_3$, NaF, and HF. The electrolysis of $SiF_4$ to Si and $F_2$ may be from a alkali fluoride eutectic mixture. Since Mg and Na have low miscibility, they can be separated in phases of the melts. Since Al and Na have low miscibility, they can be separated in phases of the melts. In another embodiment, the electrolysis products can be separated by distillation. In further embodiment, $Ti_2O_3$ is regenerated by reaction with C and $Cl_2$ to form CO and $TiCl_4$ that is further reacted with Mg to form Ti and $MgCl_2$. Mg and $Cl_2$ may be regenerated by electrolysis. In the case that MgO is the product, Mg can be regenerated by the Pidgeon process. In an embodiment, MgO is reacted with Si to form $SiO_2$ and Mg gas that is condensed. The product $SiO_2$ may be regenerated to Si by $H_2$ reduction at high temperature or by reaction with carbon to form Si and CO and $CO_2$. In another embodiment, Si is regenerated by electrolysis using a method such as the electrolysis of solid oxides in molten calcium chloride. In an embodiment, chlorate or perchlorate such as an alkali chlorate or perchlorate is regenerated by electrolytic oxidation. Brine may be electrolytically oxidized to chlorate and perchlorate.

To regenerate the reactants, any oxide coating on a metal support that may be formed may be removed by dilute acid following separation from the reactant or product mixture. In another embodiment, the carbide is generated from the oxide by reaction with carbon with release of carbon monoxide or dioxide.

In the case that the reaction mixture comprises a solvent, the solvent may be separated from other reactants or products to be regenerated by removing the solvent using evaporation or by filtration or centrifugation with retention of the solids. In the case that other volatile components such as alkali metals are present, they may be selectively removed by heating to a suitably elevated temperature such that they are evaporated. For example, a metal such that Na metal is collected by distillation and a support such as carbon remains. The Na may be rehydrided to NaH and returned to the carbon with solvent added to regenerate the reaction mixture. Isolated solids such as R-Ni may be regenerated separately as well. The separated R-Ni may be hydrided by exposure to hydrogen gas at a pressure in the range of 0.1 to 300 atm The solvent may be regenerated in the case that it decomposes during the catalyst reaction to form hydrinos. For example, the decomposition products of DMF may be dimethylamine, carbon monoxide, formic acid, sodium formate, and formaldehyde. In an embodiment, dimethyl formamide is produced either with catalyzed reaction of dimethyl amine and carbon monoxide in methanol or the reaction of methyl formate with dimethyl amine. It may also be prepared by reacting dimethylamine with formic acid.

In an embodiment, an exemplary ether solvent may be regenerated from the products of the reaction mixture. Preferably, the reaction mixture and conditions are chosen such that reaction rate of ether is minimized relative to the rate to form hydrinos such that any ether degradation is insignificant relative to the energy produced from the hydrino reaction. Thus, ether may be added back as needed with the ether degradation product removed. Alternatively, the ether and reaction conditions may be chosen such that the ether reaction product may be isolated and the ether regenerated.

An embodiment comprises at least one of the following: the HSA is a fluoride, the HSA is a metal, and the solvent is fluorinated. A metal fluoride may be a reaction product. The metal and fluorine gas may be generated by electrolysis. The electrolyte may comprise the fluoride such as NaF, $MgF_2$, $AlF_3$, or $LaF_3$ and may additionally comprise at least one other species such as HF and other salts that lowers the melting point of the fluoride, such as those disclosed in U.S. Pat. No. 5,427,657. Excess HF may dissolve $LaF_3$. The electrodes may be carbon such as graphite and may also form fluorocarbons as desired degradation products. In an embodiment, at least one of the metal or alloy, preferably nanopowder, coated with carbon such as carbon-coated Co, Ni, Fe, other transition metal powders, or alloys, and the metal-coated carbon, preferably nanopowder, such as carbon coated with a transition metal or alloy, preferably at least one of Ni, Co, Fe, and Mn coated carbon, comprise particles that are magnetic. The magnetic particles may be separated from a mixture such as a mixture of a fluoride such as NaF and carbon by using a magnet. The collected particles may be recycled as part of the reaction mixture to form hydrinos.

In an embodiment, the catalyst or source of catalyst such as NaH and the fluorinated solvent is regenerated from the products comprising NaF by separation of the products followed by electrolysis. The method of isolation of NaF may be rinsing the mixture with a polar solvent with a low boiling point followed by one or more of filtration and evaporation to give NaF solid. The electrolysis may be molten-salt electrolysis. The molten salt may be a mixture such as eutectic mixture. Preferably, the mixture comprises NaF and HF as known in the art. Sodium metal and fluorine gas may be collected from the electrolysis. Na may be reacted with H to form NaH. Fluorine gas may be reacted with a hydrocarbon to form a fluorinated hydrocarbon that may serve as the solvent. HF fluorination product can be returned to the electrolysis mixture. Alternatively, a hydrocarbon and a carbon product such as benzene and graphitic carbon, respectively, can be fluorinated and returned to the reaction mixture. Carbon can be cracked to smaller fluorinated fragments with a lower melting point to serve as the solvent by methods known in the art. The solvent may comprise a mixture. The degree of fluorination can be used as a method to control the hydrogen catalysis reaction rate.

In an embodiment, $CF_4$ is produced by electrolysis of a molten fluoride salt, preferably an alkali fluoride, using a carbon electrode or by reaction of carbon dioxide with fluorine gas. Any $CH_4$ and hydrocarbons products may also be fluorinated to $CF_4$ and fluorcarbons.

Suitable fluorinated HSA materials and methods to fluorinated carbon to form said HSA materials may those known in the art such as those disclosed in U.S. Pat. Nos. 3,929,920, 3,925,492, 3,925,263, and 4,886,921. Further methods comprise the preparation of poly-dicarbon monofluoride as disclosed in U.S. Pat. No. 4,139,474, a process for the continuous fluorination of carbon as disclosed in U.S. Pat. No. 4,447,663, a process for producing a graphite fluoride comprising mainly polydicarbon monofluoride represented by the formula $(C_2F)_n$ as disclosed in U.S. Pat. No. 4,423,261, a process for preparing polycarbonmonofluoride as disclosed in U.S. Pat. No. 3,925,263, a process for the preparation of graphite fluoride as disclosed in U.S. Pat. No. 3,872,032, a process for preparing poly-dicarbon monofluoride as disclosed in U.S. Pat. No. 4,243,615, a method for the preparation of graphite fluoride by contact reaction between carbon and fluorine gas as disclosed in U.S. Pat. No. 4,438,086, the synthesis of fluorographite as disclosed in U.S. Pat. No. 3,929,918, the process for preparing polycarbonmonofluoride as disclosed in U.S. Pat. No. 3,925,492, and a mechanism for providing new synthetic approaches to graphite-fluorine chemistry as disclosed by Lagow et al., J. C. S. Dalton, 1268 (1974) wherein the materials disclosed therein comprise the HSA materials. As a kind of material of reactors, Monel metal, nickel, steel, or copper may be employed in consideration of the corrosion by fluorine gas. The carbon materials include amorphous carbons such as carbon black, petroleum coke, petroleum pitch coke and charcoal, and crystalline carbons such as natural graphite, graphene, and artificial graphite, fullerene and nanotubes, preferably single-walled. Preferably Na does not intercalate into the carbon support or form an acetylide. Such carbon materials can be employed in various forms. In general preferably, the powdery carbon materials have an average particle size of not more than 50 microns, but greater is suitable as well. In addition to the powdery carbon materials, other forms are suitable. The carbon materials may be in the form of blocks, spheres, bars and fibers. The reaction may performed in a reactor chosen from a fluidized bed-type reactor, a rotary kiln-type reactor and a tray tower-type reactor.

In another embodiment, the fluorinated carbon is regenerated using an additive. Carbon can also be fluorinated by inorganic reactants such as $CoF_3$ outside of the cell or in situ. The reaction mixture may further comprise a source of inorganic fluorinating reactant such as one of Co, CoF, $CoF_2$, and $CoF_3$ that may be added to the reactor and regenerated or it may be formed during the operation of the cell from the reactant mixture to form hydrinos and possibly another reagent such as $F_2$ gas with optionally a fluorination catalytic metal such as Pt or Pd. The additive may be $NH_3$ that may form $NH_4F$. At least one of carbon and hydrocarbon may react with $NH_4F$ to become fluorinated. In an embodiment, the reaction mixture further comprises $HNaF_2$ that may react with carbon to fluorinate it. The fluorocarbon may be formed in situ or externally to the hydrino reactor. The fluorocarbon may serve as a solvent or HSA material.

In an embodiment wherein at least one of the solvent, support, or getter comprises fluorine, products comprise possibly carbon, in cases such that the solvent or support is a fluorinated organic, as well as fluorides of the catalyst metal such as $NaHF_2$, and NaF. This is in addition to lower-energy hydrogen products such as molecular hydrino gas that may be vented or collected. Using $F_2$, the carbon may be etched away as $CF_4$ gas that may be used as a reactant in another cycle of the reaction to make power. The remaining products of NaF and $NaHF_2$ may be electrolyzed to Na and $F_2$. The Na may be reacted with hydrogen to form NaH and the $F_2$ may be used to etch carbon product. The NaH, remaining NaF, and $CF_4$ may be combined to run another cycle of the power-production reaction to form hydrinos. In other embodiments, Li, K, Rb, or Cs may replace Na.

VI. Other Liquid and Heterogeneous Fuel Embodiments

In the present disclosure a "liquid-solvent embodiment" comprises any reaction mixture and the corresponding fuel comprising a liquid solvent such as a liquid fuel and a heterogeneous fuel.

In another embodiment comprising a liquid solvent, one of atomic sodium and molecular NaH is provided by a reaction between a metallic, ionic, or molecular form of Na and at least one other compound or element. The source of Na or NaH may be at least one of metallic Na, an inorganic compound comprising Na such as NaOH, and other suitable Na compounds such as $NaNH_2$, $Na_2CO_3$, and $Na_2O$, NaX (X is a halide), and NaH (s). The other element may be H, a displacing agent, or a reducing agent. The reaction mixture may comprise at least one of (1) a solvent, (2) a source of sodium such as at least one of Na(m), NaH, $NaNH_2$, $Na_2CO_3$, $Na_2O$, NaOH, NaOH doped-R-Ni, NaX (X is a halide), and NaX doped R-Ni, (3) a source of hydrogen such as $H_2$ gas and a dissociator and a hydride, (4) a displacing agent such as an alkali or alkaline earth metal, preferably Li, and (5) a reducing agent such as at least one of a metal such as an alkaline metal, alkaline earth metal, a lanthanide, a transition metal such as Ti, aluminum, B, a metal alloy such as AlHg, NaPb, NaAl, LiAl, and a source of a metal alone or in combination with reducing agent such as an alkaline earth halide, a transition metal halide, a lanthanide halide, and aluminum halide. Preferably, the alkali metal reductant is Na. Other suitable reductants comprise metal hydrides such as $LiBH_4$, $NaBH_4$, $LiAlH_4$, or $NaAlH_4$. Preferably, the reducing agent reacts with NaOH to form a NaH molecules and a Na product such as Na, NaH (s), and $Na_2O$. The source of NaH may be R-Ni comprising NaOH and a reactant such as a reductant to form NaH catalyst such as an alkali or alkaline earth metal or the Al intermetallic of R-Ni. Further exemplary reagents are an alkaline or alkaline earth metal and an oxidant such as $AlX_3$, $MgX_2$, $LaX_3$, $CeX_3$, and $TiX$. where X is a halide, preferably Br or I. Additionally, the reaction mixture may comprise another compound comprising a getter or a dispersant such as at least one of $Na_2CO_3$, $Na_3SO_4$, and $Na_3PO_4$ that may be doped into the dissociator such as R-Ni. The reaction mixture may further comprise a support wherein the support may be doped with at least one reactant of the mixture. The support may have preferably a large surface area that favors the production of NaH catalyst from the reaction mixture. The support may comprise at least one of the group of R-Ni, Al, Sn, $Al_2O_3$ such as gamma, beta, or alpha alumina, sodium aluminate (beta-aluminas have other ions present such as $Na^+$ and possess the idealized composition $NaO.11Al_2O_3$), lanthanide oxides such as $M_2O_3$ (preferably M=La, Sm, Dy, Pr, Tb, Gd, and Er), Si, silica, silicates, zeolites, lanthanides, transition metals, metal alloys such as alkali and alkali earth alloys with Na, rare earth metals, $SiO_2$—$Al_2O_3$ or $SiO_2$ supported Ni, and other supported metals such as at least one of alumina supported platinum, palladium, or ruthenium. The support may have a high surface area and comprise a high-surface-area (HSA)

materials such as R-Ni, zeolites, silicates, aluminates, aluminas, alumina nanoparticles, porous $Al_2O_3$, Pt, Ru, or $Pd/Al_2O_3$, carbon, Pt or Pd/C, inorganic compounds such as $Na_2CO_3$, silica and zeolite materials, preferably Y zeolite powder, and carbon such as fullerene or nanotubes. In an embodiment, the support such as $Al_2O_3$ (and the $Al_2O_3$ support of the dissociator if present) reacts with the reductant such as a lanthanide to form a surface-modified support. In an embodiment, the surface Al exchanges with the lanthanide to form a lanthanide-substituted support. This support may be doped with a source of NaH molecules such as NaOH and reacted with a reductant such as a lanthanide. The subsequent reaction of the lanthanide-substituted support with the lanthanide will not significantly change it, and the doped NaOH on the surface can be reduced to NaH catalyst by reaction with the reductant lanthanide.

In an embodiment comprising a liquid solvent, wherein the reaction mixture comprises a source of NaH catalyst, the source of NaH may be an alloy of Na and a source of hydrogen. The alloy may comprise at least one of those known in the art such as an alloy of sodium metal and one or more other alkaline or alkaline earth metals, transition metals, Al, Sn, Bi, Ag, In, Pb, Hg, Si, Zr, B, Pt, Pd, or other metals and the H source may be $H_2$ or a hydride.

The reagents such as the source of NaH molecules, the source of sodium, the source of NaH, the source of hydrogen, the displacing agent, and the reducing agent are in any desired molar ratio. Each is in a molar ratio of greater than 0 and less than 100%. Preferably, the molar ratios are similar.

In a liquid-solvent embodiment, the reaction mixture comprises at least one species of the group comprising a solvent, Na or a source of Na, NaH or a source of NaH, a metal hydride or source of a metal hydride, a reactant or source of a reactant to form a metal hydride, a hydrogen dissociator, and a source of hydrogen. The reaction mixture may further comprise a support. A reactant to form a metal hydride may comprise a lanthanide, preferably La or Gd. In an embodiment, La may reversibly react with NaH to form $LaH_n$ (n=1,2,3). In an embodiment, the hydride exchange reaction forms NaH catalyst. The reversible general reaction may be given by $$NaH+M \leftrightarrows Na+MH \tag{156}$$

The reaction given by Eq. (156) applies to other MH-type catalysts given in TABLE 3. The reaction may proceed with the formation of hydrogen that may be dissociated to form atomic hydrogen that reacts with Na to form NaH catalyst. The dissociator is preferably at least one of Pt, Pd, or $Ru/Al_2O_3$ powder, Pt/Ti, and R-Ni. Preferentially, the dissociator support such as $Al_2O_3$ comprises at least surface La substitution for Al or comprises Pt, Pd, or $Ru/M_2O_3$ powder wherein M is a lanthanide. The dissociator may be separated from the rest of the reaction mixture wherein the separator passes atomic H.

A suitable liquid-solvent embodiment comprises the reaction mixture of a solvent, NaH, La, and Pd on $Al_2O_3$ powder wherein the reaction mixture may be regenerated in an embodiment by removing the solvent, adding $H_2$, separating NaH and lanthanum hydride by sieving, heating lanthanum hydride to form La, and mixing La and NaH. Alternatively, the regeneration involves the steps of separating Na and lanthanum hydride by melting Na and removing the liquid, heating lanthanum hydride to form La, hydriding Na to NaH, mixing La and NaH, and adding the solvent. The mixing of La and NaH may be by ball milling.

In a liquid-solvent embodiment, a high-surface-area material such as R-Ni is doped with NaX (X=F, Cl, Br, I). The doped R-Ni is reacted with a reagent that will displace the halide to form at least one of Na and NaH. In an embodiment, the reactant is at least an alkali or alkaline earth metal, preferably at least one of K, Rb, Cs. In another embodiment, the reactant is an alkaline or alkaline earth hydride, preferably at least one of KH, RbH, CsH, $MgH_2$ and $CaH_2$. The reactant may be both an alkali metal and an alkaline earth hydride. The reversible general reaction may be given by $$NaX+MH \leftrightarrows NaH+MX \tag{157}$$

A. NaOH Catalyst Reactions to Form NaH Catalyst

The reaction of NaOH and Na to $Na_2O$ and NaH is $$NaOH+2Na \rightarrow Na_2O+NaH \tag{158}$$

The exothermic reaction can drive the formation of NaH(g). Thus, Na metal can serve as a reductant to form catalyst NaH(g). Other examples of suitable reductants that have a similar highly exothermic reduction reaction with the NaH source are alkali metals, alkaline earth metals such as at least one of Mg and Ca, metal hydrides such as $LiBH_4$, $NaBH_4$, $LiAlH_4$, or $NaAlH_4$, B, Al, transition metals such as Ti, lanthanides such as at least one of La, Sm, Dy, Pr, Tb, Gd, and Er, preferably La, Tb, and Sm. Preferably, the reaction mixture comprises a solvent, a high-surface-area material (HSA material) having a dopant such as NaOH comprising a source of NaH catalyst. Preferably, conversion of the dopant on the material with a high surface area to the catalyst is achieved. The conversion may occur by a reduction reaction. In addition to Na, other preferred reductants are other alkali metals, Ti, a lanthanide, or Al. Preferably, the reaction mixture comprises NaOH doped into a HSA material preferably R-Ni wherein the reductant is Na or the intermetallic Al. The reaction mixture may further comprise a source of H such as a hydride or $H_2$ gas and a dissociator. In certain embodiments, the H source is hydrided R-Ni.

In a liquid-solvent embodiment, $Na_2O$ formed as a product of a reaction to generate NaH catalyst such as that given by Eq. (158), is reacted with a source of hydrogen to form NaOH that can further serve as a source of NaH catalyst. In an embodiment, a regenerative reaction of NaOH from Eq. (158) in the presence of atomic hydrogen is $$Na_2O+H \rightarrow NaOH+Na \quad \Delta H=11.6 \text{ kJ/mole NaOH} \tag{159}$$

$$NaH \rightarrow Na+H(1/3) \quad \Delta H=-10,500 \text{ kJ/mole H} \tag{160}$$

and $$NaH \rightarrow Na+H(1/4) \quad \Delta H=-19,700 \text{ kJ/mole H}. \tag{161}$$

Thus, a small amount of NaOH and Na with a source of atomic hydrogen or atomic hydrogen serves as a catalytic source of the NaH catalyst, that in turn forms a large yield of hydrinos via multiple cycles of regenerative reactions such as those given by Eqs. (158-161). In an embodiment, from the reaction given by Eq. (162), $Al(OH)_3$ can serve as a source of NaOH and NaH wherein with Na and H, the reactions given by Eqs. (158-161) proceed to form hydrinos.

$$3Na+Al(OH)_3 \rightarrow NaOH+NaAlO_2+NaH+\tfrac{1}{2}H_2. \tag{162}$$

In a liquid-solvent embodiment, the Al of the intermetallic serves as the reductant to form NaH catalyst The balanced reaction is given by $$3NaOH+2Al \rightarrow Al_2O_3+3NaH \tag{163}$$

This exothermic reaction can drive the formation of NaH(g) to drive the very exothermic reaction given by Eqs. (25-30)

wherein the regeneration of NaH occurs from Na in the presence of atomic hydrogen.

Two suitable liquid-solvent embodiments comprise the first reaction mixture of Na and R-Ni comprising about 0.5 wt % NaOH wherein Na serves as the reductant and a second reaction mixture of R-Ni comprising about 0.5 wt % NaOH wherein intermetallic Al serves as the reductant. The reaction mixture may be regenerated by adding NaOH and NaH that may serve as an H source and a reductant.

In a liquid-solvent embodiment, of the energy reactor, the source of NaH such as NaOH is regenerated by addition of a source of hydrogen such as at least one of a hydride and hydrogen gas and a dissociator. The hydride and dissociator may be hydrided R-Ni. In another embodiment, the source of NaH such as NaOH-doped R-Ni is regenerated by at least one of rehydriding, addition of NaH, and addition of NaOH wherein the addition may be by physical mixing. With the solvent first removed, the mixing may be performed mechanically by methods such as by ball milling.

In a liquid-solvent embodiment, the reaction mixture further comprises oxide-forming reactants that react with NaOH or $Na_2O$ to form a very stable oxide and NaH. Such reactants comprises a cerium, magnesium, lanthanide, titanium, or aluminum or their compounds such as $AlX_3$, $MgX_2$, $LaX_3$, $CeX_3$, and $TiX_n$ where X is a halide, preferably Br or I and a reducing compound such as an alkali or alkaline earth metal. In an embodiment, the source of NaH catalyst comprises R-Ni comprising a sodium compound such as NaOH on its surface. Then, the reaction of NaOH with the oxide-forming reactants such as $AlX_3$, $MgX_2$, $LaX_3$, $CeX_3$, and $TiX_n$, and alkali metal M forms NaH, MX, and $Al_2O_3$, MgO, $La_2O_3$, $Ce_2O_3$, and $Ti_2O_3$, respectively.

In a liquid-solvent embodiment, the reaction mixture comprises NaOH doped R-Ni and an alkaline or alkaline earth metal added to form at least one of Na and NaH molecules. The Na may further react with H from a source such as $H_2$ gas or a hydride such as R-Ni to form NaH catalyst. The subsequent catalysis reaction of NaH forms H states given by Eq. (35). The addition of an alkali or alkaline earth metal M may reduce $Na^+$ to Na by the reactions:

$$NaOH+M \text{ to } MOH+Na \qquad (164)$$

$$2NaOH+M \text{ to } M(OH)_2+2Na. \qquad (165)$$

M may also react with NaOH to form H as well as Na $$2NaOH+M \text{ to } Na_2O+H_2+MO \qquad (166)$$

$$Na_2O+M \text{ to } M_2O+2Na. \qquad (167)$$

Then, the catalyst NaH may be formed by the reaction $$Na+H \text{ to } NaH \qquad (168)$$

by reacting with H from reactions such as that given by Eq. (166) as well as from R-Ni and any added source of H. Na is a suitable reductant since it is a further source of NaH.

Hydrogen may be added to reduce NaOH and form NaH catalyst:

$$NaOH+H_2 \text{ to } NaH+H_2O. \qquad (169)$$

The H in R-Ni may reduce NaOH to Na metal, and water that may be removed by pumping. An organic solvent may first be removed before the reduction or a molten inorganic solvent may be used.

In a liquid-solvent embodiment, the reaction mixture comprises one or more compounds that react with a source of NaH to form NaH catalyst. The source may be NaOH. The compounds may comprise at least one of a $LiNH_2$, $Li_2NH$, and $Li_3N$. The reaction mixture may further comprise a source of hydrogen such as $H_2$. In embodiments, the reaction of sodium hydroxide and lithium amide to form NaH and lithium hydroxide is $$NaOH+LiNH_2 \rightarrow LiOH+NaH+\tfrac{1}{2}N_2+LiH. \qquad (170)$$

The reaction of sodium hydroxide and lithium imide to form NaH and lithium hydroxide is $$NaOH+Li_2NH \rightarrow Li_2O+NaH+\tfrac{1}{2}N_2+\tfrac{1}{2}H_2. \qquad (171)$$

And, the reaction of sodium hydroxide and lithium nitride to form NaH and lithium oxide is $$NaOH+Li_3N \rightarrow Li_2O+NaH+\tfrac{1}{2}N_2+Li. \qquad (172)$$

B. Alkaline Earth Hydroxide Catalyst Reactions to Form NaH Catalyst

In a liquid-solvent embodiment, a source of H is provided to a source of Na to form the catalyst NaH. The Na source may be the metal. The source of H may be a hydroxide. The hydroxide may be at least one of alkali, alkaline earth hydroxide, a transition metal hydroxide, and $Al(OH)_3$. In an embodiment, Na reacts with a hydroxide to form the corresponding oxide and NaH catalyst. In an embodiment wherein the hydroxide is $Mg(OH)_2$, the product is MgO. In an embodiment wherein the hydroxide is $Ca(OH)_2$, the product is CaO. Alkaline earth oxides may be reacted with water to regenerate the hydroxide. The hydroxide can be collected as a precipitate by methods such as filtration and centrifugation.

For example, in an embodiment, the reaction to form NaH catalyst and regeneration cycle for $Mg(OH)_2$, are given by the reactions:

$$3Na+Mg(OH)_2 \rightarrow 2NaH+MgO+Na_2O \qquad (173)$$

$$MgO+H_2O \rightarrow Mg(OH)_2. \qquad (174)$$

In a liquid-solvent embodiment, the reaction to form NaH catalyst and regeneration cycle for $Ca(OH)_2$, are given by the reactions:

$$4Na+Ca(OH)_2 \rightarrow 2NaH+CaO+Na_2O \qquad (175)$$

$$CaO+H_2O \rightarrow Ca(OH)_2. \qquad (176)$$

C. Na/N Alloy Reactions to Form NaH Catalyst

Alkali metal in the solid and liquid states is a metal. In order to generate M or MH catalyst, M is an alkali metal, the reaction mixture of the liquid or heterogeneous fuel comprises M/N alloy reactants. In an embodiment, the reaction mixture, liquid-fuel reactions, heterogeneous-fuel reactions, and regeneration reactions comprise those of the M/N system, wherein the fuel generates at least one of the catalyst and atomic hydrogen.

In an embodiment, the reaction mixture comprises one or more compounds that react with a source of NaH to form NaH catalyst. The reaction mixture may comprise at least one of the group of Na, NaH, $NaNH_2$, $Na_2NH$, $Na_3N$, $NH_3$, a dissociator, a hydrogen source such as $H_2$ gas or a hydride, a support, and a getter such as NaX (X is a halide). The dissociator is preferably Pt, Ru, or $Pd/Al_2O_3$ powder. The dissociator may comprise Pt or Pd on a high surface area support suitably inert to Na. The dissociator may be Pt or Pd on carbon or $Pd/Al_2O_3$. The latter support may comprise a protective surface coating of a material such as $NaAlO_2$. The reactants may be present in any wt %.

A suitable liquid-solvent embodiment comprises the reaction mixture of a solvent, Na or NaH, $NaNH_2$, and Pd on $Al_2O_3$ powder wherein the reaction mixture may be regenerated by addition of $H_2$.

In an embodiment, NaNH$_2$ is added to the reaction mixture. NaNH$_2$ generates NaH according to the reversible reactions $$Na_2 + NaNH_2 \to NaH + Na_2NH \quad (177)$$

and $$2NaH + NaNH_2 \to NaH(g) + Na_2NH + H_2. \quad (178)$$

In the hydrino reaction cycle, Na—Na and NaNH$_2$ react to form NaH molecule and Na$_2$NH, and the NaH forms hydrino and Na. Thus, the reaction is reversible according to the reactions:

$$Na_2NH + H_2 \to NaNH_2 + NaH \quad (179)$$

and $$Na_2NH + Na + H \to NaNH_2 + Na_2. \quad (180)$$

In an embodiment, NaH of Eq. (179) is molecular such that this reaction is another to generate the catalyst.

The reaction of sodium amide and hydrogen to form ammonia and sodium hydride is $$H_2 + NaNH_2 \to NH_3 + NaH \quad (181)$$

In a liquid-solvent embodiment, this reaction is reversible. The reaction can be driven to form NaH by increasing the H$_2$ concentration. Alternatively, the forward reaction can be driven via the formation of atomic H using a dissociator. The reaction is given by $$2H + NaNH_2 \to NH_3 + NaH \quad (182)$$

The exothermic reaction can drive the formation of NaH(g).

In a liquid-solvent embodiment, NaH catalyst is generated from a reaction of NaNH$_2$ and hydrogen, preferably atomic hydrogen as given in reaction Eqs. (181-182). The ratios of reactants may be any desired amount. Preferably the ratios are about stoichiometric to those of Eqs. (181-182). The reactions to form catalyst are reversible with the addition of a source of H such as H$_2$ gas or a hydride to replace that reacted to form hydrinos wherein the catalyst reactions are given by Eqs. (25-30), and sodium amide forms with additional NaH catalyst by the reaction of ammonia with Na:

$$NH_3 + Na_2 \to NaNH_2 + NaH. \quad (183)$$

In a liquid-solvent embodiment, a HSA material is doped with NaNH$_2$. The doped HSA material is reacted with a reagent that will displace the amide group to form at least one of Na and NaH. In an embodiment, the reactant is an alkali or alkaline earth metal, preferably Li. In another embodiment, the reactant is an alkaline or alkaline earth hydride, preferably LiH. The reactant may be both an alkali metal and an alkaline earth hydride. A source of H such as H$_2$ gas may be further provided in addition to that provided by any other reagent of the reaction mixture such as a hydride, HSA material, and displacing reagent.

In a liquid-solvent embodiment, sodium amide undergoes reaction with lithium to form lithium amide, imide, or nitride and Na or NaH catalyst. The reaction of sodium amide and lithium to form lithium imide and NaH is $$2Li + NaNH_2 \to Li_2NH + NaH \quad (184)$$

The reaction of sodium amide and lithium hydride to form lithium amide and NaH is $$LiH + NaNH_2 \to LiNH_2 + NaH \quad (185)$$

The reaction of sodium amide, lithium, and hydrogen to form lithium amide and NaH is $$Li + \tfrac{1}{2}H_2 + NaNH_2 \to LiNH_2 + NaH. \quad (186)$$

In a liquid-solvent embodiment, the reaction of the mixture forms Na, and the reactants further comprise a source of H that reacts with Na to form catalyst NaH by a reaction such as the following:

$$Li + NaNH_2 \text{ to } LiNH_2 + Na \quad (187)$$

and $$Na + H \text{ to } NaH \quad (188)$$

$$LiH + NaNH_2 \text{ to } LiNH_2 + NaH. \quad (189)$$

In a liquid-solvent embodiment, the reactants comprise NaNH$_2$, a reactant to displace the amide group of NaNH$_2$ such as an alkali or alkaline earth metal, preferably Li, and may additionally comprise a source of H such as at least one of MH (M=Li, Na, K, Rb, Cs, Mg, Ca, Sr, and Ba), H$_2$ and a hydrogen dissociator, and a hydride.

The reagents of the reaction mixture such as solvent, M, MH, NaH, NaNH$_2$, HSA material, hydride, and the dissociator are in any desired molar ratio. Each of M, MH, NaNH$_2$, and the dissociator are in molar ratios of greater than 0 and less than 100%, preferably the molar ratios are similar.

Other embodiments of liquid-solvent systems to generate molecular catalyst NaH involve Na and NaBH$_4$ or NH$_4$X (X is an anion such as halide). Molecular NaH catalyst can be generated by reaction of Na$_2$ and NaBH$_4$:

$$Na_2 + NaBH_4 \text{ to } NaBH_3 + Na + NaH. \quad (190)$$

NH$_4$X can generate NaNH$_2$ and H$_2$ $$Na_2 + NH_4X \text{ to } NaX + NaNH_2 + H_2. \quad (191)$$

Then, NaH catalyst can be generated according to the reaction of Eqs. (177-189). In another liquid-solvent embodiment, the reaction mechanism for the Na/N system to form hydrino catalyst NaH is $$NH_4X + Na\text{-}Na \text{ to } NaH + NH_3 + NaX. \quad (192)$$

D. Additional MH-Type Catalysts and Reactions

Another catalytic system of the type MH involves aluminum. The bond energy of AlH is 2.98 eV. The first and second ionization energies of Al are 5.985768 eV and 18.82855 eV, respectively. Based on these energies AlH molecule can serve as a catalyst and H source since the bond energy of AlH plus the double ionization (t=2) of Al to Al$^{2+}$, is 27.79 eV (27.2 eV) which is equivalent to m=1 in Eq. (36). The catalyst reactions are given by $$27.79 \text{ eV} + AlH \to Al^{2+} + 2e^- + H\left[\frac{a_H}{(2)}\right] + \left[(2)^2 - 1^2\right] \cdot 13.6 \text{ eV} \quad (193)$$

$$Al^{2+} + 2e^- + H \to AlH + 27.79 \text{ eV, and} \quad (194)$$

the overall reaction is $$H \to H\left[\frac{a_H}{(2)}\right] + \left[(2)^2 - 1^2\right] \cdot 13.6 \text{ eV}. \quad (195)$$

In a liquid-solvent embodiment, the reaction mixture comprises at least one of AlH molecules and a source of AlH molecules. A source of AlH molecules may comprise Al metal and a source of hydrogen, preferably atomic hydrogen. The source of hydrogen may be a hydride, preferably R-Ni. In another embodiment, the catalyst AlH is generated by the reaction of an oxide or hydroxide of Al with a reductant. The reductant comprises at least one of the NaOH reductants given previously. In an embodiment, a source of H is provided to a source of Al to form the catalyst AlH. The Al source may be the metal. The source of H may be a hydroxide. The hydroxide may be at least one of alkali, alkaline earth hydroxide, a transition metal hydroxide, and $Al(OH)_3$.

Raney nickel can be prepared by the following two reaction steps:

$$Ni + 3Al \rightarrow NiAl_3 \text{ (or } Ni_2Al_3\text{)} \tag{196}$$

$$NiAl_3 + 2NaOH + 6H_2O \rightarrow$$
$$(NiAl_x \text{ (skeleton, porous Ni)} + 2Na[Al(OH)_4] + 3H_2). \tag{197}$$

$Na[Al(OH)_4]$ is readily dissolved in concentrated NaOH. It can be washed in de-oxygenated water. The prepared Ni contains Al (~10 wt %, that may vary), is porous, and has a large surface area. It contains large amounts of H, both in the Ni lattice and in the form of Ni—$AlH_x$ ($x$=1,2,3).

R-Ni may be reacted with another element to cause the chemical release of AlH molecules which then undergo catalysis according to reactions given by Eqs. (193-195). In an embodiment, the AlH release is caused by a reduction reaction, etching, or alloy formation. One such other element M is an alkali or alkaline earth metal which reacts with the Ni portion of R-Ni to cause the AlH component to release AlH molecules that subsequently under go catalysis. In an embodiment, M may react with Al hydroxides or oxides to form Al metal that may further react with H to form AlH. The reaction can be initiated by heating, and the rate may be controlled by controlling the temperature. Solvent, M (alkali or alkaline earth metal), and R-Ni are in any desired molar ratio. Each of solvent, M, and R-Ni are in molar ratios of greater than 0 and less than 100%. Preferably the molar ratio of M and R-Ni are similar.

In a liquid-solvent embodiment, the source of AlH comprises R-Ni and other Raney metals or alloys of Al known in the art such as R-Ni or an alloy comprising at least one of Ni, Cu, Si, Fe, Ru, Co, Pd, Pt, and other elements and compounds. The R-Ni or alloy may further comprise promoters such as at least one of Zn, Mo, Fe, and Cr. The R-Ni may be at least one of W. R. Grace Raney 2400, Raney 2800, Raney 2813, Raney 3201, Raney 4200, or an etched or Na doped embodiment of these materials. In another liquid-solvent embodiment of the AlH catalyst system, the source of catalyst comprises a Ni/Al alloy wherein the Al to Ni ratio is in the range of about 10-90%, preferably about 10-50%, and more preferably about 10-30%. The source of catalyst may comprise palladium or platinum and further comprise Al as a Raney metal.

Another catalytic system of the type MH involves chlorine. The bond energy of HCl is 4.4703 eV. The first, second, and third ionization energies of Cl are 12.96764 eV, 23.814 eV, and 39.61 eV, respectively. Based on these energies HCl can serve as a catalyst and H source since the bond energy of HCl plus the triple ionization (t=3) of Cl to $Cl^{3+}$, is 80.86 eV (3.27.2 eV) which is equivalent to m=3 in Eq. (36). The catalyst reactions are given by $$80.86 \text{ eV} + HCl \rightarrow Cl^{3+} + 3e^- + H\left[\frac{a_H}{(4)}\right] + \lceil(4)^2 - 1^2\rceil \cdot 13.6 \text{ eV} \tag{198}$$

$$Cl^{3+} + 3e^- + H \rightarrow HCl + 80.86 \text{ eV, and} \tag{199}$$

the overall reaction is $$H \rightarrow H\left[\frac{a_H}{(4)}\right] + \lceil(4)^2 - 1^2\rceil \cdot 13.6 \text{ eV}. \tag{200}$$

In a liquid-solvent embodiment, the reaction mixture comprises HCl or a source of HCl. A source may be $NH_4Cl$ or a solid acid and a chloride such as an alkali or alkaline earth chloride. The solid acid may be at least one of $MHSO_4$, $MHCO_3$, $MH_2PO_4$, and $MHPO_4$ wherein M is a cation such as an alkali or alkaline earth cation. Other such solid acids are known to those skilled in the art. In an embodiment, the reaction mixture comprises a strong acid such as $H_2SO_4$ and an ionic compound such as NaCl. The reaction of the acid with the ionic compound such as NaCl generates HCl to serve as a hydrino catalyst and H source.

In general, MH type hydrogen catalysts to produce hydrinos provided by the breakage of the M-H bond plus the ionization of t electrons from the atom M each to a continuum energy level such that the sum of the bond energy and ionization energies of the t electrons is approximately m·27.2 eV where m is an integer are given in TABLE 3. Each MH catalyst is given in the first column and the corresponding M-H bond energy is given in column two. The atom M of the MH species given in the first column is ionized to provide the net enthalpy of reaction of m·27.2 eV with the addition of the bond energy in column two. The enthalpy of the catalyst is given in the eighth column where m is given in the ninth column. The electrons that participate in ionization are given with the ionization potential (also called ionization energy or binding energy). For example, the bond energy of NaH, 1.9245 eV, is given in column two. The ionization potential of the n th electron of the atom or ion is designated by $IP_n$ and is given by the CRC. That is for example, Na+5.13908 eV$\rightarrow Na^+ + e^-$ and $Na^+$+47.2864 eV$\rightarrow Na^{2+}+e^-$. The first ionization potential, $IP_1$=5.13908 eV, and the second ionization potential, $IP_2$=47.2864 eV, are given in the second and third columns, respectively. The net enthalpy of reaction for the breakage of the NaH bond and the double ionization of Na is 54.35 eV as given in the eighth column, and m=2 in Eq. (36) as given in the ninth column. Additionally, H can react with each of the MH molecules given in TABLE 3 to form a hydrino having a quantum number p increased by one (Eq. (35)) relative to the catalyst reaction product of MH alone as given by exemplary Eq. (23).

TABLE 3

MH type hydrogen catalysts capable of providing a net enthalpy of reaction of approximately m · 27.2 eV.

| Catalyst | M-H Bond Energy | $IP_1$ | $IP_2$ | $IP_3$ | $IP_4$ | $IP_5$ | Enthalpy | m |
|---|---|---|---|---|---|---|---|---|
| AlH | 2.98 | 5.985768 | 18.82855 | | | | 27.79 | 1 |
| BiH | 2.936 | 7.2855 | 16.703 | | | | 26.92 | 1 |
| ClH | 4.4703 | 12.96763 | 23.8136 | 39.61 | | | 80.86 | 3 |
| CoH | 2.538 | 7.88101 | 17.084 | | | | 27.50 | 1 |
| GeH | 2.728 | 7.89943 | 15.93461 | | | | 26.56 | 1 |
| InH | 2.520 | 5.78636 | 18.8703 | | | | 27.18 | 1 |
| NaH | 1.925 | 5.139076 | 47.2864 | | | | 54.35 | 2 |
| RuH | 2.311 | 7.36050 | 16.76 | | | | 26.43 | 1 |
| SbH | 2.484 | 8.60839 | 16.63 | | | | 27.72 | 1 |
| SeH | 3.239 | 9.75239 | 21.19 | 30.8204 | 42.9450 | | 107.95 | 4 |
| SiH | 3.040 | 8.15168 | 16.34584 | | | | 27.54 | 1 |
| SnH | 2.736 | 7.34392 | 14.6322 | 30.50260 | | | 55.21 | 2 |

In other liquid-solvent embodiments of the MH type catalyst, the reactants comprise sources of SbH, SiH, SnH, and InH. In embodiments providing the catalyst MH, the sources comprise at least one of M and a source of $H_2$ and MH such as at least one of Sb, Si, Sn, and In and a source of $H_2$, and $SbH_3$, $SiH_4$, $SnH_4$, and $InH_3$.

The liquid-solvent reaction mixture may further comprise a source of H and a source of catalyst wherein the source of at least one of H and catalyst may be a solid acid or $NH_4X$ where X is a halide, preferably Cl to form HCl catalyst. Preferably, the reaction mixture may comprise at least one of solvent, $NH_4X$, a solid acid, NaX, LiX, KX, NaH, LiH, KH, Na, Li, K, a support, a hydrogen dissociator and $H_2$ where X is a halide, preferably Cl. The solid acid may be $NaHSO_4$, $KHSO_4$, $LiHSO_4$, $NaHCO_3$, $KHCO_3$, $LiHCO_3$, $Na_2HPO_4$, $K_2HPO_4$, $Li_2HPO_4$, $NaH_2PO_4$, $KH_2PO_4$, and $LiH_2PO_4$. The catalyst may be at least one of NaH, Li, K, and HCl. The reaction mixture may further comprise at least one of a dissociator and a support.

In each case of a source of MH comprising an M alloy such as AlH and Al, respectively, the alloy may be hydrided with a source of $H_2$ such as $H_2$ gas. $H_2$ can be supplied to the alloy during the reaction, or $H_2$ may be supplied to form the alloy of a desired H content with the H pressure changed during the reaction. In this case, the initial $H_2$ pressure may be about zero. The alloy may be activated by the addition of a metal such as an alkali or alkaline earth metal. For MH catalysts and sources of MH, the hydrogen gas may be maintained in the range of about 1 Torr to 100 atm, preferably about 100 Torr to 10 atm, more preferably about 500 Torr to 2 atm. In other embodiments, the source of hydrogen is from a hydride such as an alkali or alkaline earth metal hydride or a transition metal hydride.

Atomic hydrogen in high density can undergo three-body-collision reactions to form hydrinos wherein one H atom undergoes the transition to form states given by Eq. (35) when two additional H atoms ionize. The reaction are given by $$27.21 \text{ eV} + 2H[a_H] + H[a_H] \rightarrow \qquad (201)$$

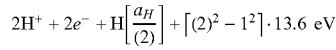

$$2H^+ + 2e^- \rightarrow 2H[a_H] + 27.21 \text{ eV}, \qquad (202)$$

the overall reaction is $$H[a_H] \rightarrow H\left[\frac{a_H}{(2)}\right] + \lceil (2)^2 - 1^2 \rceil \cdot 13.6 \text{ eV}. \qquad (203)$$

In another embodiment, the reaction are given by $$54.4 \text{ eV} + 2H[a_H] + H[a_H] \rightarrow \qquad (204)$$

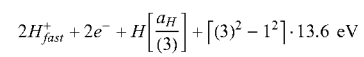

$$2H^+_{fast} + 2e^- \rightarrow 2H[a_H] + 54.4 \text{ eV, and} \qquad (205)$$

the overall reaction is $$H[a_H] \rightarrow H\left[\frac{a_H}{(3)}\right] + \lceil (3)^2 - 1^2 \rceil \cdot 13.6 \text{ eV}. \qquad (206)$$

In a liquid-solvent embodiment, the material that provides H atoms in high density is R-Ni. The atomic H may be from at least one of the decomposition of H within R-Ni and the dissociation of $H_2$ from an $H_2$ source such as $H_2$ gas supplied to the cell. R-Ni may be reacted with an alkali or alkaline earth metal M to enhance the production of layers of atomic H to cause the catalysis. R-Ni isolated from the solvent mixture can be regenerated by evaporating the metal M followed by addition of hydrogen to rehydride the R-Ni.

VII. Additional H Auto-Catalyst Reactions

In another catalyst reaction involving solely H atoms, two hot $H_2$ molecules collide and dissociate such that three H atoms serve as a catalyst of 3·27.2 eV for the fourth. Then, the reaction between four hydrogen atoms whereby three atoms resonantly and nonradiatively accept 81.6 eV from the fourth hydrogen atom such that 3H serves as the catalyst is given by $$81.6 \text{ eV} + 3H + H \rightarrow 3H^+_{fast} + 3e^- + H\left[\frac{a_H}{4}\right] + \lceil 4^2 - 1^2 \rceil \cdot 13.6 \text{ eV} \qquad (207)$$

$$3H^+_{fast} + 3e^- \rightarrow 3H + 81.6 \text{ eV, and} \qquad (208)$$

the overall reaction is $$H \to H\left[\frac{a_H}{4}\right] + [4^2 - 1^2] \cdot 13.6 \text{ eV}. \quad (209)$$

The extreme-ultraviolet continuum radiation band due to the $$H*\left[\frac{a_H}{3+1}\right]$$

intermediate of Eq. (207) is predicted to have short wavelength cutoff at 122.4 eV (10.1 nm) and extend to longer wavelengths.

In general, the transition of H to $$H\left[\frac{a_H}{p=m+1}\right]$$

due by the acceptance of m·27.2 eV gives a continuum band with a short wavelength cutoff at energy $$E_{\left(H \to H\left[\frac{a_H}{p=m+1}\right]\right)}$$

given by $$E_{\left(H \to H\left[\frac{a_H}{p=m+1}\right]\right)} = m^2 \cdot 13.6 \text{ eV corresponding to } \frac{91.2}{m^2} \text{ nm} \quad (210)$$

and extends to longer wavelengths than the corresponding cutoff.

Another catalyst reaction involving a collision of hot H with $H_2$ can occur wherein each of two of the H atoms accept 13.6 eV to from the third to become ionized to serve as a catalyst of 27.2 eV for the third. Then, the reaction between the hydrogen atoms whereby two atoms resonantly and nonradiatively accept 27.2 eV from the third hydrogen atom such that 2H serves as the catalyst is given by $$27.2 \text{ eV} + 2H + H \to 2H^+ + 2e^- + H\left[\frac{a_H}{2}\right] + [2^2 - 1^2] \cdot 13.6 \text{ eV} \quad (211)$$

$$2H^+ + 2e^- \to 2H + 27.2 \text{ eV, and} \quad (212)$$

the overall reaction is $$H \to H\left[\frac{a_H}{2}\right] + [2^2 - 1^2] \cdot 13.6 \text{ eV}. \quad (213)$$

The extreme-ultraviolet continuum radiation band due to the $$H*\left[\frac{a_H}{1+1}\right]$$

intermediate of Eq. (211) is predicted to have short wavelength cutoff at 13.6 eV (91.2 nm) and extend to longer wavelengths. High densities are permissive of another reaction to give the 91.2 continuum band wherein a H atom serves as a catalyst by accepting 27.2 eV from a second hydrogen atom.

In the presence of a high field, an ionized electron can transition to a fractional state directly with the binding energy released as a continuum band with a short wavelength cutoff at the binding energy of the final-state hydrino atom. The transitions for H(½) and H(⅓) are given by $$H^+ + e^- \to H\left[\frac{a_H}{4}\right] + [2^2 - 0^2] \cdot 13.6 \text{ eV} \quad (214)$$

$$H^+ + e^- \to H\left[\frac{a_H}{4}\right] + [3^2 - 0^2] \cdot 13.6 \text{ eV}. \quad (215)$$

The extreme-ultraviolet continuum radiation bands are predicted to have short wavelength cutoffs at 54.4 eV (22.8 nm) and 122.4 eV (10.1 nm), respectively, and extend to longer wavelengths. Due to the multipolarity and corresponding selection rules H(¼) is a prefer state. The extreme-ultraviolet continuum radiation is predicted to have a short wavelength cutoff at 217.6 eV (5.7 nm) and extending to longer wavelengths.

The ionization potential of molecular hydrino $H_2(1/p)$ is $$\begin{aligned} IP_1 &= E_T(H_2^+(1/p)) - E_T(H_2(1/p)) \\ &= -p^2 16.13392 \text{ eV} - p^3 0.118755 \text{ eV} - \\ & \quad (-p^2 31.351 \text{ eV} - p^3 0.326469 \text{ eV}) \\ &= p^2 15.2171 \text{ eV} + p^3 0.207714 \text{ eV} \end{aligned} \quad (216)$$

The molecular hydrino $H_2(1/p)$ bond energy, $E_D$, is given by:

$$\begin{aligned} E_D &= -p^2 27.20 \text{ eV} - E_T \\ &= -p^2 2720 \text{ eV} - (-p^2 31.351 \text{ eV} - p^3 0.326469 \text{ eV}) \\ &= p^2 4.151 \text{ eV} + p^3 0.326469 \text{ eV} \end{aligned} \quad (217)$$

Another aspect of the present disclosure comprises a light source of EUV radiation. The light source comprises molecular hydrino gas and a component to excite molecular hydrino gas to the ionization threshold. The de-excitation energy is given by Eq. (216). The excitation may be with a particle beam, preferably an electron beam. The molecular hydrino gas may be trapped in a matrix, preferably an alkali or alkaline earth halide crystal. The crystal may be bombarded with an electron beam at high energy such as about 12 kV to cause the excitation followed by de-excitation emission. In another embodiment, the de-excitation further results in the breaking of the molecular hydrino bond. The emitted energy is then given by the difference in the energies given by Eqs. (216) and (217):

$$E_{emission} = p^2 11.0661 \text{ eV} - p^3 0.118755 \text{ eV}. \quad (218)$$

For p=4, the radiation is 7.3 nm (169.5 eV), which is in the extreme ultraviolet (EUV). This light could be for EUV lithography to make microelectronic devices.

In embodiments disclose herein, at least one of a source of $Rb^+$ such as Rb or hydride or a source of Cs such as Cs metal or hydride may serve as a source of $Rb^+$ or Cs catalyst, respectively.

The hydrino hydride ion may react with an oxidant such as oxygen or sulfur to form molecular hydrino. Exemplary reactions are $$2H^-(1/p) + S \to H_2(1/p) + S^{2-} \quad (219)$$

$$2H^-(1/p) + O_2 \to H_2(1/p) + O_2^{2-}. \quad (220)$$

Thus, in an embodiment of a hydrino chemical reaction, the hydrino hydride may be converted to molecular hydrino when it is the desired product.

VIII. Hydrogen Gas Discharge Power and Plasma Cell and Reactor

Figure 5:
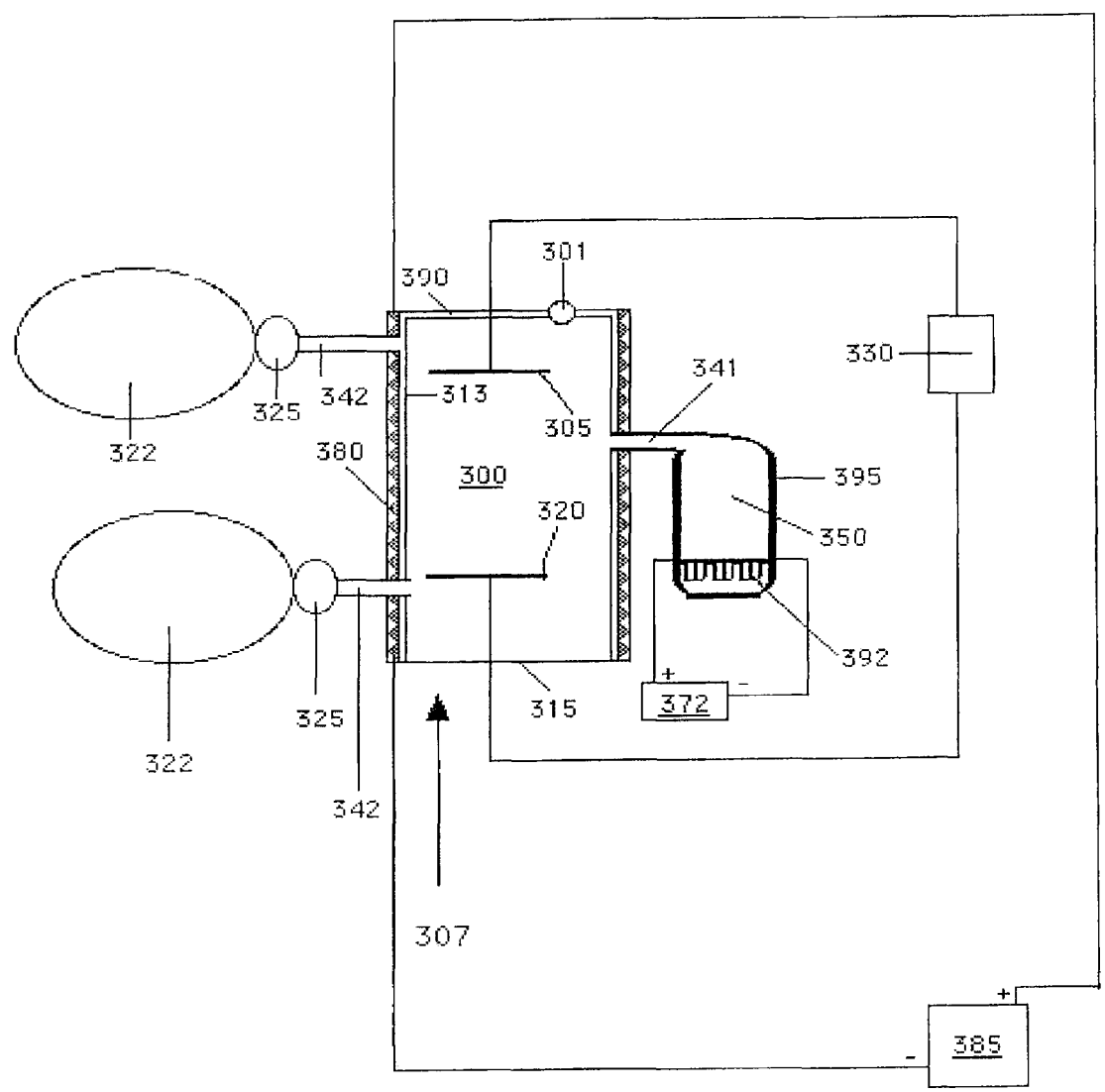
FIG. 5 is a schematic drawing of a discharge power and plasma cell and reactor in accordance with the present disclosure.

A hydrogen gas discharge power and plasma cell and reactor of the present disclosure is shown in FIG. 5. The hydrogen gas discharge power and plasma cell and reactor of FIG. 5, includes a gas discharge cell 307 comprising a hydrogen gas-filled glow discharge vacuum vessel 315 having a chamber 300. A hydrogen source 322 supplies hydrogen to the chamber 300 through control valve 325 via a hydrogen supply passage 342. A catalyst is contained in the cell chamber 300. A voltage and current source 330 causes current to pass between a cathode 305 and an anode 320. The current may be reversible.

In an embodiment, the material of cathode 305 may be a source of catalyst such as Fe, Dy, Be, or Pd. In another embodiment of the hydrogen gas discharge power and plasma cell and reactor, the wall of vessel 313 is conducting and serves as the cathode that replaces electrode 305, and the anode 320 may be hollow such as a stainless steel hollow anode. The discharge may vaporize the catalyst source to catalyst. Molecular hydrogen may be dissociated by the discharge to form hydrogen atoms for generation of hydrinos and energy. Additional dissociation may be provided by a hydrogen dissociator in the chamber.

Another embodiment of the hydrogen gas discharge power and plasma cell and reactor where catalysis occurs in the gas phase utilizes a controllable gaseous catalyst. The gaseous hydrogen atoms for conversion to hydrinos are provided by a discharge of molecular hydrogen gas. The gas discharge cell 307 has a catalyst supply passage 341 for the passage of the gaseous catalyst 350 from catalyst reservoir 395 to the reaction chamber 300. The catalyst reservoir 395 is heated by a catalyst reservoir heater 392 having a power supply 372 to provide the gaseous catalyst to the reaction chamber 300. The catalyst vapor pressure is controlled by controlling the temperature of the catalyst reservoir 395, by adjusting the heater 392 through its power supply 372. The reactor further comprises a selective venting valve 301. A chemically resistant open container, such as a stainless steel, tungsten or ceramic boat, positioned inside the gas discharge cell may contain the catalyst. The catalyst in the catalyst boat may be heated with a boat heater using an associated power supply to provide the gaseous catalyst to the reaction chamber. Alternatively, the glow gas discharge cell is operated at an elevated temperature such that the catalyst in the boat is sublimed, boiled, or volatilized into the gas phase. The catalyst vapor pressure is controlled by controlling the temperature of the boat or the discharge cell by adjusting the heater with its power supply. To prevent the catalyst from condensing in the cell, the temperature is maintained above the temperature of the catalyst source, catalyst reservoir 395 or catalyst boat.

In an embodiment, the catalysis occurs in the gas phase, lithium is the catalyst, and a source of atomic lithium such as lithium metal or a lithium compound such as $LiNH_2$ is made gaseous by maintaining the cell temperature in the range of about 300-1000° C. Most preferably, the cell is maintained in the range of about 500-750° C. The atomic and/or molecular hydrogen reactant may be maintained at a pressure less than atmospheric, preferably in the range of about 10 millitorr to about 100 Torr. Most preferably, the pressure is determined by maintaining a mixture of lithium metal and lithium hydride in the cell maintained at the desired operating temperature. The operating temperature range is preferably in the range of about 300-1000° C. and most preferably, the pressure is that achieved with the cell at the operating temperature range of about 300-750° C. The cell can be controlled at the desired operating temperature by the heating coil such as 380 of FIG. 5 that is powered by power supply 385. The cell may further comprise an inner reaction chamber 300 and an outer hydrogen reservoir 390 such that hydrogen may be supplied to the cell by diffusion of hydrogen through the wall 313 separating the two chambers. The temperature of the wall may be controlled with a heater to control the rate of diffusion. The rate of diffusion may be further controlled by controlling the hydrogen pressure in the hydrogen reservoir.

In another embodiment of a system having a reaction mixture comprising species of the group of Li, $LiNH_2$, $Li_2NH$, $Li_3N$, $LiNO_3$, LiX, $NH_4X$ (X is a halide), $NH_3$, $LiBH_4$, $LiAlH_4$, and $H_2$, at least one of the reactants is regenerated by adding one or more of the reagents and by a plasma regeneration. The plasma may be one of the gases such as $NH_3$ and $H_2$. The plasma may be maintained in situ (in the reaction cell) or in an external cell in communication with the reaction cell. In other embodiments, K, Cs, and Na replace Li wherein the catalyst is atomic K, atomic Cs, and molecular NaH.

To maintain the catalyst pressure at the desire level, the cell having permeation as the hydrogen source may be sealed. Alternatively, the cell further comprises high temperature valves at each inlet or outlet such that the valve contacting the reaction gas mixture is maintained at the desired temperature.

The plasma cell temperature can be controlled independently over a broad range by insulating the cell and by applying supplemental heater power with heater 380. Thus, the catalyst vapor pressure can be controlled independently of the plasma power.

The discharge voltage may be in the range of about 100 to 10,000 volts. The current may be in any desired range at the desired voltage. Furthermore, the plasma may be pulsed at any desired frequency range, offset voltage, peak voltage, peak power, and waveform.

In another embodiment, the plasma may occur in a liquid medium such as a solvent of the catalyst or of reactants of species that are a source of the catalyst.

IX. Fuel Cell and Battery

Figure 6:
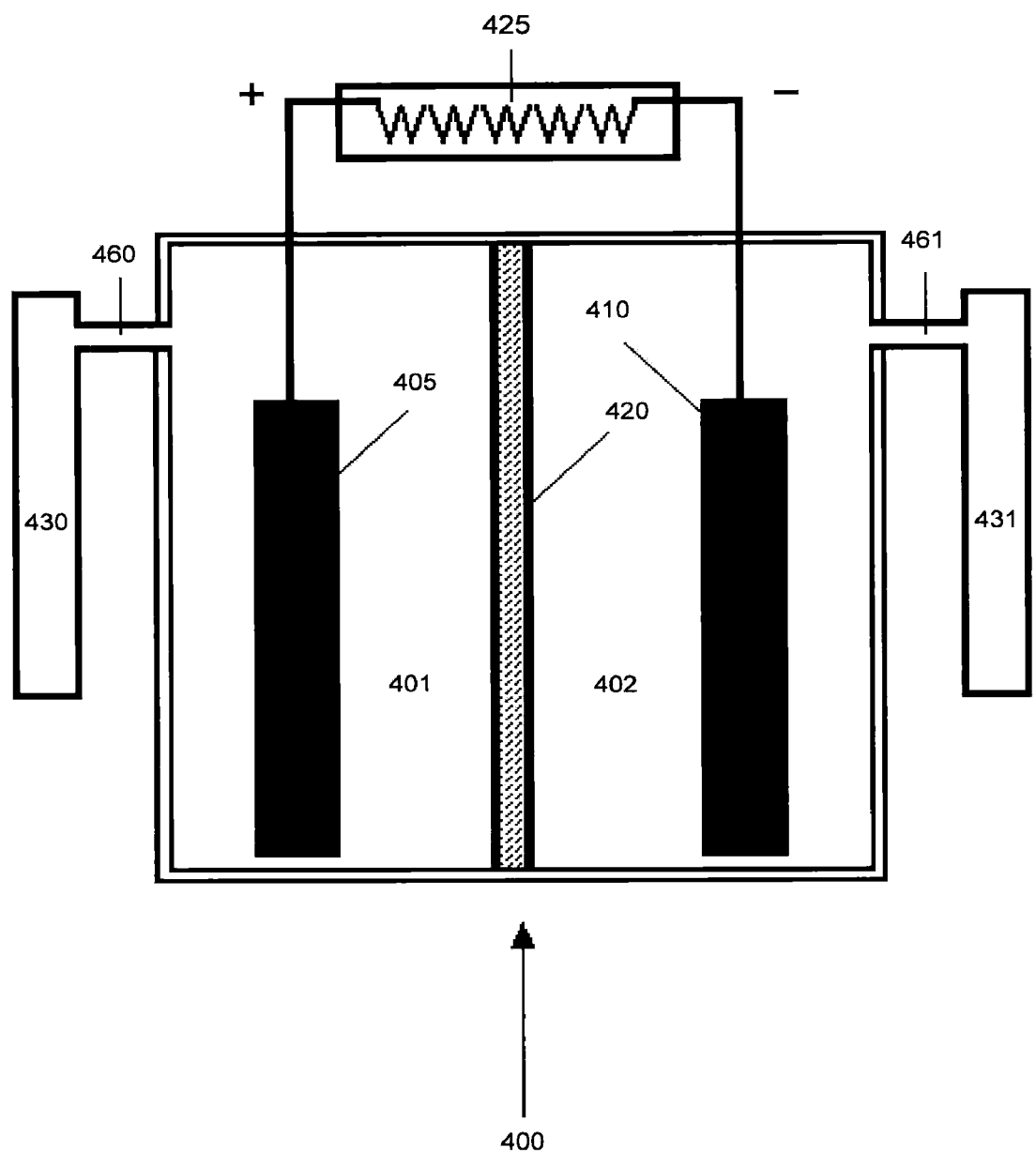
FIG. 6 is a schematic drawing of a battery and fuel cell in accordance with the present disclosure.

In embodiments of a fuel cell and a battery 400 shown in FIG. 6, the hydrino reactants comprising a solid fuel or a heterogeneous catalyst comprise the reactant for corresponding cell half reactions. During operation, the catalyst reacts with atomic hydrogen, and the energy transfer results in the ionization of the catalyst. This reaction may occur in the anode compartment 402 such that the anode 410 ultimately accepts the ionized-electron current. At least one of Li, K, and NaH may serve as the catalysts to form hydrinos. The reaction step of a nonradiative energy transfer of an integer multiple of 27.2 eV from atomic hydrogen to the catalyst results in ionized catalyst and free electrons. The support such as AC may serve as a conductive electron acceptor in electrical contact with the anode. The final electron-acceptor reactants comprise an oxidant such as free radicals, or a source thereof, and a source of a positively-charged counter ion that are the components of the cathode-cell reaction mixture that ultimately scavenge electrons released from the catalyst reaction to form hydrinos. The oxidant or cathode-cell reaction mixture is located in the cathode compartment 401 having cathode 405. Preferably the oxidant is at least one of oxygen or a source of oxygen, a halogen, preferably $F_2$ or $Cl_2$, or a source of halogen, $CF_4$, $SF_6$, and $NF_3$. During operation, the counterion such as the ion of the catalyst may migrate to the anode compartment to the cathode compartment, preferably through a salt bridge 420. Each cell reaction may be supplied by additional reactant or products may be removed through passages 460 and 461 to sources of reactants or reservoirs for product storage 430 and 431.

In certain embodiments, the power, chemical, battery and fuel cell systems disclosed herein that regenerate the reactants and maintain the reaction to form lower-energy hydrogen can be closed except that only hydrogen consumed in forming hydrinos need be replaced wherein the consumed hydrogen fuel may be obtained from the electrolysis of water.

X. Chemical Reactor

The present disclosure is also directed to other reactors for producing increased binding energy hydrogen compounds of the present disclosure, such as dihydrino molecules and hydrino hydride compounds. Further products of the catalysis are power and optionally plasma and light depending on the cell type. Such a reactor is hereinafter referred to as a "hydrogen reactor" or "hydrogen cell." The hydrogen reactor comprises a cell for making hydrinos. The cell for making hydrinos may take the form of a chemical reactor or gas fuel cell such as a gas discharge cell, a plasma torch cell, or microwave power cell. Exemplary embodiments of the cell for making hydrinos may take the form of a liquid-fuel cell, a solid-fuel cell, and a heterogeneous-fuel cell. Each of these cells comprises: (i) a source of atomic hydrogen; (ii) at least one catalyst chosen from a solid catalyst, a molten catalyst, a liquid catalyst, a gaseous catalyst, or mixtures thereof for making hydrinos; and (iii) a vessel for reacting hydrogen and the catalyst for making hydrinos. As used herein and as contemplated by the present disclosure, the term "hydrogen," unless specified otherwise, includes not only proteum ($^1H$), but also deuterium ($^2H$) and tritium ($^3H$). In the case of the use of deuterium as a reactant of the hydrino reaction, relatively trace amounts of tritium or helium products of the heterogeneous fuels and solid fuels are expected.

In an embodiment of the chemical reactor to synthesize compounds comprising lower-energy hydrogen such as hydrino hydride compounds, iron hydrino hydride film is synthesized using an iron salt having Fe in a positive oxidation state that can react with $H^-(1/p)$ by displacement of the iron counterion, preferably iron carbide, an iron oxide, or a volatile iron salt such as $FeI_2$ or $FeI_3$. The catalyst can be K, NaH, or Li. The H can be from $H_2$ and a dissociator such as R-Ni or $Pt/Al_2O_3$. In another embodiment, iron hydrino hydride is formed from an iron source such as an iron halide that decomposes at the reactor operating temperature, a catalyst such as NaH, Li, or K, and a source of hydrogen such as $H_2$ gas and a dissociator such as R-Ni. Manganese hydrino hydride may be formed from a manganese source such as an organometallic such as Mn(II)2,4-pentanedionate that decomposes at the reactor operating temperature, a catalyst such as NaH, Li, or K, and a source of hydrogen such as $H_2$ gas and a dissociator such as R-Ni. In an embodiment, the reactor is maintained in the temperature range of about 25° C. to 800° C., preferably in the range of about 400° C. to 500° C.

Since alkali metals are covalent diatomic molecules in the gas phase, in an embodiment, the catalyst to form increased-binding-energy hydrogen compounds is formed from a source by a reaction with at least one other element. The catalyst such as K or Li may be generated by the dispersion of K or Li metal in an alkali halide such as the KX or LiX to form KHX LiHX wherein X is halide. The catalyst K or Li may also be generated by the reaction of vaporized $K_2$ or $Li_e$ with atomic H to form KH and K or LiH and Li, respectively. The increased-binding-energy hydrogen compounds may be MHX wherein M is an alkali metal, H is hydrino hydride, and X is a singly negatively charged ion, preferably X is one of a halide and $HCO_3^-$. In an embodiment, the reaction mixture to form KHI or KHCl wherein H is hydrino hydride comprises K metal covered with the KX (X=Cl, I) and a dissociator, preferably nickel metal such as nickel screen and R-Ni, respectively. The reaction is carried out by maintaining the reaction mixture at an elevated temperature preferably in the range of 400-700° C. with the addition of hydrogen. Preferably the hydrogen pressure is maintained at a gauge pressure of about 5 PSI. Thus, MX is placed over the K such that K atoms migrate through the halide lattice and the halide serves to disperse K and act as a dissociator for $K_2$ that reacts at the interface with H from the dissociator such as nickel screen or R-Ni to form KHX.

A suitable reaction mixture for the synthesis of hydrino hydride compounds comprises at least two species of the group of a catalyst, a source of hydrogen, an oxidant, a reductant, and a support wherein the oxidant is a source of at least one of sulfur, phosphorous, and oxygen such as $SF_6$, S, $SO_2$, $SO_3$, $S_2O_5O_2$, $F_5SOF$, $M_2S_2O_8$, $S_xX_y$ such as $S_2Cl_2$, $SCl_2$, $S_2Br_2$, $S_2F_2$, $CS_2$, $Sb_2S_5$, $SO_xX_y$ such as $SOCl_2$, $SOF_2$, $SO_2F_2$, $SOBr_2$, P, $P_2O_5$, $P_2S_5$, $P_xX_y$ such as $PF_3$, $PCl_3$, $PBr_3$, $PI_3$, $PF_5$, $PCl_5$, $PBr_4F$, or $PCl_4F$, $PO_xX_y$ such as $POBr_3$, $POI_3$, $POCl_3$ or $POF_3$, $PS_xX_y$ such as $PSBr_3$, $PSF_3$, $PSCl_3$, a phosphorous-nitrogen compound such as $P_3N_5$, $(Cl_2PN)_3$, or $(Cl2PN)_4$, $(Br_2PN)$ (M is an alkali metal, x and y are integers, X is halogen), $O_2$, $N_2O$, and $TeO_2$. The oxidant may further comprise a source of a halide, preferable fluorine, such as $CF_4$, $NF_3$, or $CrF_2$. The mixture may also comprise a getter as a source of phosphorous or sulfur such as MgS, and MHS (M is an alkali metal). A suitable getter is an atom or compound that gives rise to an upfield shifted NMR peak with ordinary H and a hydrino hydride peak that is upfield of the ordinary H peak. Suitable getters comprise elemental S, P, O, Se, and Te or comprise compounds comprising S, P, O, Se, and Te. A general property of a suitable getter for hydrino hydride ions is that it forms chains, cages, or rings in elemental form, in doped elemental form, or with other elements that traps and stabilizes hydrino hydride ions. Preferably, the $H^-(1/p)$ can be observed in solid or solution NMR. In another, embodiment, either NaH or HCl serves as the catalyst. A suitable reaction mixture comprises MX and M'HSO4 wherein M and M' are alkali metals, preferably Na and K, respectively, and X is a halogen, preferably Cl.

The reaction mixtures comprising at least one of (1) NaH catalyst, $MgH_2$, $SF_6$, and activated carbon (AC), (2) NaH catalyst, $MgH_2$, S, and activated carbon (AC), (3) NaH catalyst, $MgH_2$, $K_2S_2O_8$, Ag, and AC, (4) KH catalyst, $MgH_2$, $K_2S_2O_8$, and AC, (5) MH catalyst (M=Li, Na, K), Al or $MgH_2$, $O_2$, $K_2S_2O_8$, and AC, (6) KH catalyst, Al, $CF_4$, and AC, (7) NaH catalyst, Al, $NF_3$, and AC, (8) KH catalyst, $MgH_2$, $N_2O$, and AC, (9) NaH catalyst, $MgH_2$, $O_2$, and activated carbon (AC), (10) NaH catalyst, $MgH_2$, $CF_4$, and AC, (11) MH catalyst, $MgH_2$, (M=Li, Na, or K) $P_2O_5$ ($P_4O_{10}$), and AC, (12) MH catalyst, $MgH_2$, $MNO_3$, (M=Li, Na, or K) and AC, (13) NaH or KH catalyst, Mg, Ca, or Sr, a transition metal halide, preferably, $FeCl_2$, $FeBr_2$, $NiBr_2$, $MnI_2$, or a rare earth halide such as EuBr2, and AC, and (14) NaH catalyst, Al, $CS_2$, and AC are suitable systems for generating power and also for producing lower-energy hydrogen compounds. In other embodiments of the exemplary reaction mixtures given supra, the catalyst cation comprises one of Li, Na, K, Rb, or Cs and the other species of the reaction mixture are chosen from those of reactions 1 through 14. The reactants may be in any desired ratios.

The hydrino reaction product is at least one of a hydrogen molecule and a hydride ion having a proton NMR peak shifted upfield of that or ordinary molecular hydrogen or hydrogen hydride, respectively. In an embodiment, the hydrogen product is bound to an element other than hydrogen wherein the proton NMR peak is shifted upfield of that of the ordinary molecule, species, or compound that has the same molecular formula as the product, or the ordinary molecule, species, or compound is not stable at room temperature.

In an embodiment, power and increased binding energy hydrogen compounds are produced by a reaction mixture comprising two or more of the following species; $LiNO_3$, $NaNO_3$, $KNO_3$, LiH, NaH, KH, Li, Na, K, $H_2$, a support such as carbon, for example activated carbon, a metal or metal hydride reductant, preferably $MgH_2$. The reactants can be in any molar ratio. Preferably the reaction mixture comprises 9.3 mole % MH, 8.6 mole % $MgH_2$, 74 mole % AC, and 7.86 mole % $MNO_3$ (M is Li, Na, or K) wherein the molar % of each species can be varied within a range of plus or minus a factor of 10 of that given for each species. The product molecular hydrino and hydrino hydride ion having a preferred ¼ state may be observed using liquid NMR at about 1.22 ppm and −3.85 ppm, respectively, following extraction of the product mixture with an NMR solvent, preferably deuterated DFM. The product $M_2CO_3$ may serve as a getter for hydrino hydride ion to form a compound such as $MHMHCO_3$.

In another embodiment, power and increased binding energy hydrogen compounds are produced by a reaction mixture comprising two or more of the following species; LiH, NaH, KH, Li, Na, K, $H_2$, a metal or metal hydride reductant, preferably $MgH_2$ or Al powder, preferably nanopowder, a support such as carbon, preferably activated carbon, and a source of fluorine such as a fluorine gas or a fluorocarbon, preferably $CF_4$ or hexafluorobenzene (HFB). The reactants can be in any molar ratio. Preferably the reaction mixture comprises 9.8 mole % MH, 9.1 mole % $MgH_2$ or 9 mole % Al nanopowder, 79 mole % AC, and 2.4 mole % $CF_4$ or HFB (M is Li, Na, or K) wherein the molar % of each species can be varied within a range of plus or minus a factor of 10 of that given for each species. The product molecular hydrino and hydrino hydride ion having a preferred ¼ state may be observed using liquid NMR at about 1.22 ppm and 3.86 ppm, respectively, following extraction of the product mixture with an NMR solvent, preferably deuterated DFM or $CDCl_3$.

In another embodiment, power and increased binding energy hydrogen compounds are produced by a reaction mixture comprising two or more of the following species; LiH, NaH, KH, Li, Na, K, $H_2$, a metal or metal hydride reductant, preferably $MgH_2$ or Al powder, a support such as carbon, preferably activated carbon, and a source of fluorine, preferably $SF_6$. The reactants can be in any molar ratio. Preferably the reaction mixture comprises 10 mole % MH, 9.1 mole % $MgH_2$ or 9 mole % Al powder, 78.8 mole % AC, and 24 mole % $SF_6$ (M is Li, Na, or K) wherein the molar % of each species can be varied within a range of plus or minus a factor of 10 of that given for each species. A suitable reaction mixture comprises NaH, MgH2 or Mg, AC, and $SF_6$ in these molar ratios. The product molecular hydrino and hydrino hydride ion having a preferred ¼ state may be observed using liquid NMR at about 1.22 ppm and 3.86 ppm, respectively, following extraction of the product mixture with an NMR solvent, preferably deuterated DFM or $CDCl_3$.

In another embodiment, power and increased binding energy hydrogen compounds are produced by a reaction mixture comprising two or more of the following species; LiH, NaH, KH, Li, Na, K, $H_2$, a metal or metal hydride reductant, preferably $MgH_2$ or Al powder, a support such as carbon, preferably activated carbon, and a source of at least one of sulfur, phosphorous, and oxygen, preferably S or P powder, $SF_6$, $CS_2$, $P_2O_5$, and $MNO_3$ (M is an alkali metal). The reactants can be in any molar ratio. Preferably the reaction mixture comprises 8.1 mole % MH, 7.5 mole % $MgH_2$ or Al powder, 65 mole % AC, and 19.5 mole % S (M is Li, Na, or K) wherein the molar % of each species can be varied within a range of plus or minus a factor of 10 of that given for each species. A suitable reaction mixture comprises NaH, $MgH_2$ or Mg, AC, and S powder in these molar ratios. The product molecular hydrino and hydrino hydride ion having a preferred ¼ state may be observed using liquid NMR at about 1.22 ppm and −3.86 ppm, respectively, following extraction of the product mixture with an NMR solvent, preferably deuterated DFM or $CDCl_3$.

In another embodiment, power and increased binding energy hydrogen compounds are produced by a reaction mixture comprising NaHS. The hydrino hydride ion may be isolated from NaHS. In an embodiment, a solid state reaction occurs within NaHS to form $H^-$(¼) that may be further reacted with a source of protons such as a solvent, preferably $H_2O$, to form $H_2$(¼).

In an embodiment, hydrino hydride compounds may be purified. The purification method may comprise at least one of extraction and recrystallization using a suitable solvent. The method may further comprise chromatography and other techniques for separation of inorganic compounds known to those skilled in the art.

In a liquid-fuel embodiment, the solvent has a halogen functional group, preferably fluorine. A suitable reaction mixture comprises at least one of hexafluorobenzene and octafluoronaphthalene added to a catalyst such as NaH, and mixed with a support such as activated carbon, a fluoropolymer or R-Ni. The reaction mixture may comprise an energetic material that may be used in applications that are known by those skilled in the art. Suitable applications due to the high-energy balance are a propellants and piston-engine fuel. In an embodiment, a desired product is at least one of fullerene and nanotubes that are collected.

In an embodiment, molecular hydrino $H_2(1/p)$, preferably $H_2$(¼), is a product that is further reduced to form the corresponding hydrides ions that may be used in applications such as hydride batteries and surface coatings. The molecular hydrino bond may be broken by a collisional method. $H_2(1/p)$ may be dissociated via energetic collisions with ions or electrons in a plasma or beam. The dissociated hydrino atoms may then react to form the desired hydride ions.

In a further embodiment, molecular hydrino $H_2(1/p)$, preferably $H_2$(¼), is a product that is used as a Magnetic Resonance Imaging (MRI) contrast agent. The agent may be inhaled to image the lungs wherein its upfield chemical shift relative to ordinary H permits it to be distinguishable and thus selective. In another embodiment, at least one of the lower-energy hydrogen compound and lower-energy hydrogen species such as $H^-(1/p)$ is a pharmaceutical agent comprising at least one of the group of antilipidemic drugs, anticholesterol drugs, contraceptive agents, anticoagulants, anti-inflamatory agents, immuno-suppressive drugs, antiarrhythmic agents, antineoplastic drugs, antihypertensive drugs, epinephrine blocking agents, cardiac inotropic drugs, antidepressant drugs, diuretics, antifungal agents, antibacterial drugs, anxiolytic agents, sedatives, muscle relaxants, anticonvulsants, agents for the treatment of ulcer disease, agents for the treatment of asthma and hypersensitivity reactions, antithroboembolic agents, agents for the treatment of muscular dystrophy, agents to effect a therapeutic abortion, agents for the treatment of anemia, agents to improve allograft survival, agents for the treatment of disorders of purine metabolism, agents for the treatment of ischemic heart disease, agents for the treatment of opiate withdrawal, agents which activate the effects of secondary messenger inositol triphosphate, agents to block spinal reflexes, and antiviral agents including a drug for the treatment of AIDS. In a formulation that occurs naturally, the least one of the lower-energy hydrogen compound and lower-energy hydrogen species is made to have a desired concentration such as a higher concentration than naturally occurring.

XI. Experimental

A. Water-Flow, Batch Calorimetry

The energy and power balance of the catalyst reaction mixtures listed on the right-hand side of each entry infra was obtained using cylindrical stainless steel reactors of approximately 130.3 cm$^3$ volume (1.5" inside diameter (ID), 4.5" length, and 0.2" wall thickness) or 1988 cm$^3$ volume (3.75" inside diameter (ID), 11" length, and 0.375" wall thickness) and a water flow calorimeter comprising a vacuum chamber containing each cell and an external water coolant coil that collected 99+% of the energy released in the cell to achieved an error <±1%. The energy recovery was determined by integrating the total output power $P_T$ over time. The power was given by $$P = \dot{m} C_P \Delta T \qquad (221)$$

where $\dot{m}$ was the mass flow rate, C was the specific heat of water, and $\Delta T$ was the absolute change in temperature between the inlet and outlet. The reaction was initiated by applying precision power to external heaters. Specially, 100-200 W of power (130.3 cm$^3$ cell) or 800-1000 W (1988 cm$^3$ cell) was supplied to the heater. During this heating period, the reagents reached a hydrino reaction threshold temperature wherein the onset of reaction was typically confirmed by a rapid rise in cell temperature. Once the cell temperature reached about 400-500° C. the input power was set to zero. After 50 minutes, the program directed the power to zero. To increase the rate of heat transfer to the coolant, the chamber was re-pressurized with 1000 Torr of helium, and the maximum change in water temperature (outlet minus inlet) was approximately 1.2° C. The assembly was allowed to fully reach equilibrium over a 24-hour period as confirmed by the observation of full equilibrium in the flow thermistors.

In each test, the energy input and energy output were calculated by integration of the corresponding power. The thermal energy in the coolant flow in each time increment was calculated using Eq. (221) by multiplying volume flow rate of water by the water density at 19° C. (0.998 kg/liter), the specific heat of water (4.181 kJ/kg ° C.), the corrected temperature difference, and the time interval. Values were summed over the entire experiment to obtain the total energy output. The total energy from the cell $E_T$ must equal the energy input $E_{in}$ and any net energy $E_{net}$. Thus, the net energy was given by $$E_{net} = E_T - E_{in}. \qquad (222)$$

From the energy balance, any excess heat $E_{ex}$ was determined relative to the maximum theoretical $E_{mt}$ by $$E_{ex} = E_{net} - E_{mt}. \qquad (223)$$

The calibration test results demonstrated a heat coupling of better than 98% of the resistive input to the output coolant, and zero excess heat controls demonstrated that the with calibration correction applied, the calorimeter was accurate to within less than 1% error. The results are given as follows where Tmax is the maximum cell temperature, Ein is the input energy, and dE is the measured output energy in excess of the input energy. All energies are exothermic. Positive values where given represent the magnitude of the energy.

Metal Halides, Oxides, and Sulfides 20 g AC3-5+5 g Mg+8.3 g KH+11.2 g Mg3As2, 298.6 kJ, dE: 21.8 kJ, TSC: none, Tmax: 315° C., theoretical is endothermic, the gain is infinity.

20 g AC3-5+5 g Mg+8.3 g KH+9.1 g Ca3P2, Ein: 282.1 kJ, dE: 18.1 Id, TSC: none, Tmax: 320° C. is endothermic, the gain is infinity.

Rowan Validation KH 7.47 gm+Mg 4.5 gm+TiC 18.0 gm+EuBr2 14.04 gm, Ein: 321.1 kJ, dE: 40.5 kJ, Tmax ~340° C., Energy Gain ~6.5X (1.37 kJ x 4.5=6.16 kJ).

KH 8.3 gm+Mg 5.0 gm+CAII-300 20.0 gm+TiB2 3.5 gm, Ein: 299 kJ, dE: 10 kJ, No TSC with Tmax ~320° C. Energy Gain ~X (X~0 kJ; 1"cell: Excess energy-5.1 kJ).

KH 8.3 gm+Mg 5.0 gm+CAII-300 20.0 gm+RbCl 6.05 gm, Ein: 311 kJ, dE: 18 kJ, No TSC with Tmax ~340° C., Energy Gain ~X (X~0 kJ; 1"Cell: Excess energy ~6.0 kJ).

KH 8.3 gm+Mg 5.0 gm+CAII-300 20.0 gm+Li2S 2.3 gm, Ein: 323 kJ, dE: 12 kJ, No TSC with Tmax ~340° C. Energy Gain ~X (X~0 kJ; 1"cell: Excess energy ~5.0 kJ).

KH 8.3 gm+Mg 5.0 gm+CAII-300 20.0 gm+Mg3N2 5.05 gm, Ein: 323 kJ, dE: 11 kJ, No TSC with Tmax ~330° C. Energy Gain ~(X~0 kJ; 1" cell: Excess energy-5.2 kJ).

4 g AC3-5+1 g Mg+1.66 g KH+3.55 g PtBr2, Ein: 95.0 kJ, dE: 15.7 kJ, TSC: 108-327° C., Tmax: 346° C., theoretical is 6.66 Id, gain is 2.36 times.

4 g AC3-5+1 g Mg+1 g NaH+3.55 g PtBr2, EM: 94.0 kJ, dE: 14.3 kJ, TSC: 100-256° C., Tmax: 326° C., theoretical is 6.03 kJ, gain is 2.37 times.

4 g WC+1 g MgH2+1 g NaH+0.01 mol Cl2 initiated with UV lamp to dissociate Cl$_2$ to Cl, Ein: 162.9 kJ, dE: 16.0 kJ, TSC: 23-42° C., Tmax: 85° C., theoretical is 7.10 kJ, gain is 2.25 times.

4 g AC3-5+1 g Mg+1.66 g KH+2.66 g PdBr2, Ein: 113.0 kJ, dE: 11.7 kJ, TSC: 133-276° C., Tmax: 370° C., theoretical is 6.43 kJ, gain is 1.82 times.

4 g AC3-5+1 g Mg+1 g NaH+2.66 g PdBr2, Ein: 116.0 kJ, dE: 9.4 Id, TSC: 110-217° C., Tmax: 361° C., theoretical is 5.81 kJ, gain is 1.63 times.

4 g AC3-5+1 g Mg+1.66 g KH+3.60 g PdI2, Ein: 142.0 kJ, dE: 7.8 kJ, TSC: 177-342° C., Tmax: 403° C., theoretical is 5.53 kJ, gain is 1.41 times.

0.41 g of AlN+1.66 g of KH+1 g of Mg powder+4 g of AC3-5 in a 1" heavy duty cell, energy gain was 4.9 kJ, but no cell temperature burst was observed. The maximum cell temperature was 407° C., theoretical is endothermic.

KH 8.3 gm+Mg 5.0 gm+CAII-300 20.0 gm+CrB2 3.7 gm, Ein: 317 kJ, dE: 19 kJ, No TSC with Tmax ~340° C., theoretical energy is endothermic 0.05 kJ, gain is infinite.

KH 8.3 gm+NEW Mg 5.0 gm+CAII-300 20.0 gm+AgCl_9.36 gm, Ein: 99 kJ, dE: 43 kJ, Small TSC at ~250° C. with Tmax ~340° C. Energy Gain ~2.3X (X=18.88 kJ).

KH 8.3 gm+Mg 5.0 gm+NEW TiC (G06U055) 20.0 gm+AgCl 7.2 gm, Ein: 315 kJ, dE: 25 kJ, Small TSC at ~250° C. with Tmax ~340° C. Energy Gain ~1.72X (X=14.52 kJ).

KH 8.3 gm+Mg 5.0 gm+CAII-300 20.0 gm+$Y_2O_3$ 11.3 gm (Gain ~4X with TiC), Ein: 353 kJ, dE: 23 kJ, No TSC with Tmax ~350° C. Energy Gain ~4X (X~1.18 kJ*5=5.9 kJ).

KH 4.15 gm+Mg 2.5 gm+CAII-300 10.0 gm+EuBr3 9.8 gm, Ein: 323 kJ, dE: 27 kJ, No TSC with Tmax ~350° C. Energy Gain ~2.26 X (X=11.93 kJ).

4 g AC3-5+1 g Mg+1 g NaH+2.23 g Mg3As2, 133.0 kJ, dE: 5.8 kJ, TSC: none, Tmax: 371° C., the theoretical is endothermic, the gain is infinity.

4 g AC3-5+1 g Mg+1.66 g KH+2.23 g Mg3As2, Ein: 139.0 kJ, dE: 6.5 kJ, TSC: none, Tmax: 393° C., the theoretical is endothermic, the gain is infinity.

4 g AC3-5+1 g Mg+1.66 g KH+1.82 g Ca3P2, Ein: 133.0 kJ, dE: 5.8 kJ, TSC: none, Tmax: 407° C., the theoretical is endothermic, the gain is infinity.

4 g AC3-5+1 g Mg+1 g NaH+3.97 g WCl6; Ein: 99.0 Id; dE: 21.84 kJ; TSC: 100-342° C.; Tmax: 375° C., theoretical is 16.7, the gain is 1.3 times.

2.60 g of CsI, 1.66 g of KH, 1 g of Mg powder and 4 g of AC3-4 in a 1" heavy duty cell was finished. The energy gain was 4.9 kJ, but no cell temperature burst was observed. The maximum cell temperature was 406° C., theoretical is 0, the gain is infinity.

0.42 g of LiCl, 1.66 g of KH, 1 g of Mg powder and 4 g of AC3-4 was finished. The energy gain was 5.4 kJ, but no cell temperature burst was observed. The maximum cell temperature was 412° C., theoretical is 0, the gain is infinity.

4 g AC3-4+1 g Mg+1 g NaH+1.21 g RbCl, Ein: 136.0 kJ, dE: 5.2 Id, TSC: none, Tmax: 372° C., theoretical is 0 kJ, gain is infinite.

KH 8.3 gm+Mg 5.0 gm+CAII-300 20.0 gm+CaBr2 10.0 gm, Ein: 323 kJ, dE: 27 kJ, No TSC with Tmax ~340° C. Energy Gain ~3.0 X (X~1.71 kJ*5=8.55 kJ).

KH 8.3 gm+Mg 5.0 gm+CAII-300 20.0 gm+YF3 7.3 gm, Ein: 320 kJ, dE: 17 kJ, No TSC with Tmax ~340° C. Energy Gain ~4.5 X (X~0.74 kJ*5=3.7 kJ).

KH 8.3 gm+Mg 5.0 gm+TiC 20.0 gm+Dried SnBr2 14.0 gm, Ein: 299 kJ, dE: 36 kJ, Small TSC at ~130° C. with Tmax ~350° C. Energy Gain ~1.23X (X~5.85 kJ×5=29.25 kJ).

KH 8.3 gm+Mg 5.0 gm+TiC 20.0 gm+EuBr2 15.6 gm, Ein: 291 kJ, dE: 45 kJ, Small TSC at ~50° C. with Tmax ~320° C. Energy Gain ~32X (X~0.28 kJ×5=1.4 kJ) and Gain is ~6.5X (1.37 kJ×5=6.85 kJ).

KH 8.3 gm+Mg 5.0 gm+CAII-300 20.0 gm+Dried ZnBr2 11.25 gm, Ein: 288 kJ, dE: 45 kJ, Small TSC at ~200° C. with Tmax ~350° C. Energy Gain ~2.1X (X~4.19 kJ×5=20.9 kJ).

NaH 5.0 gm+Mg 5.0 gm+CAII-300 20.0 gm+SF6, Ein: 77.7 kJ, dE: 105 kJ, Tmax ~400° C. Energy Gain ~1.43X (X for 0.03 mole SF6~73 kJ).

NaH 5.0 gm+Mg 5.0 gm+CAII-300 20.0 gm+SF6, Ein: 217 kJ, dE: 84 kJ, Tmax ~400° C. Energy Gain ~1.15X (X for 0.03mole SF6~73 kJ).

KH 8.3 gm+Mg_5.0 gm+CAII-300 20.0 gm+AgCl 7.2 gm, EM: 357 kJ, dE: 25 kJ, Small TSC at ~250° C. with Tmax ~340° C. Energy Gain ~1.72X (X~14.52 kJ).

KH 8.3 gm+Mg 5.0 gm+CAII-300 20.0 gm+AgCl 7.2 gm, EM: 487 kJ, dE: 34 kJ, Small TSC at ~250° C. with Tmax ~340° C. Energy Gain ~2.34X (X~14.52 kJ).

20 g AC3-4+8.3 g Ca+5 g NaH+15.5 g MnI2, EM: 181.5 kJ, dE: 61.3 kJ, TSC: 159-233° C., Tmax: 283° C., theoretical is 29.5 kJ, gain is 2.08 times.

4 g AC3-4+1.66 g Ca+1.66 g KH+3.09 g MnI2, Ein: 113.0 kJ, dE: 15.8 kJ, TSC: 228-384° C., Tmax: 395° C., theoretical is 6.68 kJ, gain is 2.37 times.

4 g AC3-4+1 g Mg+1.66 g KH+0.46 g Li2S, EM: 144.0 kJ, dE: 5.0 kJ, TSC: none, Tmax: 419° C., theoretical is endothermic.

1.01 g of Mg3N2, 1.66 g of KH, 1 g of Mg powder and 4 g of AC3-4 in a 1" heavy duty cell, energy gain was 5.2 kJ, but no cell temperature burst was observed. The maximum cell temperature was 401° C., theoretical is 0.

1.21 g of RbCl, 1.66 g of KH, 1 g of Mg powder and 4 g of AC3-4, energy gain was 6.0 kJ, but no cell temperature burst was observed. The maximum cell temperature was 442° C., theoretical is 0.

2.24 g of Zn3N2, 1.66 g of KH, 1 g of Mg powder and 4 g of AC3-4 was finished. The energy gain was 5.5 kJ, but no cell temperature burst was observed. The maximum cell temperature was 410° C., theoretical is 4.41 kJ, gain is 1.25 times.

4 g AC3-4+1 g Mg+1 g NaH+1.77 g PdCl2, Ein: 89.0 kJ, dE: 10.5 kJ, TSC: 83-204° C., Tmax: 306° C., theoretical is 6.14 kJ, gain is 1.7 times.

0.74 g of CrB2, 1.66 g of KH, 1 g of Mg powder and 4 g of CA-III 300 activated carbon powder (AC3-4) in a 1" heavy duty cell, energy gain was 4.3 kJ, but no cell temperature burst was observed. The maximum cell temperature was 404° C., theoretical is 0.

0.70 g of TiB2, 1.66 g of KH, 1 g of Mg powder and 4 g of CA-III 300 activated carbon powder (AC3-4) was finished. The energy gain was 5.1 kJ, but no cell temperature burst was observed. The maximum cell temperature was 431° C., theoretical is 0.

NaH 5.0 gm+Mg 5.0 gm+CAII-300 20.0 gm+BaBr2 14.85 gm (Dried), Ein: 328 kJ, dE: 16 kJ, No TSC with Tmax ~320° C. Energy Gain 160X (X_0.02 kJ*5=0.1 kJ).

NaH 1.0 gm-F Mg 1.0 gm+CAII-300 4.0 gm+BaBr2 2.97 gm (Dried), Ein: 140 Id, dE: 3 kJ, No TSC with Tmax ~360° C. Energy Gain ~150X (X~0.02 kJ).

NaH 5.0 gm+Mg 5.0 gm+CAII-300 20.0 gm+MgI2 13.9 gm, EM: 315 kJ, dE: 16 Id, No TSC with Tmax ~340° C. Energy Gain ~1.8X (X~1.75×5=8.75 kJ).

KH 8.3 gm+Mg 5.0 gm+CAII-300 20.0 gm+MgBr2 9.2 gm, Emil: 334 kJ, dE: 24 kJ, No TSC with Tmax ~340° C. Energy Gain ~2.1X (X~2.23×5=11.5 kJ).

20 g AC3-3+8.3 g KH+7.2 g AgCl, Ein: 286.6 kJ, dE: 29.5 Id, TSC: 327-391° C., Tmax: 394° C., theoretical is 13.57 kJ, gain is 2.17 times.

4 g AC3-3+1 g MgH2+1.66 g KH+1.44 g AgCl, Ein: 151.0 kJ, dE: 4.8 kJ, TSC: none, Tmax: 397° C., theoretical is 2.53 kJ, gain is 1.89 times.

4 g AC3-3+1 g Mg+1 g NaH+1.48 g Ca3N2, Ein: 140.0 kJ, dE: 4.9 kJ, TSC: none, Tmax: 392° C., theoretical is 2.01 kJ, gain is 2.21 times.

4 g AC3-3+1 g Mg+1 g NaH+1.86 g InCl2, Ein: 125.0 kJ, dE: 7.9 kJ, TSC: 163-259° C., Tmax: 374° C., theoretical is 4.22 kJ, gain is 1.87 times.

4 g AC3-3+1 g Mg+1.66 g KH+1.86 g InCl2, Ein: 105.0 kJ, dE: 7.5 kJ, TSC: 186-302° C., Tmax: 370° C., theoretical is 4.7 kJ, gain is 1.59 times.

4 g AC3-3+1 g Mg+1.66 g KH+2.5 g DyI2, Ein: 135.0 kJ, dE: 6.1 kJ, TSC: none, Tmax: 403° C., theoretical is 1.89 kJ, gain is 3.22 times.

3.92 g of EuBr3, 1.66 g of KH, 1 g of Mg powder and 4 g of CA-III 300 activated carbon powder (AC3-3) in a 1"

heavy duty cell, energy gain was 10.5 kJ, but no cell temperature burst was observed. The maximum cell temperature was 429° C., theoretical is 3.4 kJ, gain is 3 times.

4.56 g of AsI3, 1.66 g of KH, 1 g of Mg powder and 4 g of CA-III 300 activated carbon powder (AC3-3), energy gain was 13.5 kJ, and the cell temperature burst was 166° C. (237-403° C.). The maximum cell temperature was 425° C., theoretical is 8.65 kJ, gain is 1.56 times.

4 g AC3-3+1 g Mg+1 g NaH+2.09 g EuF3, Ein: 185.1 kJ, dE: 8.0 kJ, TSC: none, Tmax: 463° C., theoretical is 1.69 kJ, gain is 4.73 times.

4 g AC3-3+1 g Mg+1.66 g KH+1.27 g AgF; Ein: 127.0 kJ; dE: 6.04 kJ; TSC: 84-190° C.; Tmax: 369° C., theoretical is 3.58 kJ, gain is 1.69 times.

4 g AC3-3+1 g Mg+1 g NaH+3.92 g EuBr3; Ein: 162.5 kJ; dE: 7.54 kJ; TSC: not observed; Tmax: 471° C., theoretical is 3.41 kJ, gain is 2.21 times.

2.09 g of EuF3, 1.66 g of KH, 1 g of Mg powder and 4 g of CA-III 300 activated carbon powder (AC3-3) in a 1" heavy duty cell, energy gain was 5.5 kJ, but no cell temperature burst was observed. The maximum cell temperature was 417° C., theoretical is 1.71 kJ, gain is 3.25 times.

3.29 g of YBr3, 1.66 g of KH, 1 g of Mg powder and 4 g of CA-III 300 activated carbon powder (AC3-3), energy gain was 7.0 kJ, but no cell temperature burst was observed. The maximum cell temperature was 441° C., theoretical is 4.16 kJ, gain is 1.68 times.

NaH 5.0 gm+Mg 5.0 gm+CAII-300 20.0 gm+BaI2 19.5 gm, Ein: 334 kJ, dE: 13 kJ, No TSC with Tmax ~350° C. Energy Gain ~2.95 X (X~0.88 kJ×5=4.4 kJ).

KH 8.3 gm+Mg 5.0 gm+CAII-300 20.0 gm+BaCl2 10.4 gm, Ein: 331 kJ, dE: 18 kJ, No TSC with Tmax ~320° C. Energy Gain ~6.9X (X~0.52×5=2.6 kJ).

KH 8.3 gm+Mg 5.0 gm+TiC 20.0 gm+LaF3 9.8 gm, Ein: 338 kJ, dE: 7 kJ, No TSC with Tmax ~320° C. Energy Gain ~1.9X (X~3.65 kJ).

NaH 5.0 gm+Mg 5.0 gm+CAII-300 20.0 gm+BaBr2 14.85 gm (Dried), Ein: 280 kJ, dE: 10 kJ, No TSC with Tmax ~320° C. Energy Gain ~100 X (X~0.01=0.02×5 kJ).

KH 8.3 gm+Mg 5.0 gm+CAII-300 20.0 gm+BaBr2 14.85 gm (Dried), Ein: 267 kJ, dE: 8 kJ, No TSC with Tmax ~360° C. Energy Gain ~2.5 X (X~3.2 kJ).

NaH 5.0 gm+Mg 5.0 gm+TiC 20.0 gm+ZnS 4.85 gm, Ein: 319 kJ, dE: 12 kJ, No TSC with Tmax ~340° C. Energy Gain ~1.5 X (X~8.0 kJ).

KH 8.3 gm+Mg 5.0 gm+TiC 20.0 gm+AgCl 7.2 gm (Dried on 070109), Ein: 219 kJ, dE: 26 kJ, Small TSC at ~250° C. with Tmax ~340° C. Energy Gain ~1.8X (X~14.52 kJ).

KH 8.3 gm+Mg 5.0 gm+TiC 20.0 gm-F $Y_2O_3$ 11.3 gm, Ein: 339 kJ, dE: 24 kJ, Small TSC at ~300° C. with Tmax ~350° C. Energy Gain ~4.0 X (X~5.9 kJ with NaH).

4 g AC3-3+1 g Mg+1 g NaH+1.95 g YCl3, Ein: 137.0 kJ, dE: 7.1 kJ, TSC: none, Tmax: 384° C., theoretical is 3.3 kJ, the gain is 2.15 times.

4.70 g of YI3, 1.66 g of KH, 1 g of Mg powder and 4 g of CA-III 300 activated carbon powder (AC3-1) in a 1" heavy duty cell, energy gain was 6.9 kJ, but no cell temperature burst was observed. The maximum cell temperature was 426° C., theoretical is 3.37 kJ, the gain is 2.04 times.

1.51 g of SnO2, 1.66 g of KH, 1 g of Mg powder and 4 g of CA-III 300 activated carbon powder (AC3-1), energy gain was 9.4 kJ, but no cell temperature burst was observed. The maximum cell temperature was 460° C., theoretical is 7.06 Id, the gain is 1.33 times.

4.56 g of AsI3, 1.66 g of KH, 1 g of Mg powder and 4 g of CA-III 300 activated carbon powder (AC3-1), energy gain was 11.5 kJ, and the cell temperature burst was 144° C. (221-365° C.). The maximum cell temperature was 463° C., theoretical is 8.65 kJ, the gain is 1.33 times.

3.09 g of MnI2, 1.66 g of KH, 1 g of Mg powder and 4 g of STiC-1 (TiC from Sigma Aldrich), energy gain was 9.6 kJ, and the cell temperature burst was 137° C. (38-175° C.). The maximum cell temperature was 396° C., theoretical is 3.73 kJ, the gain is 2.57 times.

3.99 g of SeBr4, 1.66 g of KH, 1 g of Mg powder and 4 g of CA-III 300 activated carbon powder (AC3-1), energy gain was 20.9 kJ, and the cell temperature burst was 224° C. (47-271° C.). The maximum cell temperature was 383° C., theoretical is 16.93 kJ, the gain is 1.23 times.

20 g AC3-3+5 g Mg+8.3 g KH+11.65 g AgI, Ein: 238.6 kJ, dE: 31.7 kJ, TSC: 230-316° C., Tmax: 317° C., theoretical is 12.3 kJ, gain is 2.57 times.

4 g AC3-3+1 g Mg+1.66 g KH+0.91 g CoS, Ein: 145.1 Id, dE: 8.7 Id, TSC: none, Tmax: 420° C., theoretical is 2.63 kJ, gain is 3.3 times.

4 g AC3-3+1 g Mg+1.66 g KH+1.84 g MgBr2; Ein: 134.1 kJ; dE: 5.75 kJ; TSC: not observed; Tmax: 400° C., theoretical is 2.23 kJ, gain is 2.58 times.

5.02 g of SbI3, 1.66 g of KH, 1 g of Mg powder and 4 g of CA-III 300 activated carbon powder (AC3-1), energy gain was 12.2 kJ, and the cell temperature burst was 154° C. (141-295° C.). The maximum cell temperature was 379° C., theoretical is 9.71 kJ, gain is 1.26 times KH 8.3 gm+Mg 5.0 gm+TiC 20.0 gm+AgCl 7.2 gm, Ein: 304 kJ, dE: 30 kJ, Small TSC at ~275° C. with Tmax ~340° C. Energy Gain ~2.1X (X~14.52 kJ).

ICH 1.66 gm+Mg 1.0 gm+TiC 5.0 gm+BaBr2 2.97 gm Loaded BaBr2-KH—Mg—TiC, Ein: 130 kJ, dE: 2 kJ, No TSC with Tmax ~360° C., theoretical is 0.64 kJ, gain is 3 times.

ICH 8.3 gm+Mg 5.0 gm+TiC 20.0 gm+CuS 4.8 gm, Ein: 318 Id, dE: 30 kJ, Small TSC at ~250° C. with Tmax ~360° C. Energy Gain ~2.1X (X~14.4 kJ).

ICH 8.3 gm+Mg 5.0 gm+TiC 20.0 gm+MnS 4.35 gm, Ein: 326 Id, dE: 14 kJ, No TSC with Tmax ~350° C. Energy Gain ~2.2X (X~6.3 kJ).

KH 8.3 gm+Mg 5.0 gm+TiC 20.0 gm+GdF3 10.7 gm, EM: 339 kJ, dE: 7 Id, No TSC with Tmax ~360° C. Energy Gain ~2.54X (X~2.75 kJ).

20 g AC3-2+5 g Mg+8.3 g KH+7.2 g AgCl, Ein: 327.1 kJ, dE: 40.4 kJ, TSC: 288-318° C., Tmax: 326° C., theoretical is 14.52, gain is 2.78 times.

20 g AC3-2+5 g Mg+8.3 g KH+7.2 g CuBr, Ein: 205.1 kJ, dE: 22.5 kJ, TSC: 216-268° C., Tmax: 280° C., theoretical is 13.46, gain is 1.67 times.

4 g AC3-2+1 g Mg+1 g NaH+1.46 g YF3, Ein: 157.0 kJ, dE: 4.3 kJ, TSC: none, Tmax: 405° C., theoretical is 0.77, gain is 5.65 times.

4 g AC3-2+1 g Mg+1.66 g KH+1.46 g YF3, Ein: 137.0 kJ, dE: 5.6 kJ, TSC: none, Tmax: 398° C., theoretical is 0.74, gain is 7.54 times.

11.3 g of $Y_2O_3$, 5 g of NaH, 5 g of Mg powder and 20 g of CA-III 300 activated carbon powder (AC3-2) in a 2" heavy duty cell, energy gain was 24.5 kJ, but no cell temperature burst was observed. The maximum cell temperature was 386° C., theoretical is 5.9, gain is 4.2 times.

4 g AC3-2+1 g Mg+1 g NaH+3.91 g BaI2, EM: 135.0 kJ, dE: 5.3 kJ, TSC: none, Tmax: 378° C., theoretical is 0.1 kJ, gain is 51 times.

4 g AC3-2+1 g Mg+1.66 g KH+3.91 g BaI2, Ein: 123.1 kJ, dE: 3.3 kJ, TSC: none, Tmax: 390° C., theoretical is 0.88 kJ, gain is 3.8 times.

4 g AC3-2+1 g Mg+1.66 g KH+2.08 g BaCl2, Ein: 141.0 kJ, dE: 5.5 kJ, TSC: none, Tmax: 403° C., theoretical is 0.52 kJ, gain is 10.5 times.

4 g AC3-2+1 g Mg+1.66 g KH+3.42 g SrI2; Ein: 128.2 kJ; dE: 4.35 kJ; TSC: not observed; Tmax: 383° C., theoretical is 1.62 kJ, gain is 3.3 times.

4.04 g of Sb2S5, 1.66 g of KH, 1 g of Mg powder and 4 g of CA-III 300 activated carbon powder (AC3-2) was finished. The energy gain was 18.0 kJ, and the cell temperature burst was 251° C. (224-475° C.). The maximum cell temperature was 481° C., theoretical is 12.7 kJ, gain is 1.4 times.

4 g AC3-2+1 g Mg+1 g NaH+0.97 g ZnS, Ein: 132.1 kJ, dE: 7.5 kJ, TSC: none, Tmax: 370° C., theoretical is 1.4 kJ, gain is 5.33 times.

4 g AC3-2+1 g Mg+1 g NaH+3.12 g EuBr2, Ein: 135.0 kJ, dE: 5.0 kJ, TSC: 114-182° C., Tmax: 371° C., theoretical is endothermic+0.35 kJ, gain is infinite.

4 g AC3-2+1 g Mg+1.66 g KH+3.12 g EuBr2, Ein: 122.0 kJ, dE: 9.4 kJ, TSC: 73-135° C., Tmax: 385° C., theoretical is 0.28 kJ, gain is 34 times.

4 g CA3-2+1 g Mg+1.66 g KH+3.67 g PbBr2; Ein: 126.0 kJ; dE: 6.98 kJ; TSC: 270-408° C.; Tmax: 421° C., theoretical is 5.17 kJ, gain is 1.35 times.

4 g CA3-2+1 g Mg+1 g NaH+1.27 g AgF; Ein: 125.0 kJ; dE: 7.21 kJ; TSC: 74-175° C.; Tmax: 372° C., theoretical is 3.58 kJ, gain is 2 times.

1.80 g of GdBr3 (0.01 mol GdBr3 is 3.97 g, but there was no enough GdBr3), 1.66 g of KH, 1 g of Mg powder and 4 g of CA-III 300 activated carbon powder (AC3-1), energy gain was 2.8 kJ, but no cell temperature burst was observed. The maximum cell temperature was 431° C., theoretical is 1.84 kJ, gain is 1.52 times.

0.97 g of ZnS, 1.66 g of KH, 1 g of Mg powder and 4 g of CA-III 300 activated carbon powder (AC3-1), energy gain was 4.0 kJ, but no cell temperature burst was observed. The maximum cell temperature was 444° C., theoretical is 1.61 kJ, gain is 2.49 times.

3.92 g of BI3 (in PP vial), 1.66 g of KH, 1 g of Mg powder and 4 g of CA-III 300 activated carbon powder (AC3-1), energy gain was 13.2 kJ, and the cell temperature slope change was 87° C. (152-239° C.). The maximum cell temperature was 465° C., theoretical is 9.7 kJ, gain is 1.36 times.

4 g AC3-2+1 g Mg+1 g NaH+3.2 g HfCl4, Ein: 131.0 kJ, dE: 10.5 kJ, TSC: 277-439° C., Tmax: 440° C., theoretical is 8.1 kJ, gain is 1.29 times.

4 g AC3-2+1 g Mg+1.66 g KH+3.2 g HfCl4, Ein: 125.0 kJ, dE: 11.5 kJ, TSC: 254-357° C., Tmax: 405° C., theoretical is 9.06 kJ, gain is 1.27 times.

4 g CA3-2+1 g Mg+1.66 g KH+2.97 g BaBr2; Ein: 132.1 kJ; dE: 4.65 kJ; TSC: not observed; Tmax: 361° C., theoretical is 0.64 kJ, gain is 7.24 times.

4 g CA3-2+1 g Mg+1.66 g KH+2.35 g AgI; Ein: 142.9 kJ; dE: 7.32 kJ; TSC: not observed; Tmax: 420° C., theoretical is 2.46 kJ, gain is 2.98 times.

4.12 g of PI3, 1.66 g of KH, 1 g of Mg powder and 4 g of CA-III 300 activated carbon powder (AC3-1) was finished. The energy gain was 13.8 kJ, and the cell temperature burst was 189° C. (184-373° C.). The maximum cell temperature was 438° C., theoretical is 11.1 kJ, gain is 1.24 times.

1.57 g of SnF2, 1.66 g of KH, 1 g of Mg powder and 4 g of CA-III 300 activated carbon powder (AC3-1), energy gain was 7.9 kJ, and the cell temperature slope change was 72° C. (149-221° C.). The maximum cell temperature was 407° C., theoretical is 5.28 kJ, gain is 1.5 times.

1.96 g of LaF3, 1.66 g of KH, 1 g of Mg powder and 4 g of CA-III 300 activated carbon powder (AC3-1), energy gain was 4.2 kJ, but no cell temperature burst was observed. The maximum cell temperature was 442° C., theoretical is 0.68 kJ, gain is 6.16 times.

4 g CAIII-300+1 g Mg+1 g NaH+2.78 g MgI2, Ein: 129.0 kJ, dE: 6.6 kJ, TSC: none, Tmax: 371° C., theoretical is 1.75 Id, gain is 3.8 times.

4 g CAIII-300+1 g Mg+1.66 g KH+2.48 g SrBr2, Ein: 137.0 kJ, dE: 6.1 kJ, TSC: none, Tmax: 402° C., theoretical is 1.35 Id, gain is 4.54 times.

4 g CA3-2+1 g Mg+1.66 g KH+2.0 g CaBr2; Ein: 147.0 kJ; dE: 6.33 kJ; TSC: not observed; Tmax: 445° C., theoretical is 1.71 kJ, gain is 3.7 times.

4 g CA3-2+1 g Mg+1 g NaH+2.97 g BaBr2; Ein: 140.1 kJ; dE: 8.01 kJ; TSC: not observed; Tmax: 405° C., theoretical is 0.02 kJ, gain is 483 times.

0.90 g of CrF2, 1.66 g of ICH, 1 g of Mg powder and 4 g of CA-III 300 activated carbon powder (AC3-1) was finished. The energy gain was 4.7 kJ, but no cell temperature burst was observed. The maximum cell temperature was 415° C., theoretical is 3.46 kJ, gain is 1.36 times.

ICH 8.3 gm+Mg 5.0 gm+TiC 20.0 gm+InCl 7.5 gm, EM 275 kJ, dE: 26 kJ, No TSC with Tmax ~340° C. Energy Gain ~2.2 X (X~11.45 kJ).

KH 8.3 gm+Mg 5.0 gm+TiC 20.0 gm+InI 12.1 gm, Ein 320 kJ, dE: 12 kJ, No TSC with Tmax ~340° C. Energy Gain ~1.25 X (X~9.6 kJ).

KH 8.3 gm+Mg 5.0 gm+TiC 20.0 gm+InBr 9.75 gm, Ein 323 kJ, dE: 17 kJ, No TSC with Tmax ~340° C. Energy Gain ~1.7X (X~10 kJ).

KH 8.3 gm+Mg 5.0 gm+TiC 20.0 gm+MnI2 15.45 gm VALIDATION Experiment for Dr. Peter Jansson, Ein 292 kJ, dE: 45 kJ, Small TSC at ~30° C. with Tmax ~340° C. Energy Gain ~2.43X (X~18.5 kJ).

KH 8.3 gm+Mg 5.0 gm+TiC 20.0 gm+FeBr2 10.8 gm (FeBr2 from STREM Chemicals) VALIDATION Experiment for Dr. Peter Jansson, Ein: 308 kJ, dE: 46 kJ, TSC at ~220° C. with Tmax ~330° C. Energy Gain ~1.84X (X~25 kJ).

KH 8.3 gm+Mg_5.0 gm+TiC 20.0 gm+CoI2_15.65 gm, Ein: 243 kJ, dE: 55 kJ, Small TSC at ~170° C. with Tmax ~330° C., theoretical is 26.35 kJ, gain is 2.08 times.

KH 8.3 gm+Mg 5.0 gm+TiC 20.0 gm+NiBr2 11.0 gm, Ein: 270 kJ, dE: 45 kJ, TSC at ~220° C. with Tmax ~340° C., theoretical is 23 kJ, gain is 1.95 times.

KH 8.3 gm+Mg 5.0 gm+TiC 20.0 gm+FeBr2 10.8 gm (FeBr2 from STREM Chemicals), Ein: 291 kJ, dE: 38 kJ, TSC at ~200° C. with Tmax ~330° C., theoretical is 25 kJ, gain is 1.52 times.

KH 8.3 gm+Mg 5.0 gm+CAII-300 20.0 gm+ZnBr2_11.25 gm, EM 302 kJ, dE: 42 kJ, Small TSC at ~200° C. with Tmax ~375° C. Energy Gain ~2X (X~20.9 kJ).

KH 8.30 gm+Mg 5.0 gm+TiC 20.0 gm+GdBr3 19.85 gm, Ein: 308 kJ, dE: 26 kJ, TSC at ~250° C. with Tmax ~340° C. Energy Gain ~1.3X (X~20.3 kJ).

KH 8.3 gm+Mg 5.0 gm+CAII-300 20.0 gm+MnS 4.35 gm, EM: 349 kJ, dE: 24 kJ, TSC at ~260° C. with Tmax ~350° C. Energy Gain ~3.6 X (X~6.6 kJ).

4 g CAIII-300+1 g Mg+1 g NaH+3.79 g LaBr3, Ein: 143.0 kJ, dE: 4.8 kJ, TSC: none, Tmax: 392° C., theoretical is 2.46 kJ, gain is 1.96 times.

4 g CAIII-300+1 g Mg+1.66 g KH+3.80 g CeBr3, Ein: 145.0 kJ, dE: 7.6 kJ, TSC: none, Tmax: 413° C., theoretical is 3.84 kJ, gain is 1.97 times.

4 g CAIII-300+1 g Mg+1.66 g KH+1.44 g AgCl; Ein: 136.2 kJ; dE: 7.14 kJ; TSC: not observed; Tmax: 420° C., theoretical is 2.90 kJ, gain is 2.46 times.

4 g CAIII-300+1 g Mg+1.66 g KH+1.60 g Cu2S, Ein: 137.0 kJ, dE: 5.5 kJ, TSC: none, Tmax: 405° C., theoretical is 2.67 kJ, gain is 2.06 times.

2.54 g of TeI4 (0.01 mol TeI4 is 6.35 g, but no enough TeI4), 1.66 g of KH, 1 g of Mg powder and 4 g of CA-III 300 activated carbon powder (AC3-1), energy gain was 8.3 kJ, and the cell temperature burst was 113° C. (202-315° C.). The maximum cell temperature was 395° C., theoretical is 5.61 Id, the gain is 1.48 times.

2.51 g of BBr3, 1.66 g of KH, 1 g of Mg powder and 4 g of CA-III 300 activated carbon powder (AC3-1), energy gain was 12.4 kJ. The cell temperature slope change was 52° C. (77-129° C.), and the cell temperature burst was 88° C. (245-333° C.). The maximum cell temperature was 438° C., theoretical is 9.28 kJ, the gain is 1.34 times.

4 g CAIII-300+1 g Mg+1.0 g NaH+3.59 g TaCl5, Ein: 102.0 kJ, dE: 16.9 kJ, TSC: 80-293° C., Tmax: 366° C., theoretical is 11.89 kJ, gain is 1.42 times.

2.72 g of CdBr2, 1.66 g of KH, 1 g of Mg powder and 4 g of CA-III 300 activated carbon powder (dried at 300° C.), energy gain was 6.6 kJ, and the cell temperature burst was 56° C. (253-309° C.). The maximum cell temperature was 414° C., theoretical is 4.31 kJ, gain is 1.53 times.

2.73 g of MoCl5, 1.66 g of KH, 1 g of Mg powder and 4 g of CA-III 300 activated carbon powder (dried at 300° C.), energy gain was 20.1 kJ, and the cell temperature burst was 240° C. (67-307° C.). The maximum cell temperature was 511° C., theoretical is 15.04 kJ, gain is 1.34 times.

2.75 g of InBr2, 1.66 g of KH, 1 g of Mg powder and 4 g of CA-III 300 activated carbon powder (dried at 300° C.), energy gain was 7.3 kJ, but no cell temperature burst was observed. The maximum cell temperature was 481° C., theoretical is 4.46 kJ, gain is 1.64 times.

1.88 g of NbF5, 1.66 g of KH, 1 g of Mg powder and 4 g of CA-III 300 activated carbon powder (dried at 300° C.), energy gain was 15.5 kJ, but no cell temperature burst was observed. The maximum cell temperature was 448° C., theoretical is 11.36 kJ, gain is 1.36 times.

2.33 g of ZrCl4, 1.66 g of KH, 1 g of Mg powder and 4 g of CA-III 300 activated carbon powder (dried at 300° C.), energy gain was 12.9 kJ, and the cell temperature burst was 156° C. (311-467° C.). The maximum cell temperature was 472° C., theoretical is 8.82 kJ, gain is 1.46 times.

3.66 g of CdI2, 1.66 g of KH, 1 g of Mg powder and 4 g of CA-III 300 activated carbon powder (dried at 300° C.), energy gain was 6.7 kJ, and the cell temperature slope change was 74° C. (125-199° C.). The maximum cell temperature was 417° C., theoretical is 4.12 kJ, gain is 1.62 times.

4 g CAIII-300+1 g Mg+1.66 g KH+2.64 g GdCl3; Ein: 127.0 kJ; dE: 4.82 kJ; TSC: not observed; Tmax: 395° C., theoretical is 3.54 kJ, gain is 1.36 times.

KH 8.3 gm+Mg 5.0 gm+CAII-300 20.0 gm+InCl 7.5 gm, Ein: 305 kJ, dE: 32 kJ, Small TSC at ~150° C. with Tmax ~.350° C. Energy Gain ~2.8X (X~11.5 kJ).

KH 8.3 gm+Mg 5.0 gm+WC 20.0 gm+CoI2 15.65 gm, Ein: 306 kJ, dE: 41 kJ, Small TSC at ~200 C with Tmax ~.350° C. Energy Gain ~1.55 X (X~26.4 kJ).

NaH 5.0 gm+Mg 5.0 gm+WC 20.0 gm+GdBr3 19.85 gm, Ein 309 kJ, dE: 28 kJ, Small TSC at ~250° C. with Tmax ~340° C. Energy Gain ~1.8X (X~15.6 kJ).

KH_4.98 gm+Mg_3.0 gm+CAII-300_12.0 gm+InBr_5.85 gm 3X system, Ein: 297 kJ, dE: 13 kJ, Small TSC at ~200° C. with Tmax ~330° C. Energy Gain ~1.3X (X~10 kJ).

4 g CAIII-300+1 g Mg+1 g NaH+2.26 g Y2O3, Ein: 133.1 kJ, dE: 5.2 kJ, TSC: none, Tmax: 384° C., theoretical is 1.18 kJ, the gain is 4.44 times.

4.11 g of ZrBr4, 1.66 g of KH, 1 g of Mg powder and 4 g of CA-III 300 activated carbon powder (dried at 300° C.), energy gain was 11.2 kJ, and the cell temperature burst was 154° C. (280-434° C.). The maximum cell temperature was 444° C., theoretical is 9.31 kJ, gain is 1.2 times.

5.99 g of ZrI4, 1.66 g of KH, 1 g of Mg powder and 4 g of CA-III 300 activated carbon powder (dried at 300° C.), energy gain was 11.3 kJ, and the cell temperature burst was 200° C. (214-414° C.). The maximum cell temperature was 454° C., theoretical is 9.4 kJ, gain is 1.2 times.

2.70 g of NbCl5, 1.66 g of KH, 1 g of Mg powder and 4 g of CA-III 300 activated carbon powder (dried at 300° C.), energy gain was 16.4 kJ, and the cell temperature burst was 213° C. (137-350° C.). The maximum cell temperature was 395° C., theoretical is 13.40 kJ, gain is 1.22 times.

2.02 g of MoCl3, 1.66 g of KH, 1 g of Mg powder and 4 g of CA-III 300 activated carbon powder (dried at 300° C.), energy gain was 12.1 kJ, but no cell temperature burst was observed. The maximum cell temperature was 536° C., theoretical is 8.48 kJ, gain is 1.43 times.

3.13 g of NiI2, 1.66 g of KH, 1 g of Mg powder and 4 g of CA-III 300 activated carbon powder (dried at 300° C.), energy gain was 8.0 kJ, and the cell temperature burst was 33° C. (335-368° C.). The maximum cell temperature was 438° C., theoretical is 5.89 kJ, gain is 1.36 times.

3.87 g of As2Se3, 1.66 g of KH, 1 g of Mg powder and 4 g of CA-III 300 activated carbon powder (dried at 300° C.), energy gain was 12.3 kJ, and the cell temperature burst was 241° C. (195-436° C.). The maximum cell temperature was 446° C., theoretical is 8.4 kJ, gain is 1.46 times.

2.74 g of Y2S3, 1.66 g of KH, 1 g of Mg powder and 4 g of CA-III 300 activated carbon powder (dried at 300° C.), energy gain was 5.2 kJ, but no cell temperature burst was observed. The maximum cell temperature was 444° C., theoretical is 0.41 kJ, gain is 12.64 times.

4 g CAIII-300+1 g Mg+1.66 g KH+3.79 g LaBr3, Ein: 147.1 kJ, dE: 7.1 kJ, TSC: none, Tmax: 443° C., theoretical is 3.39 Id, gain is 2 times.

4 g CAIII-300+1 g Mg+1.66 g KH+2.15 g MnBr2; Ein: 124.0 kJ; dE: 5.55 kJ; TSC: 360-405° C.; Tmax: 411° C., theoretical is 3.63 kJ, gain is 1.53 times.

2.60 g of Bi(OH)3, 1.66 g of KH, 1 g of Mg powder and 4 g of CA-III 300 activated carbon powder (dried at 300° C.), energy gain was 14.8 kJ, and the cell temperature burst was 173° C. (202-375° C.). The maximum cell temperature was 452° C., theoretical is 12.23 kJ, the gain is 1.2 times.

KH 8.3 gm+Mg 5.0 gm+TiC 20.0 gm+SnI2 18.5 gm Strem, Ein: 244 kJ, dE: 53 kJ, TSC at ~150° C. with Tmax ~330° C., theoretical is 28.1 kJ, gain is 1.9 times.

KH 8.3 gm+Mg 5.0 gm+TiC 20.0 gm+FeBr2 10.8 gm, Ein: 335 kJ, dE: 43 kJ, TSC at ~250° C. with Tmax ~375° C., theoretical is 22 kJ, gain is 1.95 times.

KH 8.3 gm+Mg 5.0 gm+WC 20.0 gm+FeBr2 10.8 gm, Ein: 335 kJ, dE: 32 kJ, TSC at ~230° C. with Tmax ~360° C., theoretical is 22 kJ, gain is 1.45 times.

KH 8.3 gm+Mg 5.0 gm+TiC 20.0 gm+MnI2 15.45 gm Strem, Ein: 269 kJ, dE: 49 kJ, Small TSC at ~50° C. with Tmax ~350° C. Energy Gain ~3.4X (X~14.8 kJ).

4 g CAIII-300+1.66 g Ca+1 g NaH+3.09 g MnI2; Ein: 112.0 kJ; dE: 9.98 kJ; TSC: 178-374° C.; Tmax: 383° C., theoretical is 5.90 kJ, gain is 1.69 times.

0.96 g of CuS, 1.66 g of KH, 1 g of Mg powder and 4 g of CA-III 300 activated carbon powder (dried at 300° C.), energy gain was 5.5 kJ, but no cell temperature burst was observed. The maximum cell temperature was 409° C., theoretical is 2.93 kJ, the gain is 1.88 times.

0.87 g of MnS, 1.66 g of KH, 1 g of Mg powder and 4 g of CA-III 300 activated carbon powder (dried at 300° C.), energy gain was 4.7 kJ, but no cell temperature burst was observed. The maximum cell temperature was 412° C., theoretical is 1.32 kJ, the gain is 3.57 times.

KH 8.3 gm+Mg 5.0 gm+TiC 20.0 gm+MnI2 15.45 gm, Ein: 269 kJ, dE: 49 kJ, Small TSC at ~50° C. with Tmax ~350° C., theoretical is 18.65 kJ, gain is 2.6 times.

NaH 5.0 gm+Mg 5.0 gm+TiC 20.0 gm+NiBr2 11.0 gm, Ein: 245 kJ, dE: 43 kJ, TSC at ~200° C. with Tmax ~310° C., theoretical is 26 kJ, gain is 1.6 times.

KH 8.3 gm+Mg 5.0 gm+CAII-300 20.0 gm+MnCl2 6.3 gm, Ein: 333 kJ, dE: 34 kJ, TSC at ~250° C. with Tmax ~340° C., theoretical is 17.6 kJ, gain is 2 times.

2.42 g of InI, 1.66 g of KH, 1 g of Mg powder and 4 g of CA-III 300 activated carbon powder (dried at 300° C.), energy gain was 4.4 kJ, but no cell temperature burst was observed. The maximum cell temperature was 438° C., theoretical is 1.92 kJ, gain is 2.3 times.

1.72 g of InF3, 1.66 g of KH, 1 g of Mg powder and 4 g of CA-III 300 activated carbon powder (dried at 300° C.), energy gain was 9.2 Id, but no cell temperature burst was observed. The maximum cell temperature was 446° C., theoretical is 5 kJ, gain is 1.85 times.

4 g CAIII-300+1 g Mg+1 g NaH+1.98 g As2O3, Ein: 110.5 kJ, dE: 17.1 kJ, TSC: 325-452° C., Tmax: 471° C., theoretical is 11.48 kJ, gain is 1.49 times.

4 g CAIII-300+1 g Mg+1 g NaH+4.66 g Bi2O3, Ein: 152.0 kJ, dE: 17.7 kJ, TSC: 185-403° C., Tmax: 481° C., theoretical is 13.8 kJ, gain is 1.28 times.

4 g CAIII-300+1 g Mg+1 g NaH+2.02 g MoCl3; Ein: 118.0 kJ; dE: 11.10 kJ; TSC: 342-496° C.; Tmax: 496 C, theoretical is 7.76, gain is 1.43 times.

2.83 g of PbF4, 1.66 g of KH, 1 g of Mg powder and 4 g of CA-III 300 activated carbon powder (dried at 300° C.), energy gain was 13.9 kJ, and the cell temperature burst was 245 C (217-462° C.). The maximum cell temperature was 464 C, theoretical is 13.38 kJ, gain is 1.32 times.

2.78 g of PbCl2, 1.66 g of KH, 1 g of Mg powder and 4 g of CA-III 300 activated carbon powder (dried at 300 C), energy gain was 6.8 kJ, but no cell temperature burst was observed. The maximum cell temperature was 488 C, theoretical is 5.22 kJ, gain is 1.3 times.

4 g CAIII-300+1.66 g KH+2.19 g NiBr2, Ein: 136.0 kJ, dE: 7.5 kJ, TSC: 275-350 C, Tmax: 385 C, theoretical is 4.6 kJ, gain is 1.6 times.

4 g CAIII-300+1 g Mg+1 g NaH+2.74 g MoCl5, Ein: 96.0 kJ, dE: 19.0 kJ, TSC: 86-334 C, Tmax: 373 C, theoretical is 14.06 kJ, gain is 1.35 times.

4 g CAIII-300+1.66 g Ca+1 g NaH+2.19 g NiBr2; EM: 127.1 Id; dE: 10.69 kJ; TSC: 300-420 C; Tmax: 10.69 C, theoretical is 7.67 kJ, gain is 1.39 times.

5.90 g of BiI3, 1.66 g of KH, 1 g of Mg powder and 4 g of CA-III 300 activated carbon powder (dried at 300 C), energy gain was 10.9 kJ, and the cell temperature slope change was 70 C (217-287 C). The maximum cell temperature was 458 C, theoretical is 8.87 kJ, gain is 1.23 times.

1.79 g of SbF3, 1.66 g of KH, 1 g of Mg powder and 4 g of CA-III 300 activated carbon powder (dried at 300 C), energy gain was 11.7 kJ, and the cell temperature burst was 169 C (138-307 C). The maximum cell temperature was 454 C, theoretical is 9.21 kJ, gain is 1.27 times.

4 g CAIII-300+1.66 g Ca+1 g NaH+3.09 g MnI2, Ein: 111.0 kJ, dE: 12.6 kJ, TSC: 178-340 C, Tmax: 373 C, theoretical is 5.9 kJ, the gain is 2.13 times.

4 g CAIII-300+1.66 g Ca+1 g NaH+1.34 g CuCl2; Ein: 135.2 kJ; dE: 12.26 kJ; TSC: 250-390 C; Tmax: 437 C, theoretical is 8.55 kJ, the gain is 1.43 times.

1.50 g of InCl, 1.66 g of KH, 1 g of Mg powder and 4 g of CA-III 300 activated carbon powder (dried at 300 C), energy gain was 5.1 kJ, but no cell temperature burst was observed. The maximum cell temperature was 410 C, theoretical is 2.29 kJ, the gain is 2.22 times.

2.21 g of InCl3, 1.66 g of KH, 1 g of Mg powder and 4 g of CA-III 300 activated carbon powder (dried at 300 C), energy gain was 10.9 kJ and the cell temperature burst was 191 C (235-426 C). The maximum cell temperature was 431 C, theoretical is 7.11 kJ, the gain is 1.5 times.

1.95 g of InBr, 1.66 g of KH, 1 g of Mg powder and 4 g of CA-III 300 activated carbon powder (dried at 300 C), energy gain was 6.0 kJ, but no cell temperature burst was observed. The maximum cell temperature was 435 C, theoretical is 2 kJ, the gain is 3 times.

3.55 g of InBr3, 1.66 g of KH, 1 g of Mg powder and 4 g of CA-III 300 activated carbon powder (dried at 300 C), energy gain was 9.1 kJ, and the cell temperature burst was 152 C (156-308 C). The maximum cell temperature was 386 C, theoretical is 6.92 kJ, the gain is 1.3 times.

4 g CAIII-300+1.66 g KH+3.79 g SnI2, Ein: 169.1 kJ, dE: 6.0 kJ, TSC: 200-289 C, Tmax: 431 C, theoretical is 4.03 kJ, the gain is 1.49 times.

KH 8.3 gm+Mg 5.0 gm+WC 20.0 gm+MnBr2 10.75 gm, Ein: 309 kJ, dE: 35 kJ, No TSC with Tmax ~335 C. Energy Gain-4.9X (X~18.1 kJ).

KH 8.3 gm+Mg 5.0 gm+CAII-300 20.0 gm+MnBr2 10.75 gm, EM: 280 kJ, dE: 41 Id, TSC at ~280 C with Tmax ~350 C. Energy Gain ~2.2 X (X~18.1 kJ).

KH 1.66 gm+Mg 1.0 gm+TiC 4.0 gm+TiF3 1.05 gm 5X Cell #1086 with CAII-300, Ein: 143 kJ, dE: 6 kJ, No TSC with Tmax ~280 C, theoretical is 2.5 kJ, gain is 2.4 times.

KH 8.3 gm+Mg 5.0 gm+CAII-300 20.0 gm+FeF2 4.7 gm, Ein: 280 kJ, dE: 40 kJ, TSC at ~260 C with Tmax ~340 C, theoretical is 20.65 kJ, gain is 1.93 times.

KH 8.3 gm+Mg 5.0 gm+CAII-300 20.0 gm+CuF2 5.1 gm, Ein: 203 kJ, dE: 57 kJ, TSC at ~125 C with Tmax ~280 C, theoretical is 29 kJ, gain is 1.96 times.

KH 83.0 gm+Mg 50.0 gm+WC 200.0 gm+SnI2 185 gm URS, Ein: 1310 kJ, dE: 428 kJ, TSC at ~140 C with Tmax ~350 C, theoretical is 200 kJ, gain is 2.14 times.

061009KAWFC1#1102 NaH 1.0 gm+Mg 1.0 gm+WC 4.0 gm+GdBr3_3.97 gm, Ein: 148 kJ, dE: 7 kJ, Small TSC at ~300 C with Tmax ~420 C. Energy Gain-3.5 X (X~2 kJ).

KH 8.3 gm+Mg 5.0 gm+CAII-300 20.0 gm+FeO 3.6 gm, Ein: 355 kJ, dE: 24 Id, Small TSC at ~260 C with Tmax ~360 C. Energy Gain-1.45 X (X~16.6 kJ).

KH 83.0 gm+Mg 50.0 gm+WC 200.0 gm+SnI2 185 gm ROWAN, Ein: 1379 kJ, dE: 416 kJ, TSC at ~140 C with Tmax ~-350 C, theoretical is 200 kJ, gain is 2 times.

KH 8.3 gm+Mg 5.0 gm+CAII-300 20.0 gm+CoI2 15.65 gm, Ein: 361 kJ, dE: 69 kJ, TSC at ~200 C with Tmax ~410 C, theoretical is 26.35 kJ, gain is 2.6 times.

KH 8.3 gm+5.0 gm+CAII 300 20.0 gm+FeS 4.4 gm, Ein: 312 kJ, dE: 22 kJ, No TSC with Tmax ~-350 C. Energy Gain ~1.7 X (X~12.3 kJ).

KH 8.3 gm+WC 40.0 gm+SnI2 18.5 gm, Ein: 315 kJ, dE: 27 kJ, Small TSC at ~140 C with Tmax ~340 C. Energy Gain-1.35 X (X~20 kJ).

NaH 5.0 gm+Mg 5.0 gm+WC 20.0 gm+MnI2 15.45 gm, EM: 108 kJ, dE: 30 kJ, TSC at ~70 C with Tmax ~170 C, theoretical is 14.8 kJ, gain is 2 times.

NaH 5.0 gm+Mg 5.0 gm+WC 20.0 gm+NiBr2 11.0 gm, Ein: 248 kJ, dE: 34 kJ, TSC at ~170 C with Tmax ~300 C. Energy Gain-1.7 X (X~20 kJ), theoretical is 26.25 kJ, gain is 1.3 times.

KH 8.3 gm+Mg 5.0 gm+WC 20.0 gm+NiBr2 11.0 gm, EM: 291 kJ, dE: 30 Id, Small TSC at ~250 C with Tmax ~340 C. Energy Gain-1.5 X (X~20 Id), theoretical is 26.25 kJ, gain is 1.14 times.

NaH 5.0 gm-F Mg 5.0 gm+WC 20.0 gm-F NiBr2 11.0 gm Repeat of Cell #1105, Ein: 242 kJ, dE: 33 kJ, TSC at ~70 C with Tmax ~280 C. Energy Gain-1.65 X (X~20 kJ).

NaH 5.0 gm+Mg 5.0 gm+CAII-300 20.0 gm+InCl3 11.1 gm, Ein: 189 kJ, dE: 48 kJ, Small TSC at ~80 C with Tmax ~260 C. Energy Gain ~1.5X (X~31 kJ).

KH 8.3 gm+Mg 5.0 gm+CAII-300 20.0 gm+MnI2 15.45 gm, Ein: 248 kJ, dE: 46 kJ, Small TSC at ~200 C with Tmax ~325 C. Energy Gain ~3 X (X~14.8 kJ).

2.96 g of FeBr3, 1.66 g of KH, 1 g of Mg powder and 4 g of CA-III 300 activated carbon powder (dried at 300 C), energy gain was 12.5 kJ, and the cell temperature burst was 77 C (72-149 C). The maximum cell temperature was 418 C, theoretical is 8.35 kJ, the gain is 1.5 times.

0.72 g of FeO, 1.66 g of KH, 1 g of Mg powder and 4 g of CA-III 300 activated carbon powder (dried at 300 C), energy gain was 6.7 kJ, but no cell temperature burst was observed. The maximum cell temperature was 448 C, theoretical is 3.3 kJ, the gain is 2 times.

1.26 g of MnCl2, 1.66 g of KH, 1 g of Mg powder and 4 g of CA-III 300 activated carbon powder (dried at 300 C), energy gain was 8.6 kJ, but no cell temperature burst was observed. The maximum cell temperature was 437 C, theoretical is 3.52 kJ, the gain is 2.45 times.

1.13 g of FeF3, 1.66 g of KH, 1 g of Mg powder and 4 g of CA-III 300 activated carbon powder (dried at 300 C), energy gain was 12.6 kJ, but no cell temperature burst was observed. The maximum cell temperature was 618 C, theoretical is 6.44 kJ, the energy gain is 1.96 times.

4 g CAIII-300+1 g Mg+1 g NaH+3.97 g GdBr3, Ein: 143.1 kJ, dE: 5.4 kJ, TSC: none, Tmax: 403 C, theoretical is 1.99 kJ, the gain is 2.73 times.

4 g CAIII-300+1 g Mg+1 g NaH+1.57 g SnF2; Ein: 139.0 kJ; dE: 7.24 kJ; TSC: not observed; Tmax: 413 C, theoretical is 5.28 kJ, gain is 1.37 times.

4 g CAIII-300+1 g Mg+1 g NaH+4.04 g Sb2S5, Ein: 125.0 kJ, dE: 19.3 kJ, TSC: 421-651 C, Tmax: 651 C, theoretical is 12.37 kJ, gain is 1.56 times.

1.36 g of ZnCl2, 1.66 g of KH, 1 g of Mg powder and 4 g of CA-III 300 activated carbon powder (dried at 300 C), energy gain was 6.6 kJ, but no cell temperature burst was observed. The maximum cell temperature was 402 C, theoretical is 4.34 kJ, gain is 1.52 times.

1.03 g of ZnF2, 1.66 g of KH, 1 g of Mg powder and 4 g of CA-III 300 activated carbon powder (dried at 300 C), energy gain was 6.5 kJ, but no cell temperature burst was observed. The maximum cell temperature was 427 C, theoretical is 3.76 kJ, gain is 1.73 times.

4 g CAIII-300+1 g Mg+1 g NaH+2.22 g InCl3, Experimental dE: ~12.6 kJ Reaction considered: InCl3(c)+3NaH (c)+1.5Mg(c)=3NaCl(c)+In(c)+1.5MgH2(c) Q=−640.45 kJ/reaction theoretical chemical reaction energy: −6.4 kJ, Excess heat: −6.2 kJ, 2.0X excess heat.

1.08 g of VF3, 1.66 g of KH, 1 g of Mg powder and 4 g of CA-III 300 activated carbon powder (dried at 300 C), energy gain was 9.5 kJ, but no cell temperature burst was observed. The maximum cell temperature was 447 C, theoretical is 4.9 kJ, the gain is 1.94 times.

8.3 g KH+5.0 g Mg+20.0 g AC (II-300)+5.4 g VF3, Ein: 286 kJ, dE: 58 kJ, theoretical is 24.5 kJ, gain is 2.3 times.

4 g CAIII-300+1 g Mg+1 g NaH+1.72 g InF3, Ein: 134.0 kJ, dE: 8.1 kJ, TSC: none, Tmax: 391 C, theoretical is 5 kJ, gain is 1.62 times.

4 g CAIII-300+1 g Mg+1.66 g KH+1.02 g CuF2, Experimental dE: −9.4 kJ Reaction considered: CuF2(c)+Mg(c) =MgF2(c)+Cu(c) Q=−581.5 kJ/reaction theoretical chemical reaction energy: −5.82 kJ, Excess heat: −3.59 kJ, 1.6X excess heat.

4 g CAIII-300+1 g Mg+1 g NaH+2.83 g PbF4, Experimental dE: −17.6 kJ Reaction considered: PbF4(c)+2Mg(c)+ 4NaH (c)=2MgH2(c)+4NaF(c)+Pb(c) 0=−1290.0 kJ/reaction theoretical chemical reaction energy: −12.9 kJ, Excess heat: −4.7 kJ 1.4X excess heat.

KH 1.66 gm+Mg 1.0 gm+TiC 4.0 gm+SnI4 6.26 gm, Ein: 97 kJ, dE: 17 Id, TSC at ~150 C with Tmax ~370 C, theoretical is 10.1 kJ, the gain is 1.7 times.

4 g CAIII-300+1 g Mg+1.66 g KH+3.7 g TiBr4, Experimental dE: −16.1 kJ Reaction considered: TiBr4(c)+4KH (c)+2Mg(c)+C(s)=4KBr(c)+TiC(c)+2MgH2(c) Q=−1062.3 kJ/reaction theoretical chemical reaction energy: −10.7 kJ, Excess heat: −5.4 kJ 1.5X excess heat.

BI3

4 g CAIII-300+1 g Mg+1 g NaH+2.4 g BI3, Ein: 128.1 kJ, dE: 7.9 kJ, TSC: 180-263 C, Tmax: 365 C, theoretical is 5.55 kJ, the gain is 1.4 times.

MnBr2

4 g CAIII-300+1 g Mg+1.66 g KH+2.15 g MnBr2, Experimental dE: −7.0 kJ Reaction considered: MnBr2(c)+ 2KH(c)+Mg(c)=2KBr(c)+Mn(c)+MgH2(c) Q=−362.6 kJ/reaction theoretical chemical reaction energy: −3.63 kJ, Excess heat: −3.4 kJ 1.9X excess heat.

KH 8.3 gm+Mg 5.0 gm+WC 20.0 gm+MnBr2 10.75 gm, Ein: 309 kJ, dE: 35 kJ, No TSC with Tmax ~335 C. Energy Gain-1.9X (X~18.1 kJ).

KH 8.3 gm+Mg 5.0 gm+CAII-300 20.0 gm+MnBr2 10.75 gm, Ein: 280 kJ, dE: 41 Id, TSC at ~280 C with Tmax ~350 C. Energy Gain ~2.2 X (X~18.1 kJ).

FeF2

4 g CAIII-300+1 g Mg+1.66 g KH+0.94 g FeF2, Experimental dE: −9.8 kJ Reaction considered: FeF2(c)+Mg(c) =MgF2(c)+Fe(c) Q=−412.9 kJ/reaction theoretical chemical reaction energy: −4.13 kJ, Excess heat: −5.67 kJ, 2.4X excess heat.

KH 8.3 gm+Mg 5.0 gm+CAII-300 20.0 gm+FeF2 4.7 gm, Ein: 280 kJ, dE: 40 kJ, TSC at ~260 C with Tmax ~340 C, theoretical is 20.65 kJ, the gain is 1.94 times.

TiF3

KH 1.66 gm+Mg 1.0 gm+TiC 4.0 gm+TiF3 1.05 gm (5X Cell #1086 with CAII-300), Ein: 143 kJ, dE: 6 kJ, No TSC with Tmax ~280 C, theoretical is 2.5, the gain is 2.4 times.

KH 8.3 gm+Mg 5.0 gm+CAII-300 20.0 gm+TiF3 5.25 gm, Ein: 268 kJ, dE: 7 kJ, No TSC with Tmax ~280 C. No Energy Gain (X~21.7 Id).

CuF2

KH 8.3 gm+Mg 5.0 gm+CAII-300 20.0 gm+CuF2 5.1 gm, Ein: 203 kJ, dE: 57 kJ, TSC at ~125 C with Tmax ~280 C, the theoretical is 29.1 kJ, the gain is 2 times.

MnI2

NaH 4.0 gm+Mg 4.0 gm+CAII-300 16.0 gm+MnI2 12.36 gm (4X Scale up), Ein: 253 kJ, dE: 30 kJ, No TSC with Tmax ~300 C, theoretical is 11.8 kJ, gain is 2.5 times.

The heat measurement with 3.09 g of MnI2, 1.66 g of KH, 1 g of Mg powder and 4 g of CA-III 300 activated carbon powder (dried at 300 C), energy gain was 8.8 kJ, and the cell temperature burst was 92 C (172-264 C). The maximum cell temperature was 410 C, theoretical is 2.96 kJ, gain is 3 times.

4 g CAIII-300+1 g Mg+1 g NaH+3.09 g MnI2, Ein: 126.1 kJ, dE: 8.0 kJ, TSC: 157-241 C, Tmax: 385 C, theoretical is 2.96 kJ, the gain is 2.69 times.

ZnBr2

2.25 g of ZnBr2, 1.66 g of KH, 1 g of Mg powder and 4 g of CA-III 300 activated carbon powder (dried at 300 C), energy gain was 10.3 kJ, and the cell temperature burst was 82 C (253-335 C). The maximum cell temperature was 456 C, theoretical is 3.56 kJ, gain is 2.9 times.

NaH 5.0 gm+Mg 5.0 gm+CAII-300 20.0 gm+ZnBr2 11.25 gm, Ein: 291 kJ, dE: 26 kJ, No TSC with Tmax ~330 C, theoretical is 17.8 kJ, gain is 1.46 times.

CoCl2

1.3 g of CoCl2, 1.66 g of KH, 1 g of Mg powder and 4 g of CA-III 300 activated carbon powder (dried at 300 C), energy gain was 10.4 kJ, and the cell temperature slope change was 105 C (316-421 C). The maximum cell temperature was 450 C, theoretical is 5.2 kJ, gain is 2 times.

1.3 g of CoCl2, 1.66 g of KH, 1 g of Mg powder and 4 g of CA-III 300 activated carbon powder (dried at 300 C), energy gain was 9.6 kJ, and the cell temperature burst was 181 C (295-476 C). The maximum cell temperature was 478 C, theoretical is 5.2 kJ, the gain is 1.89 times.

SnBr2

2.8 g of SnBr2, 1.66 g of KH, 1 g of Mg powder and 4 g of CA-III 300 activated carbon powder (dried at 300 C), energy gain was 14.2 kJ, and the temperature burst was 148 C(148-296 C). The maximum cell temperature was 376 C, theoretical is 3.75 kJ, gain is 3.78 times.

4 g CAIII-300+1 g Mg+1 g NaH+2.79 g SnBr2, Ein: 116.0 kJ, dE: 7.7 kJ, TSC: 135-236 C, Tmax: 370 C, theoretical is 3.75 kJ, the gain is 2 times.

KH 8.3 gm+Mg Powder 5.0 gm+CAII 300 20.0 gm+SnBr2 11.4 gm, Ein: 211 kJ, dE: 41 kJ, TSC at ~170 C with Tmax ~300 C; theoretical is 15.5 kJ, the gain is 2.6 times.

KH 8.3 gm+Mg 5.0 gm+TiC 20.0 gm+SnBr2 14.0 gm, Ein 229 kJ, dE: 46 kJ, TSC at ~150 C with Tmax ~310 C and Gain-2.4X (X~19 kJ), theoretical is 18.8 kJ, gain is 2.4 times.

KH 1.66 gm+Mg 1.0 gm+WC 4.0 gm+SnBr2 2.8 gm, Ein: 101 kJ, dE: 10 kJ, TSC at ~150 C with Tmax ~.350 C, theoretical is 3.75 kJ, the gain is 2.66 times.

4 g CAIII-300+1.66 g KH+2.79 g SnBr2, Ein: 132.0 kJ, dE: 9.6 kJ, TSC: 168-263, Tmax: 381 C, theoretical is 4.29 kJ, the gain is 2.25 times.

1 g Mg+1.66 g KH+2.79 g SnBr2; Ein: 123.0 kJ; dE: 7.82 kJ; TSC: 125-220 C; Tmax: 386 C, theoretical is 5.85 kJ, the gain is 1.33 times.

SnI2

KH 6.64 gm+Mg Powder 4.0 gm+TiC 18.0 gm+SnI2 14.8 gm; Ein: 232 kJ, dE: 47 kJ, TSC at ~150 C with Tmax ~280 C. Energy Gain ~3.6X (X~12.8 kJ), theoretical is 12.6 kJ, the gain is 3.7 times.

3.7 g of SnI2, 1.66 g of KH, 1 g of Mg powder and 4 g of CA-III 300 activated carbon powder (dried at 300 C), energy gain was 11.9 kJ, but no temperature burst was observed. The maximum cell temperature was 455 C, theoretical is 3.2 kJ, gain is 3.7 times.

KH 1.6 gm+Mg Powder 1.0 gm+TiC 4.0 gm+SnI2 3.7 gm, Ein: 162 kJ, dE: 13 kJ; TSC at 100 C with Tmax ~490 C; theoretical is 3.2 kJ, gain is 4 times.

KH 8.3 gm+Mg Powder 5.0 gm+CAII 300 20.0 gm+SnI2 18.5 gm, Ein: 221 kJ, dE: 47 kJ, TSC at ~170 C with Tmax ~300 C, theoretical is 15.9 kJ, the gain is 3 times.

4 g CAIII-300+1 g Mg+1 g NaH+3.73 g SnI2; Ein: 121.9 kJ; dE: 7.56 kJ; TSC: not observed; Tmax: 391 C, theoretical is 3.2 kJ, the gain is 2.36 times.

1.66 g KH+3.79 g SnI2, Ein: 114.0 kJ, dE: 8.8 kJ, TSC: 161-259 C, Tmax: 359 C, theoretical is 4 kJ, the gain is 2.17 times.

SnCl2

NaH 5.0 gm+Mg 5.0 gm+CAII-300 20.0 gm+SnCl2 9.6 gm, Ein: 181 kJ, dE: 30 kJ, TSC at ~140 C with Tmax ~280 C, theoretical is 19 kJ, the gain is 1.57 times.

NiBr2

4 g CAIII-300+1 g Mg+1 g NaH+2.19 g NiBr2; Ein: 126.0 kJ; dE: 12.01 kJ; TSC: 290-370 C; Tmax: 417 C, theoretical is 4 kJ, gain is 3 times.

NaH 1.0 gm+MgH2 Powder 1.0 gm+TiC 4.0 gm) Mix+NiBr2_2.2 gm, Ein: 121 kJ, dE: 11 kJ, Temp. slope Jump at 260 C with Tmax ~390 C, theoretical is 4 kJ, gain is 2.75 times.

4 g CAIII-300+1 g Al+1 g NaH+2.19 g NiBr2; Ein: 122.0 kJ; dE: 7.78 kJ; TSC: not observed; Tmax: 392 C, theoretical is 4 kJ, gain is 1.95 times.

4 g CAIII-300+1 g Mg+0.33 g LiH+2.19 g NiBr2; Ein: 128.0 kJ; dE: 10.72 kJ; TSC: 270-436 C; Tmax: 440 C, theoretical is 4 kJ, gain is 2.68 times 4 g CAIII-300+1 g Mg+1.66 g KH+2.19 g NiBr2; Ein: 126.0 kJ; dE: 10.45 kJ; TSC: 285-423 C; Tmax: 423 C, theoretical is 4 kJ, gain is 2.6 times.

4 g CAIII-300+1 g MgH2+1 g NaH+2.19 g NiBr2; Ein: 138.1 kJ; dE: 8.12 kJ; TSC: not observed; Tmax: 425 C, theoretical is 4 kJ, gain is 2 times.

NaH 5.0 gm+Mg Powder 5.0 gm+Activated Carbon CAII 300 20.0 gm) Mix+NiBr2 11.0 gm (Theoretical 23.6 kJ), Ein: 224 kJ, dE: 53 kJ, Temp. slope Jump at 160 C with Tmax ~280 C, theoretical is 20 kJ, the gain is 2.65 times.

NaH 1.0 gm+Mg 1.0 gm+WC 4.0 gm+NiBr2 2.2 gm, Ein: 197 kJ, dE: 11 kJ, Small TSC at ~200 C with Tmax ~500 C; theoretical is 4 kJ, the gain is 2.75 times.

NaH 50.0 gm+Mg 50.0 gm+CAII-300 200.0 gm+NiBr2 109.5 gm, Ein: 1990 kJ, dE: 577 kJ, TSC at ~140 C with Tmax ~980 C, theoretical is 199 kJ, gain is 2.9 times.

no Mg control: 4 g CAIII-300+1 g NaH+2.19 g NiBr2; Ein: 134.0 kJ; dE: 5.37 kJ; TSC: not observed; Tmax: 375 C, theoretical is 3.98 kJ, the gain is 1.35 times.

control: 1 g Mg+1 g NaH+2.19 g NiBr2; Ein: 129.0 Id; dE: 5.13 kJ; TSC: 195-310 C; Tmax: 416 C, theoretical is 5.25 kJ.

control: 1 g NaH+2.19 g NiBr2; Ein: 138.2 kJ; dE: −0.18 kJ; TSC: not observed; Tmax: 377 C, theoretical is 3.98 kJ.

CuCl2

4 g CAIII-300+1 g Mg+1 g NaH+1.34 g CuCl2, Ein: 119.0 kJ, dE: 10.5 kJ, TSC: 250-381 C, Tmax: 393 C, theoretical is 4.9 kJ, gain is 2.15 times.

4 g CAIII-300+1 g Al+1 g NaH+1.34 g CuCl2, Ein: 126.0 kJ, dE: 7.4 kJ, TSC: 229-354 C, Tmax: 418 C, theoretical is 4.9 kJ, gain is 1.5 times.

4 g CAIII-300+1 g MgH2+1 g NaH+1.34 g CuCl2, Ein: 144.0 kJ, dE: 8.3 kJ, TSC: 229-314 C, Tmax: 409 C, theoretical is 4.9 kJ, the gain is 1.69 times.

NaH 5.0 gm+Mg Powder 5.0 gm+Activated Carbon CAII 300 20.0 gm) Mix+CuCl2 10.75 gm (Theoretical is 45 kJ), Ein: 268 kJ, dE: 80 kJ, Temp. slope Jump at 210 C with Tmax ~360 C, theoretical is 39 kJ, the gain is 2 times.

1.4 g of CuCl2, 1.66 g of KH, 1 g of Mg powder and 4 g of CA-III 300 activated carbon powder (dried at 300 C) in 1 inch heavy duty cell, energy gain was 14.6 kJ, and the temperature burst was 190 C(188-378 C). The maximum cell temperature was 437 C, theoretical is 4.9 kJ, the gain is 3 times.

KH 8.3 gm+Mg Powder 5.0 gm+CAII-300 20.0 gm+CuCl2 6.7 gm, Ein: 255 kJ, dE: 55 kJ, TSC at ~200 C with Tmax ~320 C, theoretical is 24.5 kJ, the gain is 2.24 times CuCl 4 g CAIII-300+1 g Mg+1 g NaH+1 g CuCl; Ein: 128.1 kJ; dE: 4.94 kJ; TSC: not observed; Tmax: 395 C, theoretical is 2.18 kJ, the gain is 2.26 times.

CoI2

4 g CAIII-300+1 g Mg+1 g NaH+3.13 g CoI2, Ein: 141.1 kJ, dE: 9.7 kJ, TSC: none, Tmax: 411 C Reaction considered: 2NaH (c)+CoI2(c)+Mg(c)=2NaI(c)+Co(c)+MgH2(c) 0=−449.81d/reaction theoretical chemical reaction energy: −4.50 kJ, Excess heat: −5.18 kJ, the gain is 1.9 times.

3.13 g of CoI2, 1.66 g of KH, 1 g of Mg powder and 4 g of CA-III 300 activated carbon powder (dried at 300 C), energy gain was 10.7 kJ, and the cell temperature burst was 117 C (248-365 C). The maximum cell temperature was 438 C, theoretical is 5.27 kJ, gain is 2.03 times.

ZnI2

4 g CAIII-300+1 g Mg+1 g NaH+3.19 g ZnI2, Ein: 157.1 kJ, dE: 5.8 kJ, TSC: none, Tmax: 330 C Reaction considered: 2NaH (c)+ZnI2(c)+Mg(c)=2NaI(c)+Zn(c)+MgH2(c) Q=−330.47 kJ/reaction theoretical chemical reaction energy: −3.30 kJ, Excess heat: −2.50 kJ, the gain 1.75 times.

3.19 g of ZnI2, 1.66 g of KH, 1 g of Mg powder and 4 g of CA-III 300 activated carbon powder (dried at 300 C), energy gain was 5.9 kJ, and the cell temperature slope change was 79 C (180-259 C). The maximum cell temperature was 423 C, theoretical is 4.29 kJ, gain is 1.38 times.

NiF2

4 g CAIII-300+1 g Mg+1 g NaH+0.97 g NiF2, Ein: 135.0 kJ, dE: 7.9 kJ, TSC: 253-335 C, Tmax: 385 C Reaction considered: 2NaH (c)+NiF2(c)+Mg(c)=2NaF(c)+Ni(c)+MgH2(c) Q=−464.4 kJ/reaction theoretical chemical reaction energy: −4.64 kJ, Excess heat: −3.24 kJ, the gain is 1.7 times.

0.97 g of NiF2, 1.66 g of KH, 1 g of Mg powder and 4 g of CA-III 300 activated carbon powder (dried at 300 C), energy gain was 8.7 kJ, and the cell temperature slope change was 63 C (256-319 C). The maximum cell temperature was 410 C, theoretical is 5.25 kJ, the gain is 1.66 times.

CoBr2

4 g CAIII-300+1 g Mg+1 g NaH+2.19 g CoBr2, Ein: 140.0 kJ, dE: 7.6 kJ, TSC: none, Tmax: 461 C Reaction considered: 2NaH (c)+CoBr2(c)+Mg(c)=2NaBr(c)+Co(c)+MgH2(c) Q=−464 kJ/reaction theoretical chemical reaction energy: −4.64 kJ, Excess heat: −2.9 kJ, the gain is 1.64 times.

2.19 g of CoBr2, 1.66 g of KH, 1 g of Mg powder and 4 g of CA-III 300 activated carbon powder (dried at 300 C), energy gain was 10.4 kJ, and the cell temperature burst was 110 C (306-416 C). The maximum cell temperature was 450 C, theoretical is 5.27 kJ, gain is 1.97 times.

2.19 g of CoBr2, 1.66 g of KH, 1 g of Mg powder and 4 g of CA-III 300 activated carbon powder (dried at 300 C), energy gain was 10.2 kJ, but no cell temperature burst was observed. The maximum cell temperature was 446 C, theoretical is 5.27 kJ, the gain is 1.94 times.

FeCl2

4 g CAIII-300+1 g Mg+1 g NaH+1.27 g FeCl2, Ein: 155.0 kJ, dE: 10.5 kJ, TSC: none, Tmax: 450 C, theoretical is 3.68 kJ, gain is 2.85 times.

4 g CAIII-300+1 g Al+1 g NaH+1.27 g FeCl2, Ein: 141.7 kJ, dE: 7.0 kJ, TSC: none, Tmax: 440 C, theoretical is 3.68 kJ, gain is 1.9 times.

1.3 g of FeCl2, 1.66 g of KH, 1 g of Mg powder and 4 g of CA-III 300 activated carbon powder (dried at 300 C) in 1 inch heavy duty cell, energy gain was 11.5 kJ, and the temperature burst was 142 C(287-429 C). The maximum cell temperature was 448 C, theoretical is 4.1 kJ, the gain is 2.8 times.

NaH_5.0 gm+Mg Powder_5.0 gm+Activated Carbon CAII 300_20.0 gm) Mix+FeCl2_6.35 gm, Ein: 296 kJ, dE: 37 kJ, Temp. slope Jump at 220 C with Tmax ~330 C, theoretical is 18.4 kJ, the gain is 2 times.

FeCl3

2.7 g of FeCl3, 1.66 g of KH, 1 g of Mg powder and 4 g of CA-III 300 activated carbon powder (dried at 300 C), energy gain was 21.3 kJ, and the cell temperature burst was 205 C (147-352 C) The maximum cell temperature was 445 C, theoretical is 10.8 kJ, the gain is 1.97 times.

NaH 1.0 gm+Mg Powder 1.0 gm+TiC 4.0 gm+FeCl3 1.6 gm, Ein: 88 kJ, dE: 14 kJ; TSC at 80 C with Tmax ~.350 C, theoretical is 6.65 kJ, gain is 2.1 times.

KH 8.3 gm+MgH2 Powder 5.0 gm+CAII 300 20.0 gm+FeCl3 8.1 gm, Ein: 253 kJ, dE: 52 kJ/; No TSC with Tmax ~300 C, theoretical is 33 kJ, gain is 1.56 times.

KH 8.3 gm+Mg 5.0 gm+CAII-300 20.0 gm+FeCl2 6.5 gm, Ein: 299 kJ, dE: 44 kJ, No TSC with Tmax ~.350 C, theoretical is 18.9 kJ, gain is 2.3 times.

FeBr2

4 g CAIII-300+1 g Mg+1.66 g KH+2.16 g FeBr2; Ein: 144.0 kJ; dE: 9.90 kJ; TSC: not observed; Tmax: 455 C, theoretical is 3.6 kJ, gain is 2.75 times.

4 g CAIII-300+1 g MgH2+1 g NaH+2.16 g FeBr2; Ein: 142.0 kJ; dE: 8.81 kJ; TSC: not observed; Tmax: 428 C, theoretical is 3.6 kJ, gain is 2.44 times.

4 g CAIII-300+1 g MgH2+0.33 g LiH+2.16 g FeBr2; Ein: 164.0 kJ; dE: 8.68 kJ; TSC: not observed; Tmax: 450 C, theoretical is 3.6 kJ, the gain is 2.4 times.

4 g CAIII-300+1 g MgH2+1.66 g KH+2.16 g FeBr2; Ein: 159.8 kJ; dE: 9.07 kJ; TSC: not observed; Tmax: 459 C, theoretical is 3.6 kJ, the gain is 2.5 times.

4 g CAIII-300+1 g Mg+1 g NaH+2.96 g FeBr2, Experimental dE: −6.7 kJ Reaction considered: 2NaH (c)+FeBr2 (c)+Mg(c)=2NaBr(c)+Fe(c)+MgH2(c) Q=−435.1 kJ/reaction
theoretical chemical reaction energy: −4.35 kJ, Excess heat: −2.35 kJ, 1.54X excess heat.

NiCl2

4 g CAIII-300+1 g Mg+1 g NaH+1.30 g NiCl2, Ein: 112.0 kJ, dE: 9.7 kJ, TSC: 230-368 C, Tmax: 376 C, theoretical is 4 kJ, gain is 2.4 times.

1.3 g of NiCl2, 0.33 g of LiH, 1 g of Mg powder and 4 g of CA-III 300 activated carbon powder (dried at 300 C) in 1 inch heavy duty cell, energy gain was 9.2 kJ, and the temperature slope change was 100 C(205-305 C). The maximum cell temperature was 432 C, theoretical is 4 kJ, the gain is 2.3 times.

1.3 g of NiCl2, 0.33 g of LiH, 1 g of Al powder and 4 g of CA-III 300 activated carbon powder (dried at 300 C) in 1 inch heavy duty cell, energy gain was 8.0 kJ, and the temperature slope change was 85 C(206-291 C). The maximum cell temperature was 447 C, theoretical is 4 kJ, the gain is 2 times.

CuBr 4 g CAIII-300+1 g Mg+1 g NaH+1.44 g CuBr; EM: 125.0 kJ; dE: 4.67 kJ; TSC: not observed; Tmax: 382 C, theoretical is 2 kJ, the gain is 2.33 times.

4 g CAIII-300+1 g Mg+1.66 g KR+1.44 g CuBr, Experimental dE: −7.6 kJ Reaction considered: CuBr(c)+KH(c)+0.5Mg(c)=KBr(c)+Cu(c)+0.5MgH2(c) Q=−269.2 kJ/reaction theoretical chemical reaction energy: −2.70 kJ, Excess heat: −4.90 kJ 2.8X excess heat.

CuBr2

4 g CAIII-300+1 g Mg+1 g NaH+2.23 g CuBr2; Ein: 118.1 kJ; dE: 8.04 kJ; TSC: 108-180 C; Tmax: 369 C, theoretical is 4.68 kJ, the gain is 1.7 times.

SnF4

2.0 g of SnF4, 1.66 g of KH, 1 g of Mg powder and 4 g of CA-III 300 activated carbon powder (dried at 300 C), energy gain was 18.4 kJ, but no temperature burst was observed. The maximum cell temperature was 576 C, theoretical is 9.3 kJ, the gain is 1.98 times AlI3

4.1 g of AlI3, 1.66 g of KH, 1 g of Mg powder and 4 g of CA-III 300 activated carbon powder (dried at 300 C), energy gain was 10.1 kJ, but no temperature burst was observed. The maximum cell temperature was 412 C, theoretical is 6.68 kJ, the gain is 1.51 times.

KH 8.3 gm+Mg 5.0 gm+CAII-300 20.0 gm+AlI3 20.5 gm, Ein: 318 kJ, dE: 48 Id, theoretical is 33.4 kJ, gain is 1.4 times.

SiCl4

1.7 g of SiCl4, 1.66 g of KH, 1 g of Mg powder and 4 g of CA-III 300 activated carbon powder (dried at 300 C), energy gain was 12.6 kJ, and the temperature burst was 68 C(366-434 C. The maximum cell temperature was 473 C, theoretical is 7.32 kJ, gain is 1.72 times.

4 g CAIII-300+1 g Mg+1 g NaH+0.01 mol SiCl4 (1.15 cc); Ein: 114.0 kJ; dE: 14.19 kJ; TSC: 260-410 C; Tmax: 423 C, theoretical is 7.32 kJ, the gain is 1.94 times.

AlBr3

2.7 g of AlBr3, 1.66 g of KH, 1 g of Mg powder and 4 g of CA-III 300 activated carbon powder (dried at 300 C), energy gain was 7.5 kJ, but no temperature burst was observed. The maximum cell temperature was 412 C, theoretical is 4.46 kJ, the gain is 1.68 times.

FeCl3

2.7 g of FeCl3, 1.66 g of KH, 1 g of Mg powder and 4 g of CA-III 300 activated carbon powder (dried at 300 C), energy gain was 21.3 kJ, and the cell temperature burst was 205 C (147-352 C) The maximum cell temperature was 445 C, theoretical is 10.8 kJ, the gain is 1.97 times.

SeBr4

4 g CAIII-300+1 g Mg+1 g NaH+3.99 g SeBr4; Ein: 112.0 kJ; dE: 23.40 kJ; TSC: 132-448 C; Tmax: 448 C, theoretical is 15.7 kJ, the gain is 1.5 times.

SnBr4

4 g CAIII-300+1 g Mg+1 g NaH+4.38 g SnBr4; Ein: 98.0 kJ; dE: 12.44 kJ; TSC: 120-270 C; Tmax: 359 C, theoretical is 8.4 kJ, the gain is 1.48 times.

KH 8.3 gm+Mg Powder 5.0 gm+CAII 300 20.0 gm+SnBr4 22.0 gm, Ein: 163 kJ; dE: 78 kJ; TSC at 60 C with Tmax ~290 C, theoretical is 42 kJ, gain is 1.86 times.

SiBr4

3.5 g of SiBr4, 1.66 g of KH, 1 g of Mg powder and 4 g of CA-III 300 activated carbon powder (dried at 300 C), energy gain was 11.9 kJ, and the temperature burst was 99 C(304-403 C). The maximum cell temperature was 449 C, theoretical is 7.62 kJ, the gain is 1.56 times.

TeBr4

4 g CAIII-300+1 g Mg+1 g NaH+4.47 g TeBr4, Ein: 99.0 kJ, dE: 18.4 kJ, TSC: 186-411 C, Tmax: 418 C, theoretical is 11.3 kJ, gain is 1.63 times.

4 g CAIII-300+1 g Al+1 g NaH+4.47 g TeBr4, Ein: 101.0 kJ, dE: 14.7 kJ, TSC: 144-305 C, Tmax: 374 C, theoretical is 11.4 kJ, gain is 1.29 times.

4.5 g of TeBr4, 1.66 g of KH, 1 g of MgH2 powder and 4 g of CA-III 300 activated carbon powder (dried at 300 C) in 1 inch heavy duty cell, energy gain was 19.1 kJ, and the temperature burst was 218 C(172-390 C). The maximum cell temperature was 410 C, theoretical is 12.65 kJ, gain is 1.5 times.

4.5 g of TeBr4, 1.66 g of KH, 1 g of Mg powder and 4 g of CA-III 300 activated carbon powder (dried at 300 C) in 1 inch heavy duty cell, energy gain was 23.5 kJ, and the temperature burst was 247 C(184-431 C). The maximum cell temperature was 436 C theoretical is 12.4 kJ, gain is 1.89 times.

KH 6.64 gm+Mg Powder 4.0 gm+Activated Carbon CAII 300 16 gm)+TeBr4 18 gm (kJ Theoretical) (80% of 5X scaleup), Ein: 213 kJ, dE: 77 kJ, Temp. slope Jump at 140 C with Tmax ~320 C, theoretical is 48.4 kJ, the gain is 1.59 times TeCl4

4 g CAIII-300+1 g Mg+1 g NaH+2.7 g TeCl4; Ein: 99.0 kJ; dE: 16.76 kJ; TSC: 114-300 C; Tmax: 385 C, theoretical is 13 kJ, gain is 1.29 times.

2.7 g of TeCl4, 0.33 g of LiH, 1 g of MgH2 powder and 4 g of CA-III 300 activated carbon powder (dried at 300 C) in 1 inch heavy duty cell, energy gain was 20.4 kJ, and the temperature burst was 140 C(138-278 C). The maximum cell temperature was 399 C, theoretical is 12.1 kJ, the gain is 1.69 times.

2.7 g of TeCl4, 0.33 g of LiH, 1 g of Mg powder and 4 g of CA-III 300 activated carbon powder (dried at 300 C) in 1 inch heavy duty cell, energy gain was 17.2 kJ, and the temperature burst was 240 C(137-377 C). The maximum cell temperature was 398 C, theoretical is 12.8 kJ, the gain is 1.34 times.

2.7 g of TeCl4, 1.66 g of KH, 1 g of MgH2 powder and 4 g of CA-III 300 activated carbon powder (dried at 300 C) in 1 inch heavy duty cell. energy gain was 15.6 kJ, and the temperature burst was 216 C(139-355 C). The maximum cell temperature was 358 C, theoretical is 12.1 kJ, the gain is 1.29 times.

2.7 g of TeCl4, 1.66 g of KH, 1 g of Al powder and 4 g of CA-III 300 activated carbon powder (dried at 300 C) in 1 inch heavy duty cell, energy gain was 19.4 kJ, and the temperature burst was 202 C(89-291 C). The maximum cell temperature was 543 C, theoretical is 10.9 kJ, gain is 1.78 times.

2.7 g of TeCl4, 0.33 g of LiH, 1 g of Al powder and 4 g of CA-III 300 activated carbon powder (dried at 300 C) in 1 inch heavy duty cell, energy gain was 19.0 kJ, and the temperature burst was 288 C(155-443 C). The maximum cell temperature was 443 C, theoretical is 10.9 kJ, gain is 1.74 times.

2.7 g of TeCl4, 1.66 g of KH, 1 g of Mg powder and 4 g of CA-III 300 activated carbon powder (dried at 300 C) in 1 inch heavy duty cell, energy gain was 17.7 kJ, and the temperature burst was 208 C(84-292 C). The maximum cell temperature was 396 C, theoretical is 13 kJ, gain is 1.36 times.

2.7 g of TeCl4, 1.66 g of KH, 1 g of Al powder and 4 g of CA-III 300 activated carbon powder (dried at 300 C) in 1 inch heavy duty cell, energy gain was 18.7 kJ, and the temperature burst was 224 C(112-336 C). The maximum cell temperature was 398 C, theoretical is 12 kJ, gain is 1.56 times.

SeCl4

4 g CAIII-300+1 g Mg+1 g NaH+2.21 g SeCl4; Ein: 93.0 kJ; dE: 22.14 kJ; TSC: 141-435 C; Tmax: 435 C, theoretical is 15 kJ, the gain is 1.48 times.

4 g CAIII-300+1 g Mg+1.66 g KH+2.20 g SeCl4, Experimental dE: −25.2 kJ Reaction considered: SeCl4(c)+4KH(c)+3Mg(c)=4KCl(c)+MgSe(c)+2MgH2(c)
Q=−1750.4 kJ/reaction
theoretical chemical reaction energy: −17.5 kJ, Excess heat: −7.7 kJ, 1.44X excess heat.

CF4

NaH 50 gm+Al 50 gm+Activated Carbon CAII300 200 gm+CF4 0.3 mole; 45 PSIG Reservoir Cell Volume: 2221.8 CC, Ein: 2190 kJ, dE: 482 kJ, Temp. jump at 200 C with Tmax ~760 C, theoretical is 345 kJ, gain is 1.4 times.

NaH 50.0 gm+Mg Powder 50 gm+Activated Carbon CAII-300 200 gm+CF4_75-9.9 PSIG after Evacuation. Volume of the reservoir is 1800 CC and for this pressure drop, n=0.356 mole and Theoretical Energy is 392 kJ, Ein: 1810 kJ, dE: 765 kJ, Temp Slope Jump at 170 C with Tmax ~1000 C and gain is 765/392=1.95 X.

NaH 1.0 gm+(Mg Powder 1.0 gm+Activated Carbon CAII 300 4 gm) Ball Mill+CF4 0.0123 mole and Theoretical Energy 13.6 kJ), Ein: 143 kJ, dE: 25 kJ, Temp. slope jump at 250 C with Tmax ~500 C and Energy Gain 1.8 X.

NaH 1.0 gm+(Mg Powder 1.0 gm+Activated Carbon CAII-300 4 gm 4 gm) Ball Mill+CF4 0.01 mole Theoretical Energy 10.2 kJ, Ein: 121 kJ, dE: 18 Id, Temp. slope jump at 260 C with Tmax ~500 C and Energy Gain 1.7 X.

NaH 1.0 gm+(Mg Powder 1.0 gm+activated Carbon CAII-300 4 gm 4 gm) Ball Mill+CF4 0.006 mole and Theoretical Energy 7.2 Id), Ein: 133 Id, dE: 15 Id, Temp. slope jump at 300 C with Tmax ~440 C and Energy Gain 2.0 X.

4 g CAIII-300+1 g MgH2+3.55 g Rb+0.0082 mol CF4+0.0063 mol H2; Ein: 76.0 kJ; dE: 20.72 kJ; TSC: 30-200 C; Tmax: 348 C, theoretical is 10 kJ, gain is 2 times.

SF6

NaH 50 gm+MgH2_50 gm+Activated Carbon CAII300 200 gm+SF6 0.29 mole; 43 PSIG Reservoir Cell Volume: 2221.8 CC, Ein: 1760 kJ, dE: 920 kJ, Temp. slope jump at 140 C with Tmax ~1100 C, theoretical is 638 kJ, gain is 1.44 times.

4 g CAIII-300+1 g MgH2+1 g NaH+0.0094 mol SF6; Ein: 96.7 kJ; dE: 33.14 kJ; TSC: 110-455 C; Tmax: 455 C, theoretical is 20.65 kJ, the excess is 12.5 kJ, the gain is 1.6 times.

NaH 1.0 gm+Al Powder 1.0 gm+Activated Carbon CAII 300 4 gm) Ball Mill+SF6 0.01 mole and Theoretical Energy ~20 kJ), Ein: 95 kJ, dE: 30 kJ, Temperature slope change at ~100 C with Tmax ~400 C, theoretical is 20.4 kJ, excess is 9.6 kJ, the gain is 1.47 times.

NaH 1.0 gm+MgH2 Powder 1.0 gm+Activated Carbon CAII 300 4 gm) Ball Mill+SF6 0.01 mole and Theoretical Energy ~22 kJ), Ein: 85 kJ, dE: 28 kJ, Temperature slope change at ~110 C with Tmax ~410 C, theoretical is 22 kJ, excess is 6 kJ, the gain is 1.27 times.

NaH 1.0 gm+Al nano Powder 1.0 gm+Activated Carbon CAII 300 4 gm) Ball Mill+SF6 0.005 mole, Ein: 107 kJ, dE: 21 kJ, Temperature slope change at ~160 C with Tmax ~380 C, theoretical is 10.2 kJ, the gain is 2 times NaH 1.0 gm+Mg Powder 1.0 gm+Activated Carbon CAII 300 4 gm) Ball Mill+SF6 0.005 mole, Ein: 104 kJ, dE: 18 kJ, Temperature slope change at ~150 C with Tmax ~370 C, theoretical is 12.5 kJ, the excess is 5.5 kJ, the gain is 1.44 times.

NaH 1.0 gm+MgH2 Powder 1.0 gm+Activated Carbon CAII 300 4 gm) Ball Mill+SF6 0.0025 mole and Theoretical Energy −5.5 kJ), Ein: 100 kJ, dE: 10 kJ, Temperature slope change at ~160 C with Tmax ~-335 C, theoretical is 5.5 kJ, the gain is 1.8 times.

4 g CAIII-300+0.5 g B+1 g NaH+0.0047 mol SF6; Ein: 112.0 kJ; dE: 15.14 kJ; TSC: 210-350 C; Tmax: 409 C, theoretical is 10.12 kJ, excess is 5 kJ, gain is 1.49 times.

4 g CAIII-300+1 g MgH2+1.66 g KH+0.00929 mol SF6 (Cell temperature rose up to 29 C upon SF6 fill); Ein: 66.0 kJ; dE: 26.11 kJ; TSC: 37-375 C; Tmax: 375 C, theoretical is 20.4 kJ, gain is 1.28 times.

4 g CAIII-300+1 g Mg+0.33 g LiH+0.00929 mol SF6 (Cell temperature rose up to 26 C upon SF6 fill); Ein: 128.0 kJ; dE: 32.45 kJ; TSC: 275-540 C; Tmax: 550 C, theoretical is 23.2 kJ, gain is 1.4 times.

4 g CAIII-300+1 g S+1 g NaH+0.0106 mol SF6 (online), Ein: 86.0 kJ, dE: 18.1 kJ, TSC: 51-313 C, Tmax: 354 C, theoretical is 11.2 kJ, gain is 1.6.

NaH 5.0 gm+MgH2 5.0 gm+Activated Carbon CAII 300 20.0 gm) Ball Mill+SF6 40 PSIG; 0.026 mole ON LINE (Theoretical Energy ~57 kJ) 2" cell, Ein: 224 kJ, dE: 86 kJ, Temp jump at 150 C with Tmax ~350 C, theoretical is 57 kJ, gain is 1.5 times.

TeO2

4 g CAIII-300+1 g MgH2+1 g NaH+1.6 g TeO2; EM: 325.1 kJ; dE: 18.46 kJ; TSC: 210-440 C; Tmax: 440 C, theoretical is 9.67 kJ, the excess is 8.8 kJ, the gain is 1.9 times.

4 g CAIII-300+2 g MgH2+2 g NaH+3.2 g TeO2, Ein: 103.0 kJ, dE: 31.6 kJ, TSC: 185-491 C, Tmax: 498 C, theoretical is 17.28 kJ, gain is 1.83 times.

1.6 g of TeO2, 0.33 g of LiH, 1 g of Al powder and 4 g of CA-III 300 activated carbon powder (dried at 300 C) in 1 inch heavy duty cell, energy gain was 18.1 kJ, but no temperature burst was observed. The maximum cell temperature was 637 C, theoretical 8.66 kJ, gain is 2.1 times.

1.6 g of TeO2, 1.66 g of KH, 1 g of MgH2 powder and 4 g of CA-III 300 activated carbon powder (dried at 300 C) in 1 inch heavy duty cell, energy gain was 22.0 kJ, and the temperature burst was 233 C(316-549 C). The maximum cell temperature was 554 C, theoretical 8.64 kJ, gain is 2.55 times.

1.6 g of TeO2, 1.66 g of KH, 1 g of Mg powder and 4 g of CA-III 300 activated carbon powder (dried at 300 C) in 1 inch heavy duty cell, energy gain was 20.3 kJ, and the temperature burst was 274 C(268-542 C). The maximum cell temperature was 549 C, theoretical is 10.9 kJ, gain is 1.86.

NaH 5.0 gm+MgH2 Powder 5.0 gm+Activated Carbon CAII 300 20 gm) Ball Mill+TeO2 8.0 gm, Ein: 253 kJ, dE: 77 Id, Temp. slope Jump at 200 C with Tmax ~400 C, theoretical is 48.35 kJ, gain is 1.6 times.

NaH 1.0 gm+MgH2 Powder 1.0 gm+Activated Carbon CAII 300 4.0 gm) Ball Mill+TeO2 1.6 gm, Ein: 110 Id, dE: 16 kJ, Temp. slope Jump at 190 C with Tmax ~400 C, theoretical is 9.67 kJ, gain is 1.65 times.

KH 1.66 gm+MgH2 Powder 1.0 gm+Activated Carbon CAII 300 4.0 gm) Ball Mill+TeO2 1.6 gm, Ein: 119 Id, dE:

19 Id, Temp. slope Jump at 340 C with Tmax ~570 C, theoretical is 9.67 kJ, the gain is 2 times.

4 g CAIII-300+1 g NaH+1.6 g TeO2, Ein: 116.0 kJ, dE: 11.0 kJ, TSC: 207-352 C, Tmax: 381 C, theoretical is 6.6 kJ, the gain is 1.67 times.

KH 1.66 gm+MgH2 Powder 1.0 gm+TiC 4.0 gm+TeO2 1.6 gm, Ein: 133 kJ, dE: 15 kJ, Temp. slope Jump at 280 C with Tmax ~460 C, theoretical is 8.64 kJ, the gain is 1.745 times.

4 g+1 g Mg+1 g NaH+1.60 g TeO2, Experimental dE: −17.0 kJ Reaction considered: TeO2(c)+3Mg(c)+2NaH (c)=2Mg0(c)+Na2Te(c)+MgH2(c) Q=−1192.7 kJ/reaction theoretical chemical reaction energy: −11.9 kJ, Excess heat: −5.1 kJ. 1.43X excess heat.

P2O5

1.66 g of KH, 2 g of P2O5 and 1 g of MgH2 and 4 g of CA-III 300 activated carbon powder (dried at 300 C) in 1 inch heavy duty cell, energy gain was 21.2 kJ, and temperature burst was 242 C (299-541 C). The maximum cell temperature was 549 C, the theoretical is 10.8 kJ, the excess is 10.35 kJ, the gain is 1.96 times 032609GC4: 031909RCWF4/1.66 g KH+2 g P205+1 g MgH2+4 g CA III-300 in DMF-d7 (as received), strong −3.86 ppm peak.

4 g CAIII-300+1 g MgH2+1.66 g KH+2 g P205, Ein: 138.0 kJ, dE: 21.6 kJ, TSC: 320-616 C, Tmax: 616 C, theoretical is 11.5 kJ, excess is 10.1 kJ, gain is 1.9 times.

KH 8.3 gm+MgH2 Powder 5.0 gm+Activated Carbon CAII 300 20 gm) Ball Mill+P205 10.0 gm, Ein: 272 kJ, dE: 98 kJ, Jump at 250 C with Tmax ~450 C, theoretical is 54 kJ, gain is 1.81 times.

KH 1.66 gm+MgH2 Powder 1.0 gm+Activated Carbon CAII 300 4 gm) Ball Mill+P205 2.0 gm, Ein: 130 kJ, dE: 21 kJ, Jump at 300 C with Tmax ~550 C, theoretical is 10.8 kJ, gain is 1.94 times.

KH 1.66 gm+MgH2 Powder 1.0 gm+TiC 4.0 gm+P205 2.0 gm, Ein: 129 kJ, dE: 21 kJ, Temp. slope Jump at 270 C with Tmax ~600 C theoretical is 10.8 kJ, the gain is 1.95 times.

NaMnO4

4 g CAIII-300+1 g Si+1 g NaH+3.5 g NaMnO4; Ein: 123.0 kJ; dE: 26.25 kJ; TSC: 45-330 C; Tmax: 465 C, theoretical is 17.6 kJ, excess is 8.7 kJ, gain is 1.5 times.

4 g CAIII-300+1 g Al+1 g NaH+3.5 g NaMnO4; Ein: 120.0 kJ; dE: 32.41 kJ; TSC: 44-373 C; Tmax: 433 C, theoretical is 20.5 kJ, excess is 7.7 kJ, gain is 1.58 times.

4 g CAIII-300+1 g Mg+1 g NaH+3.5 g NaMnO4; Ein: 66.0 kJ; dE: 32.27 kJ; TSC: 74-430 C; Tmax: 430 C, theoretical is 17.4 kJ, excess is 14.9 kJ, gain is 1.85 times.

4 g CAIII-300+1 g Mg+1 g NaH+3.5 g NaMnO4, Ein: 72.0 kJ, dE: 34.1 kJ, TSC: 49-362 C, Tmax: 364 C, theoretical is 17.4 kJ, excess is 16.7 kJ, gain is 2.

KH 8.3 gm+Mg Powder 5.0 gm+Activated Carbon CAII 300 20 gm) Ball Mill+NaMnO4 17.5 gm, Ein: 130 kJ, dE: 160 kJ, Temp. slope Jump at 70 C with Tmax ~350 C, theoretical is 87 kJ, gain is 1.84 times KH 8.3 gm+Al Powder 5.0 gm+Activated Carbon CAII 300 20 gm) Ball Mill+NaMnO4 17.5 gm, Ein: 134 kJ, dE: 171 kJ, Temp. slope Jump at 50 C with Tmax ~350 C, theoretical is 102.5 kJ, gain is 1.66 times.

NaH 1.0 gm+Mg Powder 1.0 gm+Activated Carbon CAII 300 4.0 gm) Ball Mill+NaMnO4 3.5 gm (Theoretical −17.4 kJ), Ein: 54 kJ, dE: 32 kJ, Temp. slope Jump at 60 C with Tmax ~450 C, theoretical is 17.4 kJ, gain is 1.8 times.

KH 1.66 gm+Mg Powder 1.0 gm+TiC 4.0 gm+NaMnO4 3.5 gm, Ein: 65 kJ, dE: 30 kJ, Temp. slope Jump at 70 C with Tmax ~410 C, theoretical is 17.4 kJ, the gain is 1.7 times.

Nitrate 2. g of NaH, 3 g of NaNO3 and the mixture of 1 g of Ti powder and 4 g of activated C powder (dried at 300 C) in 1 inch cell, energy gain was 33.2 kJ, and temperature burst was 418 C (110-528 C). The maximum cell temperature was 530 C, theoretical is 24.8 kJ, excess is 8.4 kJ, gain is 1.3 times.

3. g of NaH, 3 g of NaNO3 and the mixture of 1 g of Al nanopowder and 4 g of activated C powder (dried at 300 C) in 1 inch cell, energy gain was 42.3 kJ, and temperature burst was 384 C (150-534 C). The maximum cell temperature was 540 C, theoretical is 33.3 kJ, excess is 9 kJ, gain is 1.27 times 2, 1 g of NaH, 3 g of NaNO3 and the mixture of 1 g of MgH2 and 4 g of activated C powder (dried at 300 C) in 1 inch cell, energy gain was 43.4 kJ, and temperature burst was 382 C (67-449 C). The maximum cell temperature was 451 C, theoretical is 28.6 kJ, excess is 14.8 kJ, gain is 1.52 times.

0.33 g of LiH, 1.7 g of LiNO3 and the mixture of 1 g of MgH2 and 4 g of activated C powder (dried at 300 C) in 1 inch heavy duty cell, the energy gain was 40.1 kJ, and temperature burst was 337 C (92-429 C). The maximum cell temperature was 431 C, theoretical is 21.6 kJ, excess is 18.5 kJ, gain is 1.86 times.

0.33 g of LiH, 1.7 g of LiNO3 and the mixture of 1 g of Ti and 4 g of activated C powder (dried at 300 C) in 1 inch cell, energy gain was 36.5 kJ, and temperature burst was 319 C (83-402 C). The maximum cell temperature was 450 C, theoretical is 18.4 kJ, excess is 18 kJ, gain is 2 times.

4 g CAIII-300+1 g MgH2+1 g NaH+2.42 g LiNO3; Ein: 75.0 Id; dE: 39.01 kJ; TSC: 57-492 C; Tmax: 492 C, theoretical is 28.5 kJ, excess is 10.5 kJ, gain is 1.37 times 4 g CAIII-300+1 g Al+1 g NaH+2.42 g LiNO3; Ein: 81.2 kJ; dE: 41.89 kJ; TSC: 73-528 C; Tmax: 528 C, theoretical is 34.6 kJ, excess is 7.3 kJ, gain is 1.21 times.

ClO4

4 g CAIII-300+1 g MgH2+2 g NaClO4+1 g NaH; Ein: 86.0 kJ; dE: 38.88 kJ; TSC: 130-551 C; Tmax: 551 C, theoretical is 30.7 kJ, excess is 8.2 kJ, gain is 1.27 times.

4 g CAIII-300+1 g Al+1 g NaH+4.29 g NaClO4; Ein: 88.0 kJ; dE: 58.24 kJ; TSC: 119-615 C; Tmax: 615 C, theoretical is 47.1 kJ, excess is 11.14 kJ, gain is 1.23 times.

4 g CAIII-300+1 g MgH2+1 g NaH+4.29 g NaClO4; EM: 98.0 kJ; dE: 56.26 kJ; TSC: 113-571 C; Tmax: 571 C, theoretical is 36.2 kJ, excess is 20.1 kJ, gain is 1.55 times.

K2S2O8

4 g+1 g MgH2+1.66 g KH+2.7 g K2S208, Ein: 121.0 kJ, dE: 27.4 kJ, TSC: 178-462 C, Tmax: 468 C, theoretical is 19.6 kJ, excess is 7.8 kJ, the gain is 1.40 times.

SO2

4 g CAIII-300+1 g MgH2+1 g NaH+0.0146 mol SO2, Ein: 58.0 kJ, dE: 20.7 kJ, TSC: 42-287 C, Tmax: 309 C, theoretical 15 kJ, excess is 5.7 kJ, the gain is 1.38 times.

S 4 g CAIII-300+1 g MgH2+1 g NaH+3.2 g S, Ein: 67.0 kJ, dE: 22.7 kJ, TSC: 49-356 C, Tmax: 366 C, theoretical is 17.9 kJ, excess is 4.8 kJ, the gain is 1.27 times.

1.3 g of S powder, 1.66 g of KH, 1 g of Si powder and 4 g of CA-III 300 activated carbon powder (dried at 300 C) in 1 inch heavy duty cell, energy gain was 13.7 kJ, and the temperature burst was 129 C(66-195 C). The maximum cell temperature was 415 C, theoretical is 7.5 kJ, excess is 1.82 times.

3.2 g of S powder, 0.33 g of LiH, 1 g of Al powder and 4 g of CA-IV 300 activated carbon powder (dried at 300 C) in 1 inch heavy duty cell, energy gain was 27.1 kJ, and the temperature burst was 301 C(163-464 C). The maximum cell temperature was 484 C, theoretical is 20.9 kJ, excess is 6.2 kJ, gain is 1.3 times.

3.2 g of S powder, 0.33 g of LiH, 1 g of Si powder and 4 g of CA-IV 300 activated carbon powder (dried at 300 C) in 1 inch heavy duty cell, energy gain was 17.7 kJ, and the temperature burst was 233 C(212-445 C). The maximum cell temperature was 451 C, theoretical is 13.7 kJ, excess is 4 kJ, gain is 1.3 times.

4 g CAIII-300+1 g Si+1.66 g KH+1.3 g S, Ein: 81.0 kJ, dE: 10.8 kJ, TSC: 52-196 C, Tmax: 326 C, theoretical is 7.4 kJ, gain is 1.45 times.

SnF4

4 g+1 g Mg+1 g NaH+1.95 g SnF4; Ein: 130.2 kJ; dE: 13.89 kJ; TSC: 375-520 C; Tmax: 525 C, theoretical is 9.3 kJ, the gain is 1.5 times.

4 g CAIII-300+1 g Mg+1 g NaH+1.95 g SnF4; Ein: 130.2 kJ; dE: 13.89 kJ; TSC: 375-520 C; Tmax: 525 C, theoretical is 9.3 kJ, the gain is 1.5 times.

SeO2

4 g CAIII-300+2 g MgH2+2 g NaH+2.2 g SeO2, Ein: 82.0 kJ, dE: 29.5 kJ, TSC: 99-388 C, Tmax: 393 C, theoretical is 20.5 kJ, gain is 1.4 times.

CS2

NaH 1.0 gm+(Al Powder 1.0 gm+Activated Carbon CAII 300 4 gm) Ball Mill+CS2 1.2 ml in PP Vial, Ein: 72 kJ, dE: 18 kJ, Temp. Slope jump at ~80 C with Tmax ~320 C, theoretical is 11.4 kJ, gain is 1.58 times.

NaH 1.0 gm+MgH2 Powder 1.0 gm+Activated Carbon CAII 300 4 gm) Ball Mill+CS2 1.2 ml in PP Vial, Ein: 82 kJ, dE: 18 kJ, Temp. Slope jump at 80 C with Tmax ~330 C, theoretical is 12.6 kJ, gain is 1.4 times.

CO2

4 g CAIII-300+1 g MgH2+1 g NaH+0.00953 mol CO2 (Cell temperature rose up to 45 C upon CO2 fill); Ein: 188.4 kJ; dE: 10.37 kJ; TSC: 80-120 C; Tmax: 508 C, theoretical is 6.3 kJ, the gain is 1.65 times.

PF5

4 g CAIII-300+1 g Al+1 g NaH+0.010 mol PF5; Ein: 127.0 kJ; dE: 15.65 kJ; TSC: 210-371 C; Tmax: 371 C, theoretical is 10 kJ, excess is 6.45 kJ, the gain is 1.57 times.

4 g CAIII-300+1 g Al+1 g NaH+0.01 mol PF5, Ein: 101.0 kJ, dE: 15.7 kJ, TSC: 178-370 C, Tmax: 391 C, theoretical is 10 Id, the gain is 1.57 times.

SNF3

NaH 1.0 gm+(Mg Powder 1.0 gm+Activated Carbon CAII-300 4 gm) Ball Mill+NF3 0.011 mole and Theoretical Energy kJ), Ein: 136 Id, dE: 28 kJ, Temp. slope jump at 70 C with Tmax ~470 C, theoretical is 19.6 kJ, gain is 1.4 times.

PCl5

4 g CAIII-300+1 g MgH2+2.08 g PCl5+1 g NaH; Ein: 90.0 kJ; dE: 20.29 kJ; TSC: 180-379 C; Tmax: 391 C, theoretical is 13.92 kJ, the gain is 1.45 times.

P2S5

4 g CAIII-300+1 g MgH2+1 g NaH+2.22 g P2S5; Ein: 105.0 kJ; dE: 13.79 kJ; TSC: 150-363 C; Tmax: 398 C, theoretical is 10.5 kJ, the excess is 3.3 kJ, the gain is 1.3 times.

NaH 1.0 gm+Al Powder 1.0 gm+Activated Carbon CAII 300 4 gm) Ball Mill+P2S5 2.22 gm), Ein: 110 kJ, dE: 14 kJ, Temp. Slope jump at ~170 C with Tmax ~-425 C, theoretical is 10.1 kJ, gain is 1.39 times.

Oxide 4 g AC+1 g MgH2+1.66 g KH+1.35 g K02, Ein: 86.0 kJ, dE: 21.0 kJ, TSC: 157-408 C, Tmax: 416 C, theoretical is 15.4 kJ, gain is 1.36 times.

MnO4

4 g CAIII-300+1 g Mg+1 g NaH+3.5 g MnO2; Ein: 108.0 kJ; dE: 22.11 kJ; TSC: 170-498 C; Tmax: 498 C, theoretical is 18.4 kJ, excess is 3.7 kJ, gain is 1.2 times.

N2O 4 g Pt/C+1 g Mg+1 g NaH+0.0198 mol N2O, Ein: 72.0 kJ, dE: 22.2 kJ, TSC: 73-346 C, Tmax: 361 C, theoretical is 16.2 kJ, gain is 1.37 times.

HFB

NaH 1.0 gm+(Aluminum Nano Powder 1 gm+Activated Carbon (AC) 5 gm) Ball Milled+HFB 1 ml, Ein: 108 kJ, dE 35 kJ, Temp. jump of 450° C. at 90° C.

NaH 1.0 gm+(La 5 gm+Activated Carbon 5 gm) Ball-milled+HexaFluoro Benzene 1 ml, Ein: 109 kJ, dE: 38 kJ, Temp. jump of 400° C. at 90° C.

(4 g activated carbon (AC)+1 g $MgH_2$) Ball Milled+1 ml HFB+1 g NaH, Ein: 150.0 kJ, dE: 45.1 kJ, TSC: ~50-240, Tmax ~250° C.

Blend (4 g AC+1 g $MgH_2$)+1 ml HFB+1 g NaH, Ein: 150.0 kJ, dE: 35.0 kJ, TSC: 54-255° C., 45-241° C., 48-199° C.; Tmax: 258° C., 247° C., 206° C. (three tandem cells).

1.66 g of KH, 1 ml of hexadecafluoroheptane (HDFH), and the mixture of 4 g of activated C powder and 1 g of MgH2 in a 1 inch cell, dE: 34.3 kJ, and the burst was 419° C. (145-564° C.), Tmax ~575° C.

B. Solution NMR

Representative reaction mixtures for forming hydrino comprise (i) at least one catalyst such as one chosen from LiH, ICH, and NaH, (ii) at least one oxidant such as one chosen from $NiBr_2$, $MnI_2$, AgCl, $EuBr_2$, $SF_6$, S, $CF_4$, NF $LiNO_3$, $M_2S_2O_8$ with Ag, and $P_2O_5$, (iii) at least one reductant such as one chosen from Mg powder, or $MgH_2$, Al powder, or aluminum nano-powder (Al NP), Sr, and Ca, and (iv) at least one support such as one chosen from AC and TiC. 50 mg of reaction product of the reaction mixtures were added to 1.5 ml of deuterated N,N-dimethylformamide-d7 $(DCON(CD_3)_2$, DMF-d7, (99.5% Cambridge Isotope Laboratories, Inc.) in a vial that was sealed with a glass TEFLON™ valve, agitated, and allowed to dissolve over a 12 hour-period in a glove box under an argon atmosphere. The solution in the absence of any solid was transferred to an NMR tube (5 mm OD, 23 cm length, Wilmad) by a gas-tight connection, followed by flame-sealing of the tube. The NMR spectra were recorded with a 500 MHz Bruker NMR spectrometer that was deuterium locked. The chemical shifts were referenced to the solvent frequency such as DMF-d7 at 8.03 ppm relative to tetramethylsilane (TMS).

The hydrino hydride ion $H^-$(¼) was predicted to be observed at about −3.86 ppm and molecular hydrino $H_2$(¼) was predicted to be observed at 1.25 ppm relative to TMS. The position of occurrence of these peaks with the shift and intensity for a specific reaction mixture are given in TABLE 4.

TABLE 4

The 1H solution NMR following DMF-d7 solvent extraction of the product of the heterogeneous hydrino catalyst systems comprising reactants (I) catalyst such as LiH, KU, or NaH, (ii) reductant such as Al, Al NP, Mg, or MgH2, and (iii) oxidant such as $CF_4$, $N_2O$, $NF_3$, $K_2S_2O_8$, $FeSO_4$, $O_2$, $LiNO_3$, $P_2O_5$, $SF_6$, S, $CS_2$, $NiBr_2$, $TeO_2$, $NaMNO_4$, $SnF_4$, and $SnI_4$ mixed with (iv) a support such as AC or Pt/C.

| Reactants | H2 (1/4) Peak position and Intensity | H⁻ (1/4) Peak position and Intensity |
|---|---|---|
| 1.66 g KH, 1 g Al, 4 g AC, and 0.01 moles CF4 | 1.22 ppm strong | minus 3.85 ppm strong |
| 1 g NaH, 1 g Al, 4 g AC, and 0.01 moles CF4 | 1.23 ppm strong | |
| 1 g NaH, 1 g MgH2, 4 g AC, and 0.01 moles CF4 | 1.22 ppm strong | |
| 1 g NaH, 1 g MgH2, 4 g AC and 0.004 mole CF4 | 1.22 ppm strong | |
| 1 g NaH, 1 g Mg, 4 g AC and 52 milli mole CF4 | 1.21 ppm medium | |
| 1 g NaH, 1 g Al, 4 g AC and 52 milli mole CF4 | 1.21 ppm strong | |
| 1 g NaH, 1 g MgH2, 4 g Pt/C and 0.01 mole CF4 | 1.27 ppm medium | minus 3.86 ppm medium |
| 1 g NaH, 1 g Al, 4 g Pt/C and 0.002 mole CF4 | 1.21 ppm strong | |
| 0.5 g NaH, 0.5 g Mg, 2 g AC and 52 millimole CF4 | 1.22 ppm strong | |
| 0.5 g NaH, 0.5 g Al, 2 g AC and 0.002 mole CF4 | 1.21 ppm strong | |
| 1.66 g KH, 1 g MgH2, 4 g AC, 0.01 moles N2O | 1.22 ppm very strong | minus 3.85 ppm medium |
| 1 g NaH, 1 g Al, 4 g AC, 0.002 moles N2O | 1.21 ppm strong | |
| 1 g NaH, 1 g Al, 4 g AC, 0.004 moles N2O | 1.21 ppm strong | |
| 1 g NaH, 1 g MgH2, 4 g AC, 0.002 moles N2O | 1.21 ppm strong | |
| 1 g NaH, 1 g MgH2, 4 g AC, 0.004 moles N2O | 1.22 ppm medium | |
| 1 g NaH, 1 g Al, 4 g AC and 0.01 mole N2O | 1.24 ppm strong | |
| 1 g NaH, 1 g MgH2, 4 g AC and 0.018 mole N2O | 1.24 ppm strong | minus 3.84 ppm strong |
| 0.33 g LiH, 1 g Al, 4 g Al and 0.004 mole N2O | 1.22 ppm medium | minus 3.85 ppm strong |
| 1 g NaH, 1 g MgH2, 4 g Pd/C(1%) and 0.01 mole N2O | 1.24 ppm very strong | |
| 1 g NaH, 4 g AC and 0.004 mole N2O | 1.21 ppm very strong | |
| 1 g NaH, 1 g MgH2, 5 g Er2O3, 4 g Ac and 0.01 mole N2O | 1.23 ppm strong | |
| 1 g NaH, 1 g Al, 5 g Er2O3, 4 g Ac and 0.01 mole N2O | 1.24 ppm strong | |
| 1 g NaH, 1 g Mg, 4 g Ac and 0.004 mole N2O | 1.23 ppm strong | |
| 0.5 g NaH, 0.5 g MgH2, 4 g AC and 0.004 mole N2O | 1.22 ppm strong | |
| 0.33 g LiH, 1 g Al, 4 g AC, 0.21 g K2S2O8 and 0.01 mole O2 | 1.26 ppm medum | minus 3.85 ppm very strong |
| 0.33 g LiH, 1 g Al, 4 g AC and 0.01 mole 02 | 1.27 ppm medium | minus 3.85 ppm strong |
| 0.33 g LiH, 1 g MgH2, 4 g AC, 0.21 g K2S2O8 and 0.01 mole O2 | 1.27 ppm medium | minus 3.85 ppm very strong |
| 1 g NaH, 1 g MgH2, 4 g AC, 0.15 g FeSO4 and 0.01 mole O2 | 1.24 ppm strong | |
| 1.66 g KH, 1 g Mg, 4 g AC and 0.004 mole O2 | 1.21 ppm strong | |
| 1 g NaH, 1 g Si, 4 g AC and 0.01 mole O2 | 1.21 ppm strong | |
| 1 g NaH, 10 g Pt/Ti, 1 g MgH2, 4 g AC, 0.01 mole NH3 and 0.01 mole O2 | 1.22 ppm very strong | |
| 0.5 g NaH, 0.5 g Al, 4 g AC and 0.002 mole NF3 | 1.22 ppm medium | minus 3.85 ppm strong |
| 0.5 NaH, 0.5 g MgH2, 4 g AC and 0.004 mole NF3 | 1.21 ppm very strong | |
| 1 g NaH, 1 g Al, 4 g AC and 0.002 mole NF3 | 1.21 ppm strong | |
| 0.5 g NaH, 0.5 g MgH2, 4 g AC and 0.004 mole NF3 | | minus 3.85 ppm medium |
| 0.5 NaH, 0.5 g MgH2, 4 g AC and 0.002 mole NF3 | 1.22 ppm strong | |
| 1.66 g KH, 2.5 g LiNO3, 4 g AC and 1 g MgH2 | 1.22 ppm strong | minus 3.85 ppm strong |
| 1 g NaH, 3 g NaNO3, 4 g AC and 1 g MgH2 | | minus 3.84 ppm medium |
| 1 g NaH, 2.5 g LiNO3, 4 g AC and 1 g MgH2 | | minus 3.84 ppm medium |
| 1.66 g KH, 2.5 g LiNO3 and 1 g MgH2 | 1.22 ppm very strong | |
| 1.66 g KH, 2 g P2O5, 4 g AC and 1 g MgH2 | 1.28 ppm very strong | minus 3.86 ppm strong |
| 0.33 g LiH, 2 g P2O5, 4 g AC and 1 g MgH2 | | minus 3.85 ppm medium |
| 1 g NaH, 2 g P2O5, 4 g AC and 1 g MgH2 | | minus 3.85 ppm medium |
| 1 g NaH, 2 g P2O5, 4 g AC and 1 g Al | 1.20 ppm strong | minus 3.85 ppm medium |
| 1.66 g KH, 1 g MgCl2, 4 g AC, 4.5 g KO2 and 0.1 g CoCl2 | 1.23 ppm very strong | minus 3.85 ppm medium |
| 1 g NaH, 1 g MgH2, 4 g AC and 0.0094 mole SF6 | | minus 3.84 ppm very strong |
| 1 g NaH, 0.5 g B, 4 g AC and 0.0047 mole SF6 | | minus 3.85 ppm strong |
| 1 g NaH, 1 g Mg, 4 g AC and 0.01 mole SF6 | | minus 3.86 ppm strong |
| 1 g NaH, 1 g Al, 4 g AC and 0.005 mole SF6 | 1.20 ppm strong | minus 3.86 ppm weak |
| 1.66 g KH, 1 g Si, 4 g AC and 0.0092 mole SF6 | | minus 3.86 ppm very strong |
| 1.66 g KH, 1 g Al, 4 g AC and 0.0092 mole SF6 | | minus 3.86 ppm very strong |
| 1.66 g KH, 1 g MgH2, 4 g AC and 0.0092 mole SF6 | | minus 3.86 ppm very strong |
| 0.33 g LiH, 1 g MgH2, 4 g AC and 0.009 mole SF6 | | minus 3.82 ppm very strong |
| 0.33 g LiH, 1 g Mg, 4 g AC and 0.009 mole SF6 | | minus 3.84 ppm medium |
| 0.33 g LiH, 1 g La, 4 g AC and 0.0094 mole SF6 | | minus 3.75 ppm board |
| 1.66 g KH, 1 g MgH2, 4 g AC and 0.0093 mole SF6 | 1.21 ppm strong | minus 3.86 ppm weak |
| 1 g NaH, 5 g La, 4 g AC and 0.0047 mole SF6 | 1.21 ppm medium | minus 3.86 ppm weak |
| 1 g NaH, 1 g MgH2, 4 g AC and 3.2 g S | | minus 2.83 ppm very strong |
| 1 g NaH, 1 g MgH2, 4 g AC and 3.2 g S (outside) | | minus 2.83 ppm strong and board |
| 0.33 g LiH, 1 g Si, 4 g AC and 1.3 g S | | minus 3.81 ppm very strong |
| 0.33 g LiH, 1 g Al, 4 g AC and 1.3 g S | | minus 3.81 ppm very strong |
| 1.66 g KH, 1 g Al, 4 g AC and 1.3 g S | | minus 3.47 ppm very strong |
| 1.66 g KU, 1 g Al, 4 g AC and 1.3 g S | | minus 3.86 ppm very strong |
| 1.66 g KH, 1 g Si, 4 g AC and 1.3 g S | | minus 3.55 ppm very strong |
| 1.66 g KH, 1 g Si, 4 g AC and 1.3 g S | | minus 3.85 ppm strong |
| 1.66 g KH, 1 g MgH2, 4 g AC and 2.7 g K2S2O8 | 1.24 ppm strong | minus 3.85 ppm very strong |
| 1 g NaH, 1 g Al, 4 g AC and 1.2 ml CS2 | | minus 3.85 ppm very strong |
| 1 g NaH, 1 g MgH2, 4 g AC and 1.2 ml CS2 | | minus 3.85 ppm very strong |
| 1 g NaH, 1 g MgH2, 4 g AC and 0.0146 mol SO2 | 1.21 ppm medium | minus 3.86 ppm medium |

TABLE 4-continued

The 1H solution NMR following DMF-d7 solvent extraction of the product of the heterogeneous hydrino catalyst systems comprising reactants (I) catalyst such as LiH, KU, or NaH, (ii) reductant such as Al, Al NP, Mg, or MgH2, and (iii) oxidant such as $CF_4$, $N_2O$, $NF_3$, $K_2S_2O_8$, $FeSO_4$, $O_2$, $LiNO_3$, $P_2O_5$, $SF_6$, S, $CS_2$, $NiBr_2$, $TeO_2$, $NaMnO_4$, $SnF_4$, and $SnI_4$ mixed with (iv) a support such as AC or Pt/C.

| Reactants | H2 (1/4) Peak position and Intensity | H− (1/4) Peak position and Intensity |
|---|---|---|
| 1 g NaH, 1 g MgH2, 4 g AC and 2.2 g NiBr2 | 1.23 ppm strong | |
| 1 g NaH, 1 g Mg, 4 g AC and 2.2 g NiBr2 | 1.25 ppm medium | |
| 1 g NaH, 4 g AC and 2.2 g NiBr2 | 1.24 ppm very strong | |
| 1.66 g KH, 4 g AC and 2.2 g NiBr2 | 1.22 ppm very strong | |
| 1 g NaH, 1.66 g Ca, 4 g AC and 2.2 g NiBr2 | 1.24 ppm very strong | |
| 1 g NaH, 3.67 g Sr, 4 g AC and 3.1 g MnI2 | 1.24 ppm very strong | |
| 83 g KH, 50 g Mg, 200 g TiC and 154.5 g MnI2 | 1.24 ppm strong | |
| 1 g NaH, 1.66 g Ca, 4 g AC and 3.1 g MnI2 | 1.23 ppm very strong | |
| 1 g NaH, 4 g AC and 1.6 g TeO2 | 1.21 ppm strong | minus 3.85 ppm strong |
| 2 g NaH, 2 g MgH2, 4 g AC and 3.2 g TeO2 | 1.21 ppm medium | |
| 1.66 g KH, 1 g MgH2, 4 g AC and 1.6 g TeO2 | 1.21 ppm strong | |
| 0.33 g LiH, 1 g MgH2, 4 g AC and 1.6 g TeO2 | 1.22 ppm medium | |
| 1 g NaH, 1 g Mg, 4 g AC and 3.5 g NaMnO4 | 1.21 ppm medium | |
| 8.3 g KH, 5 g Mg, 20 g AC and 17.5 g NaMnO4 | 1.21 ppm strong | |
| 1.66 g KH, 1 g Mg, 4 g AC and 2.0 g SnF4 | 1.23 ppm medium | |
| 1.66 g KH, 1 g Mg, 4 g AC and 6.3 g SnI4 | 1.21 ppm medium | |
| 1.66 g KH, 4 g AC and 3.79 g SnI2 | 1.24 ppm very strong | |
| 1 g NaH, 1 g Mg, 4 g AC and 1.57 g SnF2 | 1.22 ppm strong | |
| 83 g KH, 50 g Mg, 200 g WC and 185 g SnI2 | 1.23 ppm medium | |
| 1 g NaH, 1.66 g Ca, 4 g AC and 1.34 g CuCl2 | 1.22 ppm very strong | |
| 1 g NaH, 1 g Mg, 4 g AC and 0.96 g CuS | 1.21 ppm strong | |
| 8.3 g KH + 5 g Mg + 20 g CA II-300 + 14.85 g BaBr2 | 1.22 ppm strong | |
| 5 g NaH + 5 g Mg + 20 g CA II-300 + 14.85 g BaBr2 | 1.22 ppm medium | |
| 20 g AC 3-3 + 8.3 g KH + 7.2 g AgCl | 1.22 ppm medium | |
| 3.09 g MnI2 + 1.66 g KH + 1 g Mg + 4 g S TiC-1 | 1.25 ppm medium | |

What is claimed is:

1. A solid fuel reaction mixture comprising:
(a) inorganic halide selected from $PF_5$, and $NF_3$, inorganic oxide selected from $SnO_2$, $As_2O_3$, $Bi_2O_3$, $TeO_2$, $P_2O_5$, and $SeO_2$,
inorganic nitrate, wherein the inorganic nitrate is $LiNO_3$, metal carbide selected from TiC, and WC,
inorganic nitride selected from $Mg_3N_2$, $Zn_3N_2$, and $Ca_3N_2$,
inorganic sulfide selected from $Li_2S$, ZnS, CoS, MnS, $Cu_2S$, $Y_2S_3$, CuS, FeS, $Sb_2S_5$, and $CS_2$, inorganic boride selected from $CrB_2$ and $TiB_2$, or combinations thereof;
(b) metal hydride or metal hydroxide; and
(c) one or more alkali or alkali earth metals.

2. The reaction mixture according to claim 1, wherein component (b) comprises an alkali metal hydride and/or an alkali earth metal hydride.

3. The reaction mixture according to claim 2, wherein component (b) comprises an alkali metal hydride comprising LiH, KH, or combinations thereof and/or an alkali earth metal hydride comprising $MgH_2$.

4. The reaction mixture according to claim 1, wherein said one or more alkali or alkali earth metals of component (c) is present and said metal is selected from Mg or Ca.

5. The reaction mixture according to claim 1, wherein said reaction mixture further comprises activated carbon.

6. The reaction mixture according to claim 1, wherein said reaction mixture comprises an inorganic nitride selected from $Mg_3N_2$, $Zn_3N_2$, and $Ca_3N_2$.

7. The reaction mixture according to claim 1, wherein component (a) further comprises an inorganic sulfide selected from $Li_2S$, ZnS, CoS, MnS, $Cu_2S$, $Y_2S_3$, CuS, FeS, $Sb_2S_5$, and $CS_2$.

8. The reaction mixture according to claim 1, wherein component (a) further comprises an inorganic boride selected from $CrB_2$ and $TiB_2$.

9. The reaction mixture according to claim 1, component (a) further comprises an inorganic oxide selected from $SnO_2$, $As_2O_3$, $Bi_2O_3$, $TeO_2$, $P_2O_5$, and $SeO_2$.

10. The reaction mixture according to claim 1, wherein component (a) further comprises an inorganic nitrate, wherein the inorganic nitrate is $LiNO_3$.

11. A system for generating power comprising:
(a) the solid fuel reaction mixture according to claim 1; and
(b) a heater coupled to said solid fuel reaction mixture;
wherein said heater is capable of initiating a reaction in said solid fuel to generate power.

* * * * *